United States Patent [19]

Sharir et al.

[11] Patent Number: 5,903,317

[45] Date of Patent: May 11, 1999

[54] APPARATUS AND METHOD FOR DETECTING, IDENTIFYING AND INCORPORATING ADVERTISEMENTS IN A VIDEO

[75] Inventors: Avi Sharir, Ramat Hasharon; Michael Tamir, Tel-Aviv, both of Israel

[73] Assignee: Orad Hi-Tech Systems Ltd., Forest Hills, N.Y.

[21] Appl. No.: 08/501,088

[22] PCT Filed: Feb. 14, 1994

[86] PCT No.: PCT/US94/01679

§ 371 Date: Nov. 9, 1995

§ 102(e) Date: Nov. 9, 1995

[87] PCT Pub. No.: WO95/10919

PCT Pub. Date: Apr. 20, 1995

[30] Foreign Application Priority Data

Feb. 14, 1993 [IL] Israel ........................................ 104725
Oct. 12, 1993 [IL] Israel ........................................ 107266

[51] Int. Cl.[6] ..................................................... H04N 9/74
[52] U.S. Cl. ........................... 348/589; 348/157; 348/159; 348/468; 348/584
[58] Field of Search ..................................... 348/153, 157, 348/159, 139, 426, 6, 7, 10, 11, 12, 17, 461, 559, 464, 465, 467, 468, 553, 563, 564, 584, 586, 588, 589, 598, 599, 568; H04N 7/10, 7/18, 9/74

[56] References Cited

U.S. PATENT DOCUMENTS

| | | | |
|---|---|---|---|
| 4,555,726 | 11/1985 | Teeter .......................................... | 358/93 |
| 4,667,221 | 5/1987 | Cawley et al. .............................. | 358/22 |
| 4,806,924 | 2/1989 | Giraud et al. ............................... | 340/792 |
| 4,814,883 | 3/1989 | Perine et al. ............................... | 358/181 |
| 4,817,175 | 3/1989 | Tenenbaum et al. ....................... | 382/41 |
| 4,884,131 | 11/1989 | Chevion et al. ........................... | 348/384 |
| 4,907,086 | 3/1990 | Truong ....................................... | 358/183 |
| 4,947,256 | 8/1990 | Wood et al. ............................... | 358/183 |
| 4,992,866 | 2/1991 | Morgan ...................................... | 358/181 |
| 5,018,215 | 5/1991 | Nasr et al. ................................. | 382/15 |
| 5,021,887 | 6/1991 | Park ........................................... | 358/183 |
| 5,029,014 | 7/1991 | Lindstrom ................................. | 358/342 |
| 5,046,165 | 9/1991 | Pearman et al. ........................... | 358/183 |
| 5,099,331 | 3/1992 | Truong ...................................... | 358/183 |
| 5,231,494 | 7/1993 | Wachob ..................................... | 348/385 |
| 5,233,423 | 8/1993 | Jernigan et al. .......................... | 358/181 |
| 5,258,843 | 11/1993 | Truong ..................................... | 358/183 |
| 5,264,933 | 11/1993 | Rosser et al. ............................ | 358/183 |
| 5,301,240 | 4/1994 | Stockum et al. .......................... | 382/1 |
| 5,313,302 | 5/1994 | Ohta et al. ............................... | 348/586 |
| 5,335,014 | 8/1994 | Elberbaum .............................. | 348/159 |
| 5,353,392 | 10/1994 | Luquet et al. ........................... | 348/578 |
| 5,521,634 | 5/1996 | McGray .................................... | 348/153 |
| 5,598,208 | 1/1997 | McClintock ............................. | 348/159 |

FOREIGN PATENT DOCUMENTS

93/06691  4/1993  WIPO ............................ H04N 5/275

OTHER PUBLICATIONS

Canny, J., A computational approach to edge detection, *IEEE Transactions on Pattern Analysis and Machine Intelligence*, vol. PAMI–8, No. 6, Nov. 1986, pp. 679–698.

*Primary Examiner*—John K. Peng
*Assistant Examiner*—Jeffrey S Murrell
*Attorney, Agent, or Firm*—Ladas & Parry

[57] ABSTRACT

A system (FIGS. 7 and 8) and method (FIG. 1) for video tranmission of active events, for example sports events, having in the background physical images in designated targets, wherein the physical images are electronically exchanged with preselected virtual images, so that objects or shadows actually blocking potions of the physical images will be seen by viewers as blocking the same portions of the virtual images, and the motion of players or a ball blocking the physical image will block corresponding regions of the exchanged virtual images, so that the exchange electronic image will remain in the background of the event, exactly as the original image.

4 Claims, 19 Drawing Sheets

APPARATUS AND METHOD FOR DETECTING, IDENTIFYING AND INCORPORATING ADVERTISEMENTS IN A VIDEO

The present invention relates to apparatus and methods for superimposing a small video image into a larger video image.

International sports events or other spectacles generally draw the interest and attention of spectators in many countries. For example, the Olympics, Superbowl, World Cup, major basketball and soccer games, auto races etc. fit into this category. Such events are generally broadcast live by video to a large international audience. The locale in which these events take place, such as stadiums or courts, provide advertising space all around in the form of signs, posters or other displays on fences and billboards, and in fact on any unoccupied space suitably located, including sections of the playing field.

Due to the nature of the displays, which are mostly in the form of printed matter, they are not changed too frequently and remain at least for a day, or a series or a whole season, and are directed mostly at local audiences. In cases where two teams from different countries play each other, the advertisements are usually arranged so that one side of the stadium contains advertisements directed to audiences in one country, while the other side has advertisements directed to the spectators in the other country.

The video cameras in these instances film the event from opposite sides of the stadium for their respective audiences. This of course is logistically complicated and limits the angle from which the events can be seen in either of the countries represented in the game.

Another limitation to present methods of advertising is the stringent safety requirements for positioning the billboards, so as not to interfere with the game, nor disturb the view of the spectators in the stadium, nor pose a danger to the players. The displays must not be too close to the actual field of action, so as not to distract the players.

A most serious drawback of the present system for advertising at major world sports events is the fact that although the event is televised live throughout the world, the actual physical advertisements in the stadium, because of their broad international exposure, can only cater to products having a world market.

Local advertisers can only make use of such world-class televised events by locally superimposing messages on the TV screen, or by interrupting the real time of the event.

Another drawback of the existing system is that over long time periods, due to the scanning of the TV camera, the signs appear too blurred to be read by the TV viewers. On many other occasions, only part of the sign is visible to the TV viewers and the sign cannot be read.

The following reference, the disclosure of which is incorporated herein by reference, describes Gaussian edge detection:

J. F. Canny, "A computational approach to edge detection", IEEE Trans. Pattern Analysis and Machine Intelligence, Vol. 8, pp. 679–698, November, 1986.

The present invention relates to a system and method for detecting, identifying and scaling in a video frame, suitable distinct targets and areas and inserting into these areas virtual images stored in the memory of the system, so that all objects or shadows in front of the distinct areas blocking portions thereof from view will be seen in a video transmission as being in front of and blocking the same portions of the areas containing virtual images.

A particular feature of the invention is to operate the system in real time. The invention also provides apparatus for operating the system. The invention is particularly useful for advertising in sports courts.

It is an object of the present invention to provide a system and method for video transmission of active events, for example sports events, having in the background physical images in designated targets, wherein the physical images are electronically exchanged with preselected virtual images, so that objects or shadows actually blocking portions of the physical images will be seen by viewers as blocking the same portions of the virtual images, and the motion of players or a ball blocking the physical image will block corresponding regions of the exchanged virtual image, so that the exchanged electronic image will remain in the background of the event, exactly as the original image.

In a preferred embodiment of the present invention, the physical image to be substituted is detected, recognized, and located automatically and is replaced within one TV frame so that the original image is not perceptible to the TV viewers. In this embodiment no man is required in the loop during line broadcasting.

Since the same physical image may be captured by a plurality of TV cameras deployed in various locations around the court, and each camera usually has a continuous zoom lens, the system is able to detect and identify a certain physical target in all possible spatial orientations and magnifications of the target.

The system is also capable of unequivocally identifying the scale and perspective of the physical target and normalizing the implanted virtual image into the same perspective.

Another object of the invention is to provide a system and method of implanting in video transmission, virtual images in predetermined "free" background areas generally unsuitable for displaying physical signs, like he sports court itself.

In a preferred embodiment of the present invention, the task of detection and identification of these free ares is executed automatically.

A further object of the present invention is to automatically identify cases in which the physical billboard appears blurred due to camera scanning or jitter and to replace the blurred sign with a clearer one or to alternatively apply the same blurring degree to the replacing sign so that it will have an appearance similar to its neighboring signs.

Yet another object of the present invention is to automatically identify a case in which only a small portion of the billboard is visible in the camera'a field of view and to replace this small portion with the whole image of the original billboard.

Still another object of the invention is to automatically identify cases in which the resolution of the captured billboard image is not sufficient for the TV viewers and to electronically replace them with larger virtual billboards so that their message may be conveniently captured by the viewers.

Another object of the invention is to perform the implantation described above on a succession of video frames.

Yet another object of the invention is to provide the above system and method for electronic exchange or planting of virtual images in real time.

A further object of the invention is to provide a system and method for video broadcasting the same event to different populations of viewers in real time, with different electronic messages substituted in the spaces occupied by physical displays.

Still another object of the invention is to provide a system and method for utilization of available space in a stadium unused by physical displays for the purpose of advertising by planting therein electronic virtual images during real time broadcasting of an event taking place in a stadium.

Still a further object of the invention is to provide apparatus for use in video transmission for exchanging physical images with virtual images or planting virtual images in unused background areas during an event in real time video transmission, without disturbing the actual transmission of the event.

In accordance with a preferred embodiment of the present invention, there is provided a system and method for broadcasting active events being captured by a TV camera, wherein virtual images are electronically substituted in or superimposed on targets selected from physical displays and preselected background regions, including an electronic data bank of event locales and targets therein, a memory unit for storing digitized virtual images for substitution in the targets, apparatus for grabbing and digitizing video frames, apparatus for automatic target searching in digitized video frames and for detecting targets therein, apparatus for localization, verifying and identifying the targets, apparatus for comparing the detected targets with corresponding targets in the data bank, apparatus for scaling and identifying the perspective of the original target and transforming the virtual substitute image into the same scale and perspective, apparatus for real-time video tracking of a detected target throughout a succession of frames, and for the identification of target magnification (zoom) or changes in perspective, apparatus for distinguishing between non-background objects and shadows that block portions of the detected targets, apparatus for electronically transferring the objects and shadows from the original video frame to the substituted frame, apparatus for inserting the electronically transformed virtual image into the video frame substituting the original image in the target without this transformation being perceptible by the viewers, apparatus for receiving and storing virtual images and generating a virtual images data bank, apparatus for generating a locale data bank either prior or during an event (a learning system) and video signal input-output apparatus.

For this purpose the system uses a special method for the automatic detection and identification of targets using one or more of the following attributes:

geometry—such as the physical configuration of billboards (rectangular shape or parallel lines attribute) as seen from different angles and magnifications, texture of slogans and graphics—such as for example in posters, character recognition, field or court lines—which serve as references for designating free court areas, standard objects that have typical shape and texture—such as post, backboard, basket and/or a player's shirt, colour, and objects and shadows temporarily blocking portions of the image intended to be exchanged.

The method clearly identifies the subject target at any capturing angle and range and in any zoom state, and preferably in real time, so that the original billboard will not be perceptible to the TV viewers. The method typically identifies, in any frame, a relatively large number of targets (up to 20 targets or more in an extreme case).

Blocking objects and shadows are distinguished from the background image by means of:

comparing the detected target (partially blocked) with the same target stored in the system's data bank. The smooth and processed difference image between the two is the image of hidden surfaces which forms a part of the blocking object. This procedure may be implemented also by using correlation windows and identifying a low value of the correlation coefficient as being due to occlusion, motion detection—to identify objects that move with respect to the background, texture and geometric shape—distinguishing a player, ball or shadow from a sign, slogan or graphic image etc., and colour—and shades of colour.

The electronic exchange is preferably instant and unnoticeable by the viewer since a perceptible exchange is usually unaccepted by the TV networks. Alternatively, it is possible to continuously "fade" the original image while enhancing the virtual image.

False identification of targets and images is preferably avoided.

The substituted target should be localized to sub-pixel accuracy so that the replacing target be spatially fixed with respect to the frame during the whole succession of TV frames in which the target is inside the camera's field of view. This accuracy is due to the fact that the human eye is sensitive to sub-pixel motions.

The methods preferably employ special parallel and pipelined processing hardware which will allow carrying out simultaneously the large number of operations involved in this process.

The method of this invention preferably uses two optional sub-systems:

a) Digital Image Converter and Storage Unit—consisting of an electro-optical scanner for digital conversion and storage of virtual images, for constructing a memory unit for images such as advertisements. The system may also have the possibility of inputting images such as advertisements in other ways, as by digital interface (magnetic, optical disc, communication link) or video port, and may further include a graphics programme and man-machine interface for designing virtual images (like slogans) "on-the-spot".

b) Locale "learning" and storage system—for creating a data bank of targets and fixed objects in locales such as stadiums and fields, including: signs (location, shape, colour and type—one-time, seasonal, etc.), court markets (lines, colour, goal/basket, post), etc.

These two sub-systems can operate off-line or can be part of the basic system. The system can "learn" the details of the court in the course of a live event and create/update its data bank for future use. This can also be done using the trial shots taken before the event starts.

The method involves the following steps:

When the live or previously recorded video film is being transmitted, the following steps take place:

1) Frame grabbing and digitization—each video frame is grabbed and each pixel value is digitized and stored in system memory, 2) Searching—the captured video frame is scanned to detect either actual physical displays (like the icons stored in the memory) or background regions suitable for implantation whose specifications have been predefined. After detection, suspected targets, i.e. displays, are checked for unequivocal identification. This is accomplished by identification of messages and graphics in the displays, or of colour and texture attributes using standard pattern recognition techniques like edge correlation and region matching methods, character recognition, neutral network techniques and so on. After the target (display) has been identified and accurately localized, its optical magnification and perspective are computed and the locations of all other stored targets (displays) in the frame are consecutively predicted using the locale's lay-out in the data bank, giving the system positive search clues for additional targets in the same video frame.

3) Blocked surface identification—when a given message area or display region is positively identified in a frame, the target (display) is compared with its properly scaled stored image (icon) and those areas of the display that are temporarily blocked by an object such as by the body of a player, by a ball or a shadow etc. are revealed after proper smoothing and processing of the results. The pixel addresses of these surfaces are stored so that these surfaces will later be superimposed on the substituted image.

4) Scaling, perspective transformation and substitution—when a physical image display or a free location is identified and localized, the memory of the system is searched to find the desired virtual image to be substituted or implanted. The exchanged virtual image (patch) is then first normalized to acquire the proper size and perspective of the original physical image and identified blocked surfaces are then removed, so that the exchanged image looks like a background display or as a painted display on the court.

5) Real-time video tracking—typically a given display is visible for a few second before it moves out of the camera's field of view. The system preferably uses previous frames' information to track a given display throughout this succession of frames. To do that, conventional video tracking techniques, such as edge, centroid or correlation tracking methods, are executed. These methods should incorporate subpixel accuracy estimates. Tracking of players or of the ball can also be instrumental to identify blocking portions in the case where target icons are not stored in the system memory or for implantation in free regions.

There is thus provided, in accordance with a preferred embodiment of the present invention, apparatus for advertisement incorporation including a field grabber operative to grab and digitize at least one field representing at least a portion of a sports facility, and an advertisement incorporator operative to incorporate, into at least one field, an advertisement whose contents varies over time.

Further in accordance with a preferred embodiment of the present invention, the advertisement incorporator includes an advertisement site detector operative to detect at least one advertisement site in at least one field on a basis other than location of the advertisement site relative to the sports facility.

Still further in accordance with a preferred embodiment of the present invention, the advertisement incorporator is operative to incorporate an advertisement into at least one field at a partially occluded advertisement site within the sports facility.

Still further in accordance with a preferred embodiment of the present invention, the contents of the advertisement varies in accordance with a predetermined schedule.

Additionally in accordance with a preferred embodiment of the present invention, the contents of the advertisement varies in accordance with an external input.

Further in accordance with a preferred embodiment of the present invention, the advertisement incorporator also includes an audience noise evaluator operative to detect and evaluate a level of noise generated by an audience and to provide a noise level input to the advertisement incorporator and wherein the contents of the advertisement varies in accordance with the noise level input.

There is additionally provided, in accordance with a preferred embodiment of the present invention, a method for advertisement incorporation including grabbing and digitizing at least one field representing at least a portion of a sports facility, and incorporating into at least one field, an advertisement whose contents varies over time.

The present invention will be understood and appreciated more fully from the following detailed description, taken in conjunction with the drawings and appendices in which.

Figure 1:
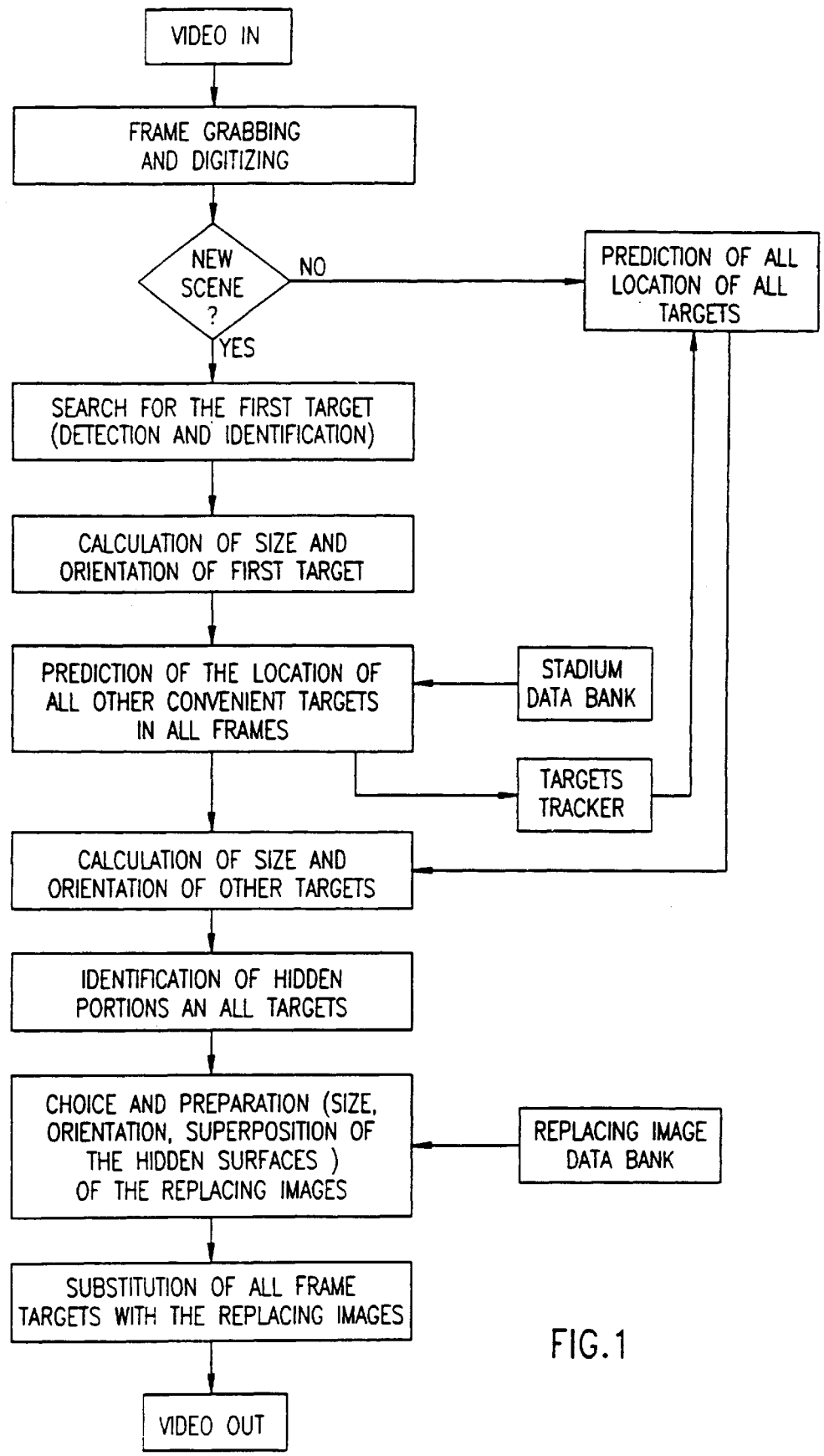
FIG. 1 is a logical flow diagram of the processes and tasks required in accordance with a preferred embodiment of the method of the present invention.

Referring now to FIG. 1, in a preferred embodiment of the present invention, the system and method are designed to automatically perform the substitution of physical targets with synthetic images in real time, although a simpler version of the invention can be used off-line.

Figure 2:
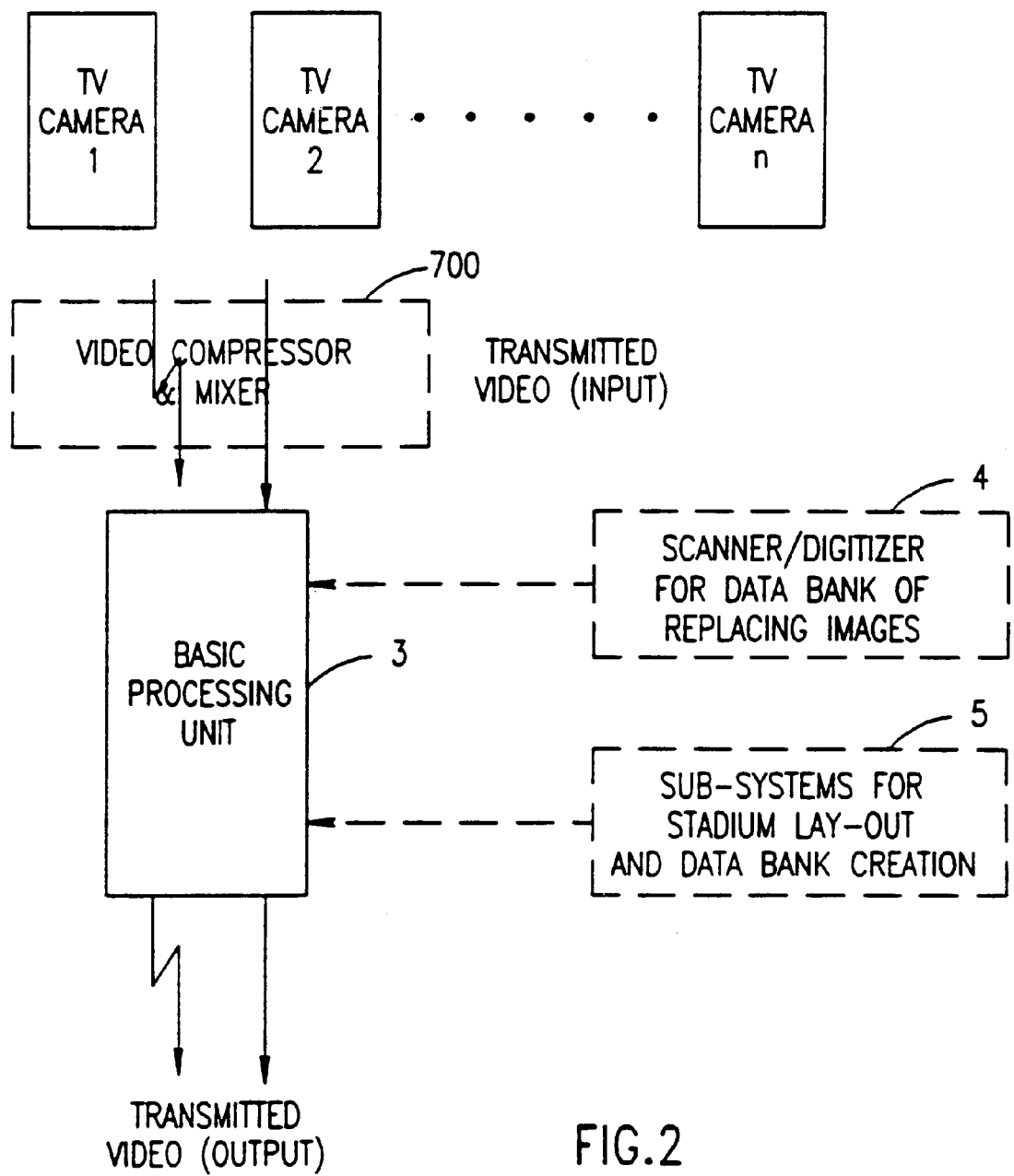
FIG. 2 is a block diagram of the basis and sub-system modules in accordance with a preferred embodiment of the present invention.

When operating the system, the modules required are illustrated in the block diagram of FIG. 2. These include:

a basic processing unit;

an optional scanner/digitizer used to create the data bank of synthetic images from still pictures; and an optional sub-system composed of a TV camera, digitizer and memory to create the stadium data bank. As was mentioned before, there may be other methods to create the data bank of synthetic images. The locale's (stadium's) data bank may also be created from the trial shots taken before the game starts or even be incrementally built in the course of the game by means of a "learning" process or by using data supplied by the stadium owner, the advertiser or the TV network.

Figure 3:
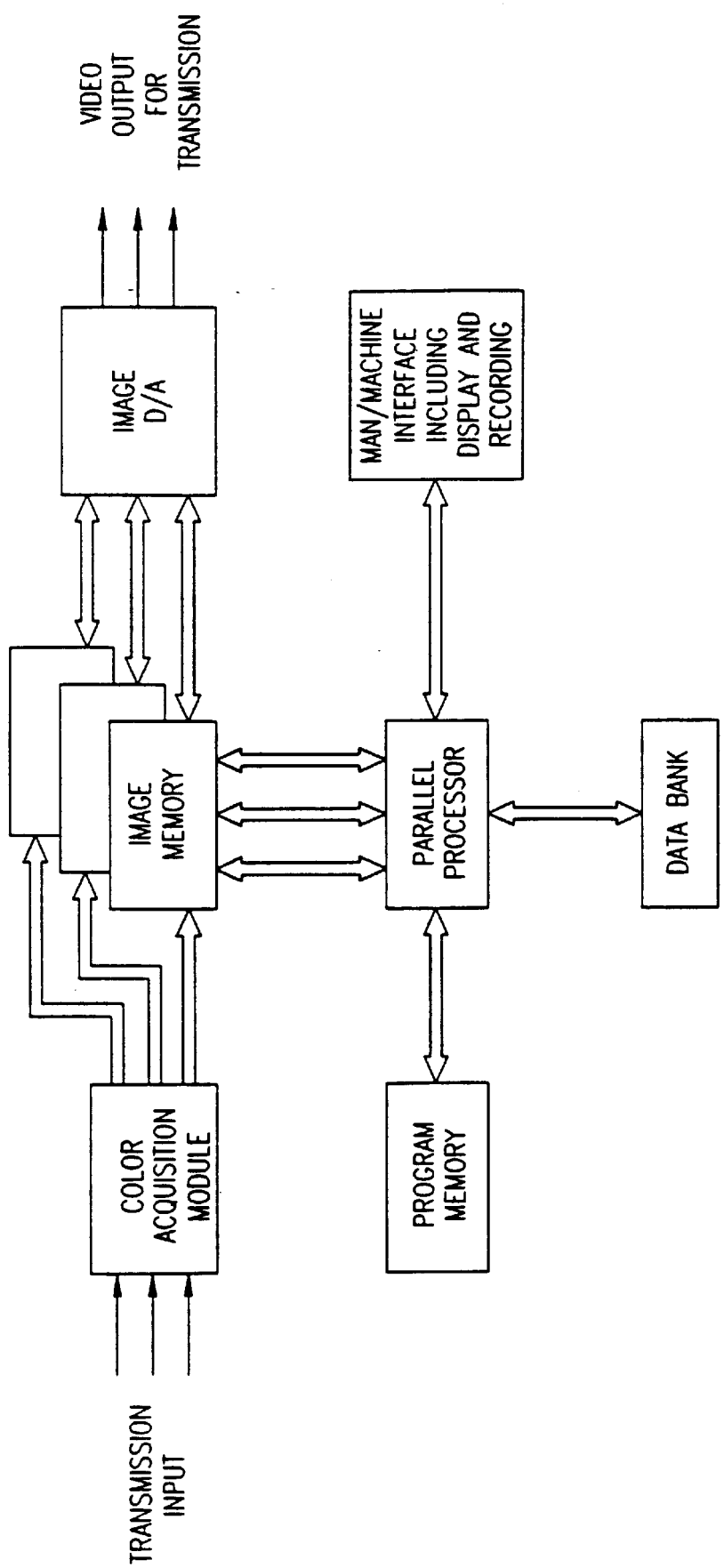
FIG. 3 is a block diagram of a basic processing unit.

FIG. 2 illustrates a block diagram of the apparatus used in the system, wherein 1, 2, . . . n are a plurality of TV cameras in different positions, which are the usual TV network cameras, 3 is the basic processing unit described in FIG. 3, sub-system 4 converts and stores synthetic images and sub-system 5 is a "learning" and storage system for event locales and targets therein. The output 6 can be transmitted by cable, optical fiber or wirelessly. It can also be displayed and/or recorded.

The basic processing unit required to operate the system in real-time is shown in FIG. 3. This module comprises:

a frame grabber for colour image acquisition;

a plurality of image memories;

a fast parallel processor;

a program memory;

data banks of synthetic images to be substituted and of locale's lay-outs and target icons;

a man/machine interface for control and for local display and recording; and an image digital to analog converter.

The above apparatus is used to automatically locate in real time in each video frame, suitable areas within a stadium which have physical displays or might be suitable for embodying such displays, and to substitute for such physical displays, or introduce into such areas, virtual images which are stored in the memory of the system to serve as advertisements in the background.

These electronic inserted images will be seen by viewers as if they are physical displays located in a stadium and all action taking place in front of the actual physical display will appear to the viewer to be taking place in front of the virtual image as well.

Figure 4:
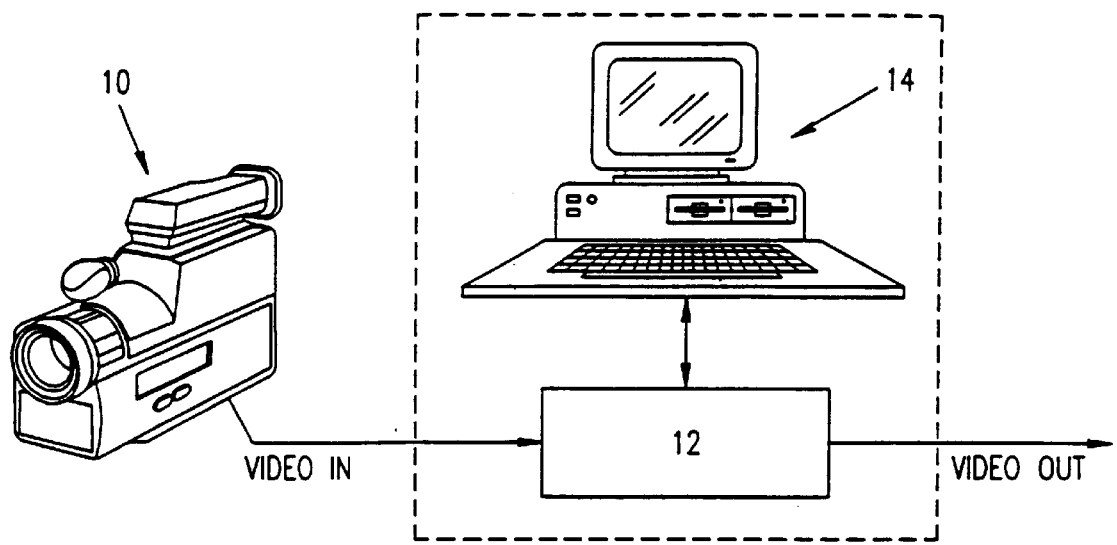
FIG. 4 illustrates a minimum basic on-line system in accordance with a preferred embodiment of the present invention.

FIG. 4 illustrates an on-line system in accordance with an aspect of this invention consisting of a video camera 10, video processing unit 12 and work station 14 that provides the required man/machine interface.

Figure 5:
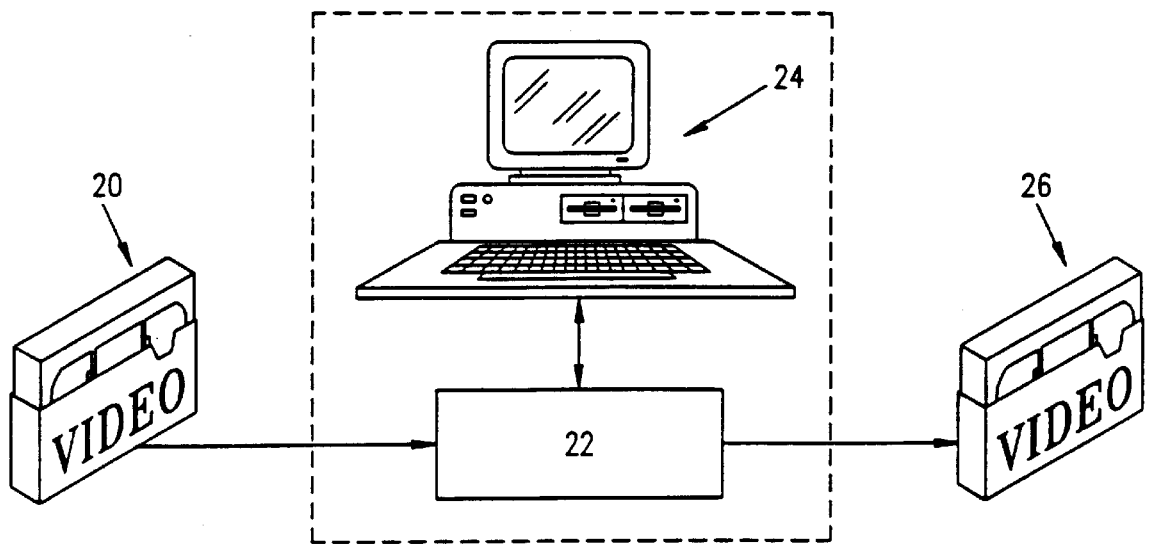
FIG. 5 illustrates a minimum basic off-line system in accordance with the invention.

FIG. 5 illustrates a basic off-line system in accordance with one aspect of this invention. In this case, a video tape 20, a video cassette recorder or a video disk is the input rather than a TV camera and this is processed by the processing unit 22 and work station 24 to provide a video tape output 26 with substituted images.

Figure 6:
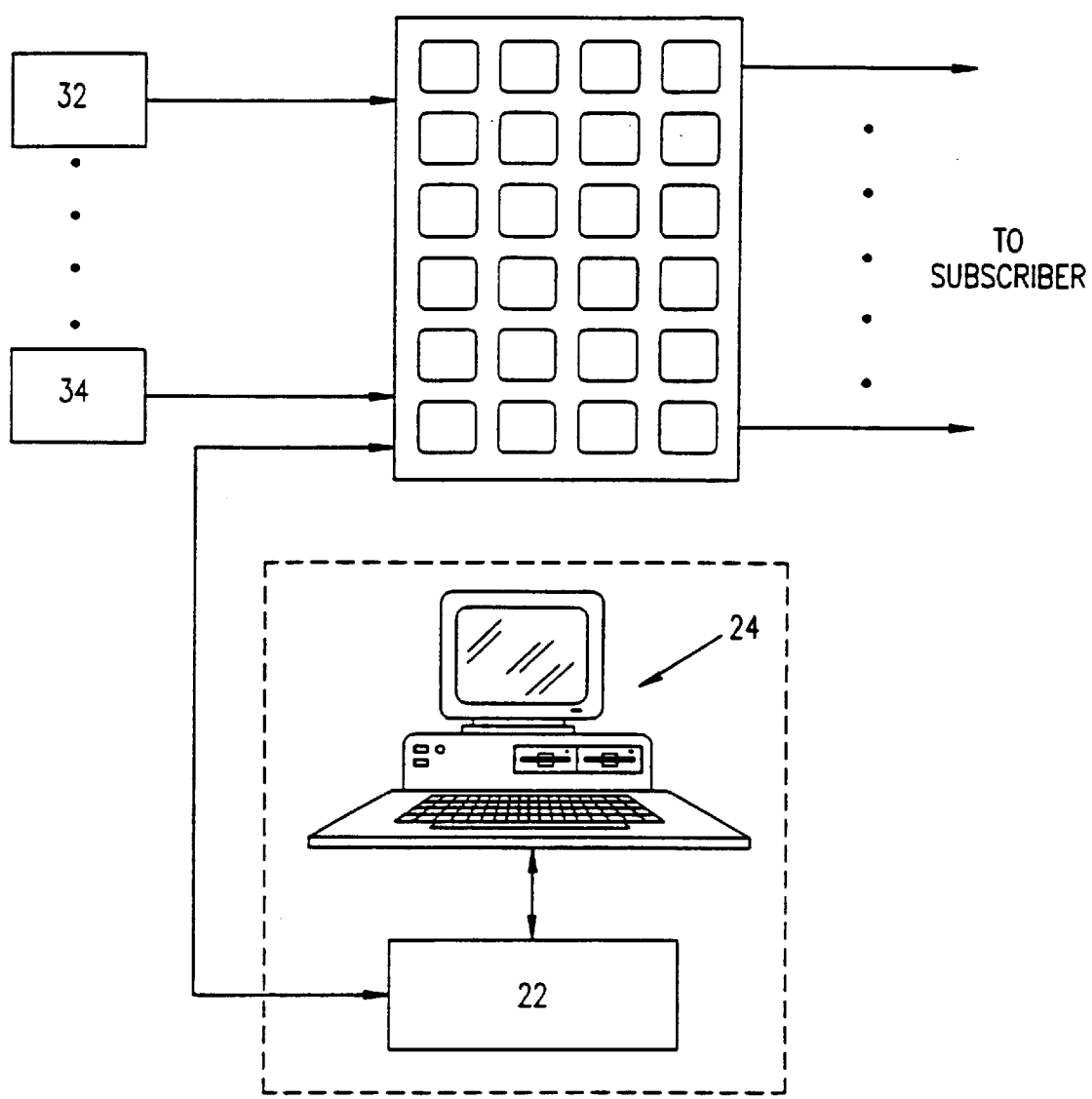
FIG. 6 illustrates a system in accordance with a preferred embodiment of the present invention adapted for cable TV application.

FIG. 6 illustrates yet another application of the system of this invention, namely a cable TV center. The center 30 receives transmissions from stations 32 and 34. These transmissions are processed by the processing unit 22 and work station 24 and broadcast with substituted advertisements to subscribers from the center 30.

Although a preferred system according to this invention superimposes blocking objects and shadows on the virtual images, a less sophisticated and much cheaper system is also intended as part of this invention, and that is a system where virtual images are exchanged for physical without relating to blocking objects.

Such a system can be quite useful for substituting images in unblocked regions, for example high up in a stadium.

Although a preferred embodiment of the present invention automatically detects and recognizes a given billboard in each TV frame, a less sophisticated system is also intended as part of this invention. In such a less sophisticated system the selection of a given sign to be substituted is done "manually" by a pointer such as a light pen or a cursor (operated by a mouse) with a human operator in the loop.

This system is mainly off-line. When it is used on-line in real time it will be very difficult for the operator to perform the pointing task since in a typical scenario the sign is cntinuously visible for only short periods of a few seconds each.

In such a mode of operation the replacement will nevertheless be perceptible to the TV viewers. This annoys the spectators and in many cases is not permitted by the TV networks.

From the above description of the invention, it is apparent that the system, method and apparatus described above can have many applications. Thus, it is also possible to introduce virtual images, such as slogans or graphic advertisement, on the uniforms of players, particularly when a player is shown in close-up. In such a case, the outline of the player, or at least his shirt or helmet, would be the target for implanting a virtual image.

Another possible application is the automatic generation of continuous video films showing only sequences wherein specific targets, which have been pre-selected, appear to the exclusion of sequences where these targets do not appear. Such video films can be useful for analyzing and monitoring the activity of specific targets, for example individual players and their performance throughout an entire team game. This enables tracking each individual throughout an entire game without having to replay the entire cassette for each player.

Another application of this invention is to generate statistical data of targets such as advertisements, for example the number of times and accumulated period that an advertisement appears on the screen, and to debit acccordingly.

The implanted image can be in the form of a fixed, blinking or scrolling image, or it may be an animated film or video clip.

Figure 7:
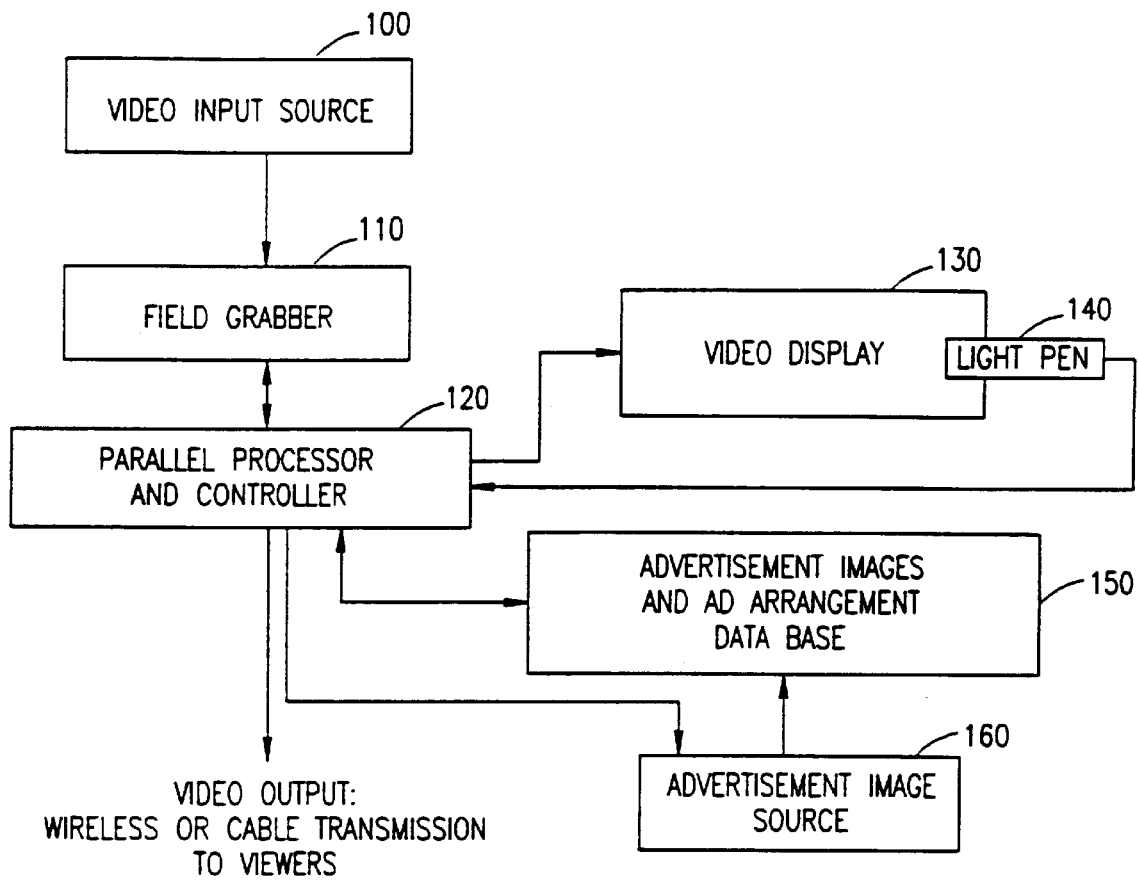
FIG. 7 is a simplified block diagram of a real time system for advertisement site detection and advertisement incorporation, constructed and operative in accordance with a preferred embodiment of the present invention.

FIG. 7 is a simplified block diagram of a real time system for advertisement site detection and advertisement incorporation, constructed and operative in accordance with a preferred embodiment of the present invention.

The apparatus of FIG. 7 includes a video input source 100, such as a video camera, video cassette, broadcast, video disk, or cable transmission, which is connected, via a suitable connector, with a field grabber 110, preferably, or alternatively with a frame grabber. Henceforth, use of the term "field grabber" is intended to include frame grabbers.

The field grabber 110 provides grabbed and digitized fields to a parallel processor and controller 120, described in more detail below with reference to FIG. 8, which is preferably associated with a video display 130 which provides an interactive indication to a user of advertisement site detection and advertisement incorporation operations of the system. Preferably a light pen 140 is associated with the video display 130.

According to an alternative embodiment of the present invention, the system receives an indication from a user of the presence in the field of view of one or more advertisements to be replaced and of the location/s thereof. The user input may, for example, be provided by means of a light pen 140. The indication provided by the user may comprise a single indication of an interior location of the advertisement, such as the approximate center of the advertisement or may comprise two or four indications of two opposite vertices or all four vertices, respectively, of an advertisement to be replaced.

Optionally, the user also provides an indication of the contents of the advertisement. For example, a menu of captions identifying advertisements to be replaced, may be provided on the video display 130 adjacent or overlaying a display of the playing field and the user can employ the light pen to identify the appropriate caption.

An advertisement images and advertisement arrangement database 150 is provided which may be stored in any suitable type of memory such as computer memory or secondary memory, such as a hard disk. The advertisement image and arrangement database 150 typically stores a plurality of advertisement images, typically still images, including images to be replaced and/or images to be incorporated into the image of the playing field, either replacing an existing advertisement or in a location not presently occupied by an advertisement.

The database 150 may also include an indication of the arrangement of a plurality of advertisements to be replaced, if the arrangement is known ahead of time. Typically, the indication of the arrangement does not include an indication of the location of each advertisement relative to the playing field, but instead includes an indication of the order in which the advertisements to be replaced will be arranged in the field. For example, a sequence of 20 side-by-side advertisements may be arranged around three sides of a playing field. The database 150 may then include an indication of the sequence in which the advertisements are arranged.

Advertisement images in the database 150 may be provided by field grabber 110 or from any suitable advertisement image source 160, such as but not limited to an image generating unit such as a image processing workstation, a scanner or other color reading device, any type of storage device, such as a hard disk, a CD ROM driver, or a communication link to any of the above.

The video output of the system may be provided via a suitable connector to suitable equipment for providing wireless or cable transmission to viewers.

Figure 8:
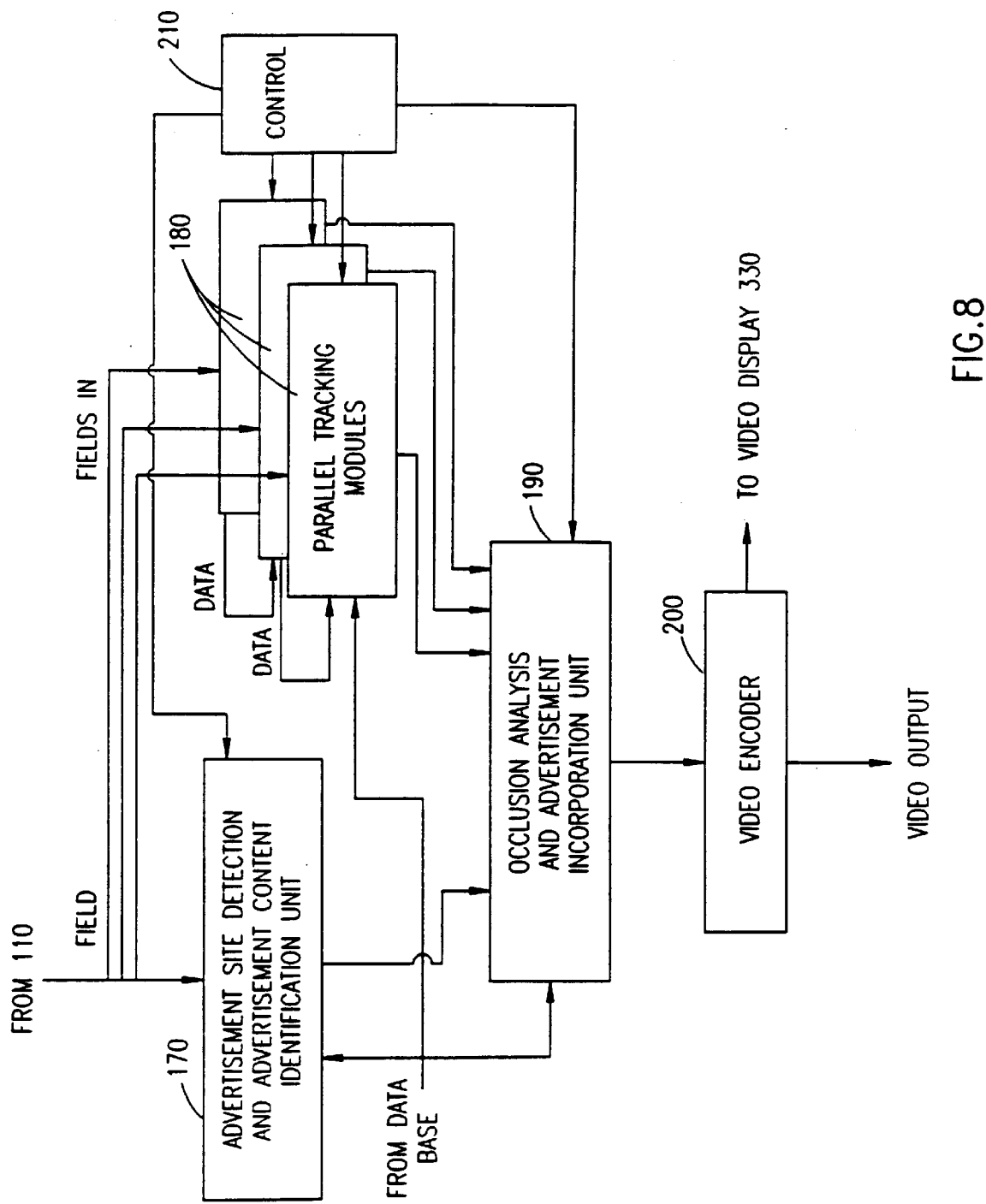
FIG. 8 is a simplified block diagram of the parallel processor and controller of FIG. 7.

FIG. 8 is a simplified block diagram of the parallel processor and controller 120 of FIG. 7. The parallel processor/controller 120 preferably includes an advertisement site detection/content identification unit 170, a plurality of parallel tracking modules 180, an occlusion analysis and advertisement incorporation unit 190, a video encoder 200 and a controller 210.

The advertisement site detection/content identification unit 170 of FIG. 8 may be implemented based on a suitable plurality of suitable image processing boards, such as Ariel Hydra boards, commercially available from Ariel, USA. Each of these preferably incorporates four TMS320C40 digital signal processors, a DRAM of 64 MB, an SRAM of 1 MB, and a VME bus interface. A specially designed coprocessor is preferably added to these boards to perform the segmentation task. The image processing boards are programmed based on the advertisement site detection and content identification methods of FIGS. 11 and 12 on which Appendix A is based in part. For example, the appropriate portions of the listing of Appendix A may be converted into Assembler and the resulting code may be loaded into the digital signal processor of the image processing board.

Each of parallel tracking modules 180 may be implemented based on one or more image processing boards, such as Ariel Hydra boards, commercially available from Ariel, USA. Each of these preferably incorporates four TMS320C40 digital signal processors, a DRAM of 64 MB, an SRAM of 1 MB, and a VME bus interface. The image processing boards are programmed for parallel operation based on the tracking method of FIG. 14 on which Appendix A is based in part. For example, the appropriate portions of the listing of Appendix A may be converted into Assembler and the resulting code may be loaded into the digital signal processor of the image processing board.

Figure 15:
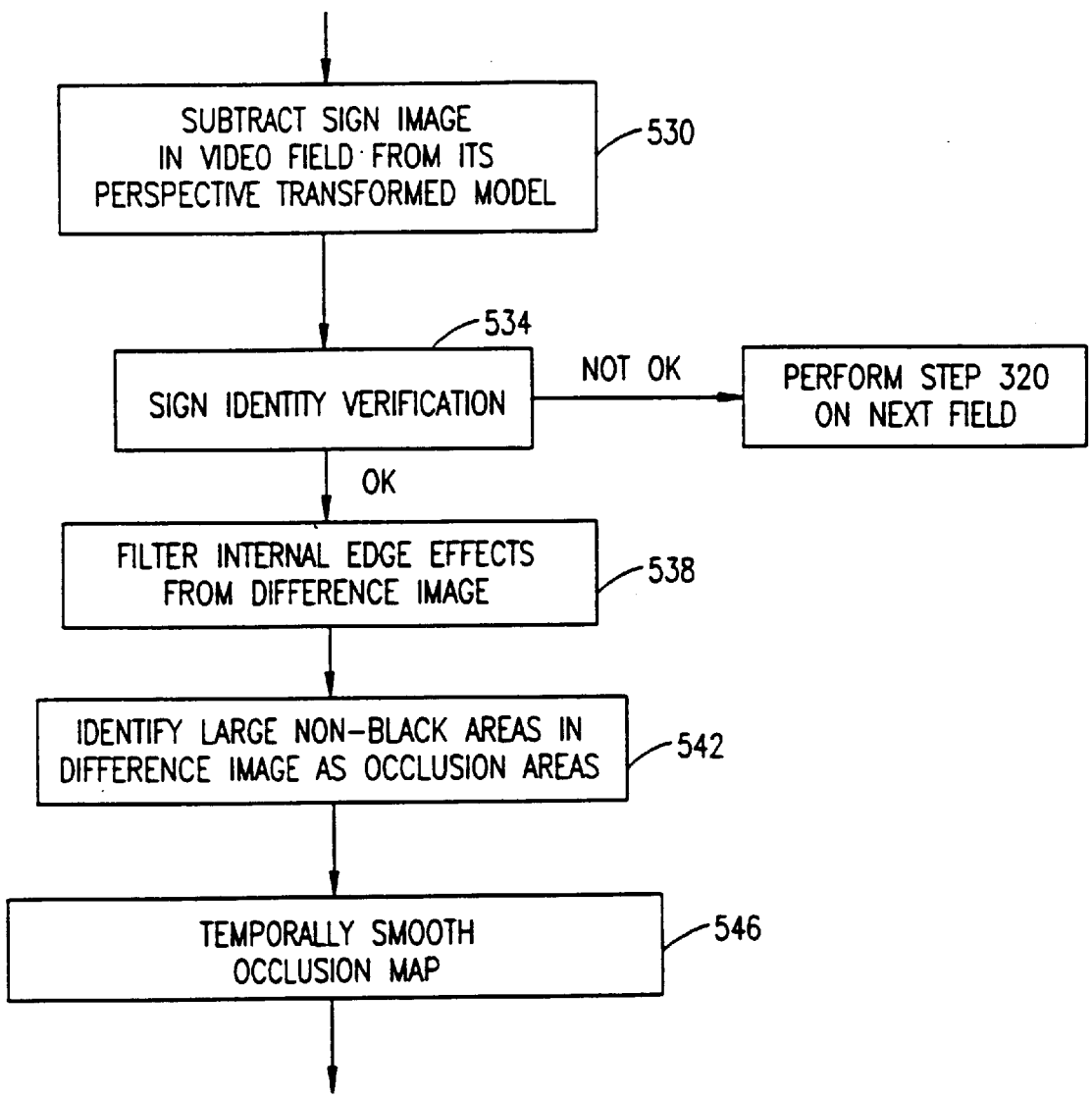
FIG. 15 is a simplified flowchart of a preferred method for performing the occlusion analysis step of FIGS. 10A and 10B.
Figure 16:
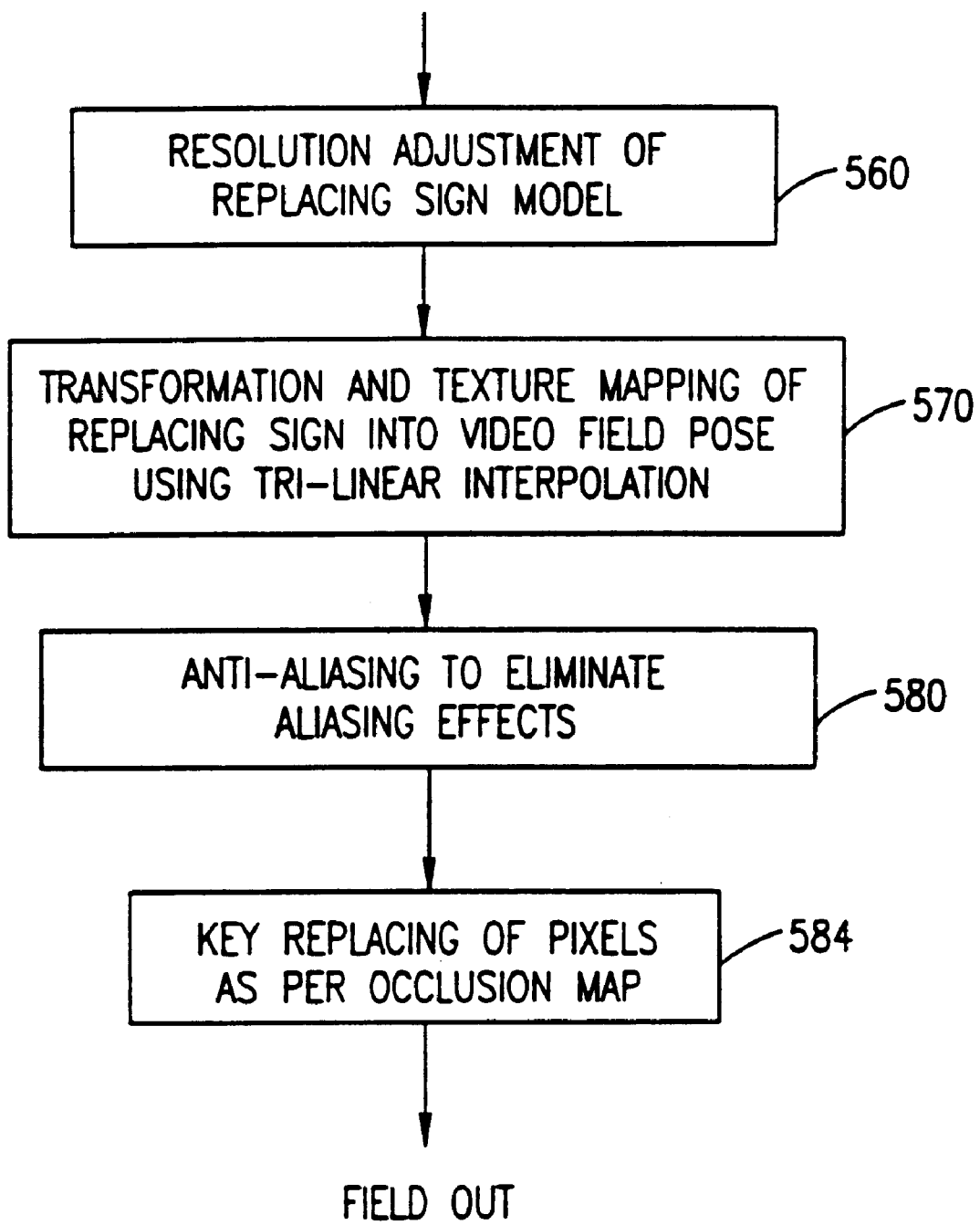
FIG. 16 is a simplified flowchart of a preferred method for performing the advertisement incorporation step of FIGS. 10A and 10B.

The occlusion analysis and advertisement incorporation unit 190 may also be based on one or more texture mapping boards such as the Fairchild's Thru-D boards with the appropriate bus bridges, programmed based on the occlusion analysis and advertisement incorporation methods of FIGS. 15 and 16 on which Appendix A is based in part. For example, the appropriate portions of the listing of Appendix A may be converted into Assembler and the resulting code may be loaded into the processor of the texture mapping board.

Video encoder 200 is operative to perform D/A conversion.

Figure 10A:
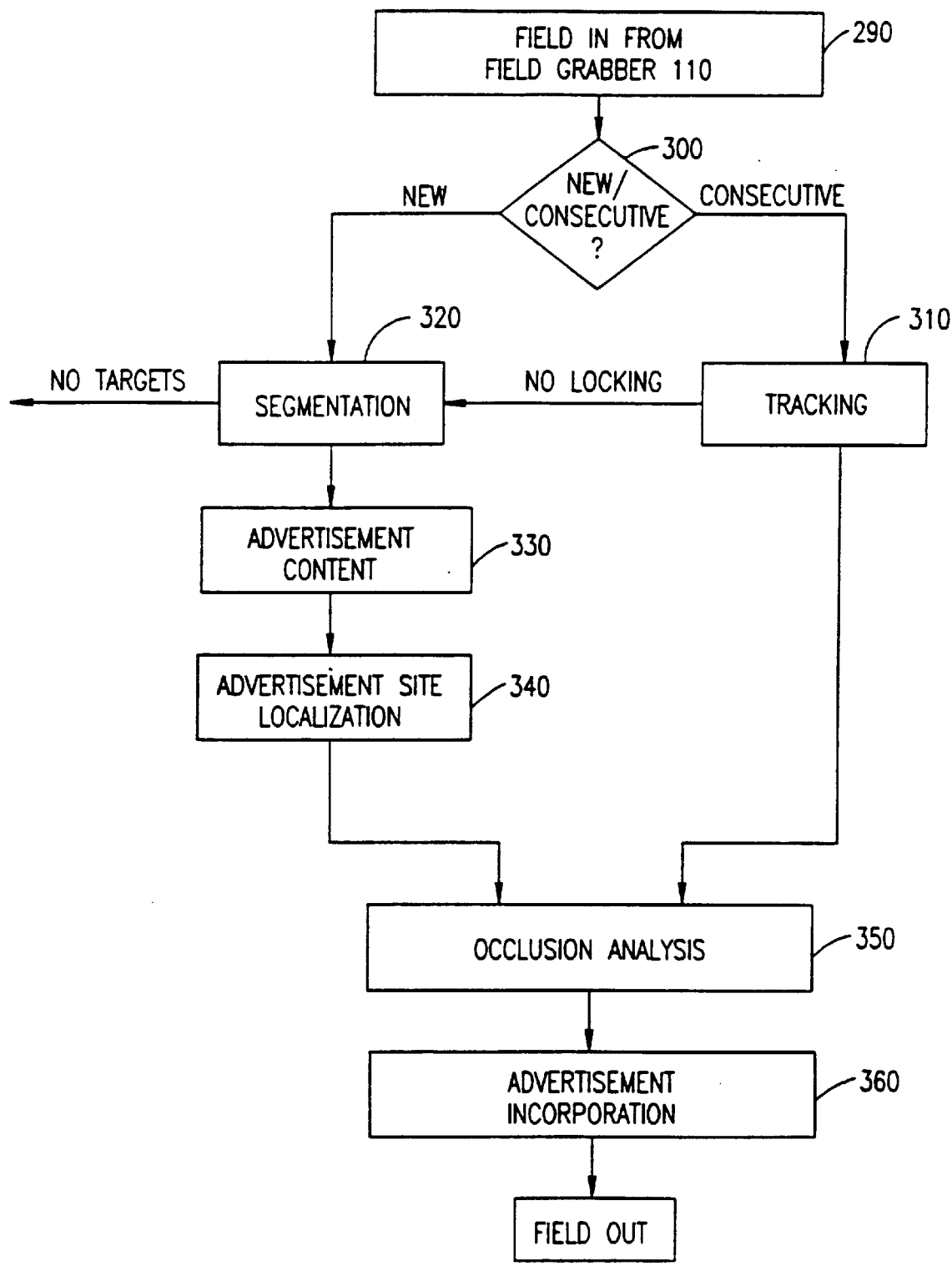
FIG. 10A is a simplified flowchart of a preferred method of operation of the parallel processor and controller of FIG. 7, when only a single advertisement site is to be identified and only a single advertisement is to be incorporated at that site.
Figure 10B:
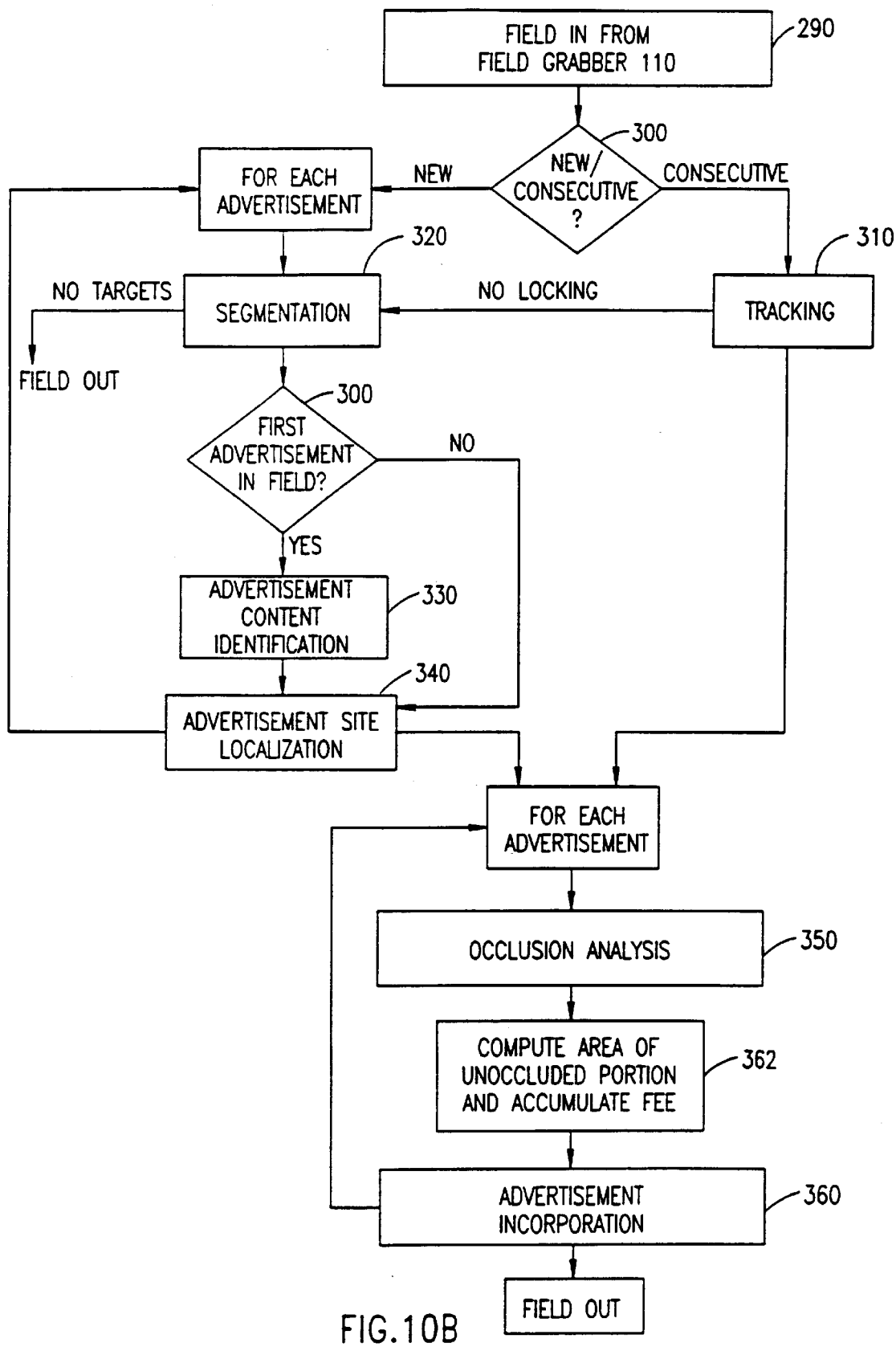
FIG. 10B is a simplified flowchart of a preferred method of operation of the parallel processor and controller of FIG. 7, when a plurality of advertisement sites is to be identified and a corresponding plurality of advertisements, which may or may not differ in content, is to be incorporated at those sites.

Controller 210 may, for example, comprise a 486 PC programmed based on the control method of FIGS. 10A–10B on which Appendix A is based in part. For example, the appropriate portions of the listing of Appendix A may be Intel 486 PC processor.

Figure 9:
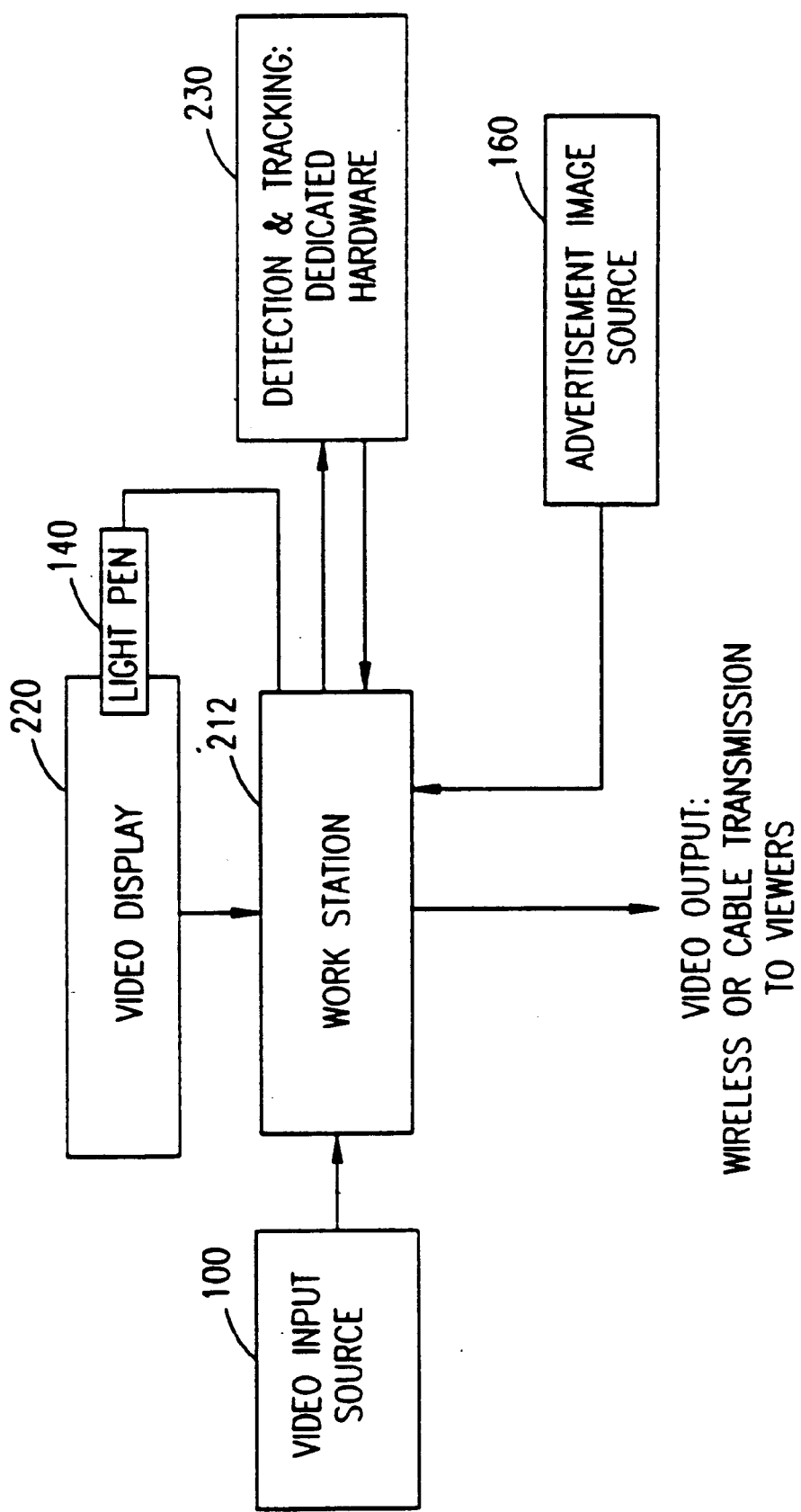
FIG. 9 is a simplified block diagram of an alternative embodiment of a real time system for advertisement site detection and advertisement incorporation.

FIG. 9 is a simplified block diagram of an alternative embodiment of a real time system for advertisement site detection and advertisement incorporation. In the apparatus of FIG. 9, a conventional workstation 212, having its own video display 220 and its own field grabber (not shown), such as a Silicon Graphics Onyx workstation loaded with a video board and a suitable software, replaces the following units of FIG. 7: field grabber 110, the parallel processor and controller 120 other than the advertisement site detection and content identification unit 170 and tracking modules 180 thereof, the video display, and the database 150.

The software for the workstation may be based on the Appendix A implementation of the method of FIGS. 10A–10B, suitably converted into the workstation's environment, however some of the functions of Appendix A are preferably omitted. Specifically:

a. the advertisement site detection and tracking functions, corresponding to the segmentation, advertisement content identification and tracking steps 320, 330 and 310 respectively of FIGS. 10A–10B are omitted and are instead implemented in real time by dedicated hardware 230 in FIG. 9; and b. The texture mapping functions (second and third steps of FIG. 16) which preferably form part of the advertisement incorporation function, are preferably omitted and are, instead, performed by the texture mapping functions provided by the workstation itself.

The dedicated hardware 230 of FIG. 9 may be similar to the advertisement site detection/content identification unit 170 and parallel tracking modules 180 of FIG. 8.

Appendix A is a computer listing of a non-real time software implementation of the present invention which is operative, for example, on a 486 PC in conjunction with a conventional frame grabber such as an Imaging MFG board. The method of Appendix A is now described with reference to FIGS. 10A–16.

FIG. 10A is a simplified flowchart of a preferred method of operation of the parallel processor and controller 120 of FIG. 7, when only a single advertisement site is to be identified and only a single advertisement image is to be incorporated at that site.

FIG. 10B is a simplified flowchart of a preferred method of operation of the parallel processor and controller 120 of FIG. 7, when a plurality of advertisement sites is to be identified and a corresponding plurality of advertisement images, which may or may not differ in content, is to be incorporated at those sites respectively.

The method of FIG. 10B typically includes the following steps, which are similar to the steps of FIG. 10A which are therefore not described separately for brevity:

STEP 290: A digitized video field is received from the field grabber 110 of FIG. 1.

STEP 300: A decision is made as to whether or not at least one advertisement in the current field was also present in the previous field (and televised by the same camera). If so, the current field is termed a "consecutive" field and the segmentation, content identification and localization steps 320, 330 and 340 preferably are replaced only by a tracking step 310. If not, the current field is termed a "new" field.

If the field is a "consecutive" field, the plurality of advertisements is tracked (step 310), based on at least one advertisement which was present in a previous field, since the present field is a "consecutive" field.

If the field is a "new" field, the advertisement site at which an advertisement is to be incorporated is identified in steps 320, 330 and 340. A loop is performed for each advertisement from among the plurality of advertisements to be processed. Preferably, the segmentation and content identification steps 320 and 330 are performed only for the first advertisement processed.

In step 320, a pair of generally parallel lines is typically detected and the image of the field is segmented. Specifically, the portion of the field located within the two detected parallel lines, which typically correspond to the top and bottom boundaries of a sequence of advertisements, is segmented from the remaining portion of the field.

Typically, the segmentation step 320 is operative to segment advertisements regardless of: their perspective relative to the imaging camera, the zoom state of the imaging camera lens, the location of the advertisement in the field of view (video field), the angular orientation of the imaging camera relative to the ground and the location of the TV camera.

The segmentation step 320 is typically operative to identify an empty or occupied advertisement site on a basis other than location, such as but not limited to any of the following, separately or in any combination:

a. Geometrical attributes of the advertisement's boundary such as substantially parallel top and bottom boundaries or such as four vertices arranged in a substantially rectangular configuration;

b. A color or a combination of colors or a color pattern, which are known in advance to be present in the advertisement image.

c. The spatial frequencies band of the advertisement image, which is typically known in advance. Typically, the known spatial frequencies band is normalized by the height of the advertisement which may, for example, be derived by computing the distance between a pair of detected horizontal lines which are known to be the top and bottom boundaries of the advertisement sequence.

In step 330, the content of the portion between the two substantially parallel lines is matched to a stored representation of an advertisement to be replaced.

Steps 320 and 330 allow advertisement sites to be identified and the content thereof to be matched to a stored model thereof, even if cuts (transitions, typically abrupt, between the outputs of a plurality of cameras which are simultaneously imaging the sports event) occur during the sports event. Typically, at each cut, steps 320 and 330 are performed so as to identify the advertisement within the first few fields of the cut. Until the next cut occurs, the identified advertisement is typically tracked (step 310).

In step 340, the advertisement is localized at subpixel accuracy.

Finally, for each advertisement, occlusion analysis is performed (step 350) and the replacing advertisement is incorporated in the advertisement site (step 360). Alternatively, the occlusion analysis and advertisement incorporation steps are replaced by an advertisement enhancement step in which the existing advertisement is enhanced, using conventional edge sharpening techniques, rather than being replaced.

Optionally, a fee accumulation step 362 is performed, typically after occlusion analysis step 350. In the fee accumulation step, a fee for each advertisement is accumulated. The fee may be computed on any suitable basis. For example, the fee may be determined by counting the total amount of time for which the advertisement was displayed and for which at least 50% of the advertisement was unoccluded, and multiplying by a fixed dollar rate per time unit. Alternatively, the proportion of the unoccluded area of the advertisement may be computed for each time interval, such as each second. Optionally, the display time or the sum over time of the displayed area may be adjusted to take into account the game's progress. For example, the display time or the sum over time of the displayed area may be multiplied by an externally provided index indicating the tension level of the game during display of the advertisement. High tension level may, for example, mean that the game has gone into overtime or that a significant event, such as a goal, has occurred during display or just before display. Alternatively, the tension level index may be provided by the system itself. For example, a voice recognition unit may recognize significant words uttered by the sports commentator, such as the word "goal".

According to an alternative embodiment of the present invention, the segmentation and advertisement content identification steps 320 and 330 respectively may be omitted if physical landmarks identifying the locations of advertisements to be replaced whose contents is known in advance, are positioned and captured ahead of time in the playing field.

Figure 11:
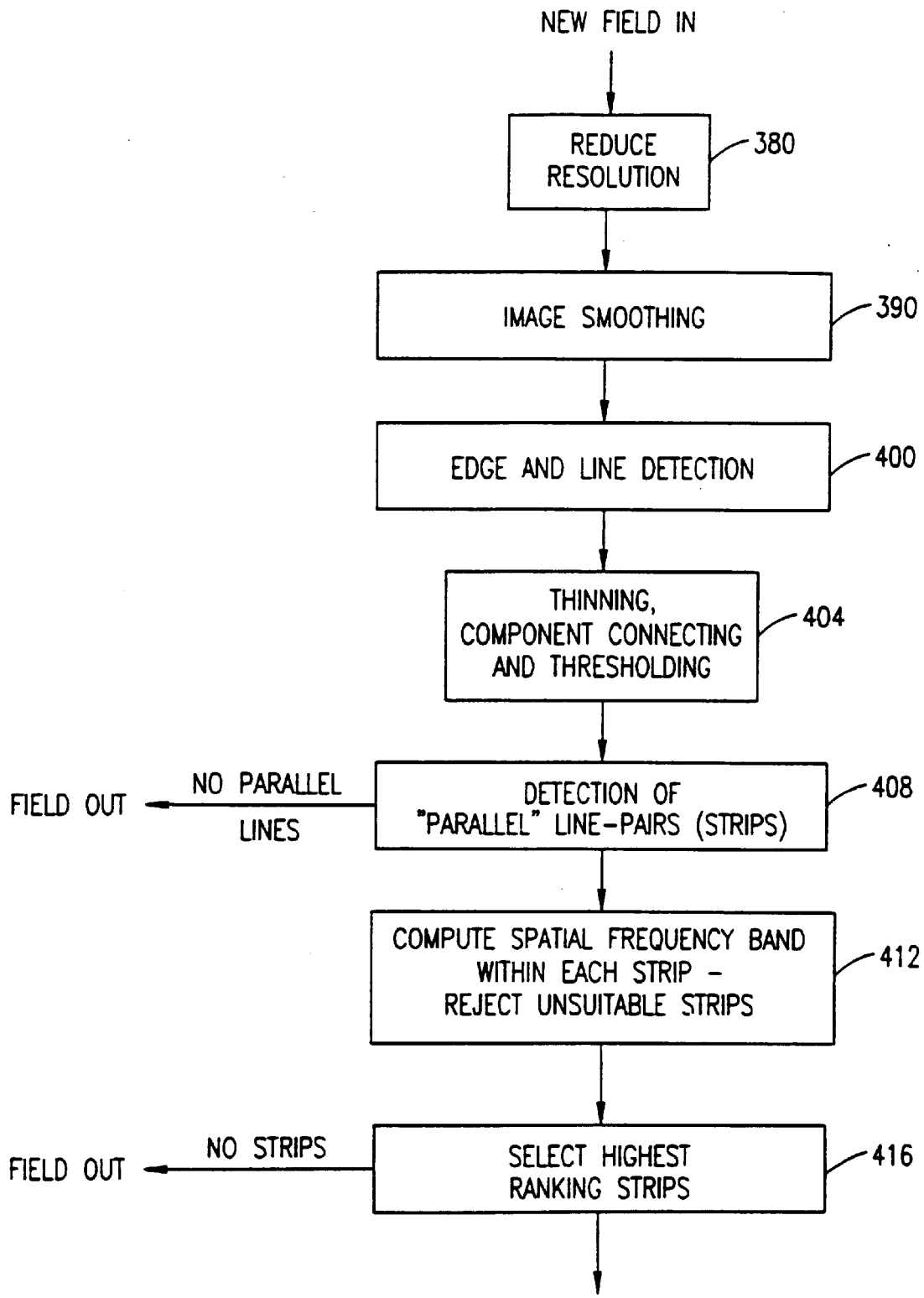
FIG. 11 is a simplified flowchart of a preferred method for performing the segmentation step of FIGS. 10A and 10B.

FIG. 11 is a simplified flowchart of a preferred method for performing the segmentation step 320 of FIGS. 10A and 10B.

The method of FIG. 11 preferably includes the following steps:

STEP 380: A new field is received and the resolution thereof is preferably reduced since the forgoing steps may be performed adequately at a lower resolution. for example, a low-pass filter may be employed to reduce a 750×500 pixel field to 128×128 pixels.

STEP 390: Optionally, the low resolution image is smoothed, e.g. by median filtering or low pass filtering, so as to remove information irrelevant to the task of searching for long or substantially horizontal lines.

STEP 400: Edges and lines (two-sided edges) are detected, using any suitable edge detection method such as the Canny method, described by J. F. Canny in "A computational approach to edge detection", IEEE Trans. Pattern Analysis and Machine Intelligence, Vol. 8, pp. 679–698, November, 1986.

STEP 404: The edges detected in step 400 are thinned and components thereof are connected using conventional techniques of connectivity analysis. The edges are thresholded so as to discard edges having too small a gradient.

STEP 408: The edges detected in steps 400 and 410 are compared pairwise so as to find strips, i.e. pairs of parallel or almost parallel lines which are relatively long. If there are no such pairs, the method terminates.

STEP 412: Find the spatial frequency spectrum within each strip and reject strips whose spatial frequency contents are incompatible with the spatial frequency band expected for advertisements. Typically, the rejection criterion is such that more than one strip, such as 3 or 4 strips, remain.

STEP 416: Rank the remaining strips and select the highest ranking strip. The rank assigned to a strip depends on the probability that the strip includes advertisements. For example, the strip in the lowest location in the upper half of the field is given higher rank than strips above it, because the strips above it are more likely to be images of portions of the stadium. The lowest located strip is more likely to be the advertisements which are typically positioned below the stadium.

Strips adjacent the bottom of the field are given low rank because the advertisements would only be imaged toward the bottom of the video field if the playing field is not being shown at all, which is unlikely.

Figure 12:
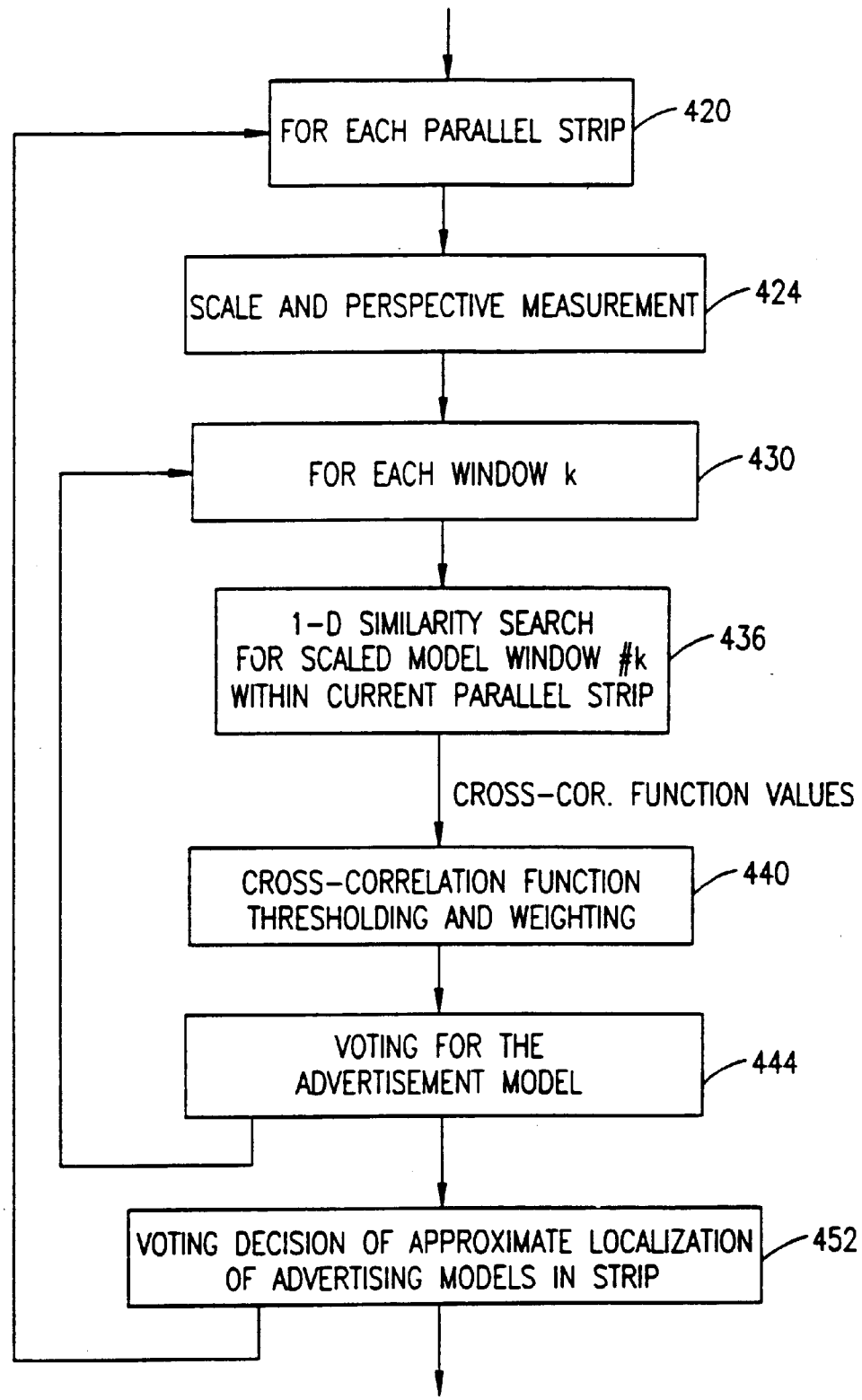
FIG. 12 is a simplified flowchart of a preferred model matching method for performing the advertisement content identification step of FIGS. 10A and 10B.

FIG. 12 is a simplified flowchart of a preferred model matching method for performing the advertisement content identification step 330 of FIGS. 10A and 10B. Alternatively, advertisement content identification may be provided by a user, as described above with reference to FIG. 1.

The method of FIG. 12 is preferably performed in low resolution, as described above with reference to step 380 of FIG. 11. The method of FIG. 12 preferably includes the following steps:

STEP 420: The forgoing steps 424, 430, 436, 440, 444 and 452 are performed for each almost parallel strip identified in segmentation step 320 of FIG. 11.

STEP 424: The distance and angle between the two lines of each strip is computed and the scale and approximate perspective at which the strip was imaged is determined therefrom.

STEP 430: During set-up, each advertisement model is divided into a plurality of windows. Steps 436, 440 and 444 are performed for each window of each advertisement model. For example, if there are 5 models each partitioned into 6 windows, this step is performed 30 times.

STEP 436: A one-dimensional similarity search is carried out for the suitably scaled current model window k, along the current almost parallel strip. Typically, a cross-correlation function may be computed for each pixel along the current strip.

STEP 440: The cross-correlation function values obtained in step 436 are thresholded. For example, values exceeding 0.6 may be assigned the value 1 (correlation) whereas values under 0.6 may be assigned the value 0 (no correlation). The 1's are weighted, depending on the "significance" of their corresponding windows. The "significance" of each window is preferably determined during set-up such that windows containing more information are more "significant" than windows containing little information.

STEP 444: At this stage, weighted thresholded cross-correlation function values have been computed which represent the results of matching the contents of each position along the strip (e.g. of each of a plurality of windows along the strip which are spaced at a distance of a single pixel) to each window of each model advertisement known to occur within the strip.

The weighted thresholded cross-correlation function values are accumulated per all windows composing a model sign or a model strip.

STEP 452: A decision is made as to the approximate location of the sequence of advertising models, within the strip. It is appreciated that, once the location of one advertisement model has been determined, the locations of the other advertisement models in the same sequence are also determined, knowing the scale ad approximate perspective of the imaged strip.

Figure 13:
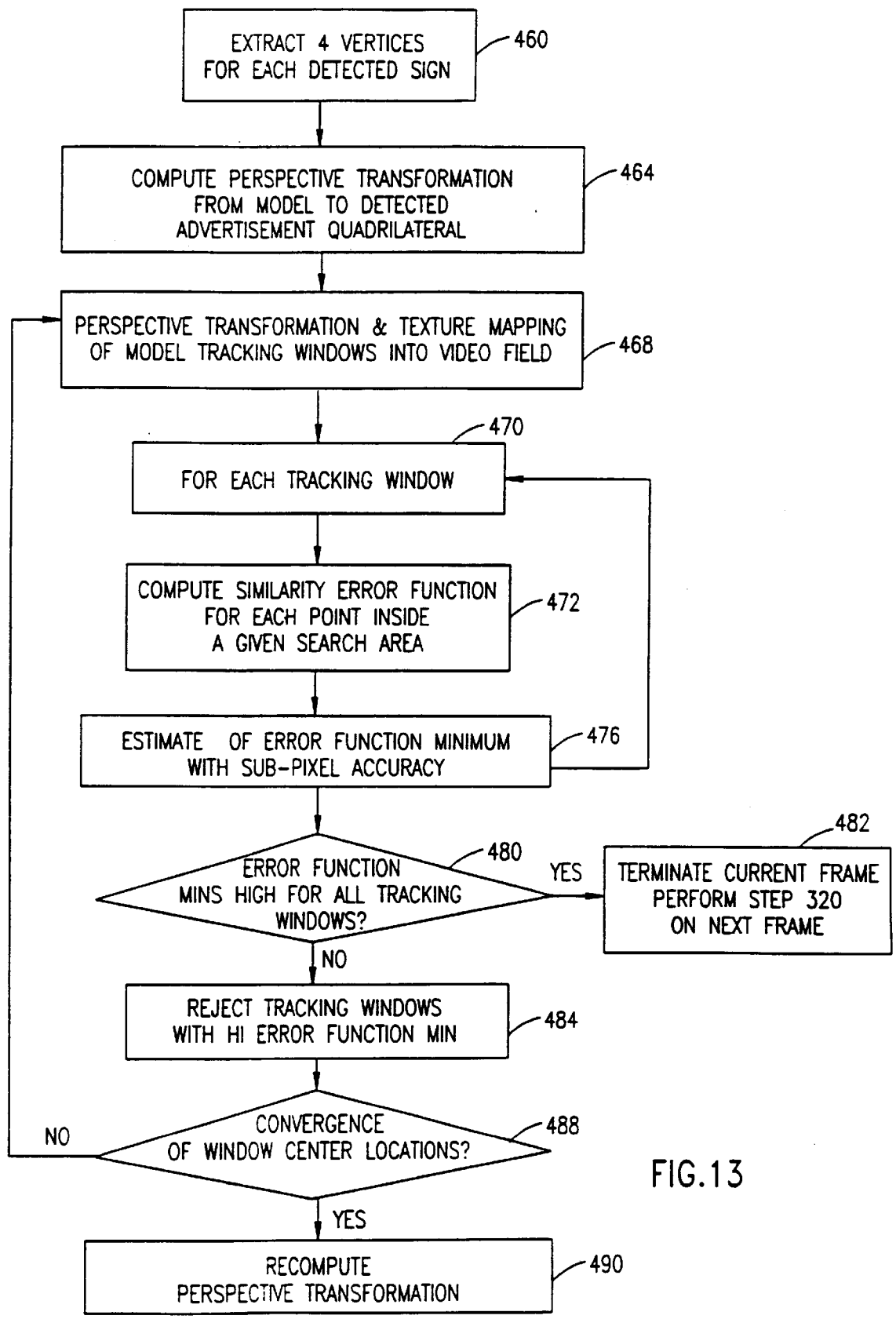
FIG. 13 is a simplified flowchart of a preferred method for performing the localization step of FIGS. 10A and 10B.

FIG. 13 is a simplified flowchart of a preferred method for performing the precise localization step 340 of FIGS. 10A and 10B. In FIG. 13, the advertisement model which was approximately localized by the method of FIG. 12, is localized with subpixel accuracy. Accurate localization is typically performed only for new fields. For "consecutive" fields, the advertisement's location is preferably measured by video tracking.

The method of FIG. 13 preferably includes the following steps:

STEP 460: From FIG. 12, the following information is available per advertisement detected: one location within the advertisement, such as one vertex thereof, the advertisement scale height in the image and its approximate perpsective. This information is employed to compute the four vertices of each detected advertisement.

STEP 464: A perspective transformation is computed which describes how to "transform" the typically rectangular model into the detected advertisement area which is typically non-rectangular due to its pose relative to the imaging camera.

STEP 468: The contents of each of a plurality of model tracking windows to which the model is divided during set up, is mapped into the video field, using the perspective transformation computed in step 464.

STEP 470: Steps 472 and 476 are performed for each of the model tracking windows.

STEP 472: The current model tracking window is translated through a search area defined in the video field. For each position of the model tracking window within the search area, a similarity error function (like cross-correlation or absolute sum of differences) is computed. Typically, the model tracking window has 8×8 or 16×16 different positions within the search area.

STEP 476: The minimum similarity error function for the current model tracking window is found. Preferably, the minimum is found at subpixel accuracy, e.g. by fitting a two-dimensional parabola to the similarity error function generated in step 472 and computing the minimum of the parabola. This minimum corresponds to the best position, at "subpixel accuracy", for the current model tracking window within the video field.

If (STEP 480) the similarity error function minima are high for all tracking windows, i.e. none of the tracking windows can be well matched to the video field, then (STEP 482) processing of the current frame is terminated and the method of FIG. 10A, from step 320 onward, is performed on the following frame.

STEP 484: Tracking windows which have a high similarity error function minimum are rejected. Typically, approximately 30 tracking windows remain.

STEP 488 is a stopping criterion determining whether or not to perform another iteration of localization by matching tracking windows. Typically, if the tracking windows' centers are found to converge, relative to the centers identified in the last iteration, the process is terminated. Otherwise, the method returns to step 464.

STEP 490: Once the tracking window locations have converged, the perspective transformation between the images advertisement and its model is recomputed.

Figure 14:
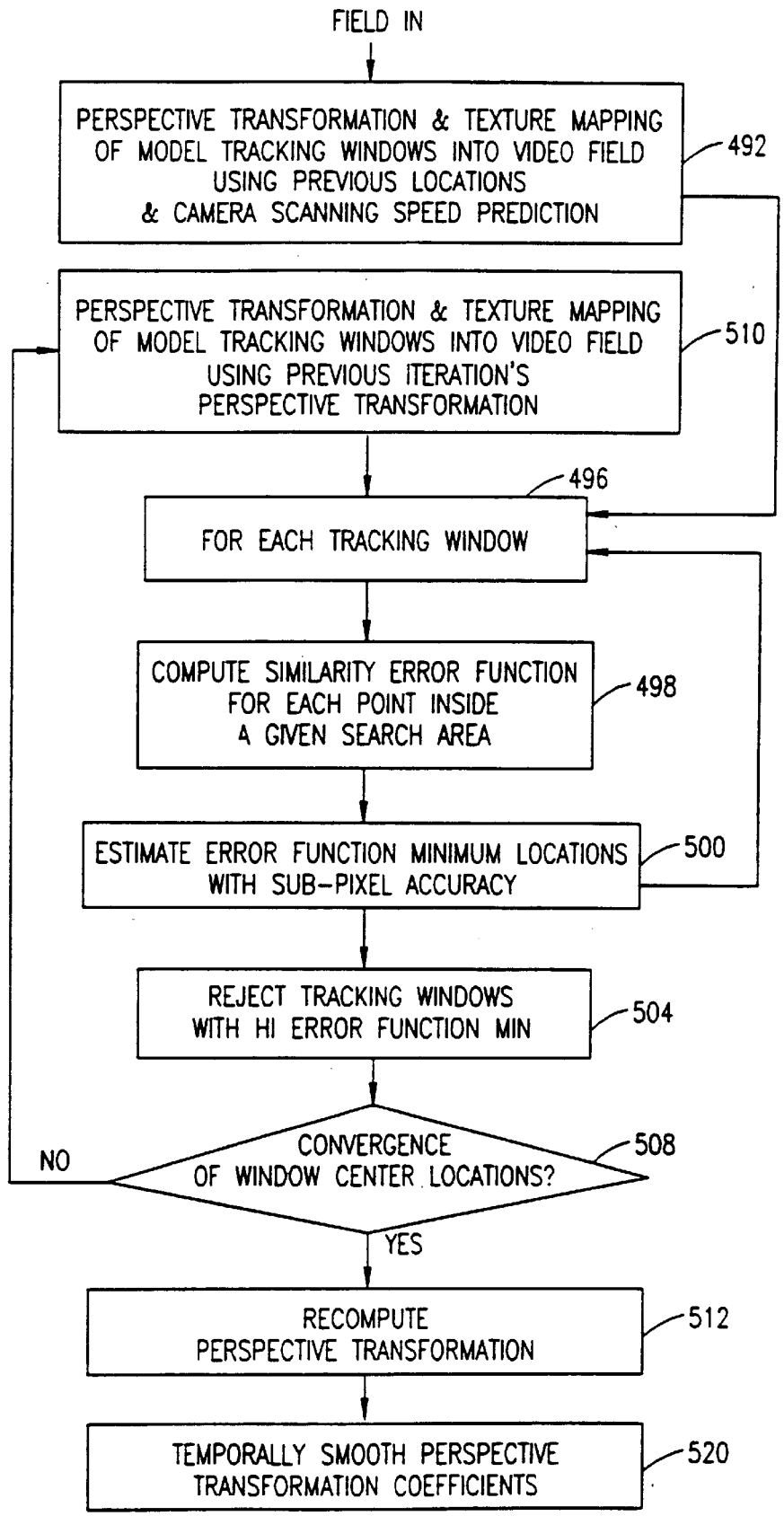
FIG. 14 is a simplified flowchart of a preferred method for performing the tracking step of FIGS. 10A and 10B.

FIG. 14 is a simplified flowchart of a preferred method for performing the tracking step 310 of FIGS. 10A and 10B. The method of FIG. 14 preferably includes the following steps:

STEP 492: A perspective transformation is performed on the model tracking windows and the contents thereof are mapped into the video field. This step employs the system's knowledge of the location of the advertisement in the previous field and, preferably, predicted scanning speed of the camera imaging the sports event.

STEP 496: Steps 498 and 500, which may be similar to steps 472 and 476, respectively, of FIG. 13, are performed for each model tracking window.

STEPS 508 AND 512 may be similar to steps 488 and 490 of FIG. 13.

STEP 510: If the window center locations do not yet converge, step 492 is redone, however, this time, the texture mapping is based upon the perspective transformation of the previous iteration.

STEP 520: The coefficients of the perspective transformation are preferably temporally smoothed, since, due to the smoothness of the camera's scanning action, it can be assumed that discontinuities are noise.

FIG. 15 is a simplified flowchart of a preferred method for performing the occlusion analysis step 350 of FIGS. 10A and 10B. The method of FIG. 15 preferably includes the following steps:

STEP 530: The advertisement image in the video field is subtracted from its perspective transformed model, as computed in step 512 of FIG. 14 or, for a new field, in step 390 of FIG. 13.

STEP 534: Preferably, the identity of the advertisement image and the stored advertisement is verified by inspecting the difference values computed in step 530. If the advertisement image and the stored advertisement are not identical, the current field is not processed any further. Instead, the next field is processed, starting from step 320 of FIG. 10B.

STEP 538: The internal edge effects are filtered out of the difference image computed in step 530 since internal edges are assumed to be artifacts.

STEP 542: Large non-black areas in the difference image are defined to be areas of occlusion.

STEP 546: The occlusion map is preferably temporally smoothed since the process of occlusion may be assumed to be continuous.

FIG. 16 is a simplified flowchart of a preferred method for performing the advertisement incorporation step 360 of FIGS. 10A and 10B. The method of FIG. 16 preferably includes the following steps:

STEP 560: The resolution of the replacing advertisement model, i.e. the advertisement in memory, is adjusted to correspond to the resolution in which the advertisment to be replaced was imaged. Typically, a single advertisement model is stored in several different resolutions.

STEP 570: The replacing advertisement is transformed and texture mapped into the video field pose, using tri-linear interpolation methods. This step typically is based on the results of step 512 of FIG. 14 or, for a new field, on the results of step 390 of FIG. 13.

STEP 580: Aliasing effects are eliminated.

STEP 590: The replacing pixels are keyed in according to an occlusion map. The values of the replacing pixels may either completely replace the existing values, or may be combined with the existing values, as by a weighted average. For example, the second alternative may be used for edge pixels whereas the first alternative may be used for middle pixels.

Figure 17:
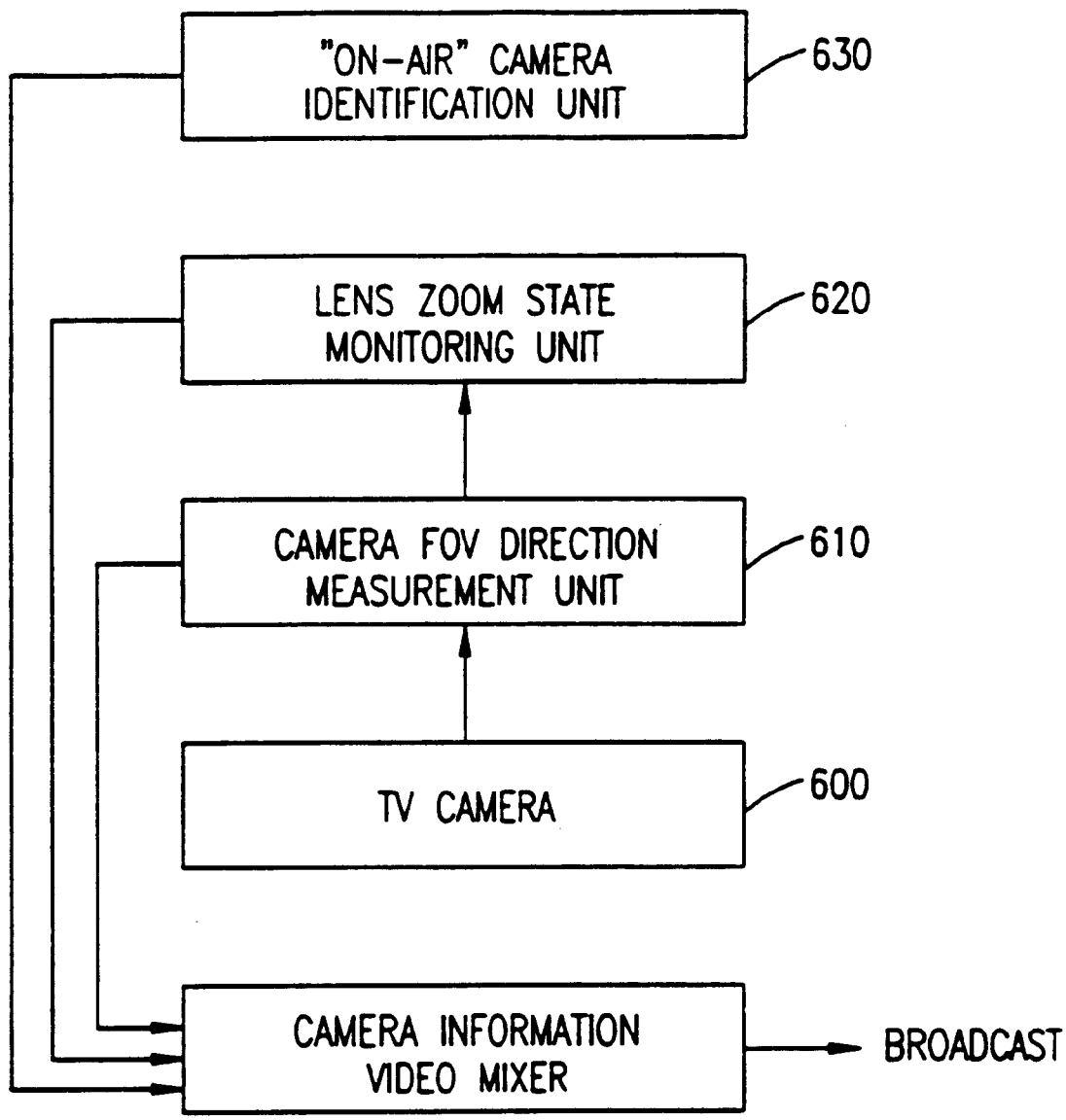
FIG. 17 is a simplified block diagram of camera monitoring apparatus useful in conjunction with the advertisement site detection/incorporation apparatus of FIG. 7.

FIG. 17 is a simplified block diagram of camera monitoring apparatus useful in conjunction with a conventional TV camera and with the advertisement site detection/incorporation apparatus of FIG. 7. If the parallel processor and controller of FIG. 7 is as illustrated in FIG. 8, the apparatus of FIG. 17 is not required and instead, a conventional TV camera may be employed. However, in the alternative, the automatic detection and content identification features of the system may be eliminated, by eliminating unit 170 of FIG. 8. In this case, the apparatus of FIG. 17 is preferably provided in operative association with the TV camera at the stadium or playing field.

The apparatus of FIG. 17 provides camera information, including the identity of the "on-air" camera, its lens zoom state and the direction of its FOV center. This information may be employed, in conjunction with known information as to the positions and contents of advertisements in the stadium, in order to detect, identify and even roughly track each advertisement.

The apparatus of FIG. 17 includes:

(a) a plurality of conventional TV cameras 600 of which one is shown in FIG. 17;
(b) for each camera 600, a camera FOV (field of view) center direction measurement unit 610 at least a portion of which is typically mounted on the TV camera 600 pedestal;
(c) for each camera 600, a camera lens zoom state monitoring unit 620 which is typically mounted on the TV camera 600 pedestal. The monitoring unit 620 receivse an output indication of the zoom state directly from the zoom mechanism of the camera;
(d) an "on-air" camera identification unit 630 operative to identify the camera, from among the plurality of TV cameras 600, which is being broadcast. This information is typically available from the broadcasting system control unit which typically receives manual input selecting an on-air camera, from a producer; and
(e) a camera information video mixer 640 operative to mix the output of units 610, 620 and 630 onto the broadcast. Any suitable mixing may be employed, such as mixing onto the audio channel, mixing onto the time code, or mixing onto the video signal itself.

The camera FOV direction measurement unit 610 may be implemented using any of the following methods, inter alia:

a. On-camera NFM (North Finding Module) in conjunction with two inclinometers for measuring the two components of the local gravity vector angle with respect to the FOV center direction;
b. GPS- (Global Position System) based direction measurement system;
c. Triangulation—positioning two RF sources at two known locations in the playing field or stadium and an RF receiver on the camera;

d. an on-camera boresighted laser designator in combination with an off-camera position sensing detector operative to measure the direction of the beam spot generated by the lasr designator.

Figure 18:
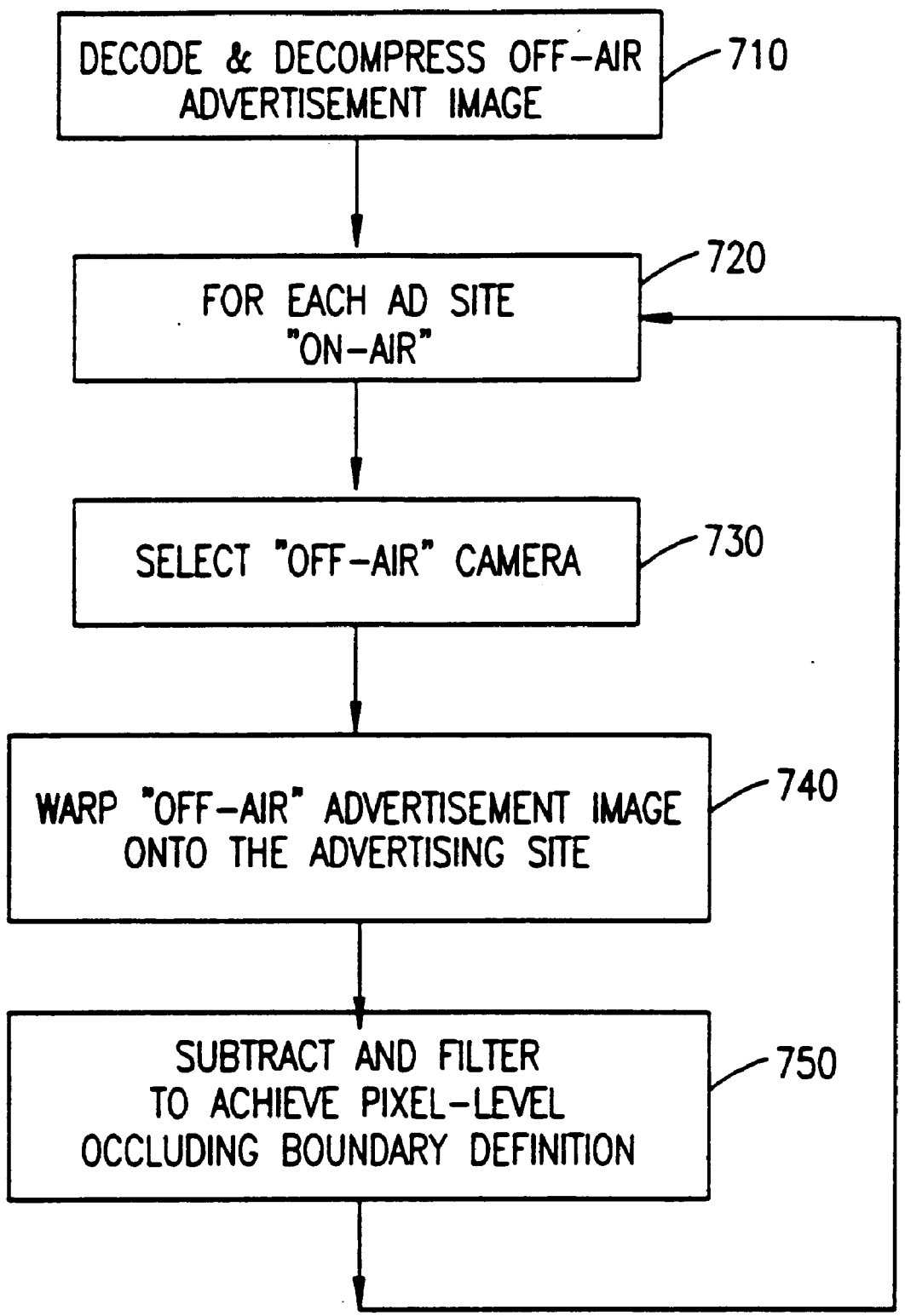
FIG. 18 is a simplified flowchart of a preferred method for processing the output of the occlusion analysis process of FIG. 15 in order to take into account images from at least one off-air camera.

FIG. 18 is a simplified flowchart of an optional method for processing the output of the occlusion analysis process of FIG. 15 in order to take into account images from at least one off-air camera. If the method of FIG. 18 is employed, a video compressor and mixer 700 are provided in operative association with the TV cameras which are imaging the event at the playing field or stadium, as shown in FIG. 2. The output of the compressor and mixer 700, comprising compressed images of the playing field as imaged by all of the TV cameras other than the TV camera which is "on-air", blended with the broadcast signal, is broadcast to remote advertisement site detection/incorporation systems such as that illustrated in FIG. 7. The transmission provided by compressor and mixer 700 of FIG. 2 is first decoded and decompressed in step 710 of FIG. 18.

STEP 720: Steps 730, 740 and 750 are repeated for each advertisement site imaged by the "on air" camera.

STEP 730: Although it is possible to employ information from more than one of the "off-air" cameras, preferably, only a single "off air" camera is employed to process each advertisement site and the single "off-air" camera is selected in step 730. For example, if the apparatus of FIG. 17 is provided, the output of camera FOV direction measurement unit 610 for each "off-air" camera may be compared in order to identify the "off-air" camera whose FOV direction is maximally different from the FOV direction of the "on-air" camera. Alternatively, particularly if the apparatus of FIG. 17 is omitted, a single "off-air" camera may be selected by performing preliminary analysis on the images generated by each of the "off-air" cameras in order to select the most helpful "off-air" camera. For example, the images generated by each "off-air" camera may be matched to the stored representation of the advertisement currently being processed. Then, the actual image may be warped and then subtracted from the stored representation for each "off-air" camera in order to obtain an estimate of the occlusion area for that camera and that advertisement. The camera with the minimal occlusion area may then be selected.

STEP 740: The advertisement image of the selected "off-air" camera is warped onto the advertisement site as imaged by the "on-air" camera.

STEP 750: The warped "off-air" advertisement image is subtracted from the "on-air" image and the difference image is filtered in order to compute the boundary of the occluding object at pixel-level accuracy.

According to a preferred embodiment of the present invention, the advertisement to be incorporated in a particular location in the playing field or other locale may vary over time. This variation may be in accordance with a predetermined schedule, or in accordance with an external input. For example, a speech recognition unit may be provided which is operative to recognize key words, such as the word "goal" or the word "overtime", on the audio channel accompanying the video input to the system. In this way, an advertisement may be scheduled to be incorporated at particular times, such as just after a goal or during overtime.

In the present specification, the term "advertisement site" refers to a location into which an advertisement is to be incorporated. If an existing advertisement occupies the advertisement site, the new advertisement replaces the existing advertisement. However, the advertisement site need not be occupied by an existing advertisement. The term "occluded" refers to an advertisement site which is partially or completely concealed by an object, typically a moving object, in front of it.

A particular feature of the present invention is that, when it is desired to track an advertisement site within a larger image, the entire image is not tracked, but rather only the advertisement site itself.

Another particular feature is that "special" advertisements may be provided, such as moving, blinking or otherwise varying advertisements, video film advertisements, advertisements with changing backgrounds, and advertisements with digital effects.

It is appreciated that the particular embodiment described in Appendix A is intended only to provide an extremely detailed disclosure of the present invention and is not intended to be limiting.

Figure 19:
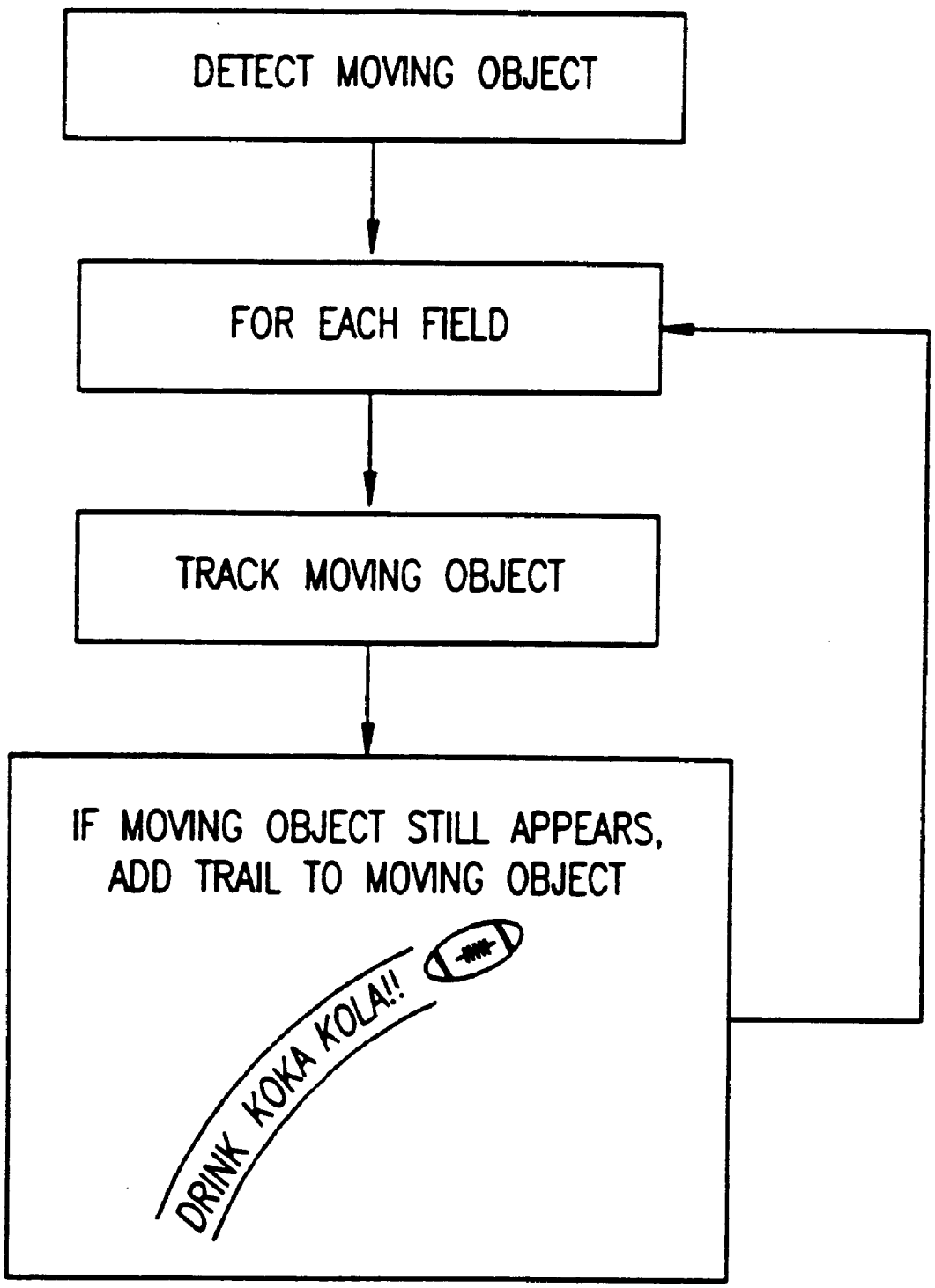
FIG. 19 is a simplified flowchart of a preferred method for detecting and tracking moving objects of central interest; and Appendix A is a computer listing of a software implemented non-real time system for advertisement site detection and advertisement incorporation, constructed and operative in accordance with an alternative embodiment of the present invention.

The applicability of the apparatus and methods described above is not limited to the detection, tracking and replacement or enhancement of advertisements. The disclosed apparatus and methods may, for example, be used to detect and track moving objects of central interest, as shown in FIG. 19, such as focal athletes and such as balls, rackets, clubs and other sports equipment. The images of these moving objects may then be modified by adding a "trail" including an advertisement such as the logo of a manufacturer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by those skilled in the art that the invention is not limited to what has been shown and described hereinabove. Rather, the scope of the invention is defined solely by the claims which follow:

APPENDIX A

```
#include "comp_fnc.h"
int __cdecl compare_short_pnt ( const void *elem1,const void *elem2 )
{int i; double t1,t2;
  double a;
  t1=(double)elem1;t2=(double)elem2;
  a=t1-t2;
  i=(a?((a<0)?1:-1):0);
  return i;
}
//=========================================================== int __cdecl compare_GOOD_DIR_LINE ( const void *elem1,const void
*elem2 )
{int i; double t1,t2;
  double a;
  t1=((GOOD_DIR_LINE*)elem1)->Qual;t2=((GOOD_DIR_LINE*)elem2)-
>Qual;
  a=t1-t2;
  i=(a?((a<0)?1:-1):0);
  return i;
}
//===========================================================
=========
//===========================================================
==============
int __cdecl compare_array_elem ( const void *elem1,const void *elem2 )
{int i;
  double a;
  a=(double )elem1-(double )elem2;
  i=(a?((a<0)?1:-1):0);
  return i;
}
//===========================================================
==============
```

```c
#ifndef COR_FNC
#define COR_FNC
#include "projctn8.h"
#include "pic_mch8.h"
#include "res_mch8.h"
typedef struct
        {double md[3],var[3];} AVERAGE_VEC;

AVERAGE_VEC   average(PCT tag,double Thr,
   COLOR_VEC (*p_funct)(COLOR_RGB p1,double Thresh_mdl));
COLOR_VEC template_conv_1 (PCT target,PCT win,double
Thr,COLOR_VEC int_v,
           COLOR_VEC (*p_funct)(COLOR_RGB p1,double
Thresh_mdl));
COLOR_VEC template_abs_diff_1 (PCT target,PCT win,double
Thr,COLOR_VEC int_v,
           COLOR_VEC (*p_funct)(COLOR_RGB p1,double Thresh_mdl),
              AVERAGE_VEC t,AVERAGE_VEC w);
COLOR_VEC Correlation(COLOR_VEC conv,AVERAGE_VEC
t,AVERAGE_VEC w,
        COLOR_VEC int_v);
COLOR_VEC Correlation_single_1(COLOR_VEC conv,AVERAGE_VEC
t,AVERAGE_VEC w,
        COLOR_VEC int_v);
AVERAGE_VEC LineMoments(PCT &T, DIR_LINE Line, short map);
double Quality(AVERAGE_VEC * UpLineQuality);

#endif
```

```
#ifndef LIBR
#define LIBR
#include "projctn8.h"
#include "pic_mch8.h"
#include "res_mch8.h"
//#include "lin_trn7.h"

#define NAME_LENGTH   40
define     GRAPHMODE     _VRES256COLOR endif
```

41

```
typedef struct {
    int cols, rows;
    int bpp;
} PHDR;
```

```
#ifndef PIC_MCH
#define PIC_MCH
#include <vmemory.h>
#include <graph.h>
#include "projctn8.h"
define MEDIAN_AREA 49 typedef unsigned char byte;

typedef struct
        {short r,g,b;}
        COLOR_RGB;
class  PCT
        {public:
          short s_rows,s_cols;
          unsigned char __far * buffer_now ;
          unsigned char __far **pict;
//================================================================
===============
        PCT()
              {buffer_now=NULL;
               pict=NULL;
               s_rows=s_cols=0;
              }
      void free_PCT()
              {int i;
               if(!pict) return;
               for(i=0;i<s_rows;i++)
                  free((void __far *)pict[i]);
               buffer_now=NULL;
               pict=NULL;
              }
      void put_str(short y,unsigned char *B)
        {
        if(y<s_rows)
              {buffer_now=pict[y];
           int i;
              for(i=0;i<3*s_cols;i++)
                  *buffer_now++=*B++;
              }
        }
      void put_pix(short y,short x,COLOR_RGB p)
        {
        if((y<s_rows) && (x<s_cols))
              buffer_now =     pict[y]+3*x;
        PutNextPix(p);
        }
```

```
//=========================================================
==========
    inline COLOR_RGB get_next(void)
        { COLOR_RGB t;
                t.r=*buffer_now++;
                t.g=*buffer_now++;
                t.b=*buffer_now++;
            return t;
        }
//=========================================================
inline COLOR_RGB get_pixel(short y,short x)
            {
                if((y<s_rows) && (x<s_cols))
                    buffer_now= pict[y]+3*x;
                return get_next();
            }
//=========================================================
//=========================================================
==========
    void PutNextPix(COLOR_RGB p);
        PCT (short n_cols, short n_rows);
      void load_template(PCT source,SCR_PNT left_up_scr);
    COLOR_RGB get_median_pixel(short y,short x,short neibour);
    int load_file_rgb(const char *name);

};

void sign_present_RGB(PCT pict_scr,SCR_PNT left_up);
PCT sign_storage_rgb(const char *name,struct _videoconfig vc);
COLOR_RGB *make_palette();

short color_num(short r,short g,short b);
void write_sign_rgb(char *name,PCT pict_now);
#endif
```

```
#ifndef PIC_PRO
#define PIC_PRO
#include  <stdlib.h>
#include  <direct.h>
#include <afx.h>
#include <pic_mch7.h>
#include "filemnp.h"
#define STR_MAX    4
//===========================================================
=======
const SCR_PNT z_0(0,0);
class  PRT:public PCT
        {public:
//information
     CString PathName;
     CString FRAME_Number;
     CString STRING_name;
     CString  SIGN_name;
         short  Pos;    // Position in the string
         long NumberOfChk,MaxNum;
         double *Charact;
//models
        PRT::~PRT()
            {this->free_PCT();
             Pos=0;
                    if(MaxNum)
                        delete Charact;
                    Charact=NULL;
                    MaxNum=NumberOfChk=0;
             }
//-----------------------------------
        PRT::PRT()
          {NumberOfChk=MaxNum=s_cols=s_rows=0;
           Charact=NULL;pict=NULL;
            }
//-----------------------------------
    PRT::PRT (short n_cols, short n_rows)
        {*(PCT *)this=PCT::PCT(n_cols,n_rows);
         NumberOfChk=MaxNum=0;
         Charact=NULL;
        }
//===========================================================
int read_proto_SGN(char ext[]=".sgn")
  {
   CString new_name(' ',80);

PathName=MakeName(PathName);
   new_name=PathName+ext;
   char now[80];
```

```
       FILE *datfp;
           if(!(datfp=fopen((const char*)new_name,"r"))) return 1;
               if(fscanf(datfp,"%*[^\n]s ")==EOF)goto ERR;
               if(fscanf(datfp,"%s ",now)==EOF)goto ERR;
               if(fscanf(datfp,"%s ",now)==EOF)goto ERR;
               if(fscanf(datfp,"%s ",now)==EOF)goto
ERR;FRAME_Number=now;
               if(fscanf(datfp,"%s ",now)==EOF)goto
ERR;STRING_name=now;
               if(fscanf(datfp,"%s ",now)==EOF)goto ERR; SIGN_name=now;
               FRAME_Number.MakeUpper();
               STRING_name.MakeUpper();
               SIGN_name.MakeUpper();
               fclose(datfp);
               return 0;
           ERR:fclose (datfp); return 1;
}
//========================================================
 int proto_storage_rgb(char *name,struct _videoconfig vc)
           {*(PCT *)this=sign_storage_rgb(name,vc);
           if (!s_cols) return 1;
           PathName=MakeName(name);
           if (read_proto_SGN())
               {free_PCT();
               return 1;
               }
           return 0;
           }
//————————————————————————
 int read_proto_DBC(FILE *datfp)
       {
       char now[80];
               if(fscanf(datfp,"%s ",now)==EOF)goto
ERR;PathName=MakeName(now);
               if(fscanf(datfp,"%s ",now)==EOF)goto
ERR;FRAME_Number=now;
               if(fscanf(datfp,"%s ",now)==EOF)goto
ERR;STRING_name=now;
               if(fscanf(datfp,"%s ",now)==EOF)goto ERR; SIGN_name=now;
               if(fscanf(datfp,"%d ",&(this->s_cols))==EOF)goto ERR;
               FRAME_Number.MakeUpper();
               STRING_name.MakeUpper();
               SIGN_name.MakeUpper();
               return 1;
           ERR: return 0;
       }
//========================================================
===
 int alloc_Charact_dbl(long Num)
```

46

```
{
 if(!(Charact=new double[Num])) return 1;
 MaxNum=Num; NumberOfChk=0;
  return 0;
 }
//————————————————————————
void free_Charact()
{delete Charact;
  Charact=NULL;
}
//————————————————————————
int read_Charact_dbl(FILE *inp,long Num)
 {short i;
  double d;
  if(MaxNum<(NumberOfChk+Num)) return 1;
  for (i=0;i<Num;i++)
   {if(fscanf(inp,"%lf ",&d) ==EOF) return 1;
    if(fabs(d)<1.0e-4) d=0;
        Charact[NumberOfChk]=d;
    NumberOfChk++;
    }
return 0;
 }
//————————————————————————
double CorrValue(short WNum,short Pnum)
 {return (*(Charact+(long)WNum*s_cols+Pnum));
 }
//=========================================================
======
//======RETURN NUMBER OF STRIPS
int read_target_SGN(SCR_PNT vrt[][4],char ext[]=".sgs")
   {int n=0,j,FLG,s;
    CString new_name(' ',80);

PathName=MakeName(PathName);
    new_name=PathName+ext;
    char now[80];
    FILE *datfp;
        if(!(datfp=fopen((const char*)new_name,"r"))) return 1;
            if(fscanf(datfp,"%*[^\n]s ")==EOF)goto OUT;
            if(fscanf(datfp,"%s ",now)==EOF)goto OUT;
            if(fscanf(datfp,"%s ",now)==EOF)goto OUT;
            if(fscanf(datfp,"%s ",now)==EOF)goto
OUT;STRING_name=now;
            if(fscanf(datfp,"%s ",now)==EOF)goto OUT; SIGN_name=now;
         if((s=PathName.ReverseFind('\\'))<0)
            s=PathName.ReverseFind(':');
            FRAME_Number=
                PathName.Right(PathName.GetLength()-s);
```

47

```
                - STRING_name.MakeUpper();
                SIGN_name.MakeUpper();
        do{
            for(j=0;j<4;j++)
            if((FLG=fscanf(datfp,"%d %d ",&(vrt[n][j].c),&(vrt[n][j].r)))==EOF)
                goto OUT;
            n++;
            }
        while(n<STR_MAX-1);
        OUT:fclose (datfp); return n;
    }
//————————————————————
};
//========================================= define UnKnown -1
//==============================================================
=
typedef struct
        { short n;   // voiting numbers
          short pos; // position in string
          double value; //value
        } RSLT_old;

//————————————————
void HistCollect(short NOfWin,short St,short Fin,PRT &Db);
RSLT_old LineEstimation (short TagSize, PRT &Db,short NOfWin,
                            short WSize,double Thr);
int LineInf(const PRT &P, PRT T, short rw, short Xpos,struct _videoconfig vc);
double LinInter( PRT &P,short WNum,short WSize ,double Pt);
void HistThresh(short *H,short *BotThr,short *TopThr,short num);

#endif
```

48

```
#ifndef PROJCTN
#define PROJCTN
#include <math.h>
#include <graph.h>
typedef struct {
   double x, y, z;
} PNT;

class SCR_PNT
   {public:
   short c, r;
   SCR_PNT(){c=0;r=0;}
   SCR_PNT(short x,short y){c=x;r=y;}
   };

//PT -> SCR_PNT conversion //
#define PT_SCR( p,scr)    (scr).c=(short)(p).u;(scr).r=(short)(p).v;
// SCR_PNT -> PT converson
#define INT_PT(scr,dbl)    (dbl).u=(double)((scr).c);\
                  (dbl).v=(double)((scr).r);

class PT
   {public:
   double u, v;
   PT(double x, double y){u=x; v=y;}
   PT(SCR_PNT p1 ){u=(double)p1.c;v=(double)p1.r;}
   PT (){u=0;v=0;}
   };

class LINE_PROJECTION;
class DIR_LINE
   { friend class LINE_PROJECTION;
     private:
        double    a,b,c;     // a*u+b*v+c=0
        PT st_pnt, end_pnt;
     public:
        DIR_LINE (PT p1, PT p2)
           {st_pnt=p1;
            end_pnt=p2;
#ifdef DEBUG
        _moveto( (short) st_pnt.u,(short) st_pnt.v );
        _lineto( (short) end_pnt.u,(short) end_pnt.v );
#endif
            a=p2.v-p1.v;
            b=p1.u-p2.u;
            c=p1.v*p2.u-p1.u*p2.v;     // a*x+b*y+c=0
           }
//—————————————————————
        DIR_LINE (SCR_PNT p1, SCR_PNT p2)
```

49

```
        {st_pnt=PT::PT(p1);
            end_pnt=PT::PT(p2);
#ifdef DEBUG
        _moveto( (short) st_pnt.u,(short) st_pnt.v );
        _lineto( (short) end_pnt.u,(short) end_pnt.v );
#endif
            a=end_pnt.v-st_pnt.v;
            b=st_pnt.u-end_pnt.u;
            c=st_pnt.v*end_pnt.u-st_pnt.u*end_pnt.v;          //
a*x+b*y+c=0
        }

DIR_LINE ()
        {st_pnt.u=st_pnt.v=
         end_pnt.u=end_pnt.v=a=b=c=0;
        }
    PT PT_for_P( double p)
        { PT t;
            t.u=st_pnt.u+p*(end_pnt.u-st_pnt.u);
            t.v=st_pnt.v+p*(end_pnt.v-st_pnt.v);
            return t;
        }
    double U_for_V(double v) {return(a?(-c-b*v)/a:0);}
    double V_for_U(double u) {return(b?(-c-a*u)/b:0);}
    double a_for_line(){return a;}
    double b_for_line(){return b;}
    double c_for_line(){return c;} double RATIO_for_PT(PT p)     //relative point position at line
        { double dx,dy,dro;
            dx=end_pnt.u-st_pnt.u;
            dy=end_pnt.v-st_pnt.v;
            if(fabs (dx)>fabs(dy))
                {if(!dx) return 0;
                 dro= (p.u-st_pnt.u)/dx;
                }
            else
                {
                 if(!dy) return 0;
                 dro= (p.v-st_pnt.v)/dy;
                }
            return dro;
        }
    int Left_Right(int col,int row)
            // +1 if point to the left hand from start to end
            //  0 otherwise
            {
             return(((a*col+b*row+c)>=0)?0:1);
            }
```

50

```
        PT Start_p(){return st_pnt;}
        PT End_p(){return end_pnt;}
friend    int U_dist(DIR_LINE l);
friend PT cross_line(DIR_LINE Line1, DIR_LINE Line2);
friend int INside(DIR_LINE l1,DIR_LINE l2,DIR_LINE l3,DIR_LINE l4,int
col,int row);
};

class LINE_PROJECTION
 {
  private:
    double   proj_prm;   //
  public:
    DIR_LINE Rl, Prj;
    LINE_PROJECTION(){
    DIR_LINE l1; Rl=l1; Prj=l1;
       proj_prm=0;
     }
    LINE_PROJECTION (DIR_LINE l1, PT p, DIR_LINE pr, PT p_pr);
    double Ro_for_P(double P)
       {return ( (P*(1+proj_prm))/(1+P*proj_prm));
       }
    double P_for_Ro(double Ro)
       {return ( Ro/(1+(1-Ro)*proj_prm));
       }
 friend DIR_LINE Line_for_PT_pr(LINE_PROJECTION line1, PT pr1,
                     LINE_PROJECTION line2, PT pr2);
 friend DIR_LINE Line_for_PT_rl(LINE_PROJECTION line1, PT p1,
                     LINE_PROJECTION line2, PT p2);

};
//=======================================
class GOOD_DIR_LINE:public DIR_LINE
           {public :
              double Qual;
              GOOD_DIR_LINE(){Qual=0;}
              GOOD_DIR_LINE(SCR_PNT St,SCR_PNT End)
                 {Qual=0;
                 *(DIR_LINE *)this=DIR_LINE::DIR_LINE(St,End);
                 }
//        void OnDraw(short incr)
//           { PT st=Start_p(), stp=End_p();
//             _moveto( (short) st.u,(short) (st.v+incr) );
//             _lineto( (short) stp.u,(short) (stp.v+incr) );
//       }
             };

typedef struct{ LINE_PROJECTION L_left,L_mid,L_right;
```

5l

```
        DIR_LINE I01, I12, I23, I30;
        DIR_LINE I01_pr, I12_pr, I23_pr, I30_pr;
    }
    RECT_RESOLVED;
#endif
```

```
#ifndef RES_MCH
#define RES_MCH
#include <graph.h>
#include "projctn8.h"
#include "pic_mch8.h"
#define NTSC 0
#define HSI 1
#define New_plan 2
#define RGB 3
#define LUMIN_THR 4
#define IHS 5
//======================================== typedef struct
    {double c[3];
    } COLOR_VEC;

void GRAPH_OUT(int ex=0);
int  GRAPHICS_START(struct _videoconfig *vc,short GR_mode);
void match_vertex(SCR_PNT *v);
int __cdecl c_comp( const void *elem1, const void *elem2);
short interpol(short * s,double x,double y);

COLOR_RGB INTER_pix_color_rgb(PCT p1, PT PT_now);
COLOR_RGB INTER_pix_color_rgb_median(PCT p1, PT PT_now);

const COLOR_VEC NORM_RGB={256,1,1};
const COLOR_VEC NORM_simple={256,256,256};

COLOR_VEC (*PointColorFunct(short M))(COLOR_RGB p1, double Thresh_mdl);

COLOR_VEC color_space_NTSC(COLOR_RGB p1,double Thresh_mdl);
COLOR_VEC color_space_RGB(COLOR_RGB p1,double Thresh_mdl);
COLOR_VEC color_space_NEW(COLOR_RGB p1,double Thresh_mdl);
COLOR_VEC color_space_RGB_simple(COLOR_RGB p1, double Thresh_mdl);
COLOR_VEC color_space_LUMIN_THR(COLOR_RGB p1, double Thresh_mdl);
COLOR_VEC color_space_IHS(COLOR_RGB p1, double Thresh_mdl);
#endif
```

```
#ifndef VICAL8
#define VICAL8
#include <vmemory.h>
typedef unsigned char byte;
unsigned char __far * virtalloc(short xdim,short ydim);
#endif
```

```
#include "comp_fnc.h"
int __cdecl compare_short_pnt ( const void *elem1,const void *elem2 )
{int i; double t1,t2;
 double a;
 t1=(double)elem1;t2=(double)elem2;
 a=t1-t2;
 i=(a?((a<0)?1:-1):0);
 return i;
}
//=========================================================== int __cdecl compare_GOOD_DIR_LINE ( const void *elem1,const void
*elem2 )
{int i; double t1,t2;
 double a;
 t1=((GOOD_DIR_LINE*)elem1)->Qual;t2=((GOOD_DIR_LINE*)elem2)-
>Qual;
 a=t1-t2;
 i=(a?((a<0)?1:-1):0);
 return i;
}
//===========================================================
=========
//===========================================================
===============
int __cdecl compare_array_elem ( const void *elem1,const void *elem2 )
{int i;
 double a;
 a=(double )elem1-(double )elem2;
 i=(a?((a<0)?1:-1):0);
 return i;
}
//===========================================================
===============
```

```c
#include <stdio.h>
#include <stdlib.h>
#include <conio.h>
#include <float.h>
#include <graph.h>
#include "cor_fnc8.h"

//===========================================================================
AVERAGE_VEC average(PCT tag,double Thr,
    COLOR_VEC (*p_funct)(COLOR_RGB p1,double Thresh_mdl))
{short r_t,c_t,n=0,i;
AVERAGE_VEC z={{0,0,0},{0,0,0}};
COLOR_VEC t_p;
  for(r_t=0;r_t<tag.s_rows;r_t++)
    for(c_t=0;c_t<tag.s_cols;c_t++)
      {n++;
       t_p=p_funct(tag.get_pixel(r_t,c_t),Thr);
       for(i=0;i<3;i++)
          {
          z.md[i]+=t_p.c[i];
          z.var[i]+=t_p.c[i]*t_p.c[i];
          }
      }
double rr,nrev;
nrev=n?1.0/n:0;
  for(i=0;i<3;i++)
   {rr=(z.md[i]*=nrev);
    z.var[i]=z.var[i]*nrev;
   }
return z;
}
//===========================================================================
COLOR_VEC template_conv_1 (PCT target,PCT win,double
Thr,COLOR_VEC int_v,
            COLOR_VEC (*p_funct)(COLOR_RGB p1,double Thresh_mdl))
{short i,r,c,n;
COLOR_VEC w_p,t_p;
COLOR_VEC res={0,0,0};

for(n=r=0;
    (r<target.s_rows)||(r<win.s_rows);r++)
    for(c=0;
    (c<target.s_cols)||(c<win.s_cols);c++)
      {n++;
        w_p=p_funct(win.get_pixel(r,c),Thr);
        t_p=p_funct(target.get_pixel(r,c),Thr);
       for(i=0;i<3;i++)
```

```
        if(int_v.c[i])
            res.c[i]+=w_p.c[i]*t_p.c[i];
    } double nrev;
nrev=n?1.0/n:0;
 for(i=0;i<3;i++)
    res.c[i]=res.c[i]*nrev;
return res;
}
//================================================================
==================
COLOR_VEC template_abs_diff_1 (PCT target,PCT win,double Thr,COLOR_VEC int_v,
            COLOR_VEC (*p_funct)(COLOR_RGB p1,double Thresh_mdl),
            AVERAGE_VEC t,AVERAGE_VEC w)
{short i,r,c,n;
COLOR_VEC w_p,t_p;
COLOR_VEC res={0,0,0},nor={0,0,0};

for(n=r=0;
    (r<target.s_rows)||(r<win.s_rows);r++)
  for(c=0;
    (c<target.s_cols)||(c<win.s_cols);c++)
    {n++;
        w_p=p_funct(win.get_pixel(r,c),Thr);
        t_p=p_funct(target.get_pixel(r,c),Thr);
    for(i=0;i<3;i++)
        if(int_v.c[i])
        {res.c[i]+=fabs(w_p.c[i]-t_p.c[i]-w.md[i]+t.md[i]);
        nor.c[i]+=__max (fabs(w_p.c[i]-w.md[i]),fabs(t_p.c[i]-t.md[i]));
//      nor.c[i]+=2* fabs(w_p.c[i]-w.md[i]);
        }
    }
 for(i=0;i<3;i++)
        if(int_v.c[i]&& nor.c[i])
        res.c[i]=1-res.c[i]/nor.c[i];
return res;
}
//================================================================
======
COLOR_VEC Correlation(COLOR_VEC conv,AVERAGE_VEC t,AVERAGE_VEC w,
        COLOR_VEC int_v)
{COLOR_VEC out;
 int i;
 double p,g;
 for(i=0;i<3;i++)
    if(int_v.c[i])
```

```
            {p=(conv.c[i]-t.md[i]*w.md[i]);
             g=(t.var[i]-t.md[i]*t.md[i])*(w.var[i]-w.md[i]*w.md[i]);
             out.c[i]=g?p*p/g:0;
             out.c[i]=(p>0)?out.c[i]:-out.c[i];
            }
        else
            out.c[i]=0.0;
 return out;
}
//==========================================================
//==========================================================
======
/*COLOR_VEC Correlation_single_1(COLOR_VEC conv,AVERAGE_VEC
t,AVERAGE_VEC w,
         COLOR_VEC int_v)
{COLOR_VEC out;
 int i;
 double sngl_conv=0;
 double sngl_var=0;
 for(i=0;i<3;i++)
    if(int_v.c[i])
       {
         sngl_conv+=conv.c[i];
         sngl_var+=t.var[i]+w.var[i];
       } out.c[0]=out.c[1]=out.c[2]=sngl_conv/sngl_var;

return out;
} */
//==========================================================
====================
AVERAGE_VEC LineMoments(PCT &T, DIR_LINE Line,short map)
{COLOR_RGB col;
 COLOR_VEC vc;
 AVERAGE_VEC out={{0.0,0.0,0.0},{0.0,0.0,0.0}};
 PT now;
 short length=U_dist( Line);
 double d;
 short j,i,k,ST_X,END_X,now_X;
 double relen,delta_V;
 PT st, stop;
 if(length<0)
  {st=Line.End_p();
   stop=Line.Start_p();
   length=fabs(length);
  }
 else
  {st=Line.Start_p(); stop=Line.End_p();
```

```
                }
        relen= length?1.0/length:0;
        ST_X=(short)st.u; END_X=(short)stop.u;

if(delta_V=(stop.v-st.v)*relen)
                for(d=st.v+0.5,now_X=ST_X;now_X<END_X;now_X++,d+=delta_V)
                {
                //    now.u=ST_X;now.v=d;
                //    col=INTER_pix_color_rgb(T, now);
                        col=T.get_pixel((short)d,now_X);
                        switch (map)
                                {case NTSC:;
                                 case New_plan:;
                                 case HSI:;
                                 case IHS:{
                                        vc= PointColorFunct(map)(col,0);
                                        for(k=0;k<3;k++)
                                                out.md[k]+=vc.c[k];
                                break;
                                } case RGB: {
                                        out.md[0]+=col.r;//out.var[0]+=col.r*col.r;
                                        out.md[1]+=col.g;//out.var[1]+=col.g*col.g;
                                        out.md[2]+=col.b;//out.var[2]+=col.b*col.b;
                                        break;
                                }
                                case LUMIN_THR:{
                                        out.md[0]+=col.r+col.g+col.b;
                                        break;
                                }

};
                        };

for(j=0;j<3;j++)
                {
                        out.md[j]*=relen;
        //              out.var[j]/=length;
                }
        return out;
        }
//====================================================
double Quality(AVERAGE_VEC * UpLineQuality)
{short i,j;
 double out,out_even=0,out_odd=0,out2_even,out2_odd,sum=0;
 for(j=0;j<3;j++)
   {
    sum+=(UpLineQuality+0)->md[j]+(UpLineQuality+1)->md[j]+
```

```
            (UpLineQuality+2)->md[j]+(UpLineQuality+3)->md[j];
    out2_even=(UpLineQuality+0)->md[j]+(UpLineQuality+1)->md[j]-
            (UpLineQuality+2)->md[j]-(UpLineQuality+3)->md[j];
    out2_even*=out2_even;
    out2_odd=(UpLineQuality+0)->md[j]-(UpLineQuality+1)->md[j]-
            (UpLineQuality+2)->md[j]+(UpLineQuality+3)->md[j];
    out2_odd*=out2_odd;
    out_even+=out2_even;
    out_odd+=out2_odd;
    }
  out=(out_even+out_odd)*0.001;
return out;
}
```

```
#include<stdlib.h>
#include<stdio.h>
#include<graph.h>
#include<math.h>
#include <io.h>
#include<fcntl.h>
#include  <string.h>
#include <float.h>
#include <malloc.h>
#include "phdr.h"
#include "vical8.h"
#include "pic_mch8.h"

int cols, rows;

PHDR inhdr;
//===========================================================
//===========================================================
==========
   void PCT::PutNextPix(COLOR_RGB p)
        {
  *buffer_now++ = (unsigned char)p.r;
     *buffer_now++ = (unsigned char)p.g;
  *buffer_now ++ = (unsigned char)p.b;
        }

//===========================================================
========= int __cdecl compare_lum ( const void *elem1,const void *elem2 )
{int i; COLOR_RGB t1,t2;
 double a;
 t1=(COLOR_RGB)elem1;t2=(COLOR_RGB)elem2;
 a=(t1.r+t1.g+t1.b-t2.r-t2.g-t2.b);
 i=(a?((a<0)?1:-1):0);
 return i;
}
//===========================================================
=========

//===========================================================
==========
COLOR_RGB PCT::get_median_pixel(short y,short x,short neibour)
         {COLOR_RGB t={0,0,0},
              s[MEDIAN_AREA],*lum_order[MEDIAN_AREA];
           short n,i,j,xnow,ynow;
           int x3=3*x;
           unsigned char __far *buffer1;
           for(n=0,i=-neibour;i<=neibour;i++)
```

61

```
            for(j=-neibour;j<=neibour;j++)
               if(((ynow=y+i)<s_rows) && ((xnow=x+j)<s_cols))
                 {
                    buffer1= (unsigned char __far *) pict[ynow];
                    t.r=*(buffer1+xnow*3+0);
                    t.g=*(buffer1+xnow*3+1);
                    t.b=*(buffer1+xnow*3+2);
                    s[n]=t;
                    *(lum_order+n)=s+n;
                    n++;
                 }
    qsort((void*)lum_order,n,sizeof(COLOR_RGB*),compare_lum );
            t=*lum_order[(n+1)>>1];
            return t;
            }
//=============================================================
================
PCT::PCT( short n_cols, short n_rows)
            {
              pict=
            (unsigned char __far **)virtalloc(3*n_cols,n_rows);
              if (!pict)
                {fprintf(stderr,"No memory for picture ");
              s_cols=0;
              s_rows=0;
                return;
                }
              buffer_now=pict[0];
              s_cols=n_cols;
              s_rows=n_rows;
            }
//================================
void PCT::load_template(PCT source,SCR_PNT left_up_scr)
            {
              short r_now, c_now;
              COLOR_RGB color_p;
              unsigned char *BUF,*B;
              BUF=(unsigned char *) malloc((size_t)
                       (sizeof(unsigned char)*3*s_cols));
              if(!BUF) {fprintf(stderr," BUF ");exit(-1);}
                for (r_now=0; r_now<s_rows;r_now++)
                   { for (B=BUF,c_now=0;c_now<s_cols; c_now++)
                     {
                        color_p=
            source.get_pixel(r_now+left_up_scr.r,c_now+left_up_scr.c);
                        *B++=color_p.r;
                        *B++=color_p.g;
                        *B++=color_p.b;
                     }
```

```
                put_str(r_now,BUF);
            } free((void*)BUF);
    }
//=================================================================
==========
int PCT::load_file_rgb(const char *name)
{   int er_r;short bytes;
    int y, infd;
    short ysize, xsize;
    char name_of_file[18];
    FILE *datfp;
    strcat(strcpy(name_of_file,name),".rgb");

datfp=fopen(name_of_file,"rb");
    infd= _fileno( datfp );
        if(infd <= 0)
{       printf("bad name 1");
        return(1);
}
 er_r=_read(infd, &inhdr, sizeof(PHDR));

xsize=cols = inhdr.cols;
        ysize=rows = inhdr.rows;

if(ysize > s_rows )
        ysize =s_rows;
        if(xsize > s_cols)
           xsize = s_cols;

s_cols= xsize;
  s_rows=ysize;
bytes =3 * xsize;

byte Buf[2040];

for(y = 0; y < ysize; y++) {
        read(infd, Buf, 3*cols);
        put_str(y, (unsigned char*)Buf);
        }
fclose(datfp);
return 0;
}

//=================================================================
==========
PCT sign_storage_rgb(const char *name,struct _videoconfig vc)
{  int er_r;
```

63

```
PCT pict_now;
char name_of_file[40];
FILE *datfp;

strcat(strcpy(name_of_file,name),".rgb");

int  infd;
   short ysize, xsize;
   datfp=fopen(name_of_file,"rb");
   infd= _fileno( datfp );
       if(infd <= 0)
{      printf("bad name 1");
       return(pict_now);
}
 er_r=_read(infd, &inhdr, sizeof(PHDR));
 if(er_r<0)
 {     printf("bad name 1");
       return(pict_now);
 }
 fclose(datfp);
       xsize=cols = inhdr.cols;
       ysize=rows = inhdr.rows;
 if(ysize > vc.numypixels )
       ysize = vc.numypixels ;
       if(xsize > vc.numxpixels)
       xsize = vc.numxpixels;
pict_now=PCT::PCT(xsize,ysize);
if(pict_now.s_cols)
       pict_now.load_file_rgb(name);
return(pict_now);
}

/*=========================================================***/
void sign_present_RGB(PCT pict_scr,SCR_PNT left_up)
{short x,y,xsize,ysize;
   COLOR_RGB t;
 xsize=       pict_scr.s_cols;
 ysize=       pict_scr.s_rows;
short c;
   for(y = 0; y < ysize; y++)
       {pict_scr.buffer_now=pict_scr.pict[y];
       for(x = 0; x < xsize; x++)
       {
         t=pict_scr.get_next();
         _setcolor(color_num (t.r>>2,t.g>>2,t.b>>2));
         _setpixel(x+left_up.c,y+left_up.r);
       }
       }
   }
```

64

```
//================================================================
const int stepr=9, stepg=9, stepb=21;

COLOR_RGB *make_palette()
{COLOR_RGB *plt=NULL;
 long now,Lut[256];
 long dr,dg,db;
 short i,j,k,num;

for(i=0,db=0;i<4;i++,db+=stepb)
   for(j=0,dg=0;j<8;j++,dg+=stepg)
     for(k=0,dr=0;k<8;k++,dr+=stepr)
        { now=(db<<16)|(dg<<8)|dr;
          num=(i<<6)|(j<<3)|k;
          Lut[num]=now;
        }
     _remapallpalette((long __far *)Lut);
  return plt;
}
//========================================
short color_num(short r,short g,short b)
{short num,i,j,k;
 i=(b+(stepb>>1))/stepb;
 j=(g+(stepg>>1))/stepg;
 k=(r+(stepr>>1))/stepr;
num=(i<<6)|(j<<3)|k;
return num;
}
//================================================
void write_sign_rgb(char *name,PCT pict_now)
{ int er_r;
char name_of_file[80];
strcat(strcpy(name_of_file,name),".rgb");
   FILE *datfp;
   int y, infd;
   datfp=fopen(name_of_file,"wb");
   infd= _fileno( datfp );
      if(infd <= 0)
         printf("bad name 1");

inhdr.cols=pict_now.s_cols;
      inhdr.rows=pict_now.s_rows;
      inhdr.bpp=3;

er_r=_write(infd, (void *)(&inhdr), sizeof(PHDR));
   for(y = 0; y < pict_now.s_rows; y++)
     {
```

65

```
#ifdef VIRTUAL
    void __far *buffer1;
        if ( (buffer1 = (void __far *)_vload( pict_now.pict[y],_VM_CLEAN )) ==
NULL )
                {_vheapterm();exit( -1 );
                 }
else
        void *buffer1;
        buffer1= (void *) pict_now.pict[y];
#endif
 er_r=_write(infd, buffer1, sizeof(char)*pict_now.s_cols*3);
     }
fclose(datfp);
strcat(strcpy(name_of_file,name),".sgn");
    datfp=fopen(name_of_file,"w");
 fprintf(datfp,"%s \n 0 0\n",name);
 fprintf(datfp,"%d 0\n",pict_now.s_cols-1);
 fprintf(datfp,"%d %d \n",pict_now.s_cols-1,pict_now.s_rows-1);
 fprintf(datfp," 0 %d\n",pict_now.s_rows-1);
 fclose(datfp);
}
//============================================================
========
```

```c
#include<stdlib.h>
#include<stdio.h>
#include<graph.h>
#include<math.h>
#include <io.h>
#include<fcntl.h>
#include <string.h>
#include <float.h>
//#include <malloc.h>
//#include "phdr.h"
//#include "vical8.h"
#include "picture.h"

//int cols, rows;

//PHDR inhdr;
//=======================================================
COLOR_RGB PCT::get_median_pixel(short y,short x,short neibour)
        {COLOR_RGB t={0,0,0},
            s[MEDIAN_AREA],*lum_order[MEDIAN_AREA];
         short n,i,j,xnow,ynow;
         int x3=3*x;
         unsigned char __far *buffer1;
         for(n=0,i=-neibour;i<=neibour;i++)
           for(j=-neibour;j<=neibour;j++)
             if(((ynow=y+i)<s_rows) && ((xnow=x+j)<s_cols))
               {
                  buffer1= (unsigned char __far *) pict[ynow];
                  t.r=*(buffer1+xnow*3+0);
                  t.g=*(buffer1+xnow*3+1);
                  t.b=*(buffer1+xnow*3+2);
                  s[n]=t;
                  *(lum_order+n)=s+n;
                  n++;
               }
    qsort((void*)lum_order,n,sizeof(COLOR_RGB*),compare_lum );
         t=*lum_order[(n+1)>>1];
         return t;
         }
//============================================================
================
PCT::PCT( short n_cols, short n_rows)
        {
          pict=
        (unsigned char __far **)virtalloc(3*n_cols,n_rows);
         if (!pict)
            {fprintf(stderr,"No memory for picture ");
         s_cols=0;
         s_rows=0;
```

```
                return;
            }
            buffer_now=pict[0];
            s_cols=n_cols;
            s_rows=n_rows;
        }
//=================================
void PCT::load_template(PCT source,SCR_PNT left_up_scr)
        {
            short r_now, c_now;
            COLOR_RGB color_p;
            unsigned char *BUF,*B;
            BUF=(unsigned char *) malloc((size_t)
                    (sizeof(unsigned char)*3*s_cols));
            if(!BUF) {fprintf(stderr," BUF ");exit(-1);}
              for (r_now=0; r_now<s_rows;r_now++)
                    { for (B=BUF,c_now=0;c_now<s_cols; c_now++)
                        {
                          color_p=
                source.get_pixel(r_now+left_up_scr.r,c_now+left_up_scr.c);
                          *B++=color_p.r;
                          *B++=color_p.g;
                          *B++=color_p.b;
                        }
                        put_str(r_now,BUF);
                    } free((void*)BUF);
        }
//============================================================
==========
int PCT::load_file_rgb(const char *name)
{  int er_r;short bytes;
    int y, infd;
    short ysize, xsize;
    char name_of_file[18];
    FILE *datfp;
    strcat(strcpy(name_of_file,name),".rgb");

datfp=fopen(name_of_file,"rb");
    infd= _fileno( datfp );
        if(infd <= 0)
{       printf("bad name 1");
        return(1);
}
    er_r=_read(infd, &inhdr, sizeof(PHDR));

xsize=cols = inhdr.cols;
        ysize=rows = inhdr.rows;
```

```
        if(ysize > s_rows )
            ysize =s_rows;
        if(xsize > s_cols)
            xsize = s_cols;

s_cols= xsize;
    s_rows=ysize;
bytes =3 * xsize;

byte Buf[2040];

for(y = 0; y < ysize; y++) {
        read(infd, Buf, 3*cols);
        put_str(y, (unsigned char*)Buf);
        }
fclose(datfp);
return 0;
}

//===============================================================
==========
PCT sign_storage_rgb(const char *name,struct _videoconfig vc)
{ int er_r;
PCT pict_now;
char name_of_file[40];
FILE *datfp;

strcat(strcpy(name_of_file,name),".rgb");

int  infd;
    short ysize, xsize;
    datfp=fopen(name_of_file,"rb");
    infd= _fileno( datfp );
        if(infd <= 0)
{       printf("bad name 1");
        return(pict_now);
}
    er_r=_read(infd, &inhdr, sizeof(PHDR));
    if(er_r<0)
    {   printf("bad name 1");
        return(pict_now);
    }
    fclose(datfp);
        xsize=cols = inhdr.cols;
        ysize=rows = inhdr.rows;
    if(ysize > vc.numypixels )
        ysize = vc.numypixels ;
        if(xsize > vc.numxpixels)
```

```
            xsize = vc.numxpixels;
   pict_now=PCT::PCT(xsize,ysize);
   if(pict_now.s_cols)
            pict_now.load_file_rgb(name);
   return(pict_now);
}

/*============================================================***/
void sign_present_RGB(PCT pict_scr,SCR_PNT left_up)
{short x,y,xsize,ysize;
    COLOR_RGB t;
  xsize=      pict_scr.s_cols;
  ysize=      pict_scr.s_rows;
  short c;
     for(y = 0; y < ysize; y++)
         {pict_scr.buffer_now=pict_scr.pict[y];
         for(x = 0; x < xsize; x++)
         {
           t=pict_scr.get_next();
           _setcolor(color_num (t.r>>2,t.g>>2,t.b>>2));
           _setpixel(x+left_up.c,y+left_up.r);
         }
         }
     }

//================================================================
=======
const int stepr=9, stepg=9, stepb=21;

COLOR_RGB *make_palette()
{COLOR_RGB *plt=NULL;
  long now,Lut[256];
  long dr,dg,db;
  short i,j,k,num;

for(i=0,db=0;i<4;i++,db+=stepb)
   for(j=0,dg=0;j<8;j++,dg+=stepg)
    for(k=0,dr=0;k<8;k++,dr+=stepr)
        { now=(db<<16)|(dg<<8)|dr;
          num=(i<<6)|(j<<3)|k;
          Lut[num]=now;
        }
     _remapallpalette((long __far *)Lut);
  return plt;
}
//=========================================
short color_num(short r,short g,short b)
{short num,i,j,k;
 i=(b+(stepb>>1))/stepb;
```

```
        j=(g+(stepg>>1))/stepg;
        k=(r+(stepr>>1))/stepr;
   num=(i<<6)|(j<<3)|k;
   return num;
   }
//===================================================
void write_sign_rgb(char *name,PCT pict_now)
{ int er_r;;
char name_of_file[80];
strcat(strcpy(name_of_file,name),".rgb");
    FILE *datfp;
    int y, infd;
    datfp=fopen(name_of_file,"wb");
    infd= _fileno( datfp );
        if(infd <= 0)
           printf("bad name 1");

inhdr.cols=pict_now.s_cols;
           inhdr.rows=pict_now.s_rows;
           inhdr.bpp=3;

er_r=_write(infd, (void *)(&inhdr), sizeof(PHDR));
   for(y = 0; y < pict_now.s_rows; y++)
      {
#ifdef VIRTUAL
     void __far *buffer1;
         if ( (buffer1 = (void __far *)_vload( pict_now.pict[y],_VM_CLEAN )) ==
NULL )
                 {_vheapterm();exit( -1 );
                  }
else
          void *buffer1;
          buffer1= (void *) pict_now.pict[y];
#endif
   er_r=_write(infd, buffer1, sizeof(char)*pict_now.s_cols*3);
       }
fclose(datfp);
strcat(strcpy(name_of_file,name),".sgn");
   datfp=fopen(name_of_file,"w");
fprintf(datfp,"%s \n 0 0\n",name);
fprintf(datfp,"%d 0\n",pict_now.s_cols-1);
fprintf(datfp,"%d %d \n",pict_now.s_cols-1,pict_now.s_rows-1);
fprintf(datfp," 0 %d\n",pict_now.s_rows-1);
fclose(datfp);
}
//======================================================
========
```

```
#include <graph.h>
#include <stdlib.h>
#include <iostream.h>
#include "projctn8.h"
// For Constructor Calculate ratio of Lengthes.

// FOR CONSTRUCTOR  Fill Members
//88888888888
LINE_PROJECTION :: LINE_PROJECTION
        (DIR_LINE l1, PT p, DIR_LINE pr, PT p_pr)
      { double P, Ro;
        Rl=l1;
        Prj=pr;
        P = l1.RATIO_for_PT( p);
        Ro= pr.RATIO_for_PT( p_pr);
        if (P && (1-Ro))
           {proj_prm=(Ro-P)/(P*(1-Ro));return;};
        cout << "LINE UNRESOLVABLE\n";
      }

PT cross_line(DIR_LINE Line1, DIR_LINE Line2)
   {PT out;
    double det;
      if(det=Line1.a*Line2.b-Line2.a*Line1.b)
        {out.u=(Line1.b*Line2.c-Line1.c*Line2.b)/det;
         out.v=(Line1.c*Line2.a-Line2.c*Line1.a)/det;
        }
      else out.u=out.v=0;
#ifdef DEBUG
    _setcolor(0);
    _ellipse(_GFILLINTERIOR, (short) (out.u-1),(short) (out.v-1),
              (short) (out.u+1),(short) (out.v+1));
endif return out;
}

// Bield real space line connecting points X1 and X2
/// X1 belongs to line1, X2  to  line2:
// PT pr1 - projection X1
// PT pr2 - projection X2
// LINE_PROJECTION line1, line2
DIR_LINE Line_for_PT_pr(LINE_PROJECTION line1, PT pr1,
                LINE_PROJECTION line2, PT pr2)

{
double P,Ro;
PT p1, p2;
```

```
        Ro=line1.Prj.RATIO_for_PT( pr1);      //relative point position at line
        P=line1.P_for_Ro( Ro);
        p1=line1.RI.PT_for_P(P);
        Ro=line2.Prj.RATIO_for_PT( pr2);      //relative point position at line
        P=line2.P_for_Ro( Ro);
        p2=line2.RI.PT_for_P(P);
    DIR_LINE ln(p1,p2);
    return(ln);
    }
// Bield projection line connecting points p1 and p2
/// p1 belongs to line1, p2 to     line2:
// PT p1 - projection X1
// PT p2 - projection X2
// LINE_PROJECTION line1, line2

DIR_LINE Line_for_PT_rl(LINE_PROJECTION line1, PT p1,
                LINE_PROJECTION line2, PT p2)

{double P,Ro;
 PT p1pr, p2pr;
    P=line1.RI.RATIO_for_PT( p1);         //relative point position at line
    Ro=line1.Ro_for_P( P);
    p1pr=line1.Prj.PT_for_P(Ro);
    P=line2.RI.RATIO_for_PT( p2);         //relative point position at line
    Ro=line2.Ro_for_P( P);
    p2pr=line2.Prj.PT_for_P(Ro);
DIR_LINE ln(p1pr,p2pr);
return(ln);
}
//=====
//================================================================
===============
// =1 if point P in quagrangle
int INside(DIR_LINE l1,DIR_LINE l2,DIR_LINE l3,DIR_LINE l4,int col,int row)
  {return(l1.Left_Right(col,row)&&l2.Left_Right(col,row)&&
        l3.Left_Right(col,row)&&l4.Left_Right(col,row));
  }
//==================================================== int U_dist(DIR_LINE l)
{return (l.end_pnt.u- l.st_pnt.u) ;
}
//====================================================
```

73

```c
#include <stdlib.h>
#include <vmemory.h>
#include "res_mch8.h"
#define AVERAGE
define SMOOSE_INT 1 extern double GAMMA;
//================================================================
COLOR_VEC (*PointColorFunct(short M))(COLOR_RGB p1, double
Thresh_mdl)

{ switch ( M)
        {case NTSC:return(color_space_NTSC);
         case New_plan:return(color_space_NEW);
         case HSI:return(color_space_RGB);
         case RGB:return(color_space_RGB_simple);
         case LUMIN_THR:return(color_space_LUMIN_THR);
         case IHS:return(color_space_IHS);
        };
return NULL;
}

//================================
void GRAPH_OUT(int ex)
{
_displaycursor( _GCURSORON );
_setvideomode( _DEFAULTMODE );
 if (ex) exit (ex);
}
//==========================================================
int  GRAPHICS_START(struct _videoconfig *p_vc,short GR_mode)
{
 _displaycursor( _GCURSOROFF );
 _setvideomode( GR_mode );
 if(_grstatus( ) <0) return(1);
 _getvideoconfig( p_vc );
 make_palette();
return 0;
}
// ---------------------------sorting vertexes int __cdecl c_comp( const void *elem1, const void *elem2)
{
   if ((((SCR_PNT*)elem1)->c >((SCR_PNT *) elem2)->c)
        return 1;
   else
        if(((SCR_PNT *) elem1)->c < ((SCR_PNT *)elem2)->c)
```

74

```
         return -1;
      else return 0;
}
//————————————————
void match_vertex(SCR_PNT *v)
{ SCR_PNT vrt[4];
  int i;
  for (i=0;i<4;i++)
     vrt[i]=*(v+i);
  qsort((void *) vrt,4,sizeof(SCR_PNT),c_comp);
  if(vrt[0].r < vrt[1].r)
     {*(v+3)=vrt[0];*(v+2)=vrt[1];}
  else
     {*(v+3)=vrt[1]; *(v+2)=vrt[0];}
  if(vrt[2].r < vrt[3].r)
     {*v=vrt[2]; *(v+1)=vrt[3];}
  else
     {*v=vrt[3]; *(v+1)=vrt[2];}
}
//===========================================================
inline short interpol(short * s,double x,double y)
     {double r=s[0]+x*y*(s[0]-s[1]+s[2]-s[3])+x*(s[1]-s[0])+y*(s[3]-s[0]);
      return((short)r);
  }
//============================================================
=
// ONLY FOR INTER_pix_color_rgb
// and  INTER_pix_color_rgb_median
//============================================================
==============
inline COLOR_RGB BE_linear(COLOR_RGB *p,double x_fract,double
y_fract)
              // loop over coolr
{short s[4];
COLOR_RGB  out_col;
    s[0]=p[0].r;
    s[1]=p[1].r;
    s[2]=p[2].r;
    s[3]=p[3].r;
   out_col.r=(short) interpol(s,x_fract,y_fract);
    s[0]=p[0].g;
    s[1]=p[1].g;
    s[2]=p[2].g;
    s[3]=p[3].g;
   out_col.g=(short) interpol(s,x_fract,y_fract);
    s[0]=p[0].b;
    s[1]=p[1].b;
    s[2]=p[2].b;
    s[3]=p[3].b;
```

```
    out_col.b=(short) interpol(s,x_fract,y_fract);
    return out_col;
}
//===================================================================
COLOR_RGB INTER_pix_color_rgb(PCT p1, PT PT_now)
    {
      int col0=(int)PT_now.u,
          row0=(int)PT_now.v;
    double x_fract=PT_now.u-col0, y_fract=PT_now.v-row0;
    COLOR_RGB p[4];
p[0]=p1.get_pixel(row0,col0);
p[1]=p1.get_next();
p[3]=p1.get_pixel(row0+1,col0);
p[2]=p1.get_next();

return ( BE_linear( p, x_fract, y_fract));
}
//===================================================================
COLOR_RGB INTER_pix_color_rgb_median(PCT p1, PT PT_now)
    {
      int col0=(int)PT_now.u,
          row0=(int)PT_now.v;
    double x_fract=PT_now.u-col0, y_fract=PT_now.v-row0;
    COLOR_RGB p[4];
p[0]=p1.get_median_pixel(row0,col0,SMOOSE_INT);
p[1]=p1.get_median_pixel(row0,col0+1,SMOOSE_INT);
p[2]=p1.get_median_pixel(row0+1,col0+1,SMOOSE_INT);
p[3]=p1.get_median_pixel(row0+1,col0,SMOOSE_INT);

return ( BE_linear( p, x_fract, y_fract));
}
//===================================================================
#define NTSCr(c)  ((c).r*0.6-(c).g*0.28-(c).b*0.32)
#define NTSCg(c)  (0.21*(c).r-0.52*(c).g+0.31*(c).b)
#define NTSCw(c)  (0.3*(c).r+0.59*(c).g+0.11*(c).b)
//===================================================================
COLOR_VEC color_space_NTSC(COLOR_RGB p1, double Thresh_mdl)
{COLOR_VEC out={0,0,0};

if((out.c[0]= NTSCw(p1))>Thresh_mdl)
          {out.c[1]= NTSCr(p1);
           out.c[2]= NTSCg(p1);
          }
        out.c[0]*=0.6;
return out;
}
```

```
//================================================================
===
#define RGBr(c)  (c).r
#define RGBg(c)  (c).g
#define RGBw(c)  ((c).r+(c).g+(c).b)

//===============================================================
=
COLOR_VEC color_space_RGB(COLOR_RGB p1, double Thresh_mdl)
{COLOR_VEC out={0,0,0};

if((out.c[0]= RGBw(p1))>Thresh_mdl)
          {out.c[1]= RGBr(p1)/out.c[0];
           out.c[2]= RGBg(p1)/out.c[0];
          }
        out.c[0]*=0.33333333333333333*GAMMA;
return out;
}
//===============================================================
===
COLOR_VEC color_space_LUM(COLOR_RGB p1, double Thresh_mdl)
{COLOR_VEC out={0,0,0};
        out.c[2]= out.c[1]=out.c[0]= RGBw(p1)*0.33333333333333333;
return out;
}
//===============================================================
===
#define RGBSr(c)  (c).r
#define RGBSg(c)  (c).g
define RGBSw(c)  (c).b //===============================================================
=
COLOR_VEC color_space_RGB_simple(COLOR_RGB p1, double
Thresh_mdl)
{COLOR_VEC out={0,0,0};

out.c[0]= (RGBSr(p1)>Thresh_mdl)?RGBSr(p1):0;
        out.c[1]= (RGBSg(p1)>Thresh_mdl)?RGBSg(p1):0;
        out.c[2]= (RGBSw(p1)>Thresh_mdl)?RGBSw(p1):0;
return out;
}
//=============================================
//   #define NEWr(c)  (0.4*((c).r+(c).g)-(c).b)
// For interval normalisation 0.4 ->0.5
#define NEWr(c)  (0.5*((c).r+(c).g)-(c).b)
#define NEWg(c)  ((c).r-(c).g)
#define NEWw(c)  ((c).r+(c).g+(c).b)
```

SUBSTITUTE SHEET (RULE 26)

```
//==============================================================
COLOR_VEC color_space_NEW(COLOR_RGB p1, double Thresh_mdl)
{COLOR_VEC out={0,0,0};

if((out.c[0]= NEWw(p1))>Thresh_mdl)
        {
          out.c[1]= NEWr(p1);
          out.c[2]= NEWg(p1);
//        out.c[1]= NEWr(p1)/out.c[0];
//        out.c[2]= NEWg(p1)/out.c[0];
        }
      out.c[0]*=0.6666666666666666;
return out;
}
//==============================================================
#define LMNr(c)    (c).r
#define LMNg(c)    (c).g
#define LMNw(c)    (((c).r+(c).g+(c).b)*0.33333333333)
#define Thresh_LUMINEN 136
//==============================================================

COLOR_VEC color_space_LUMIN_THR(COLOR_RGB p1, double
Thresh_mdl)
{COLOR_VEC out={0,0,0};
 double t;
      out.c[2]=out.c[1]=out.c[0]= ((t=LMNw(p1))>Thresh_mdl)?t:0;
return out;
}
//==============================================================
const double SQ3= (sqrt(3.0));
const double PI05=(asin(1.0));
#define min3(c) (__min((c).r,__min((c).g,(c).b)))
#define max3(c) (__max((c).r,__max((c).g,(c).b)))
#define IHSh(c,d)  (atan (SQ3*((c).g-(c).b)/d))
#define IHSi(c)    (((c).r+(c).g+(c).b)*0.33333333333)
#define IHSs(c)    ((double)(max3(c)-min3(c))/(double)(max3(c)+min3(c)))
//==============================================================

COLOR_VEC color_space_IHS(COLOR_RGB p1, double Thresh_mdl)
{COLOR_VEC out={0,0,0};
 double r=2*p1.r-p1.g-p1.b;

out.c[1]= IHSi(p1);
      out.c[2]= out.c[1]?IHSs(p1):0;
```

```
        if(fabs(out.c[2])<Thresh_mdl)
          out.c[0]=0;
        else
          out.c[0]=r?IHSh(p1,r):(((p1.g-p1.b)<0)?-PI05:PI05);

return out;
    }
```

```c
#include <stdlib.h>
#include <stdio.h>
#include <vmemory.h>
include<malloc.h> unsigned char __far ** virtalloc(short xdim,short ydim) {
  int y,j;
  unsigned char __far**mem;

mem = (unsigned char __far**) malloc( ydim * sizeof(unsigned char __far**));

if(mem == NULL)
      return(NULL);

for(y = 0; y < ydim; y++) {
      if ( (mem[y] = (unsigned char __far*) malloc(xdim*sizeof(char) )) == NULL )
          {
              printf("NO MEMORY MAX size= %d",y);
              for(j=0;j<y;j++)
                  free((void *)mem[j]);
              free((void*)mem);
              return(NULL);
          }
  }
  return(mem);
}
```

```
ORIGIN = PWB
ORIGIN_VER = 2.0
PROJ = LNS_CORR
PROJFILE = LNS_CORR.MAK
BUILDDIR = obj
DEBUG = 0

BRFLAGS  = /o obj\$(PROJ).bsc
BSCMAKE  = bscmake
SBRPACK  = sbrpack
NMAKEBSC1 = set
NMAKEBSC2 = nmake
BROWSE   = 1
CC   = cl
CFLAGS_G  = /W2 /BATCH /FR$*.sbr /Zn
CFLAGS_D  = /f /Zi /Od
CFLAGS_R  = /f- /Ot /Oi /Ol /Oe /Og /Gs
CXX  = cl
CXXFLAGS_G = /AL /W4 /G2 /D_DOS /BATCH /FR$*.sbr /Zn
CXXFLAGS_D = /f- /Od /FPi87 /Zi /DMICI /DSINGLE_WIN
CXXFLAGS_R = /f- /Ot /Ol /Og /Oe /Oi /FPi87 /Gs /DMICI /DSINGLE_WIN
MAPFILE_D = NUL
MAPFILE_R = NUL
LFLAGS_G = /NOI /STACK:32000 /BATCH /ONERROR:NOEXE
LFLAGS_D = /CO /FAR /PACKC
LFLAGS_R = /EXE /FAR /PACKC
LINKER   = link
ILINK = ilink
LRF  = echo > NUL
ILFLAGS = /a /e
LLIBS_G = graphics lafxcr
CVFLAGS = /25 /S
RUNFLAGS = ..\win4\S160_0 ..\win4\S160_ auto1

FILES = LNS_CORR.CPP ..\LIB\VICALLOC.CPP ..\LIB\PROJCTN7.CPP\
        ..\LIB\PIC_M7.CPP ..\LIB\RES_MCH7.CPP COR_FNC.CPP
COR_WIN.CPP
OBJS = obj\LNS_CORR.obj obj\VICALLOC.obj obj\PROJCTN7.obj
obj\PIC_M7.obj\
        obj\RES_MCH7.obj obj\COR_FNC.obj obj\COR_WIN.obj
SBRS = obj\LNS_CORR.sbr obj\VICALLOC.sbr obj\PROJCTN7.sbr
obj\PIC_M7.sbr\
        obj\RES_MCH7.sbr obj\COR_FNC.sbr obj\COR_WIN.sbr all: obj\$(PROJ).exe .SUFFIXES:
.SUFFIXES:
.SUFFIXES: .obj .sbr .cpp
```

81

```
obj\LNS_CORR.obj : LNS_CORR.CPP C:\C700\INCLUDE\stdlib.h\
        C:\C700\INCLUDE\conio.h C:\C700\INCLUDE\stdio.h\
        C:\C700\INCLUDE\string.h C:\C700\INCLUDE\graph.h\
        C:\C700\INCLUDE\float.H C:\C700\INCLUDE\io.h
C:\C700\INCLUDE\time.h\
        C:\C700\INCLUDE\ctype.h C:\C700\INCLUDE\iostream.h\
        C:\C700\MFC\INCLUDE\afx.h LNS_CORR.h cor_win.h
c:\ilya\lib\vicalloc.h\
        C:\C700\INCLUDE\ios.h C:\C700\INCLUDE\streamb.h\
        C:\C700\INCLUDE\istream.h C:\C700\INCLUDE\ostream.h\
        C:\C700\MFC\INCLUDE\afx.inl ..\LIB\projctn7.h ..\LIB\pic_mch7.h\
        ..\LIB\res_mch7.h c:\ilya\lib\lin_trn7.h C:\C700\INCLUDE\vmemory.h\
        C:\C700\INCLUDE\math.h
!IF $(DEBUG)
        @$(CXX) @<<obj\$(PROJ).rsp
/c $(CXXFLAGS_G)
$(CXXFLAGS_D) /Foobj\LNS_CORR.obj LNS_CORR.CPP
<<
!ELSE
        @$(CXX) @<<obj\$(PROJ).rsp
/c $(CXXFLAGS_G)
$(CXXFLAGS_R) /Foobj\LNS_CORR.obj LNS_CORR.CPP
<<
!ENDIF obj\LNS_CORR.sbr : LNS_CORR.CPP C:\C700\INCLUDE\stdlib.h\
        C:\C700\INCLUDE\conio.h C:\C700\INCLUDE\stdio.h\
        C:\C700\INCLUDE\string.h C:\C700\INCLUDE\graph.h\
        C:\C700\INCLUDE\float.H C:\C700\INCLUDE\io.h
C:\C700\INCLUDE\time.h\
        C:\C700\INCLUDE\ctype.h C:\C700\INCLUDE\iostream.h\
        C:\C700\MFC\INCLUDE\afx.h LNS_CORR.h cor_win.h
c:\ilya\lib\vicalloc.h\
        C:\C700\INCLUDE\ios.h C:\C700\INCLUDE\streamb.h\
        C:\C700\INCLUDE\istream.h C:\C700\INCLUDE\ostream.h\
        C:\C700\MFC\INCLUDE\afx.inl ..\LIB\projctn7.h ..\LIB\pic_mch7.h\
        ..\LIB\res_mch7.h c:\ilya\lib\lin_trn7.h C:\C700\INCLUDE\vmemory.h\
        C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\LNS_CORR.sbr LNS_CORR.CPP
<<
!ELSE
        @$(CXX) @<<obj\$(PROJ).rsp
/Zs $(CXXFLAGS_G)
$(CXXFLAGS_R) /FRobj\LNS_CORR.sbr LNS_CORR.CPP
<<
```

!ENDIF obj\VICALLOC.obj : ..\LIB\VICALLOC.CPP C:\C700\INCLUDE\stdlib.h\
    C:\C700\INCLUDE\stdio.h C:\C700\INCLUDE\vmemory.h\
    C:\C700\INCLUDE\malloc.h
!IF $(DEBUG)
    @$(CXX) @<<obj\$(PROJ).rsp
/c $(CXXFLAGS_G)
$(CXXFLAGS_D) /Foobj\VICALLOC.obj ..\LIB\VICALLOC.CPP
<<
!ELSE
    @$(CXX) @<<obj\$(PROJ).rsp
/c $(CXXFLAGS_G)
$(CXXFLAGS_R) /Foobj\VICALLOC.obj ..\LIB\VICALLOC.CPP
<<
!ENDIF obj\VICALLOC.sbr : ..\LIB\VICALLOC.CPP C:\C700\INCLUDE\stdlib.h\
    C:\C700\INCLUDE\stdio.h C:\C700\INCLUDE\vmemory.h\
    C:\C700\INCLUDE\malloc.h
!IF $(DEBUG)
    @$(CXX) @<<obj\$(PROJ).rsp
/Zs $(CXXFLAGS_G)
$(CXXFLAGS_D) /FRobj\VICALLOC.sbr ..\LIB\VICALLOC.CPP
<<
!ELSE
    @$(CXX) @<<obj\$(PROJ).rsp
/Zs $(CXXFLAGS_G)
$(CXXFLAGS_R) /FRobj\VICALLOC.sbr ..\LIB\VICALLOC.CPP
<<
!ENDIF obj\PROJCTN7.obj : ..\LIB\PROJCTN7.CPP C:\C700\INCLUDE\graph.h\
    C:\C700\INCLUDE\stdlib.h C:\C700\INCLUDE\iostream.h
..\LIB\projctn7.h\
    C:\C700\INCLUDE\ios.h C:\C700\INCLUDE\streamb.h\
    C:\C700\INCLUDE\istream.h C:\C700\INCLUDE\ostream.h\
    C:\C700\INCLUDE\math.h
!IF $(DEBUG)
    @$(CXX) @<<obj\$(PROJ).rsp
/c $(CXXFLAGS_G)
$(CXXFLAGS_D) /Foobj\PROJCTN7.obj ..\LIB\PROJCTN7.CPP
<<
!ELSE
    @$(CXX) @<<obj\$(PROJ).rsp
/c $(CXXFLAGS_G)
$(CXXFLAGS_R) /Foobj\PROJCTN7.obj ..\LIB\PROJCTN7.CPP
<<
!ENDIF

```
obj\PROJCTN7.sbr : ..\LIB\PROJCTN7.CPP C:\C700\INCLUDE\graph.h\
        C:\C700\INCLUDE\stdlib.h C:\C700\INCLUDE\iostream.h
..\LIB\projctn7.h\
        C:\C700\INCLUDE\ios.h C:\C700\INCLUDE\streamb.h\
        C:\C700\INCLUDE\istream.h C:\C700\INCLUDE\ostream.h\
        C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\PROJCTN7.sbr ..\LIB\PROJCTN7.CPP
<<
!ELSE
        @$(CXX) @<<obj\$(PROJ).rsp
/Zs $(CXXFLAGS_G)
$(CXXFLAGS_R) /FRobj\PROJCTN7.sbr ..\LIB\PROJCTN7.CPP
<<
!ENDIF obj\PIC_M7.obj : ..\LIB\PIC_M7.CPP C:\C700\INCLUDE\stdlib.h\
        C:\C700\INCLUDE\stdio.h C:\C700\INCLUDE\graph.h
C:\C700\INCLUDE\math.h\
        C:\C700\INCLUDE\io.h C:\C700\INCLUDE\fcntl.h
C:\C700\INCLUDE\string.h\
        C:\C700\INCLUDE\float.H C:\C700\INCLUDE\malloc.h ..\LIB\phdr.h\
        c:\ilya\lib\vicalloc.h ..\LIB\pic_mch7.h C:\C700\INCLUDE\vmemory.h\
        ..\LIB\projctn7.h
!IF $(DEBUG)
        @$(CXX) @<<obj\$(PROJ).rsp
/c $(CXXFLAGS_G)
$(CXXFLAGS_D) /Foobj\PIC_M7.obj ..\LIB\PIC_M7.CPP
<<
!ELSE
        @$(CXX) @<<obj\$(PROJ).rsp
/c $(CXXFLAGS_G)
$(CXXFLAGS_R) /Foobj\PIC_M7.obj ..\LIB\PIC_M7.CPP
<<
!ENDIF obj\PIC_M7.sbr : ..\LIB\PIC_M7.CPP C:\C700\INCLUDE\stdlib.h\
        C:\C700\INCLUDE\stdio.h C:\C700\INCLUDE\graph.h
C:\C700\INCLUDE\math.h\
        C:\C700\INCLUDE\io.h C:\C700\INCLUDE\fcntl.h
C:\C700\INCLUDE\string.h\
        C:\C700\INCLUDE\float.H C:\C700\INCLUDE\malloc.h ..\LIB\phdr.h\
        c:\ilya\lib\vicalloc.h ..\LIB\pic_mch7.h C:\C700\INCLUDE\vmemory.h\
        ..\LIB\projctn7.h
!IF $(DEBUG)
        @$(CXX) @<<obj\$(PROJ).rsp
```

```
/Zs $(CXXFLAGS_G)
$(CXXFLAGS_D) /FRobj\PIC_M7.sbr ..\LIB\PIC_M7.CPP
<<
!ELSE
        @$(CXX) @<<obj\$(PROJ).rsp
/Zs $(CXXFLAGS_G)
$(CXXFLAGS_R) /FRobj\PIC_M7.sbr ..\LIB\PIC_M7.CPP
<<
!ENDIF obj\RES_MCH7.obj : ..\LIB\RES_MCH7.CPP C:\C700\INCLUDE\stdlib.h\
        C:\C700\INCLUDE\vmemory.h ..\LIB\pic_mch7.h ..\LIB\res_mch7.h\
        C:\C700\INCLUDE\graph.h ..\LIB\projctn7.h C:\C700\INCLUDE\math.h
!IF $(DEBUG)
        @$(CXX) @<<obj\$(PROJ).rsp
/c $(CXXFLAGS_G)
$(CXXFLAGS_D) /Foobj\RES_MCH7.obj ..\LIB\RES_MCH7.CPP
<<
!ELSE
        @$(CXX) @<<obj\$(PROJ).rsp
/c $(CXXFLAGS_G)
$(CXXFLAGS_R) /Foobj\RES_MCH7.obj ..\LIB\RES_MCH7.CPP
<<
!ENDIF obj\RES_MCH7.sbr : ..\LIB\RES_MCH7.CPP C:\C700\INCLUDE\stdlib.h\
        C:\C700\INCLUDE\vmemory.h ..\LIB\pic_mch7.h ..\LIB\res_mch7.h\
        C:\C700\INCLUDE\graph.h ..\LIB\projctn7.h C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\RES_MCH7.sbr ..\LIB\RES_MCH7.CPP
<<
!ELSE
        @$(CXX) @<<obj\$(PROJ).rsp
/Zs $(CXXFLAGS_G)
$(CXXFLAGS_R) /FRobj\RES_MCH7.sbr ..\LIB\RES_MCH7.CPP
<<
!ENDIF obj\COR_FNC.obj : COR_FNC.CPP C:\C700\INCLUDE\stdio.h
C:\C700\INCLUDE\stdlib.h\
        C:\C700\INCLUDE\conio.h C:\C700\INCLUDE\float.H\
        C:\C700\INCLUDE\graph.h cor_fnc.h ..\LIB\pic_mch7.h
..\LIB\res_mch7.h\
        C:\C700\INCLUDE\vmemory.h ..\LIB\projctn7.h
C:\C700\INCLUDE\math.h
!IF $(DEBUG)
        @$(CXX) @<<obj\$(PROJ).rsp
```

```
/c $(CXXFLAGS_G)
$(CXXFLAGS_D) /Foobj\COR_FNC.obj COR_FNC.CPP
<<
!ELSE
        @$(GXX) @<<obj\$(PROJ).rsp
/c $(CXXFLAGS_G)
$(CXXFLAGS_R) /Foobj\COR_FNC.obj COR_FNC.CPP
<<
!ENDIF obj\COR_FNC.sbr : COR_FNC.CPP C:\C700\INCLUDE\stdio.h
C:\C700\INCLUDE\stdlib.h\
        C:\C700\INCLUDE\conio.h C:\C700\INCLUDE\float.H\
        C:\C700\INCLUDE\graph.h cor_fnc.h ..\LIB\pic_mch7.h
..\LIB\res_mch7.h\
        C:\C700\INCLUDE\vmemory.h ..\LIB\projctn7.h
C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\COR_FNC.sbr COR_FNC.CPP
<<
!ELSE
        @$(CXX) @<<obj\$(PROJ).rsp
/Zs $(CXXFLAGS_G)
$(CXXFLAGS_R) /FRobj\COR_FNC.sbr COR_FNC.CPP
<<
!ENDIF obj\COR_WIN.obj : COR_WIN.CPP C:\C700\INCLUDE\vmemory.h\
        C:\C700\INCLUDE\stdio.h C:\C700\INCLUDE\stdlib.h\
        C:\C700\INCLUDE\conio.h C:\C700\INCLUDE\malloc.h\
        C:\C700\INCLUDE\float.H C:\C700\INCLUDE\graph.h\
        C:\C700\INCLUDE\string.h LNS_CORR.h cor_fnc.h ..\LIB\projctn7.h\
        ..\LIB\pic_mch7.h ..\LIB\res_mch7.h c:\ilya\lib\lin_trn7.h\
        C:\C700\INCLUDE\math.h
!IF $(DEBUG)
        @$(CXX) @<<obj\$(PROJ).rsp
/c $(CXXFLAGS_G)
$(CXXFLAGS_D) /Foobj\COR_WIN.obj COR_WIN.CPP
<<
!ELSE
        @$(CXX) @<<obj\$(PROJ).rsp
/c $(CXXFLAGS_G)
$(CXXFLAGS_R) /Foobj\COR_WIN.obj COR_WIN.CPP
<<
!ENDIF obj\COR_WIN.sbr : COR_WIN.CPP C:\C700\INCLUDE\vmemory.h\
```

8b

```
        C:\C700\INCLUDE\stdio.h  C:\C700\INCLUDE\stdlib.h\
        C:\C700\INCLUDE\conio.h  C:\C700\INCLUDE\malloc.h\
        C:\C700\INCLUDE\float.H  C:\C700\INCLUDE\graph.h\
        C:\C700\INCLUDE\string.h LNS_CORR.h cor_fnc.h ..\LIB\projctn7.h\
        ..\LIB\pic_mch7.h ..\LIB\res_mch7.h c:\ilya\lib\lin_trn7.h\
        C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\COR_WIN.sbr COR_WIN.CPP
<<
!ELSE
        @$(CXX) @<<obj\$(PROJ).rsp
/Zs $(CXXFLAGS_G)
$(CXXFLAGS_R) /FRobj\COR_WIN.sbr COR_WIN.CPP
<<
!ENDIF obj\$(PROJ).bsc : $(SBRS)
        $(BSCMAKE) @<<
$(BRFLAGS) $(SBRS)
<< obj\$(PROJ).exe : $(OBJS)
        -$(NMAKEBSC1) MAKEFLAGS=
        -$(NMAKEBSC2) $(NMFLAGS) -f $(PROJFILE) obj\$(PROJ).bsc
!IF $(DEBUG)
        $(LRF) @<<obj\$(PROJ).lrf
$(RT_OBJS: = +^
) $(OBJS: = +^
)
$@
$(MAPFILE_D)
$(LIBS: = +^
) +
$(LLIBS_G: = +^
) +
$(LLIBS_D: = +^
)
$(DEF_FILE) $(LFLAGS_G) $(LFLAGS_D);
<<
!ELSE
    $(LRF) @<<obj\$(PROJ).lrf
$(RT_OBJS: = +^
) $(OBJS: = +^
)
$@
$(MAPFILE_R)
```

```
$(LIBS: = +^
) +
$(LLIBS_G: = +^
) +
$(LLIBS_R: = +^
)
$(DEF_FILE) $(LFLAGS_G) $(LFLAGS_R);
<<
!ENDIF
        $(LINKER) @obj\$(PROJ).lrf .cpp.obj :
!IF $(DEBUG)
        @$(CXX) @<<obj\$(PROJ).rsp
/c $(CXXFLAGS_G)
$(CXXFLAGS_D) /Fo$@ $<
<<
!ELSE
        @$(CXX) @<<obj\$(PROJ).rsp
/c $(CXXFLAGS_G)
$(CXXFLAGS_R) /Fo$@ $<
<<
!ENDIF .cpp.sbr :
!IF $(DEBUG)
        @$(CXX) @<<obj\$(PROJ).rsp
/Zs $(CXXFLAGS_G)
$(CXXFLAGS_D) /FR$@ $<
<<
!ELSE
        @$(CXX) @<<obj\$(PROJ).rsp
/Zs $(CXXFLAGS_G)
$(CXXFLAGS_R) /FR$@ $<
<<
!ENDIF run: obj\$(PROJ).exe
      obj\$(PROJ).exe $(RUNFLAGS)

debug: obj\$(PROJ).exe
      CV $(CVFLAGS) obj\$(PROJ).exe $(RUNFLAGS)
```

```
void corr_win_proto(PCT win_source,PCT Proto, SCR_PNT win_size
            ,short win_step,double CORR_THRESH,
            short *StripEnds) ;
```

```
//     Module calculates correlation functions of PROTO_1 and set of
// prototypes. Set of prototypes' names is defined by a MASK correspondes
// to names generated by MAKEPRB and has next structure:
//         [path]&RRW_P.rgb
// Where
//         [path] - optional name of directory;
//         &      - first letter of file name
//         RR     - two digits corresponding to prototype's hight
//                  (RR= 16| 32 | 48 | 64)
//         W      - number corresponding to window number (see
MAKEPRB
//                  description.
//         P      prototype Number
//     MASK includes ONLY [path]&RRW_        and programme will
// calculate correlation functions for prototypes with P from 0 to
// first not existing number.

// COMMAND STRING
//
// lns_corr <PROTO_1_Name> <MASK> [CommandFile]
//
//     <PROTO_1_Name>       File name of PROTOTYPE without
extention
//     <MASK>               Mask for prototypes FileNames without extention
and
//                          Prototype's number.
//     [CommandFile]        Optional ASCI file with a run time parameters.
//
// INPUT
//     RGB files of prototypes and corresponding .SGN files created by
// module MAKEPRB.
// RUN TIME parameters:
//
//     0 0 0 0      -shift for all cases have to be 0
//     <CalorSpace>
//                  We have used 1 - as worked only with a luminance
//     <Window width>
//                  We have used 8
//SEE ALSO FILE "LNS_CORR.INI"
// OUTPUT
//     Correlation functions in PROTO_1.DBC file.

#include <stdlib.h>
#include <conio.h>
#include <stdio.h>
#include <string.h>
#include <graph.h>
#include <float.H>
```

90

```
#include <io.h>
#include <time.h>
#include <ctype.h>
#include <iostream.h>
#include <afx.h>
#include "LNS_CORR.h"
#include "cor_win2.h"
#include "vicalloc.h"

char f_name[40]="_",FILE_name[40]="_", FRAME_Name[40]="_",
ARGV_1[30]="_",
      STRING_name[40]="_", SIGN_name[40]="_",TAG_name[9]="_",
drive[3]="_",dir[30]="_",
      ext[5]="_",*tag_frame;
double GAMMA=1.0,CORR_THRESH=0.0,Thresh_mdl=0.0;
short MAP;
short VOITING=3,TAG_hight;
struct _videoconfig vc;
FILE *datres;
int FLG_WRIGHT=0;
double sh[4]={0,0,0,0};

PCT pict_target, pict_proto;
FILE *out_rslt;

int picture_inf(char *name,SCR_PNT *vertexes);
int picture_inf_num(char *name,SCR_PNT *vertexes,short n);
int get_number(); // INITIALISATION GRAPHICMODE, GET SCALE
int get_number_3(); // INITIALISATION GRAPHICMODE, GET SCALE
void get_shift_f(FILE *f,double * sh); // INITIALISATION GRAPHICMODE,
GET SCALE
void get_shift(double * sh); // INITIALISATION GRAPHICMODE, GET SCALE
int get_number_3_f(FILE *f); // INITIALISATION GRAPHICMODE, GET
SCALE
int picture_inf_num_2(char *name,SCR_PNT *vertexes,short n,char *ext);
int picture_inf_num_new(char *name,SCR_PNT *vertexes,short n);
//$$$$$$$$$$$$$$$$$$$$$$$$$$$$$$$$$$$$$$$$$$$$$$$$$$$$$$$$$$$$$$$$$$
$$$$$$$$$$$$$$$$$$$$

short PRESENT_HIGHT=32, CALC_HIGHT =32;

FILE * INP_PROTOCOL;
FILE *PROTOCOL;

CString PROTOCOL_NAME;
CString PROTOCOL_START;
CString PROTO1_HEADER=CString::CString(
```

```
"PROTO_File\tFRAME_Name\tSTRING_name\tS_name\tSLength\tWinLengt
h\tSPACE\n");

CString PROTO_TAG_HEADER=CString::CString(
  "TAG_File\tFRAME_Name\tSTRING_name\tS_Name\tLegnth\tCOMM\n");

//==========================================================
=============
void init_protocol(char *name)
{short FLG;
 FLG=_access(PROTOCOL_NAME,0); //0 if exist
 PROTOCOL=fopen(PROTOCOL_NAME,"a");
 if(FLG)
    fprintf(PROTOCOL,"AUTO and CROSS correlation functions \n %s",
        PROTO1_HEADER);
 PROTOCOL_START=name;
 PROTOCOL_START+="\t";
 }
//==========================================================
===========
int open_inp_prot(char *name)
{if(!(INP_PROTOCOL=fopen(name,"r"))) return 1;
 //split first str
 fscanf(INP_PROTOCOL,"%*[^\n]s");
 return 0;
 }
//$$$$$$$$$$$$$$$$$$$$$$$$$$$$$$$$$$$$$$$$$$$$$$$$$$$$$$$$$$$
$$$$$$$$$$$$$$$$$$$$$$
//return  file name without extwntion in "name" and TRUE 1 if file exist;
int next_pict(char *name,char *mask,char *ext,int num)
                           //if num=-2 initalisation;
                           //    -1 next
                           //    >0  adding this # to mask
                           // NULL if notexist file with ".rgb"
{static int now;
 char full_name[80];
 strcpy(name,mask);
 if (num==-2)now=0;
 else if (num==-1)
        now++;
 else if (num<0) return 1;
 else now=num;
 _itoa( now, name+strlen(name), 10);
 strcat(strcpy(full_name,name),ext);
 //1 if file exist
 return(!_access( full_name, 0 ));
 }
//==========================================================
======
```

9a.

```
#include <fstream.h>
int ReadStrInf(char *name,short *StD)
{ifstream InpF;
 char a[80];
 strcat(strcpy(a,name),".str");
 short i;
 InpF.open(a,ios::in|ios::nocreate);
   if(InpF.fail())
      {InpF.clear(0);
         return 1;
         }
   InpF.getline(a,80,'\n');
   InpF.getline(a,80,'\n');
   InpF.getline(a,80,'\n');
   InpF.getline(a,80,'\n');
   InpF.getline(a,80,'\n');
   InpF.getline(a,80,'\n');
   i=0;
   do
    {
     InpF>>StD[i++];
     if (InpF.eof()|| i>17)
        { StD[--i]=-1;
          break;
          }
     InpF>>StD[i++];
     }
   while(1);
   InpF.close();
   return 0;
}

//=========================================================
==========
SCR_PNT winsize;
//=========================================================
======
int main(int argc,char* argv[])
{int FLG_F=0, FLG_WRIGHT=0;
 FILE *datainf;
 short winstep, map_stnd;
 short n=0;
 SCR_PNT t_pos;
    if((argc != 3) && (argc !=4))
       {
        printf(" target-file proto_file_mask \n");
        FLG_F=0;
       return(1);
     }
```

93

```
        else
           if(argc ==4)
               {FLG_F=1;
                if(!(datainf=fopen(argv[3],"r"))) return 0;
                }
    if(FLG_F)
       {get_shift_f(datainf,sh); //    GET SCALE
        get_number_3_f(datainf); //    GET SCALE
        }
     else
       {get_shift(sh); //  GET SCALE    0
        get_number_3();
        } strcpy(ARGV_1,argv[1]);
    PROTOCOL_NAME=argv[1];
    PROTOCOL_NAME+=".dbc";
    init_protocol(argv[1]);

// =============== GRAPHICS START
        if(GRAPHICS_START(&vc,GRAPHMODE)) exit(-1);
//======== TARGET PICTURE name and vertexes
    SCR_PNT target_pos;     // CONSTRACTOR default 0,0
    short StrDescr[17];
      _splitpath( argv[1], drive,dir,TAG_name,ext );
      pict_target=sign_storage_rgb(argv[1],vc );
      if(ReadStrInf(argv[1],StrDescr))
              {printf("STR PROTO not exist"); GRAPH_OUT(-1);return -1;
              };

winsize.r=pict_target.s_rows;
    winstep=winsize.c;
//"PROTO_File\tFRAME_Name\tSTRING_name\tS_name\SLength\tWinLengt
h\tSPACE\n");
    fprintf(PROTOCOL,"%s %8s\t%6s\t%12s\t%4d\t%4d\t%12s\n%s",
           (const char
    *)PROTOCOL_START,FRAME_Name,STRING_name,SIGN_name,
                    pict_target.s_cols,winsize.c,SP[MAP],
           (const char *)    PROTO_TAG_HEADER);

//========= PROTOTYPE       LOOP OVER names
    char   proto_name[NAME_LENGTH],buff[4];
    SCR_PNT proto_pos,z;
//loop over masks
//return  file name without extention in "name" and TRUE 1 if file exist;
    short proto_number=0; //# 0;
    while( next_pict( proto_name,argv[2],".rgb", proto_number))
    { proto_number=-1;  //next;
    SCR_PNT pr_v[4];
```

```
// PROTO INFORMATION IN PROTOCOL
    pict_proto=sign_storage_rgb(proto_name,vc );
    picture_inf_num_2(proto_name,pr_v,0,".str"); //only for SIGN_name
//  "TAG_File\tFRAME_Name\tSTRING_name\tS_Name\tLegnth\n")
    fprintf(PROTOCOL," %12s\t %8s\t %6s\t %12s\t%4d\n", proto_name,FRAME_Name,STRING_name,SIGN_name,pict_proto.s_cols);

TAG_hight=pict_proto.s_rows;
// TARGET PRESENTATION
        _clearscreen(_GCLEARSCREEN);
        proto_pos.c=target_pos.c=10;
        proto_pos.r=(target_pos.r=10)+pict_target.s_rows+5;
        sign_present_RGB( pict_target,target_pos);
        sign_present_RGB(pict_proto,proto_pos);
//====================================
        corr_win_proto(pict_target, pict_proto,
                winsize, winstep,CORR_THRESH,StrDescr);

pict_proto.free_PCT();
    }
_displaycursor( _GCURSORON );
_setvideomode( _DEFAULTMODE );
pict_target.free_PCT();
fclose(PROTOCOL);
return(0);
}

//
================================================================
========
void get_shift_f(FILE *f,double * sh) // INITIALISATION GRAPHICMODE,
GET SCALE
{int i;
        for(i=0;i<4; i++)
           {
           fscanf(f,"%lf %lf\n",sh+i++,sh+i);
           }
}
//
================================================================
========
void get_shift(double * sh) // INITIALISATION GRAPHICMODE, GET SCALE
{int i;
        cout<< "vertexes shift over rows ( top_right, bottom_right, bottom_left,
top_left %\n";
        for (i=0;i<4; i++)
                cin>>sh[i];
}
```

```c
//================================================================
int get_number_3() // INITIALISATION GRAPHICMODE, GET SCALE
{int R;
    _displaycursor( _GCURSORON );
    _setvideomode( _DEFAULTMODE );
    cout << " [<0 EXIT], color_map (0-NTSC, 1-HSI,2-NEW,3-RGB,4-LUMIN_THR 5-HSI\n";
    cout<<"WIN_SIZE\n ";
    cin >>MAP>>winsize.c;
    _displaycursor( _GCURSOROFF );
    _setvideomode( GRAPHMODE );
    make_palette();
return R;
}
//**************************
int get_number_3_f(FILE *f) // INITIALISATION GRAPHICMODE, GET SCALE
{int R;
    fscanf(f," %d  %d ",&MAP, &(winsize.c));
return 1;
}
//================================================================
int picture_inf(char *name,SCR_PNT *vertexes)
   {int i;
    char new_name[25];
    FILE *datfp;
    strcat(strcpy(new_name,name),".sgn");
    if(!(datfp=fopen(new_name,"r"))) return 0;
    fscanf(datfp,"%s\n",new_name);
    for(i=0;i<4;i++)
       fscanf(datfp,"%d %d\n",&(vertexes[i].c),&(vertexes[i].r));
   fclose(datfp);
return 1;
}
//================================
//================================================================
int picture_inf_num_2(char *name,SCR_PNT *vertexes,short n,char
*ext=".sgn")
   {int i,j;
    char new_name[45];
    FILE *datfp;
    strcat(strcpy(new_name,name),ext);

if(!(datfp=fopen(new_name,"r"))) return 0;
fscanf(datfp,"%*s %*s %*s %*s %*s \n");
fscanf(datfp,"%s %s %s %s %s",&f_name,&FILE_name, &FRAME_Name,
                             &STRING_name, &SIGN_name);
    for(j=0;j<n+1;j++)
```

```
    for(i=0;i<4;i++)
        if(fscanf(datfp,"%d %d\n",&(vertexes[i].c),&(vertexes[i].r))==EOF)
            {fclose (datfp); return 0;}
    fclose(datfp);
return 1;
}
//============================================================
/*void write_sign_inf(char *pr,PCT pict_now)
{ char fl_fp[50],f_name[9];

int FLG;
  FILE *dathere,*database;
  _splitpath( pr, drive,dir,f_name,ext );
  strcat(strcpy(fl_fp,pr),".sgn");
  dathere=fopen(fl_fp,"w");
  FLG=_access("PROTODB.1", 0 );// -1 if not exist if(!(database=fopen("PROTODB.1","a")))
    {strcpy(fl_fp,"CAN NOT CREATE D_BASE FILE");
     exit(-1);}
fprintf(dathere, " WIN_name FILE_name FRAME_Name  STRING_name
SIGN_name\n ");
fprintf(dathere,"%8s %9s %10s %11s %9s \n",f_name, FILE_name, FRAME_Name,STRING_name,SIGN_name);
if(FLG)
    fprintf(database, " WIN_name FILE_name FRAME_Name  STRING_name
SIGN_name\n ");
    fprintf(database,"%8s %9s %10s %11s %9s \n",f_name, FILE_name, FRAME_Name,STRING_name,SIGN_name);
    fprintf(dathere,"%d 0\n",pict_now.s_cols-1);
    fprintf(dathere,"%d %d \n",pict_now.s_cols-1,pict_now.s_rows-1);
    fprintf(dathere," 0 %d\n",pict_now.s_rows-1);
    fprintf(dathere," 0  0\n");

fclose(dathere);
fclose(database);
} */
//=================================================

//============================================================
int picture_inf_num(char *name,SCR_PNT *vertexes,short n)
    {int i,j;
    char new_name[25];
    FILE *datfp;
    strcat(strcpy(new_name,name),".sgn");
    if(!(datfp=fopen(new_name,"r"))) return 0;
    fscanf(datfp,"%s\n",new_name);
```

```
        for(j=0;j<n+1;j++)
          for(i=0;i<4;i++)
             if(fscanf(datfp,"%d %d\n",&(vertexes[i].c),&(vertexes[i].r))==EOF)
                {fclose (datfp); return 0;}
        fclose(datfp);
     return 1;
   }
//=============================================================
int picture_inf_num_new(char *name,SCR_PNT *vertexes,short n)
   {int i,j;
    char new_str[80];
    FILE *datfp;
    int r,FLG=0;
    strcat(strcpy(new_str,name),".sgn");
    if(!(datfp=fopen(new_str,"r"))) return 0;
    r=fscanf(datfp,"%[^\n]s ",new_str);
    r=fscanf(datfp," %[^\n]s ",new_str);
    if(__iscsymf( (int)new_str[0]))//FILE INFORMATION )
                                 //(letter or underscore)
         {sscanf(new_str," %s %s %s %s ",&FILE_name, &FRAME_Name,
                                         &STRING_name, &SIGN_name);
            r=fscanf(datfp," %[^\n]s ",new_str);
         }
      for(j=0;j<n+1;j++)
        for(i=0;i<4;i++)
           {if(FLG)
              if(fscanf(datfp," %[^\n]s",new_str)==EOF)
                 {fclose (datfp); return 0;}
            FLG=1;
            sscanf(new_str," %d %d",&(vertexes[i].c),&(vertexes[i].r));
           }
      fclose(datfp);
   return 1;
   }
//=============================================================
```

```
    }
//————————————————————————
/*COLOR_VEC int_value_1(PCT w,double Thr,
    COLOR_VEC (*p_funct)(COLOR_RGB p1,double
Thresh_mdl),AVERAGE_VEC w_av)
{COLOR_VEC col,sum[9][9],out,c1;
 const COLOR_VEC z={0,0,0};

short h_t,v_t,i,x,y,h,v,
  half_x=w.s_cols>>1,half_y=w.s_rows>>1,
  quot_x=w.s_cols>>2,quot_y=w.s_rows>>2;
  long n;

for(h=0;h<HOR_HARM+1;h++)
    for(v=0;v<VERT_HARM+1;v++)
      sum[v][h].c[0]=sum[v][h].c[1]=sum[v][h].c[2]=0.0;
  n=w.s_cols*w.s_rows;
  n*=n;
  for(y=0;y<w.s_rows;y++)
    for(v=0;v<VERT_HARM+1;v++)
      {
       v_t=y*((v+1)>>1);
       v_t=(v_t+(v & 0x0001 ? quot_y:0))/half_y;
       v_t &= 0x0001;
       for(x=0;x<w.s_cols;x++)
         {col=p_funct(w.get_pixel(y,x),Thr);
          c1= sign_for_col(v_t,col);
          for(h=0;h<HOR_HARM+1;h++)
            {
             h_t=x*((h+1)>>1);
             h_t=(h_t+(h & 0x0001 ?quot_x:0))/half_x;
             h_t &= 0x0001;
             c1= sign_for_col(h_t,c1);
             for(i=0;i<3;i++)
               sum[v][h].c[i]+=c1.c[i];
            }
         }
      }
   }
 double s0,dd,max_v=0,th;
   for(dd=i=0;i<3;i++)
     {for(s0=h=0;h<HOR_HARM+1;h++)
        for(v=0;v<VERT_HARM+1;v++)
           if(h||v)
             s0+=sum[v][h].c[i]*sum[v][h].c[i];
      s0/=n;
      dd=w_av.var[i]+w_av.md[i]*w_av.md[i];
      out.c[i]=(dd?s0/dd:1);
      max_v=(max_v<out.c[i])?out.c[i]:max_v;
     }
```

```
    for(i=0;i<3;i++)
    {th=out.c[i]/max_v;
//              THRESHOLDING
    if(th<0.2)
      out.c[i]=0;
    }
return out;
} */
//==========================================================
===========
COLOR_VEC (*PointColFunct())(COLOR_RGB p1,double Thresh_mdl)

{ switch ( MAP)
      {case NTSC:return(color_space_NTSC);
        case New_plan:return(color_space_NEW);
        case HSI:return(color_space_RGB);
        case RGB:return(color_space_RGB_simple);
        case LUMIN_THR:return(color_space_LUMIN_THR);
        case IHS:return(color_space_IHS);
          };
return NULL;
}
//=========================================================
=================
const short CH_HIGHT_D=100, CH_BASE_D=470,
      CH_HIGHT=100, CH_BASE=450, t_pos=40;
//=========================================================
double scale_fact=1;
//=========================================================
void corr_win_proto(PCT win_source,PCT Proto, SCR_PNT win_size
              ,short win_step,double CORR_THRESH,short *StripEnds)
   {
   short i;
   char mess[40];
   short F=0;
   COLOR_VEC (*p_funct)(COLOR_RGB p1,double Thresh_mdl);
   p_funct=PointColFunct();

PCT win(win_size.c,win_size.r);
   PCT tag(win_size.c,win_size.r);
   SCR_PNT st_t,st_win;
   AVERAGE_VEC middle_win[64],middle_tag;
   const AVERAGE_VEC z={{0,0,0},{0,0,0}};

COLOR_VEC *corr_now,cr;
   const COLOR_VEC z_col={0.0,0.0,0.0};
   int line_size=win_source.s_cols+Proto.s_cols;
//memory allocation
```

100

```c
if((corr_now= (COLOR_VEC*) malloc(
sizeof(COLOR_VEC)*(size_t)line_size*3))==NULL)
        {printf("WIN NOT MEMORY"); return;};

st_t.r=0;
double dd;
    st_win.r=0;
 short k,FLG_COL=1;
  short StripStart,StripStop;
  short PartNum;
 k=PartNum=0;
 while(StripEnds[PartNum]>=0)
    {StripStart=StripEnds[PartNum++];
     StripStop=StripEnds[PartNum++];
     for (st_win.c=StripStart;
st_win.c+win_size.c<=StripStop;st_win.c+=win_step,k++)
       {
         FLG_COL=1;
         for(i=0;i<line_size;corr_now[i++]=z_col);

win.load_template(win_source,st_win);
         middle_win[k]=average(win,Thresh_mdl,p_funct);

#ifdef MICI
endif const COLOR_VEC z_UNIT={1.0,1.0,1.0};

for (st_t.c=0;st_t.c<=Proto.s_cols-win_size.c;st_t.c++)
          {
//==========================================
          tag.load_template(Proto,st_t);
          middle_tag=average(tag,Thresh_mdl,p_funct);
// DIFF ABS VALUES
#ifdef SINGL_VAL
        cr=template_conv_1( tag,win,Thresh_mdl,z_UNIT,p_funct);
        strcpy(mess," VECTOR Approach to CORRELATION ");
        corr_now[st_t.c]=Correlation_single_1(cr,middle_tag,middle_win[k],z_
UNIT);
#ifdef ABS_VALUE
        strcpy(mess," DIFF ABS VALUES/ max ABS VALUES");
        cr=
          template_abs_diff_1 (tag,win,Thresh_mdl,z_UNIT,p_funct,
             middle_tag,middle_win[k]);
#else
        cr=template_conv_1( tag,win,Thresh_mdl,z_UNIT,p_funct);
        strcpy(mess," PEARSON CORR. ");
        corr_now[st_t.c]=Correlation(cr,middle_tag,middle_win[k],z_UNIT);
#endif
```

```
#endif

// ONLY LUMINANCE
//      strcat(mess," ALL 3 COMP");
        strcat(mess," Only 0 COMP");
        corr_now[st_t.c].c[1]=corr_now[st_t.c].c[2]=
            corr_now[st_t.c].c[0];
#ifdef MICI
draw_color_corr_1(
corr_now[st_t.c],FLG_COL,CH_HIGHT_D,CH_BASE_D,CORR_THRESH,
            st_t.c,Proto.s_cols);
FLG_COL=0;
#endif
        }
//======FILL PROTOCOL
//$ WILL BE USED AS SEPARATOR FOR READING
    fprintf(PROTOCOL,"$\t%s\t$\t%4d\t $\n",mess, st_win.c);
    for(i=0;i<Proto.s_cols;i++) //ONLY 0 COMP
        fprintf(PROTOCOL,"%6g\t",corr_now[i].c[0]);
    fprintf(PROTOCOL," \n");
    }
} win.free_PCT();
tag.free_PCT();
free((void *)corr_now);
return ;
}
//============================================================
===============

//============================================================
====================
void draw_chart(double *dist_line,short n,double max_value,
short CH_HIGHT,
short CH_BASE,double THRESH,
short t_pos)

{short i,j;
 double p,
  crit=max_value;
  if(!max_value)
    for (i=0;i<n;i++)
        crit=(dist_line[i]>crit)? dist_line[i]:crit;
  else crit=max_value;
  if(!crit)
    crit=1;
  p= CH_HIGHT*(1-THRESH/crit);
  _moveto( 0,CH_BASE-CH_HIGHT    );
```

```
    _lineto(n,CH_BASE-CH_HIGHT);
    _moveto(0,CH_BASE-(short)p);
    _lineto(n,CH_BASE-(short)p);
    _moveto( (short) 0,(short) CH_BASE );
    for (i=0;i<__min(n,vc.numxpixels);i++)
        {j=CH_BASE-CH_HIGHT+(short)(dist_line[i]*CH_HIGHT/crit);
        if(j<0)
//            getch()
            ;
        else
            if(!_lineto( i,j))
//                getch()
                ;
        }
    if(t_pos)
        _settextposition( t_pos,30);
char buffer[30];
    sprintf(buffer, "MAX = %f10 ", crit );
    _outtext( buffer );

}
//=========================================================
=
void draw_int(short st,short w,COLOR_VEC intr)
{short CH_HIGHT=100,
 CH_BASE=200;
double p;
        _setcolor( color_num(240,240,240));
        _setcolor( color_num(240,0,0));
        p=CH_BASE-CH_HIGHT*intr.c[0];
        _moveto( st,(short)p);
        _lineto(st+w,(short)p);
            _setcolor( color_num(0,240,0));
        p=CH_BASE-CH_HIGHT*intr.c[1];
        _moveto( st,(short)p);
        _lineto(st+w,(short)p);
            _setcolor( color_num(0,0,240));
        p=CH_BASE-CH_HIGHT*intr.c[2];
        _moveto( st,(short)p);
        _lineto(st+w,(short)p);
}
//=========================================================
=====================
void  draw_color_corr(COLOR_VEC corr,COLOR_RGB *corr_old,short F,
short CH_HIGHT,
short CH_BASE,double THRESH,
short pos_now)
{double p;
 short j;
```

```
ORIGIN = PWB
ORIGIN_VER = 2.0
PROJ = mtchstr
PROJFILE = mtchstr.mak
BUILDDIR = obj
DEBUG = 1

BRFLAGS  = /o obj\$(PROJ).bsc
BSCMAKE  = bscmake
SBRPACK  = sbrpack
NMAKEBSC1 = set
NMAKEBSC2 = nmake
BROWSE   = 1
CC  = cl
CFLAGS_G = /W2 /BATCH /FR$*.sbr /Zn
CFLAGS_D = /f /Zi /Od
CFLAGS_R = /f- /Ot /Oi /Ol /Oe /Og /Gs
CXX = cl
CXXFLAGS_G = /AL /W4 /G2 /Gy /D_DOS /BATCH /FR$*.sbr /Zn
CXXFLAGS_D = /f- /Od /FPi87 /Zi /DMYDEBUG /DRUN /D_DEBUG
/DSINGL_VAL
CXXFLAGS_R = /f- /Os /Ol /Og /Oe /Oi /FPi87 /DMYDEBUG /DRUN
/DSINGL_VAL
MAPFILE_D = NUL
MAPFILE_R = obj\$(PROJ).map
LFLAGS_G = /NOI /STACK:32000 /BATCH /ONERROR:NOEXE
LFLAGS_D = /CO /EXE /FAR /PACKC /PACKD
LFLAGS_R = /MAP /EXE /FAR /PACKC
LINKER    = link
ILINK = ilink
LRF = echo > NUL
ILFLAGS = /a /e
LLIBS_R = LAFXCR
LLIBS_D = LAFXCRD
LLIBS_G = graphics
CVFLAGS = /25 /S
RUNFLAGS = c:\ilya\tst\t6315e c:\ilya\win4\u160_ matchng.ini FILES = MTCHSTR.CPP ..\LIB\VICALLOC.CPP ..\LIB\PROJCTN7.CPP
..\LIB\L_TRN7.CPP\
        ..\LIB\PIC_M7.CPP ..\LIB\RES_MCH7.CPP FILEMNP.CPP
MTCHTPL2.CPP\
        COR_FNC2.CPP
OBJS = obj\MTCHSTR.obj obj\VICALLOC.obj obj\PROJCTN7.obj
obj\L_TRN7.obj\
        obj\PIC_M7.obj obj\RES_MCH7.obj obj\FILEMNP.obj
obj\MTCHTPL2.obj\
        obj\COR_FNC2.obj
```

```
SBRS = obj\MTCHSTR.sbr obj\VICALLOC.sbr obj\PROJCTN7.sbr
obj\L_TRN7.sbr\
       obj\PIC_M7.sbr obj\RES_MCH7.sbr obj\FILEMNP.sbr
obj\MTCHTPL2.sbr\
       obj\COR_FNC2.sbr all: obj\$(PROJ).exe .SUFFIXES:
.SUFFIXES:
.SUFFIXES: .obj .sbr .cpp obj\MTCHSTR.obj : MTCHSTR.CPP C:\C700\INCLUDE\stdlib.h
C:\C700\INCLUDE\conio.h\
       C:\C700\INCLUDE\stdio.h C:\C700\INCLUDE\string.h\
       C:\C700\INCLUDE\graph.h C:\C700\INCLUDE\float.H
C:\C700\INCLUDE\time.h\
       C:\C700\INCLUDE\ctype.h C:\C700\INCLUDE\fstream.h\
       C:\C700\MFC\INCLUDE\afx.h matchng.h PIC_PRO.h MtchTpl2.h
shift.h\
       filemnp.h C:\C700\INCLUDE\iostream.h
C:\C700\MFC\INCLUDE\afx.inl\
       c:\ilya\lib\mylib.h C:\C700\INCLUDE\direct.h ..\LIB\pic_mch7.h\
       ..\LIB\projctn7.h ..\LIB\res_mch7.h ..\LIB\lin_trn7.h\
       C:\C700\INCLUDE\ios.h C:\C700\INCLUDE\streamb.h\
       C:\C700\INCLUDE\istream.h C:\C700\INCLUDE\ostream.h\
       C:\C700\INCLUDE\vmemory.h C:\C700\INCLUDE\math.h
!IF $(DEBUG)
       @$(CXX) @<<obj\$(PROJ).rsp
/c $(CXXFLAGS_G)
$(CXXFLAGS_D) /Foobj\MTCHSTR.obj MTCHSTR.CPP
<<
!ELSE
       @$(CXX) @<<obj\$(PROJ).rsp
/c $(CXXFLAGS_G)
$(CXXFLAGS_R) /Foobj\MTCHSTR.obj MTCHSTR.CPP
<<
!ENDIF obj\MTCHSTR.sbr : MTCHSTR.CPP C:\C700\INCLUDE\stdlib.h
C:\C700\INCLUDE\conio.h\
       C:\C700\INCLUDE\stdio.h C:\C700\INCLUDE\string.h\
       C:\C700\INCLUDE\graph.h C:\C700\INCLUDE\float.H
C:\C700\INCLUDE\time.h\
       C:\C700\INCLUDE\ctype.h C:\C700\INCLUDE\fstream.h\
       C:\C700\MFC\INCLUDE\afx.h matchng.h PIC_PRO.h MtchTpl2.h
shift.h\
       filemnp.h C:\C700\INCLUDE\iostream.h
C:\C700\MFC\INCLUDE\afx.inl\
```

```
           c:\ilya\lib\mylib.h C:\C700\INCLUDE\direct.h ..\LIB\pic_mch7.h\
           ..\LIB\projctn7.h ..\LIB\res_mch7.h ..\LIB\in_trn7.h\
           C:\C700\INCLUDE\ios.h C:\C700\INCLUDE\streamb.h\
           C:\C700\INCLUDE\istream.h C:\C700\INCLUDE\ostream.h\
           C:\C700\INCLUDE\vmemory.h C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\MTCHSTR.sbr MTCHSTR.CPP
<<
!ELSE
        @$(CXX) @<<obj\$(PROJ).rsp
/Zs $(CXXFLAGS_G)
$(CXXFLAGS_R) /FRobj\MTCHSTR.sbr MTCHSTR.CPP
<<
!ENDIF obj\VICALLOC.obj : ..\LIB\VICALLOC.CPP C:\C700\INCLUDE\stdlib.h\
        C:\C700\INCLUDE\stdio.h C:\C700\INCLUDE\vmemory.h\
        C:\C700\INCLUDE\malloc.h
!IF $(DEBUG)
        @$(CXX) @<<obj\$(PROJ).rsp
/c $(CXXFLAGS_G)
$(CXXFLAGS_D) /Foobj\VICALLOC.obj ..\LIB\VICALLOC.CPP
<<
!ELSE
        @$(CXX) @<<obj\$(PROJ).rsp
/c $(CXXFLAGS_G)
$(CXXFLAGS_R) /Foobj\VICALLOC.obj ..\LIB\VICALLOC.CPP
<<
!ENDIF obj\VICALLOC.sbr : ..\LIB\VICALLOC.CPP C:\C700\INCLUDE\stdlib.h\
        C:\C700\INCLUDE\stdio.h C:\C700\INCLUDE\vmemory.h\
        C:\C700\INCLUDE\malloc.h
!IF $(DEBUG)
        @$(CXX) @<<obj\$(PROJ).rsp
/Zs $(CXXFLAGS_G)
$(CXXFLAGS_D) /FRobj\VICALLOC.sbr ..\LIB\VICALLOC.CPP
<<
!ELSE
        @$(CXX) @<<obj\$(PROJ).rsp
/Zs $(CXXFLAGS_G)
$(CXXFLAGS_R) /FRobj\VICALLOC.sbr ..\LIB\VICALLOC.CPP
<<
!ENDIF obj\PROJCTN7.obj : ..\LIB\PROJCTN7.CPP C:\C700\INCLUDE\graph.h\
```

```
        C:\C700\INCLUDE\stdlib.h C:\C700\INCLUDE\iostream.h
..\LIB\projctn7.h\
        C:\C700\INCLUDE\ios.h C:\C700\INCLUDE\streamb.h\
        C:\C700\INCLUDE\istream.h C:\C700\INCLUDE\ostream.h\
        C:\C700\INCLUDE\math.h
!IF $(DEBUG)
        @$(CXX) @<<obj\$(PROJ).rsp
/c $(CXXFLAGS_G)
$(CXXFLAGS_D) /Foobj\PROJCTN7.obj ..\LIB\PROJCTN7.CPP
<<
!ELSE
        @$(CXX) @<<obj\$(PROJ).rsp
/c $(CXXFLAGS_G)
$(CXXFLAGS_R) /Foobj\PROJCTN7.obj ..\LIB\PROJCTN7.CPP
<<
!ENDIF obj\PROJCTN7.sbr : ..\LIB\PROJCTN7.CPP C:\C700\INCLUDE\graph.h\
        C:\C700\INCLUDE\stdlib.h C:\C700\INCLUDE\iostream.h
..\LIB\projctn7.h\
        C:\C700\INCLUDE\ios.h C:\C700\INCLUDE\streamb.h\
        C:\C700\INCLUDE\istream.h C:\C700\INCLUDE\ostream.h\
        C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\PROJCTN7.sbr ..\LIB\PROJCTN7.CPP
<<
!ELSE
        @$(CXX) @<<obj\$(PROJ).rsp
/Zs $(CXXFLAGS_G)
$(CXXFLAGS_R) /FRobj\PROJCTN7.sbr ..\LIB\PROJCTN7.CPP
<<
!ENDIF obj\L_TRN7.obj : ..\LIB\L_TRN7.CPP C:\C700\INCLUDE\stdlib.h\
        C:\C700\INCLUDE\stdio.h C:\C700\INCLUDE\conio.h\
        C:\C700\INCLUDE\malloc.h ..\LIB\vicalloc.h ..\LIB\in_trn7.h\
        C:\C700\INCLUDE\vmemory.h ..\LIB\projctn7.h ..\LIB\res_mch7.h\
        ..\LIB\pic_mch7.h C:\C700\INCLUDE\math.h
C:\C700\INCLUDE\graph.h
!IF $(DEBUG)
        @$(CXX) @<<obj\$(PROJ).rsp
/c $(CXXFLAGS_G)
$(CXXFLAGS_D) /Foobj\L_TRN7.obj ..\LIB\L_TRN7.CPP
<<
!ELSE
        @$(CXX) @<<obj\$(PROJ).rsp
/c $(CXXFLAGS_G)
```

```
$(CXXFLAGS_R) /Foobj\L_TRN7.obj ..\LIB\L_TRN7.CPP
<<
!ENDIF obj\L_TRN7.sbr : ..\LIB\L_TRN7.CPP C:\C700\INCLUDE\stdlib.h\
        C:\C700\INCLUDE\stdio.h C:\C700\INCLUDE\conio.h\
        C:\C700\INCLUDE\malloc.h ..\LIB\vicalloc.h ..\LIB\in_trn7.h\
        C:\C700\INCLUDE\vmemory.h ..\LIB\projctn7.h ..\LIB\res_mch7.h\
        ..\LIB\pic_mch7.h C:\C700\INCLUDE\math.h
C:\C700\INCLUDE\graph.h
!IF $(DEBUG)
        @$(CXX) @<<obj\$(PROJ).rsp
/Zs $(CXXFLAGS_G)
$(CXXFLAGS_D) /FRobj\L_TRN7.sbr ..\LIB\L_TRN7.CPP
<<
!ELSE
        @$(CXX) @<<obj\$(PROJ).rsp
/Zs $(CXXFLAGS_G)
$(CXXFLAGS_R) /FRobj\L_TRN7.sbr ..\LIB\L_TRN7.CPP
<<
!ENDIF obj\PIC_M7.obj : ..\LIB\PIC_M7.CPP C:\C700\INCLUDE\stdlib.h\
        C:\C700\INCLUDE\stdio.h C:\C700\INCLUDE\graph.h
C:\C700\INCLUDE\math.h\
        C:\C700\INCLUDE\io.h C:\C700\INCLUDE\fcntl.h
C:\C700\INCLUDE\string.h\
        C:\C700\INCLUDE\float.H C:\C700\INCLUDE\malloc.h ..\LIB\phdr.h\
        ..\LIB\vicalloc.h ..\LIB\pic_mch7.h C:\C700\INCLUDE\vmemory.h\
        ..\LIB\projctn7.h
!IF $(DEBUG)
        @$(CXX) @<<obj\$(PROJ).rsp
/c $(CXXFLAGS_G)
$(CXXFLAGS_D) /Foobj\PIC_M7.obj ..\LIB\PIC_M7.CPP
<<
!ELSE
        @$(CXX) @<<obj\$(PROJ).rsp
/c $(CXXFLAGS_G)
$(CXXFLAGS_R) /Foobj\PIC_M7.obj ..\LIB\PIC_M7.CPP
<<
!ENDIF obj\PIC_M7.sbr : ..\LIB\PIC_M7.CPP C:\C700\INCLUDE\stdlib.h\
        C:\C700\INCLUDE\stdio.h C:\C700\INCLUDE\graph.h
C:\C700\INCLUDE\math.h\
        C:\C700\INCLUDE\io.h C:\C700\INCLUDE\fcntl.h
C:\C700\INCLUDE\string.h\
        C:\C700\INCLUDE\float.H C:\C700\INCLUDE\malloc.h ..\LIB\phdr.h\
        ..\LIB\vicalloc.h ..\LIB\pic_mch7.h C:\C700\INCLUDE\vmemory.h\
```

```
        ..\LIB\projctn7.h
!IF $(DEBUG)
        @$(CXX) @<<obj\$(PROJ).rsp
/Zs $(CXXFLAGS_G)
$(CXXFLAGS_D) /FRobj\PIC_M7.sbr ..\LIB\PIC_M7.CPP
<<
!ELSE
        @$(CXX) @<<obj\$(PROJ).rsp
/Zs $(CXXFLAGS_G)
$(CXXFLAGS_R) /FRobj\PIC_M7.sbr ..\LIB\PIC_M7.CPP
<<
!ENDIF obj\RES_MCH7.obj : ..\LIB\RES_MCH7.CPP C:\C700\INCLUDE\stdlib.h\
        C:\C700\INCLUDE\vmemory.h ..\LIB\pic_mch7.h ..\LIB\res_mch7.h\
        C:\C700\INCLUDE\graph.h ..\LIB\projctn7.h C:\C700\INCLUDE\math.h
!IF $(DEBUG)
        @$(CXX) @<<obj\$(PROJ).rsp
/c $(CXXFLAGS_G)
$(CXXFLAGS_D) /Foobj\RES_MCH7.obj ..\LIB\RES_MCH7.CPP
<<
!ELSE
        @$(CXX) @<<obj\$(PROJ).rsp
/c $(CXXFLAGS_G)
$(CXXFLAGS_R) /Foobj\RES_MCH7.obj ..\LIB\RES_MCH7.CPP
<<
!ENDIF obj\RES_MCH7.sbr : ..\LIB\RES_MCH7.CPP C:\C700\INCLUDE\stdlib.h\
        C:\C700\INCLUDE\vmemory.h ..\LIB\pic_mch7.h ..\LIB\res_mch7.h\
        C:\C700\INCLUDE\graph.h ..\LIB\projctn7.h C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\RES_MCH7.sbr ..\LIB\RES_MCH7.CPP
<<
!ELSE
        @$(CXX) @<<obj\$(PROJ).rsp
/Zs $(CXXFLAGS_G)
$(CXXFLAGS_R) /FRobj\RES_MCH7.sbr ..\LIB\RES_MCH7.CPP
<<
!ENDIF obj\FILEMNP.obj : FILEMNP.CPP C:\C700\INCLUDE\stdlib.h\
        C:\C700\INCLUDE\string.h C:\C700\INCLUDE\io.h\
        C:\C700\MFC\INCLUDE\afx.h C:\C700\INCLUDE\direct.h\
        C:\C700\INCLUDE\stdio.h C:\C700\INCLUDE\time.h\
        C:\C700\MFC\INCLUDE\afx.inl
!IF $(DEBUG)
```

```
        @$(CXX) @<<obj\$(PROJ).rsp
/c $(CXXFLAGS_G)
$(CXXFLAGS_D) /Foobj\FILEMNP.obj FILEMNP.CPP
<<
!ELSE
        @$(CXX) @<<obj\$(PROJ).rsp
/c $(CXXFLAGS_G)
$(CXXFLAGS_R) /Foobj\FILEMNP.obj FILEMNP.CPP
<<
!ENDIF obj\FILEMNP.sbr : FILEMNP.CPP C:\C700\INCLUDE\stdlib.h\
        C:\C700\INCLUDE\string.h C:\C700\INCLUDE\io.h\
        C:\C700\MFC\INCLUDE\afx.h C:\C700\INCLUDE\direct.h\
        C:\C700\INCLUDE\stdio.h C:\C700\INCLUDE\time.h\
        C:\C700\MFC\INCLUDE\afx.inl
!IF $(DEBUG)
        @$(CXX) @<<obj\$(PROJ).rsp
/Zs $(CXXFLAGS_G)
$(CXXFLAGS_D) /FRobj\FILEMNP.sbr FILEMNP.CPP
<<
!ELSE
        @$(CXX) @<<obj\$(PROJ).rsp
/Zs $(CXXFLAGS_G)
$(CXXFLAGS_R) /FRobj\FILEMNP.sbr FILEMNP.CPP
<<
!ENDIF obj\MTCHTPL2.obj : MTCHTPL2.CPP C:\C700\INCLUDE\vmemory.h\
        C:\C700\INCLUDE\stdio.h C:\C700\INCLUDE\stdlib.h\
        C:\C700\INCLUDE\conio.h C:\C700\INCLUDE\malloc.h\
        C:\C700\INCLUDE\float.H C:\C700\INCLUDE\graph.h\
        C:\C700\INCLUDE\string.h matchng.h MtchTpl2.h cor_fnc2.h\
        c:\ilya\lib\mylib.h ..\LIB\projctn7.h ..\LIB\pic_mch7.h\
        ..\LIB\res_mch7.h PIC_PRO.h ..\LIB\lin_trn7.h
C:\C700\INCLUDE\math.h\
        C:\C700\INCLUDE\direct.h C:\C700\MFC\INCLUDE\afx.h filemnp.h\
        C:\C700\INCLUDE\time.h C:\C700\MFC\INCLUDE\afx.inl
!IF $(DEBUG)
        @$(CXX) @<<obj\$(PROJ).rsp
/c $(CXXFLAGS_G)
$(CXXFLAGS_D) /Foobj\MTCHTPL2.obj MTCHTPL2.CPP
<<
!ELSE
        @$(CXX) @<<obj\$(PROJ).rsp
/c $(CXXFLAGS_G)
$(CXXFLAGS_R) /Foobj\MTCHTPL2.obj MTCHTPL2.CPP
<<
!ENDIF
```

110

```
obj\MTCHTPL2.sbr : MTCHTPL2.CPP C:\C700\INCLUDE\vmemory.h\
    C:\C700\INCLUDE\stdio.h C:\C700\INCLUDE\stdlib.h\
    C:\C700\INCLUDE\conio.h C:\C700\INCLUDE\malloc.h\
    C:\C700\INCLUDE\float.H C:\C700\INCLUDE\graph.h\
    C:\C700\INCLUDE\string.h matchng.h MtchTpl2.h cor_fnc2.h\
    c:\ilya\lib\mylib.h ..\LIB\projctn7.h ..\LIB\pic_mch7.h\
    ..\LIB\res_mch7.h PIC_PRO.h ..\LIB\lin_trn7.h
C:\C700\INCLUDE\math.h\
    C:\C700\INCLUDE\direct.h C:\C700\MFC\INCLUDE\afx.h filemnp.h\
    C:\C700\INCLUDE\time.h C:\C700\MFC\INCLUDE\afx.inl
!IF $(DEBUG)
    @$(CXX) @<<obj\$(PROJ).rsp
/Zs $(CXXFLAGS_G)
$(CXXFLAGS_D) /FRobj\MTCHTPL2.sbr MTCHTPL2.CPP
<<
!ELSE
    @$(CXX) @<<obj\$(PROJ).rsp
/Zs $(CXXFLAGS_G)
$(CXXFLAGS_R) /FRobj\MTCHTPL2.sbr MTCHTPL2.CPP
<<
!ENDIF obj\COR_FNC2.obj : COR_FNC2.CPP C:\C700\INCLUDE\stdio.h\
    C:\C700\INCLUDE\stdlib.h C:\C700\INCLUDE\conio.h\
    C:\C700\INCLUDE\float.H C:\C700\INCLUDE\graph.h cor_fnc2.h\
    ..\LIB\pic_mch7.h ..\LIB\res_mch7.h C:\C700\INCLUDE\vmemory.h\
    ..\LIB\projctn7.h C:\C700\INCLUDE\math.h
!IF $(DEBUG)
    @$(CXX) @<<obj\$(PROJ).rsp
/c $(CXXFLAGS_G)
$(CXXFLAGS_D) /Foobj\COR_FNC2.obj COR_FNC2.CPP
<<
!ELSE
    @$(CXX) @<<obj\$(PROJ).rsp
/c $(CXXFLAGS_G)
$(CXXFLAGS_R) /Foobj\COR_FNC2.obj COR_FNC2.CPP
<<
!ENDIF obj\COR_FNC2.sbr : COR_FNC2.CPP C:\C700\INCLUDE\stdio.h\
    C:\C700\INCLUDE\stdlib.h C:\C700\INCLUDE\conio.h\
    C:\C700\INCLUDE\float.H C:\C700\INCLUDE\graph.h cor_fnc2.h\
    ..\LIB\pic_mch7.h ..\LIB\res_mch7.h C:\C700\INCLUDE\vmemory.h\
    ..\LIB\projctn7.h C:\C700\INCLUDE\math.h
!IF $(DEBUG)
    @$(CXX) @<<obj\$(PROJ).rsp
/Zs $(CXXFLAGS_G)
$(CXXFLAGS_D) /FRobj\COR_FNC2.sbr COR_FNC2.CPP
```

```
<<
!ELSE
        @$(CXX) @<<obj\$(PROJ).rsp
/Zs $(CXXFLAGS_G)
$(CXXFLAGS_R) /FRobj\COR_FNC2.sbr COR_FNC2.CPP
<<
!ENDIF obj\$(PROJ).bsc : $(SBRS)
        $(BSCMAKE) @<<
$(BRFLAGS) $(SBRS)
<< obj\$(PROJ).exe : $(OBJS)
        -$(NMAKEBSC1) MAKEFLAGS=
        -$(NMAKEBSC2) $(NMFLAGS) -f $(PROJFILE) obj\$(PROJ).bsc
!IF $(DEBUG)
        $(LRF) @<<obj\$(PROJ).lrf
$(RT_OBJS: = +^
) $(OBJS: = +^
)
$@
$(MAPFILE_D)
$(LIBS: = +^
) +
$(LLIBS_G: = +^
) +
$(LLIBS_D: = +^
)
$(DEF_FILE) $(LFLAGS_G) $(LFLAGS_D);
<<
!ELSE
        $(LRF) @<<obj\$(PROJ).lrf
$(RT_OBJS: = +^
) $(OBJS: = +^
)
$@
$(MAPFILE_R)
$(LIBS: = +^
) +
$(LLIBS_G: = +^
) +
$(LLIBS_R: = +^
)
$(DEF_FILE) $(LFLAGS_G) $(LFLAGS_R);
<<
!ENDIF
        $(LINKER) @obj\$(PROJ).lrf
```

SUBSTITUTE SHEET (RULE 26)

```
.cpp.obj :
!IF $(DEBUG)
       @$(CXX) @<<obj\$(PROJ).rsp
/c $(CXXFLAGS_G)
$(CXXFLAGS_D) /Fo$@ $<
<<
!ELSE
       @$(CXX) @<<obj\$(PROJ).rsp
/c $(CXXFLAGS_G)
$(CXXFLAGS_R) /Fo$@ $<
<<
!ENDIF .cpp.sbr :
!IF $(DEBUG)
       @$(CXX) @<<obj\$(PROJ).rsp
/Zs $(CXXFLAGS_G)
$(CXXFLAGS_D) /FR$@ $<
<<
!ELSE
       @$(CXX) @<<obj\$(PROJ).rsp
/Zs $(CXXFLAGS_G)
$(CXXFLAGS_R) /FR$@ $<
<<
!ENDIF run: obj\$(PROJ).exe
       obj\$(PROJ).exe $(RUNFLAGS)

debug: obj\$(PROJ).exe
       CV $(CVFLAGS) obj\$(PROJ).exe $(RUNFLAGS)
```

```
//return  file name without extwntion in "name" and TRUE 1 if file exist;
int next_pict(char *name,char *mask,char *ext,int num);
                    //if num=-2 initalisation;
                    //      -1 next
                    //      >0   adding this # to mask
                    //      and reinialise to this #
                    // NULL if notexist file with ".ext"
//=======================================
short MaskDecoding(char *msk);
//=======================================
//============================================
CString MakeName(char *p );
CString MakeName(CString N);
//=============================================
```

```
#ifndef MATCHNG
#define MATCHNG
#include "mylib.h"

#define EXTANTION ".sg2"

#define MaxProtoNum  40
#define MaxWinNum    40
#define PRESENT_HIGHT 32
#define MaxSignSize  256
//
define CALCULATION_HIGHT 16 endif
```

```
#ifndef TEMPLT
#define MchTPLT
#include "projctn7.h"
#include "pic_mch7.h"
#include "res_mch7.h"
#include "pic_pro.h"
#define NTSC 0
#define HSI 1
#define New_plan 2
#define RGB 3
#define LUMIN_THR 4
#define IHS 5
class RsltNow
    {public:
        short voices; // voiting numbers
        double value; //value
      RsltNow::RsltNow(){voices=0;value=0;}
      RsltNow::RsltNow(short d,double v){voices=d;value=v;}
    };
//=========================================
class RSLT
    { public:
      RsltNow R;
      short pos; // position in string
      short ShNumb;
      short ProtoNum;
      short StrNum;
    RSLT::RSLT(){};
    RSLT::RSLT(short num,short p, double v,
            short shft,short pro,short st)
    {R=RsltNow::RsltNow(num,v);
     pos=p;
     ShNumb=shft;
     ProtoNum=pro;
     StrNum=st;
     }
};
//=====================================
double CalcCorrThresh(short * Hst,short HDim, short NPntAboveThr,
            int PlusThresh, double PrcntLvl=0);
double CorrelationEstim(double C, double MinVal,double MaxVal,
void*AddInf=NULL);

void MatchForProtoStr(PCT &T,PRT &P,SCR_PNT winsize,short winstep,
            double *CorrThresh,RsltNow *NowRslt,
        short *StripEnds);

#endif
```

```
#ifndef PIC_PRO
#define PIC_PRO
#include <stdlib.h>
#include <direct.h>
#include <afx.h>
#include <pic_mch7.h>
#include "filemnp.h"
#define STR_MAX    4
//=================================================================
const SCR_PNT z_0(0,0);
class PRT:public PCT
        {public:
//information
     CString PathName;
     CString FRAME_Number;
     CString STRING_name;
     CString  SIGN_name;
        short  Pos;     // Position in the string
        long NumberOfChk,MaxNum;
        double *Charact;
//models
        PRT::~PRT()
             {this->free_PCT();
              Pos=0;
                    if(MaxNum)
                        delete Charact;
                    Charact=NULL;
                    MaxNum=NumberOfChk=0;
            }
//---------------------------------------------
        PRT::PRT()
            {NumberOfChk=MaxNum=s_cols=s_rows=0;
            Charact=NULL;pict=NULL;
            }
//---------------------------------------------
    PRT::PRT (short n_cols, short n_rows)
        {*(PCT *)this=PCT::PCT(n_cols,n_rows);
         NumberOfChk=MaxNum=0;
         Charact=NULL;
        }
//=================================================================
int read_proto_SGN(char ext[]=".sgn")
  {
   CString new_name(' ',80);

PathName=MakeName(PathName);
   new_name=PathName+ext;
   char now[80];
```

```
        FILE *datfp;
        if(!(datfp=fopen((const char*)new_name,"r"))) return 1;
            if(fscanf(datfp,"%*[^\n]s ")==EOF)goto ERR;
            if(fscanf(datfp,"%s ",now)==EOF)goto ERR;
         -  if(fscanf(datfp,"%s ",now)==EOF)goto ERR;
            if(fscanf(datfp,"%s ",now)==EOF)goto
ERR;FRAME_Number=now;
            if(fscanf(datfp,"%s ",now)==EOF)goto
ERR;STRING_name=now;
            if(fscanf(datfp,"%s ",now)==EOF)goto ERR; SIGN_name=now;
            FRAME_Number.MakeUpper();
            STRING_name.MakeUpper();
            SIGN_name.MakeUpper();
            fclose(datfp);
            return 0;
        ERR:fclose (datfp); return 1;
}
//===========================================================
int proto_storage_rgb(char *name,struct _videoconfig vc,char *ext=".sgn")
        {*(PCT *)this=sign_storage_rgb(name,vc);
        if (!s_cols) return 1;
        PathName=MakeName(name);
        if (read_proto_SGN(ext))
            {free_PCT();
            return 1;
            }
        return 0;
            }
//————————————————————————
int read_proto_DBC(FILE *datfp)
    {
    char now[80];
            if(fscanf(datfp,"%s ",now)==EOF)goto
ERR;PathName=MakeName(now);
            if(fscanf(datfp,"%s ",now)==EOF)goto
ERR;FRAME_Number=now;
            if(fscanf(datfp,"%s ",now)==EOF)goto
ERR;STRING_name=now;
            if(fscanf(datfp,"%s ",now)==EOF)goto ERR; SIGN_name=now;
            if(fscanf(datfp,"%d ",&(this->s_cols))==EOF)goto ERR;
            FRAME_Number.MakeUpper();
            STRING_name.MakeUpper();
            SIGN_name.MakeUpper();
            return 1;
        ERR: return 0;
    }
//==========================================================
===
int alloc_Charact_dbl(long Num)
```

```
{
 if(!(Charact=new double[Num])) return 1;
 MaxNum=Num; NumberOfChk=0;
  return 0;
 }
//----------------------------------------
void free_Charact()
{delete Charact;
  Charact=NULL;
}
//----------------------------------------
int read_Charact_dbl(FILE *inp,long Num)
  {short i;
   double d;
   if(MaxNum<(NumberOfChk+Num)) return 1;
   for (i=0;i<Num;i++)
    {if(fscanf(inp,"%lf ",&d) ==EOF) return 1;
     if(fabs(d)<1.0e-4) d=0;
         Charact[NumberOfChk]=d;
     NumberOfChk++;
    }
 return 0;
 }
//----------------------------------------
double CorrValue(short WNum,short Pnum)
 {return (*(Charact+(long)WNum*s_cols+Pnum));
 }
//==========================================================
======
//======RETURN NUMBER OF STRIPS
int read_target_SGN(SCR_PNT vrt[][4],char ext[]=".sgs")
   {int n=0,j,FLG,s;
    CString new_name(' ',80);

PathName=MakeName(PathName);
    new_name=PathName+ext;
    char now[80];
    FILE *datfp;
        if(!(datfp=fopen((const char*)new_name,"r"))) return 1;
            if(fscanf(datfp,"%*[^\n]s ")==EOF)goto OUT;
            if(fscanf(datfp,"%s ",now)==EOF)goto OUT;
            if(fscanf(datfp,"%s ",now)==EOF)goto OUT;
            if(fscanf(datfp,"%s ",now)==EOF)goto
OUT;STRING_name=now;
            if(fscanf(datfp,"%s ",now)==EOF)goto OUT; SIGN_name=now;
        if((s=PathName.ReverseFind('\\'))<0)
            s=PathName.ReverseFind(':');
            FRAME_Number=
                PathName.Right(PathName.GetLength()-s);
```

119

```
            - STRING_name.MakeUpper();
              SIGN_name.MakeUpper();
    do{
        for(j=0;j<4;j++)
        if((FLG=fscanf(datfp,"%d %d ",&(vrt[n][j].c),&(vrt[n][j].r)))==EOF)
              goto OUT;
        n++;
    }
    while(n<STR_MAX-1);
    OUT:fclose (datfp); return n;
}
//————————————————————
};
//========================================= define UnKnown -1
//==============================================================
=
typedef struct
        { short n;  // voiting numbers
          short pos; // position in string
          double value; //value
        } RSLT_old;

//————————————————————
void HistCollect(short NOfWin,short St,short Fin,PRT &Db);
RSLT_old LineEstimation (short TagSize, PRT &Db,short NOfWin,
                         short WSize,double Thr);
int LineInf(const PRT &P, PRT T, short rw, short Xpos,struct _videoconfig vc);
double LinInter( PRT &P,short WNum,short WSize ,double Pt);
void HistThresh(short *H,short *BotThr,short *TopThr,short num);

#endif
```

12D

```
#include "lin_trn7.h"
double VShift[][4]= {
        {0.0, 0.0, 0.0, 0.0}
       ,{-2,+2,+2,-2}
       ,{+2,-2,-2,+2}
//     ,{0.125,0,0,0.125}
//     ,{-0.125,0,0,-0.125}
//     ,{0,0.125,0.125,0}
//     ,{0,-0.125,-0.125,0}
//     ,{0.125,0.125,0.125,0.125}
//          , {-0.125,-0.125,-0.125,-0.125}
//     };

//=============         ,{0.1875,0,0,0.1875}
//=============         ,{-0.1875,0,0,-0.1875}
//=============         {0,0.1875,0.1875,0}
//=============         {0,-0.1875,-0.1875,0}
//                      ,{0.1875,0.1875,0.1875,0.1875}
//                      {-0.1875,-0.1875,-0.1875,-0.1875}
//              ,{0.35,0.35,0.35,0.35}
                         };
void    VrtxCalculation(PRT &T,double sh[4],SCR_PNT NewV[4],
                                SCR_PNT OldV[4])
{short j,k,MaxV;
   MaxV=T.s_rows;
   match_vertex( OldV);
SCR_PNT v[4];
/*============
DIR_LINE top(OldV[3],OldV[0]),down(OldV[1],OldV[2]);
DIR_LINE top_new,down_new;
     vert_for_map(*((PCT *)(&T)),top,down,&top_new,&down_new);
  PT st1 =down_new.Start_p(),st2=top_new.Start_p(),
     end1 =down_new.End_p(),end2=top_new.End_p();

PT_SCR(st2,v[3]);
PT_SCR(end2,v[0]);
PT_SCR(st1,v[1]);
PT_SCR(end1,v[2]);
match_vertex( v);
=============================*/
v[0]=OldV[0];v[1]=OldV[1];v[2]=OldV[2];v[3]=OldV[3];
//=====================================================
  for(j=0;j<4;j++)
       {
       NewV[j].c=v[j].c;
       k=((j%2)?j-1:j+1);
       if (fabs(sh[j])<1)
         {NewV[j].r=(sh[j]?(short)((v[j].r-v[k].r)*sh[j])+
```

121

```
            v[j].r:v[j].r);
         }
         else
            NewV[j].r=v[j].r+sh[j];
            NewV[j].r=__max(0, __min(NewV[j].r,MaxV-1));
         }
   while((NewV[1].r-NewV[0].r)<8)
     {NewV[1].r=__min(NewV[1].r++,MaxV-1);
      if((NewV[1].r-NewV[0].r)<8)
          NewV[0].r=__max(0, NewV[0].r--);
     }
   while((NewV[2].r-NewV[3].r)<8)
     {NewV[2].r=__min(NewV[2].r++,MaxV-1);
      if((NewV[2].r-NewV[3].r)<8)
          NewV[3].r=__max(0, NewV[3].r--);
     }
  }
}
//==========================================================
============
```

```c
#include <stdlib.h>
#include <string.h>
#include <io.h>
#include <afx.h>
#include <direct.h>

//return  file name without extwntion in "name" and TRUE 1 if file exist;
int next_pict(char *name,char *mask,char *ext,int num)
                        //if num=-2 initalisation;
                        //    -1 next
                        //    >0  adding this # to mask
                        //    and reinialise to this #
                        // NULL if notexist file with ".ext"
{static int now;
 char full_name[80];
strcpy(name,mask);
if (num==-2)now=0;
else if (num==-1)
        now++;
else if (num<0) return 0;
else now=num;
 _itoa( now, name+strlen(name), 10);
 strcat(strcpy(full_name,name),ext);
  //1 if file exist
return(!_access( full_name, 0 ));
}
//================================================================
short MaskDecoding(char *msk)
{char *p,nm[40];
strcpy(nm,msk);
if(p=strrchr( nm, (int) '\' ))
    p+=2;
else
   if(p=strrchr( nm, (int)':' ))
      p+=2;
else
    p=nm+1;
  *(p+2)='\0';
return ((short)atoi( p ));
}
//================================================
CString MakeName(CString N)
{
short k=(N.SpanIncluding(" \t")).GetLength();
char *p,fp[80];
p=((char*)(const char *)N)+k;
CString M=p;
```

123

SUBSTITUTE SHEET (RULE 26)

```
if(M.Find(':')<0)
  {if(M.GetAt(0)=='\\')
    { M=':'+M;
        M= (char)(_getdrive( )-1+'A')+M;
    }
   else
      M=_fullpath(fp,(const char *)M,80);
  }
M.MakeLower();
return M;
}
//================================================================
=
CString MakeName(char *p )
{CString M(p);
return (MakeName(M));
}
//================================================================
=================
```

```c
#include <vmemory.h>
#include <stdio.h>
#include <stdlib.h>
#include <conio.h>
#include <malloc.h>
#include <float.h>
#include <graph.h>
include <string.h> include "matchng.h"
include "mtchtpl2.h"
#include "cor_fnc2.h"

#define MAX_LINE 1024

//extern short NumberOfWin;
extern double GAMMA,Thresh_mdl;
extern short MAP;
extern short VOITING;
extern struct _videoconfig vc;

#define ProbValue(S,x)    (2*(double)(x)/((S)-1.0)-1.0)
void   draw_color_corr_1(COLOR_VEC corr,short F,double THRESH,
                short pos_now);

//=============================================================
===
double CalcCorrThresh(short * Hst,short HDim, short NPntAboveThr,
                int PlusThresh, double PrcntLvl)
{double out;
 short sum=0,N=0,ist,incr;
 if (PrcntLvl)
        {for(ist=0;ist<HDim;N+=Hst[ist++]);
         NPntAboveThr=short (N*PrcntLvl+0.5);
         }
//------------------------------------------------
if(PlusThresh)
   {ist=HDim;incr=-1;}
 else
   {ist=-1;incr=1;}
// POINT PARAMETER;
 do{
   ist+=incr;
   sum+=*(Hst+ist);
   }
while((sum<NPntAboveThr) && (ist>=0) && (ist<HDim));
out=ProbValue(HDim,ist);
return out;
}
```

```
//=================================================================
=========
double CorrelationEstim(double C, double MinVal,double MaxVal,
void*AddInf)
{
  if (C<MinVal) return MinVal;
  if (C>MaxVal) return MaxVal;
  return C;
}
//=================================================================
===========
COLOR_VEC (*PointColFunct())(COLOR_RGB p1,double Thresh_mdl)

{ switch ( MAP)
      {case NTSC:return(color_space_NTSC);
       case New_plan:return(color_space_NEW);
       case HSI:return(color_space_RGB);
       case RGB:return(color_space_RGB_simple);
       case LUMIN_THR:return(color_space_LUMIN_THR);
       case IHS:return(color_space_IHS);
      };
return NULL;
}
//=================================================================
const short CH_HIGHT=80, CH_BASE=470;
//=================================================================
void MatchForProtoStr(PCT &T,PRT &P,SCR_PNT winsize,short winstep,
                  double *CorrThresh,RsltNow *NowRslt,
            short *StripEnds)
  {

_setcolor( color_num(0,0,0));
 _rectangle(_GFILLINTERIOR,0,CH_BASE-3*CH_HIGHT-(CH_HIGHT>>1),
             vc.numxpixels ,CH_BASE );

double crmdl;
    short i;
    char mess[40];
    short F=1;
    COLOR_VEC (*p_funct)(COLOR_RGB p1,double Thresh_mdl);
    p_funct=PointColFunct();
//     PCT win(winsize.c,winsize.r);
//     PCT tag(winsize.c,winsize.r);

SCR_PNT st_t,st_win;
    AVERAGE_VEC middle_win,middle_tag;
    const AVERAGE_VEC z={{0,0,0},{0,0,0}};

COLOR_VEC cr;
```

```
    const COLOR_VEC z_col={0.0,0.0,0.0};

st_t.r=0;
    st_win.r=0;
  short k,StripStart,StripStop;
  double ValueNow[1024];
  // double *ValueNow=new double[P.s_cols+T.s_cols];
  short PartNum;
   k=PartNum=0;
   while(StripEnds[PartNum]>=0)
      {StripStart=StripEnds[PartNum++];
       StripStop=StripEnds[PartNum++];
       for (st_win.c=StripStart;
 st_win.c+winsize.c<=StripStop;st_win.c+=winstep,k++)
        {
          F=1;
          middle_win=average2(P,Thresh_mdl,winsize,st_win,p_funct);

const COLOR_VEC z_UNIT={1.0,1.0,1.0};
        for(i=0;i<P.s_cols+T.s_cols;ValueNow[i++]=0.0);

for (st_t.c=0;st_t.c<=T.s_cols-winsize.c;st_t.c++)
          {
  short EndPointOfProNow= P.s_cols + st_t.c-st_win.c;
  //===========================================
          middle_tag=average2(T,Thresh_mdl,winsize,st_t,p_funct);
  // DIFF ABS VALUES
  #ifdef SINGL_VAL
          cr=template_conv_2( T,P,Thresh_mdl,z_UNIT,winsize,st_t,st_win,
          p_funct);
  //       strcpy(mess," VECTOR Approach to CORRELATION ");
          cr= Correlation_single_1(cr,middle_tag,middle_win,z_UNIT);
          crmdl=cr.c[0];
  #else
  #ifdef ABS_VALUE
  //       strcpy(mess," DIFF ABS VALUES/ max ABS VALUES");
          cr=
              template_abs_diff_1 (tag,win,Thresh_mdl,z_UNIT,p_funct,
              middle_tag,middle_win);
  #else
          cr=template_conv_1( tag,win,Thresh_mdl,z_UNIT,p_funct);
          strcpy(mess," PEARSON CORR. ");
          cr=Correlation(cr,middle_tag,middle_win,z_UNIT);
          crmdl=0.333333*(cr.c[0]+cr.c[1]+cr.c[2]);

#endif
  #endif if (crmdl> CorrThresh[k])
```

```
                ValueNow[EndPointOfProNow]=crmdl;

draw_color_corr_1( cr, F,0.3,EndPointOfProNow);
           F=0;
           }
    double old=0,next,Val,now;
       next=ValueNow[0];
       for(i=0;i<P.s_cols+T.s_cols;i++)
         {
         now=next;
         next=(i==P.s_cols+T.s_cols-1)?0:ValueNow[i+1];
            Val=__max(__max(now,next),old);
         if(Val)
             {NowRslt[i].value+= Val;
              NowRslt[i].voices++;
             }
          old=now;
      }
     }
   }
//================== delete (ValueNow);
return ;
}
//===========================================================
==============
void   draw_color_corr_1(COLOR_VEC corr,short F,
double THRESH,
short pos_now)
{
 short j,k,l,i,st;
 static short pos_old;
 short POS;
 static COLOR_RGB corr_old;
 POS=10+pos_now;
_setcolor( color_num(240,240,240));
if(F)
 { corr_old.r=k=CH_BASE-2*CH_HIGHT-40;
  st=CH_HIGHT/10;
  for(i=0;i<3;i++)
    {
    _moveto( 10,k-CH_HIGHT);
    _lineto(10,k);
    _lineto(10+vc.numxpixels,k);
    _moveto(10,k-CH_HIGHT*THRESH);
    _lineto(10+vc.numxpixels,k-CH_HIGHT*THRESH);
    for(l=0,j=1;j<11;j++)
       {l+=st;
```

```
    _moveto(
        (j==5)?5:((j==10)?0:7)
        ,k-l);
    _lineto(10,k-l);
    }
    k+=(CH_HIGHT+20);
}
corr_old.g=corr_old.r+CH_HIGHT+20;
corr_old.b=corr_old.g+CH_HIGHT+20;
pos_old=10;
}
_setcolor( color_num(240,240,240));
k=CH_BASE;
_moveto( pos_old,corr_old.b);
j=k-(short)(corr.c[2]*CH_HIGHT);
_lineto((short)(POS) ,j);
corr_old.b=j;

k-=(CH_HIGHT+20);
_moveto( pos_old,corr_old.g);
j=k-(short)(corr.c[1]*CH_HIGHT);
_lineto((short)(POS),j);
corr_old.g=j;

k-=(CH_HIGHT+20);
_moveto( pos_old,corr_old.r);
j=k-(short)(corr.c[0]*CH_HIGHT);
_lineto((short)(POS) ,j);
corr_old.r=j;
pos_old=POS;

}
```

```
#include <stdlib.h>
#include <conio.h>
#include <stdio.h>
#include <string.h>
#include <graph.h>
#include <float.H>
#include <time.h>
#include <ctype.h>
#include <fstream.h>
include <afx.h> include "matchng.h"
include "PIC_PRO.h"
#include "MtchTpl2.h"
#include "shift.h"
#include "filemnp.h"

#ifdef _DEBUG
#define new DEBUG_NEW
#endif

//input Par
//Files <frame>.RGB; <frame>.sgs; <proto's>.RGB; <proto's>.hs2
short PlusThresnPnt;    //Threshold for histogramme Number Of Points
double MinimalVal;      // for CorrThresh
double MaximalVal;
short HighVoiceThreshold=6;
short median=0;

short MAP=1;            //      Color Space short WinNum;
double CorrThresh[MaxWinNum];
int Introduction(int arg,char *a);
short  NumberOfWin,HistDim;
CString BestName[2]={CString::CString(30),CString::CString(30)};

#define MaxNumberOfPoints 1024
RsltNow NowRslt[MaxNumberOfPoints];

short ReadHist(const char *PName,short ***H);
const short NumberOfShifts=sizeof(VShift)/(4*sizeof(double));

void FreeHist( short NOfWin,short ***H);
void draw_DMF(RsltNow Now ,short F,short CH_HIGHT,short CH_BASE,
        short pos_now,double scale);

double GAMMA=1.0,CORR_THRESH=0.0,Thresh_mdl=0.0;
short VOITING=3,TAG_hight;
```

*130*

```
struct _videoconfig vc;
ofstream LineC;
const char clean[]="
//===============================================================
========
int ReadStrInf(char *name,short *StD)
{ifstream InpF;
 char a[80];
 strcat(strcpy(a,name),".str");
 short i;
 InpF.open(a,ios::in|ios::nocreate);
   if(InpF.fail())
      {InpF.clear(0);
        return 1;
        }
   InpF.getline(a,80,'\n');
   InpF.getline(a,80,'\n');
   InpF.getline(a,80,'\n');
   InpF.getline(a,80,'\n');
   InpF.getline(a,80,'\n');
   InpF.getline(a,80,'\n');
   i=0;
   do
    {
      InpF>>StD[i++];
      if (InpF.eof()|| i>17)
         { StD[-i]=-1;
           break;
           }
      InpF>>StD[i++];
      }
   while(1);
   InpF.close();
   return 0;
}
//==================================================
void   PUT_NO_MATCH(void)
{       _settextposition( vc.numtextrows-2,0);
        _outtext( clean );
        _settextposition( vc.numtextrows-2,0);
        _outtext( "NO MATCH" );
}
//===============================================================
==================
void FillProtocol(char *m,short StrN,const char *name, RSLT now, int AskMess)
{char mess[40],*p;
LineC<< StrN<<" \t"<<name<<" \t"<<now.ShNumb<<" \t"<<now.pos<<" \t"<<
     now.R.voices<<" \t"<<now.R.value<<" \t";
```

/31

```
if (AskMess)
  {if(now.R.value)
    {
      _settextposition( vc.numtextrows-2,0);
      _outtext( clean );
      _settextposition( vc.numtextrows-2,0);
      sprintf(mess," %s V=%6g N=%2d",m,now.R.value,now.R.voices);
      _outtext(mess );
      p=mess;
      while(!isspace( (int)(*p++=(char)getche()) ));
      *(--p)='\0';
      LineC<<" \t"<<mess;
    }
   else
      LineC<<" \t NO MATCH";
  }
  LineC<<"\n";
}
//===========================================================
===============
void PresentRslt(char *m,PRT &T,RSLT &R,SCR_PNT *V, short hight,short row_n,
              char *p_msk,short CL)
{
SCR_PNT p_p(10,row_n);
if(R.R.value)
{
if(CL)
{
  _setcolor( color_num(0,0,0));
   _rectangle( _GFILLINTERIOR,0,p_p.r,
                  680,p_p.r+36);
}
_setcolor( color_num(240,240,240));
PCT t_map=linear_transform(T,V,hight);
//PCT t_map=linear_transform_cont(T,V,hight);
        sign_present_RGB( t_map,p_p);
   t_map.free_PCT;
   p_p.r+=20;
char p_name[40];
PRT P;
   next_pict(p_name,p_msk,".rgb",R.ProtoNum);
   if(P.proto_storage_rgb(p_name,vc,".str"))
           {printf("RGB  PROTO not exist"); GRAPH_OUT(-1);
           };
   p_p.c=10+R.pos-P.s_cols;
   sign_present_RGB( P,p_p);
   FillProtocol(m,R.StrNum,(const char*) P.SIGN_name,
                  R,TRUE);
```

```
P.free_PCT;
}
else
   {
   PUT_NO_MATCH();
   }
}
//=============================================================
===============
CString PROTOCOL_NAME;

//============    OpenLineCollection
void OpenLineCol(const char*name)
{ LineC.open(name,ios::out|ios::app|ios::nocreate);
   if(LineC.fail())
      {LineC.clear(0);
         LineC.open(name,ios::out|ios::app|ios::noreplace);
         if(LineC.fail())
            {LineC.clear(0);
              cout << "CAN NOT OPEN FILE "<<name;
            GRAPH_OUT(-1);
            }
         }
}
//=============================================================
===
int main(int argc,char* argv[])
{
short  **Hist;
const int PlusDir= TRUE;
short StrDescr[17]; // ONLY 6 partition for string if(Introduction(argc,argv[argc-1])) return-1;

short CalcHight=MaskDecoding(argv[2]);      // PROTOTYPE HIGHT

// =======    GRAPHICS START
      if(GRAPHICS_START(&vc,GRAPHMODE)) GRAPH_OUT(-1);
PROTOCOL_NAME=argv[1];
PROTOCOL_NAME+=".mch" ;
OpenLineCol((const char*)PROTOCOL_NAME);

//================= TARGET LOADING & MEMORY PARAMETERS
DEFINITION
PRT TARGET;
PRT PROTO;
PCT target_map;
const SCR_PNT proto_pos(10,30),target_pos(10,10);
```

```
SCR_PNT
TARGET_vrt[STR_MAX][4],NewVrt[STR_MAX][NumberOfShifts][4];
    if(TARGET.proto_storage_rgb(argv[1],vc))
        {printf("RGB TARGET not exist");    GRAPH_OUT(-1);
        return -1;
        }
int NumberOfStrips=TARGET.read_target_SGN(TARGET_vrt,EXTANTION);
        LineC<< " MAP \tPlusThresnPnt \tMinimalVal \tMaximalVal \n";
        LineC<<MAP<<" \t"<<PlusThresnPnt<<" \t"<<MinimalVal
            <<" \t"<<MaximalVal<<" \t"<<median<<"\n";
    LineC<< "File \t"<< argv[1]<<" \t "<<TARGET.SIGN_name<<"\n";
    LineC<< "S# \t PROTO \t Sh \t Pos \t V \t Value \t Res\n";

if(!NumberOfStrips)
        {LineC<<"Did NOT find strips\n";
        LineC.close();
        printf("Did not find lines"); GRAPH_OUT(-1);
        return -1;
        }
char proto_name[40];
short ProtoNumber=0;

RSLT BestRslts[2];
        BestRslts[0]=RSLT::RSLT(0,0,0,-1,0,0);
        BestRslts[1]=RSLT::RSLT(0,0,0,-1,0,0);
RSLT BestNowRslts[2];

//      New Vertexes Calculation
short StripNumber;
short ShiftNumber;

for(StripNumber=0;StripNumber<NumberOfStrips;StripNumber++)
        for(ShiftNumber=0;ShiftNumber<NumberOfShifts;ShiftNumber++)  //
return NewVrt after reordering
            VrtxCalculation( TARGET,VShift[ShiftNumber],
                        NewVrt[StripNumber][ShiftNumber],
                            TARGET_vrt[StripNumber]);
//          LOOP OVER STRIPS
    for(StripNumber=0;StripNumber<NumberOfStrips;StripNumber++)
        {
//              LOOP OVER PROTOTYPE
short ProtoNumber=0;
        while(next_pict(proto_name,argv[2],".rgb",ProtoNumber))    // RGB
proto EXIST
        {
//  LOCAL QUALITY
        BestNowRslts[0]=RSLT::RSLT(0,0,0,-1,0,0);
        BestNowRslts[1]=RSLT::RSLT(0,0,0,-1,0,0);
```

```
//=========Proto Loading
        if(PROTO.proto_storage_rgb(proto_name,vc,".str"))
            {printf("RGB PROTO not exist"); GRAPH_OUT(-1);return -1;
            };
            _clearscreen( _GCLEARSCREEN );
        sign_present_RGB( PROTO,proto_pos);
        if(ReadStrInf(proto_name,StrDescr))
            {printf("SGN PROTO not exist"); GRAPH_OUT(-1);return -1;
            };
c
//==========    HIST reading
CString HName('-',60);
        HName=proto_name;
        HName+=".hs2";
// here read size of windows from Hist and so on
SCR_PNT WinSize;
short winstep,NoHist;
            WinSize.r=CalcHight;
        NoHist=0;
        if(!(WinSize.c=ReadHist((const char *)HName,&Hist)))
            {printf("Did not find Hist %s",proto_name);
            NoHist=1;
            WinSize.c=8;
            NumberOfWin=MaxWinNum;}
            winstep=WinSize.c;

//------------MEMORY ALLOCATION & inicialisation FOR Decision Making
short i;
        for (i=0;i<MaxWinNum;CorrThresh[i++]=-1.0);
        for (i=0;i<NumberOfWin;i++)
            {if(NoHist)
                CorrThresh[i]=0.3;
            else
                {
                CorrThresh[i]=CalcCorrThresh(*(Hist+i),HistDim,
                        PlusThresnPnt,PlusDir,0);
                CorrThresh[i]=CorrelationEstim(CorrThresh[i],
MinimalVal,
                    MaximalVal,NULL);
                }
            }
        if(!NoHist)
            FreeHist( NumberOfWin, Hist);
// !!!!!!!    CorrelationThreshold for all windows
short NumberOfPoints;
//============ LOOP OVER SHIFTS
        for(ShiftNumber=0;ShiftNumber<NumberOfShifts;
            ShiftNumber++)
            {if(NewVrt[StripNumber][ShiftNumber][0].r<0) continue;
```

```
                target_map=linear_transform(TARGET,
//           -  target_map=linear_transform_cont(TARGET,
                        NewVrt[StripNumber][ShiftNumber],CalcHight );
                NumberOfPoints=PROTO.s_cols+target_map.s_cols;
                _setcolor( color_num(0,0,0));
              -_rectangle( _GFILLINTERIOR,0,0,
                        vc.numxpixels ,proto_pos.r-1);

sign_present_RGB( target_map,target_pos);

//—  Result Initialisation For Every SHIFT
                for(i=0;i<MaxNumberOfPoints;i++)
                        NowRslt[i]=RsltNow::RsltNow();
//==========         Proto Calculation
                MatchForProtoStr(target_map, PROTO, WinSize, winstep,
                        CorrThresh,NowRslt,StrDescr);
                target_map.free_PCT();

//correct filling    The BEST For Shift,Proto,Strip
#ifdef MYDEBUG
double scale=-1;
 for(i=0;i<NumberOfPoints;i++)
                scale=__max(scale, NowRslt[i].value);
#endif
                for(i=0;i<NumberOfPoints;i++)
                  {
                  if( NowRslt[i].value>BestNowRslts[0].R.value)
                    {
//==================== Not repeat small shifts
                    if(abs(i-BestNowRslts[0].pos)>=4)
                                BestNowRslts[1]=BestNowRslts[0];
                    BestNowRslts[0].pos=i;
                    BestNowRslts[0].R=NowRslt[i];
                    BestNowRslts[0].ShNumb=ShiftNumber;
                    BestNowRslts[0].ProtoNum=ProtoNumber;
                    BestNowRslts[0].StrNum=StripNumber;
                    if(BestNowRslts[0].R.voices>=HighVoiceThreshold)
                       {BestRslts[0]=BestNowRslts[0];
                        BestRslts[1]=RSLT::RSLT(0,0,0,-1,0,0);
                        PROTO.free_PCT();
                        BestName[0]=PROTO.SIGN_name;
                        goto DIRECT_DECISION;
                       }
                    }
                  else
                    if( (NowRslt[i].value>BestNowRslts[1].R.value) &&
                        (abs(i-BestNowRslts[0].pos)>=4))
                                {
                                BestNowRslts[1].pos=i;
```

136

```
                            BestNowRslts[1].R=NowRslt[i];
                            BestNowRslts[1].ShNumb=ShiftNumber;
                            BestNowRslts[1].ProtoNum=ProtoNumber;
                            BestNowRslts[1].StrNum=StripNumber;
                        }
                }
//———        May be presentation for analyses
#ifdef MYDEBUG
short F=1;
short CH_HIGHT=100, CH_BASE=190;

_setcolor( color_num(0,0,0));
 _rectangle( _GFILLINTERIOR,0,CH_BASE-CH_HIGHT,
                    vc.numxpixels ,CH_BASE );
                if(scale)
                  {
                  for(i=0;i<NumberOfPoints;i++)
                    {draw_DMF(NowRslt[i] ,F, CH_HIGHT, CH_BASE,
                                    i-PROTO.s_cols, scale);
                        F=0;
                    }
#ifndef RUN
                getch();
#endif
                  }
                else
                  PUT_NO_MATCH();
#endif
            } // Shift closed
        PROTO.free_PCT();
        ProtoNumber++;
//==========PROTOCOL  PROTO
OUTPUT=========================================
#ifdef MYDEBUG
short pp2=10,CL2=TRUE;
    for (i=0;i<2;i++)
        {
        PresentRslt("PROTO SHIFT RSLT?",TARGET,BestNowRslts[i],
            NewVrt[BestNowRslts[i].StrNum][BestNowRslts[i].ShNumb],
                    CalcHight,pp2,argv[2],CL2);
        CL2=FALSE;
        pp2=50;
        }
else
        FillProtocol("PROTO SHIFT RSLT?",StripNumber,(const char*)
PROTO.SIGN_name,
                    BestNowRslts[0],FALSE);
#endif
```

```
//      GLOBAL MAX
        for(i=0;i<2;i++)
          if( BestNowRslts[i].R.value>BestRslts[0].R.value)
              {BestRslts[1]=BestRslts[0];
               BestRslts[0]=BestNowRslts[i];
               BestName[1]=BestName[0];
               BestName[0]=PROTO.SIGN_name;
               }
          else
              if( BestNowRslts[i].R.value>BestRslts[1].R.value)
                 {BestRslts[1]=BestNowRslts[i];
                  BestName[1]=PROTO.SIGN_name;
                 }
//——
        }   //Proto closed
     }      //Strips Closed
//      GLOBAL   PROTOCOL   OUTPUT
DIRECT_DECISION:
#ifdef MYDEBUG
 short i;
 short Rows_n=10,Blanc=TRUE;
        LineC<<" Result................... \n";
        _clearscreen( _GCLEARSCREEN );
        for (i=0;i<2;i++)
          {
          PresentRslt("GLOBAL RSLT
?",TARGET,BestRslts[i],NewVrt[BestRslts[i].StrNum][BestRslts[i].ShNumb],
             CalcHight,Rows_n,argv[2],Blanc);
          Blanc=FALSE;
          Rows_n+=50;
          }
else
        FillProtocol("GLOBAL RSLT ?",,(const char *)BestRslts[0].StrNum,
                     (const char*) BestName[0];
                     BestRslts[0],FALSE);

#endif
//
LineC.close();
TARGET.free_PCT();
GRAPH_OUT(0);
return 0;
}
//===============================================================
short ReadHist(const char *PName,short ***H)
{char p[80];
ifstream HFile;
    HFile.open(PName.ios::in|ios::nocreate);
```

```
        if(HFile.fail())
            {HFile.clear(0);
                cout << "CAN NOT OPEN FILE "<<PName<<"\n";
                return 0;
            }

HFile.getline(p,80);    //  LineC<<"Histogrammes\n";
    HFile.getline(p,80);    //<<argv[1]<<"\t"<<prototype.SIGN_name<<'\n';
    HFile>>p>>NumberOfWin;  // <<NumberOfWin<<'\n';

HFile>>p>>HistDim;      //"NumberOfBins-1\t"<<HistDim<<'\n';
    HFile.getline(p,80);    //"Win_pos\n";
    HFile.getline(p,80);    //"Win_pos\n";

(*H)= new (short(*[NumberOfWin]));
short n,j,i,WindowSize;
    for (i=0;i<NumberOfWin;i++)
        (*H)[i]=new short[HistDim];
    for(j=0;j<NumberOfWin;j++)
    {if(j==1)
            HFile>>WindowSize;
        else
            HFile>>n;
        for(i=0;i<HistDim;i++)
            HFile>>(*H)[j][i];
    }
HFile.close();
return(WindowSize);
}
//=============================================================
=========
void FreeHist( short NOfWin, short **H)
{short i;
 for (i=0;i<NOfWin;i++)
        delete H[i];
    delete H;
}

//
=============================================================
========
int get_number_match() // INITIALISATION GRAPHICMODE, GET SCALE
{
    GRAPH_OUT();
        cout << " MAP PlusThresnPnt MinimalVal MaximalVal
HighVoiceThreshold median \n";
```

```
    cin
>>MAP>>PlusThresnPnt>>MinimalVal>>MaximalVal>>HighVoiceThreshold
    >>median;

// ================  GRAPHICS START
    if(GRAPHICS_START(&vc,GRAPHMODE)) GRAPH_OUT(-1);
//================
return 1;
}
//**************************
int get_number_match_f(FILE *f) // INITIALISATION GRAPHICMODE, GET SCALE
{
    fscanf(f," %*[^\n]s ");
    fscanf(f," %d %d %lf %lf %d
%d",&MAP,&PlusThresnPnt,&MinimalVal,&MaximalVal,
            &HighVoiceThreshold,&median);
// Threshold for histogramme    Number Of Points
// for CorrThresh
return 1;
}
//==================INTRODUCTION
int Introduction(int arg, char *a)
{
int FLG_F=0;
FILE *datainf;
short n=0;
 if((arg != 3) && (arg !=4))
      {
        printf(" target-file proto_file_mask \n");
        FLG_F=0;
      return(1);
    }
   else
     if(arg ==4)
        {FLG_F=1;
         if(!(datainf=fopen(a,"r"))) return 0;
        }
if(FLG_F)
   {get_number_match_f(datainf); //    GET SCALE AND PARAMETERS
    fclose (datainf);
   }
else
   get_number_match();
return 0;
}
//=========================================================
==================
//———— Graphic Output
```

```
//================================================================
void draw_DMF(RsltNow Now ,short F,short CH_HIGHT,
        short CH_BASE,
short pos_now,double scale)
{
 short j,k,l,st;
 static short real_size,pos_old;
 short POS;
 static double old_Y;
 POS=10+pos_now;
 _setcolor( color_num(240,240,240));
 if(F)
 {
  old_Y=k=CH_BASE;
  st=CH_HIGHT/10;
  _moveto( 10,k-CH_HIGHT);
  _lineto(10,k);
  _lineto(680,k);
  _moveto(10,k-CH_HIGHT);
  _lineto(680,k-CH_HIGHT);
   for(l=0,j=1;j<11;j++)
      {l+=st;
       _moveto(
            (j==5)?5:((j==10)?0:7)
            ,k-l);
       _lineto(10,k-l);
       }
  pos_old=10;
  }
  _moveto( pos_old,old_Y);
  j=CH_BASE-(short)(Now.value*CH_HIGHT/scale);
  _lineto((short)(POS),j);
  old_Y=j;
  pos_old=POS;
}
//================================================================
```

```
ORIGIN = PWB
ORIGIN_VER = 2.0
PROJ = STRNEW
PROJFILE = STRNEW.MAK
BUILDDIR = obj
DEBUG = 1

BRFLAGS = /o obj\$(PROJ).bsc
BSCMAKE = bscmake
SBRPACK = sbrpack
NMAKEBSC1 = set
NMAKEBSC2 = nmake
BROWSE   = 1
CC  = cl
CFLAGS_G = /W2 /BATCH /FR$*.sbr /Zn
CFLAGS_D = /f /Zi /Od
CFLAGS_R = /f- /Ot /Oi /Ol /Oe /Og /Gs
CXX = cl
CXXFLAGS_G = /AL /W4 /G2 /D_DOS /BATCH /FR$*.sbr /Zn
CXXFLAGS_D = /f- /Ob1 /Od /FPi87 /Zi /DMYDEBUG /DRUN /D_DEBUG
CXXFLAGS_R = /f- /Os /Ol /Og /Oe /Oi /FPi87 /Gs /DMYDEBUG /DRUN
MAPFILE_D = NUL
MAPFILE_R = NUL
LFLAGS_G = /NOI /STACK:32000 /BATCH /ONERROR:NOEXE
LFLAGS_D = /CO /FAR /PACKC
LFLAGS_R = /EXE /FAR /PACKC
LINKER    = link
ILINK = ilink
LRF = echo > NUL
ILFLAGS = /a /e
LLIBS_R = LAFXCR
LLIBS_D = LAFXCRD
LLIBS_G = graphics
CVFLAGS = /25 /S
RUNFLAGS = TST\t10284o plnew.ini FILES = COR_FNC8.CPP PIC_M8.CPP VICAL8.CPP RES_MCH8.CPP
PROJCTN8.CPP\
      COMP_FNC.CPP STRNEW.CPP
OBJS = obj\COR_FNC8.obj obj\PIC_M8.obj obj\VICAL8.obj
obj\RES_MCH8.obj\
      obj\PROJCTN8.obj obj\COMP_FNC.obj obj\STRNEW.obj
SBRS = obj\COR_FNC8.sbr obj\PIC_M8.sbr obj\VICAL8.sbr
obj\RES_MCH8.sbr\
      obj\PROJCTN8.sbr obj\COMP_FNC.sbr obj\STRNEW.sbr all: obj\$(PROJ).exe

.SUFFIXES:
```

```
.SUFFIXES:
.SUFFIXES: .obj .sbr .cpp obj\COR_FNC8.obj : COR_FNC8.CPP C:\C700\INCLUDE\stdio.h\
        C:\C700\INCLUDE\stdlib.h C:\C700\INCLUDE\conio.h\
        C:\C700\INCLUDE\float.h C:\C700\INCLUDE\graph.h cor_fnc8.h
projctn8.h\
        pic_mch8.h res_mch8.h C:\C700\INCLUDE\math.h
C:\C700\INCLUDE\vmemory.h
!IF $(DEBUG)
        @$(CXX) @<<obj\$(PROJ).rsp
/c $(CXXFLAGS_G)
$(CXXFLAGS_D) /Foobj\COR_FNC8.obj COR_FNC8.CPP
<<
!ELSE
        @$(CXX) @<<obj\$(PROJ).rsp
/c $(CXXFLAGS_G)
$(CXXFLAGS_R) /Foobj\COR_FNC8.obj COR_FNC8.CPP
<<
!ENDIF obj\COR_FNC8.sbr : COR_FNC8.CPP C:\C700\INCLUDE\stdio.h\
        C:\C700\INCLUDE\stdlib.h C:\C700\INCLUDE\conio.h\
        C:\C700\INCLUDE\float.h C:\C700\INCLUDE\graph.h cor_fnc8.h
projctn8.h\
        pic_mch8.h res_mch8.h C:\C700\INCLUDE\math.h
C:\C700\INCLUDE\vmemory.h
!IF $(DEBUG)
        @$(CXX) @<<obj\$(PROJ).rsp
/Zs $(CXXFLAGS_G)
$(CXXFLAGS_D) /FRobj\COR_FNC8.sbr COR_FNC8.CPP
<<
!ELSE
        @$(CXX) @<<obj\$(PROJ).rsp
/Zs $(CXXFLAGS_G)
$(CXXFLAGS_R) /FRobj\COR_FNC8.sbr COR_FNC8.CPP
<<
!ENDIF obj\PIC_M8.obj : PIC_M8.CPP C:\C700\INCLUDE\stdlib.h
C:\C700\INCLUDE\stdio.h\
        C:\C700\INCLUDE\graph.h C:\C700\INCLUDE\math.h
C:\C700\INCLUDE\io.h\
        C:\C700\INCLUDE\fcntl.h C:\C700\INCLUDE\string.h\
        C:\C700\INCLUDE\float.h C:\C700\INCLUDE\malloc.h phdr.h vical8.h\
        pic_mch8.h C:\C700\INCLUDE\vmemory.h projctn8.h
!IF $(DEBUG)
        @$(CXX) @<<obj\$(PROJ).rsp
/c $(CXXFLAGS_G)
```

```
        $(CXXFLAGS_D) /Foobj\PIC_M8.obj PIC_M8.CPP
<<
!ELSE
        @$(CXX) @<<obj\$(PROJ).rsp
/c $(CXXFLAGS_G)
$(CXXFLAGS_R) /Foobj\PIC_M8.obj PIC_M8.CPP
<<
!ENDIF obj\PIC_M8.sbr : PIC_M8.CPP C:\C700\INCLUDE\stdlib.h
C:\C700\INCLUDE\stdio.h\
        C:\C700\INCLUDE\graph.h C:\C700\INCLUDE\math.h
C:\C700\INCLUDE\io.h\
        C:\C700\INCLUDE\fcntl.h C:\C700\INCLUDE\string.h\
        C:\C700\INCLUDE\float.h C:\C700\INCLUDE\malloc.h phdr.h vical8.h\
        pic_mch8.h C:\C700\INCLUDE\vmemory.h projctn8.h
!IF $(DEBUG)
        @$(CXX) @<<obj\$(PROJ).rsp
/Zs $(CXXFLAGS_G)
$(CXXFLAGS_D) /FRobj\PIC_M8.sbr PIC_M8.CPP
<<
!ELSE
        @$(CXX) @<<obj\$(PROJ).rsp
/Zs $(CXXFLAGS_G)
$(CXXFLAGS_R) /FRobj\PIC_M8.sbr PIC_M8.CPP
<<
!ENDIF obj\VICAL8.obj : VICAL8.CPP C:\C700\INCLUDE\stdlib.h
C:\C700\INCLUDE\stdio.h\
        C:\C700\INCLUDE\vmemory.h C:\C700\INCLUDE\malloc.h
!IF $(DEBUG)
        @$(CXX) @<<obj\$(PROJ).rsp
/c $(CXXFLAGS_G)
$(CXXFLAGS_D) /Foobj\VICAL8.obj VICAL8.CPP
<<
!ELSE
        @$(CXX) @<<obj\$(PROJ).rsp
/c $(CXXFLAGS_G)
$(CXXFLAGS_R) /Foobj\VICAL8.obj VICAL8.CPP
<<
!ENDIF obj\VICAL8.sbr : VICAL8.CPP C:\C700\INCLUDE\stdlib.h
C:\C700\INCLUDE\stdio.h\
        C:\C700\INCLUDE\vmemory.h C:\C700\INCLUDE\malloc.h
!IF $(DEBUG)
        @$(CXX) @<<obj\$(PROJ).rsp
/Zs $(CXXFLAGS_G)
```

```
    $(CXXFLAGS_D) /FRobj\VICAL8.sbr VICAL8.CPP
<<
!ELSE
        @$(CXX) @<<obj\$(PROJ).rsp
/Zs $(CXXFLAGS_G)
$(CXXFLAGS_R) /FRobj\VICAL8.sbr VICAL8.CPP
<<
!ENDIF obj\RES_MCH8.obj : RES_MCH8.CPP C:\C700\INCLUDE\stdlib.h\
        C:\C700\INCLUDE\vmemory.h res_mch8.h
C:\C700\INCLUDE\graph.h\
        projctn8.h pic_mch8.h C:\C700\INCLUDE\math.h
!IF $(DEBUG)
        @$(CXX) @<<obj\$(PROJ).rsp
/c $(CXXFLAGS_G)
$(CXXFLAGS_D) /Foobj\RES_MCH8.obj RES_MCH8.CPP
<<
!ELSE
        @$(CXX) @<<obj\$(PROJ).rsp
/c $(CXXFLAGS_G)
$(CXXFLAGS_R) /Foobj\RES_MCH8.obj RES_MCH8.CPP
<<
!ENDIF obj\RES_MCH8.sbr : RES_MCH8.CPP C:\C700\INCLUDE\stdlib.h\
        C:\C700\INCLUDE\vmemory.h res_mch8.h
C:\C700\INCLUDE\graph.h\
        projctn8.h pic_mch8.h C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\RES_MCH8.sbr RES_MCH8.CPP
<<
!ELSE
        @$(CXX) @<<obj\$(PROJ).rsp
/Zs $(CXXFLAGS_G)
$(CXXFLAGS_R) /FRobj\RES_MCH8.sbr RES_MCH8.CPP
<<
!ENDIF obj\PROJCTN8.obj : PROJCTN8.CPP C:\C700\INCLUDE\graph.h\
        C:\C700\INCLUDE\stdlib.h C:\C700\INCLUDE\iostream.h projctn8.h\
        C:\C700\INCLUDE\ios.h C:\C700\INCLUDE\streamb.h\
        C:\C700\INCLUDE\istream.h C:\C700\INCLUDE\ostream.h\
        C:\C700\INCLUDE\math.h
!IF $(DEBUG)
        @$(CXX) @<<obj\$(PROJ).rsp
/c $(CXXFLAGS_G)
```

145

```
$(CXXFLAGS_D) /Foobj\PROJCTN8.obj PROJCTN8.CPP
<<
!ELSE
        @$(CXX) @<<obj\$(PROJ).rsp
/c $(CXXFLAGS_G)
$(CXXFLAGS_R) /Foobj\PROJCTN8.obj PROJCTN8.CPP
<<
!ENDIF obj\PROJCTN8.sbr : PROJCTN8.CPP C:\C700\INCLUDE\graph.h\
        C:\C700\INCLUDE\stdlib.h C:\C700\INCLUDE\iostream.h projctn8.h\
        C:\C700\INCLUDE\ios.h C:\C700\INCLUDE\streamb.h\
        C:\C700\INCLUDE\istream.h C:\C700\INCLUDE\ostream.h\
        C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\PROJCTN8.sbr PROJCTN8.CPP
<<
!ELSE
        @$(CXX) @<<obj\$(PROJ).rsp
/Zs $(CXXFLAGS_G)
$(CXXFLAGS_R) /FRobj\PROJCTN8.sbr PROJCTN8.CPP
<<
!ENDIF obj\COMP_FNC.obj : COMP_FNC.CPP comp_fnc.h projctn8.h
C:\C700\INCLUDE\math.h\
        C:\C700\INCLUDE\graph.h
!IF $(DEBUG)
        @$(CXX) @<<obj\$(PROJ).rsp
/c $(CXXFLAGS_G)
$(CXXFLAGS_D) /Foobj\COMP_FNC.obj COMP_FNC.CPP
<<
!ELSE
        @$(CXX) @<<obj\$(PROJ).rsp
/c $(CXXFLAGS_G)
$(CXXFLAGS_R) /Foobj\COMP_FNC.obj COMP_FNC.CPP
<<
!ENDIF obj\COMP_FNC.sbr : COMP_FNC.CPP comp_fnc.h projctn8.h
C:\C700\INCLUDE\math.h\
        C:\C700\INCLUDE\graph.h
!IF $(DEBUG)
        @$(CXX) @<<obj\$(PROJ).rsp
/Zs $(CXXFLAGS_G)
$(CXXFLAGS_D) /FRobj\COMP_FNC.sbr COMP_FNC.CPP
<<
```

```
!ELSE
    @$(CXX) @<<obj\$(PROJ).rsp
/Zs $(CXXFLAGS_G)
$(CXXFLAGS_R) /FRobj\COMP_FNC.sbr COMP_FNC.CPP
<<
!ENDIF obj\STRNEW.obj : STRNEW.CPP C:\C700\INCLUDE\stdlib.h
C:\C700\INCLUDE\conio.h\
        C:\C700\INCLUDE\stdio.h C:\C700\INCLUDE\string.h\
        C:\C700\INCLUDE\graph.h C:\C700\INCLUDE\float.h\
        C:\C700\MFC\INCLUDE\afx.h C:\C700\INCLUDE\fstream.h\
        C:\C700\INCLUDE\time.h mylibmd.h comp_fnc.h cor_fnc8.h\
        C:\C700\INCLUDE\ctype.h C:\C700\MFC\INCLUDE\afx.inl\
        C:\C700\INCLUDE\iostream.h projctn8.h pic_mch8.h res_mch8.h\
        C:\C700\INCLUDE\ios.h C:\C700\INCLUDE\streamb.h\
        C:\C700\INCLUDE\istream.h C:\C700\INCLUDE\ostream.h\
        C:\C700\INCLUDE\math.h C:\C700\INCLUDE\vmemory.h
!IF $(DEBUG)
    @$(CXX) @<<obj\$(PROJ).rsp
/c $(CXXFLAGS_G)
$(CXXFLAGS_D) /Foobj\STRNEW.obj STRNEW.CPP
<<
!ELSE
    @$(CXX) @<<obj\$(PROJ).rsp
/c $(CXXFLAGS_G)
$(CXXFLAGS_R) /Foobj\STRNEW.obj STRNEW.CPP
<<
!ENDIF obj\STRNEW.sbr : STRNEW.CPP C:\C700\INCLUDE\stdlib.h
C:\C700\INCLUDE\conio.h\
        C:\C700\INCLUDE\stdio.h C:\C700\INCLUDE\string.h\
        C:\C700\INCLUDE\graph.h C:\C700\INCLUDE\float.h\
        C:\C700\MFC\INCLUDE\afx.h C:\C700\INCLUDE\fstream.h\
        C:\C700\INCLUDE\time.h mylibmd.h comp_fnc.h cor_fnc8.h\
        C:\C700\INCLUDE\ctype.h C:\C700\MFC\INCLUDE\afx.inl\
        C:\C700\INCLUDE\iostream.h projctn8.h pic_mch8.h res_mch8.h\
        C:\C700\INCLUDE\ios.h C:\C700\INCLUDE\streamb.h\
        C:\C700\INCLUDE\istream.h C:\C700\INCLUDE\ostream.h\
        C:\C700\INCLUDE\math.h C:\C700\INCLUDE\vmemory.h
!IF $(DEBUG)
    @$(CXX) @<<obj\$(PROJ).rsp
/Zs $(CXXFLAGS_G)
$(CXXFLAGS_D) /FRobj\STRNEW.sbr STRNEW.CPP
<<
!ELSE
    @$(CXX) @<<obj\$(PROJ).rsp
/Zs $(CXXFLAGS_G)
```

```
     $(CXXFLAGS_R) /FRobj\STRNEW.sbr STRNEW.CPP
<<
!ENDIF obj\$(PROJ).bsc : $(SBRS)
     $(BSCMAKE) @<<
$(BRFLAGS) $(SBRS)
<< obj\$(PROJ).exe : $(OBJS)
     -$(NMAKEBSC1) MAKEFLAGS=
     -$(NMAKEBSC2) $(NMFLAGS) -f $(PROJFILE) obj\$(PROJ).bsc
!IF $(DEBUG)
     $(LRF) @<<obj\$(PROJ).lrf
$(RT_OBJS: = +^
) $(OBJS: = +^
)
$@
$(MAPFILE_D)
$(LIBS: = +^
) +
$(LLIBS_G: = +^
) +
$(LLIBS_D: = +^
)
$(DEF_FILE) $(LFLAGS_G) $(LFLAGS_D);
<<
!ELSE
     $(LRF) @<<obj\$(PROJ).lrf
$(RT_OBJS: = +^
) $(OBJS: = +^
)
$@
$(MAPFILE_R)
$(LIBS: = +^
) +
$(LLIBS_G: = +^
) +
$(LLIBS_R: = +^
)
$(DEF_FILE) $(LFLAGS_G) $(LFLAGS_R);
<<
!ENDIF
     $(LINKER) @obj\$(PROJ).lrf .cpp.obj :
!IF $(DEBUG)
```

```
        @$(CXX) @<<obj\$(PROJ).rsp
/c $(CXXFLAGS_G)
$(CXXFLAGS_D) /Fo$@ $<
<<
!ELSE
        @$(CXX) @<<obj\$(PROJ).rsp
/c $(CXXFLAGS_G)
$(CXXFLAGS_R) /Fo$@ $<
<<
!ENDIF .cpp.sbr :
!IF $(DEBUG)
        @$(CXX) @<<obj\$(PROJ).rsp
/Zs $(CXXFLAGS_G)
$(CXXFLAGS_D) /FR$@ $<
<<
!ELSE
        @$(CXX) @<<obj\$(PROJ).rsp
/Zs $(CXXFLAGS_G)
$(CXXFLAGS_R) /FR$@ $<
<<
!ENDIF run: obj\$(PROJ).exe
        obj\$(PROJ).exe $(RUNFLAGS)

debug: obj\$(PROJ).exe
        CV $(CVFLAGS) obj\$(PROJ).exe $(RUNFLAGS)
```

```
//         LINE-SELECTION
// COMMAND STRING
//
// Ins_corr <TARGET_name> [CommandFile]
//
//     <TARGET_name>  File name of FRAME without extention
//     [CommandFile]  Optional ASCI file with a run time parameters.
//
// INPUT
//     RGB files of frame (field) and corresponding .SGN files created by
// module PLINE.
// RUN TIME parameters:
//
//fscanf(f," %d %d %d",&MinSlope,&MaxSlope,&SlopeStep,);
//SEE ALSO FILE "PLiNes.Ini"
// OUTPUT
//     TARGET_name.stp    - all local max lines;
//     TARGET_name.pn2    - lines after cleaning selected;
//     TARGET_name.pln    - Strips selected;
//     LINEDET.002        - result collection for analises,
//                          includes keyboard information for analyse.

#include <stdlib.h>
#include <conio.h>
#include <stdio.h>
#include <string.h>
#include <graph.h>
#include <float.H>
#include <afx.h>
#include <fstream.h>
#include <time.h>
#include "mylibmd.h"
#include "COMP_FNC.h"
#include "COr_FNC8.h"
include <ctype.h> short MaxStripNumber= 16;
short DistanceThresh=10;
short DetectorWidthPlus=4;
short MinSlope=-20, MaxSlope=20, SlopeStep=2;

GOOD_DIR_LINE __huge Lines[300];
AVERAGE_VEC __huge AverageForLines[300];

struct _videoconfig vc;
double GAMMA=1.0,CORR_THRESH=0,Thresh_mdl=0;
short VOITING=0,MAP=0;
char f_name[40]="_",FILE_name[40]="_", FRAME_Name[40]="_";
```

```
PCT pict_target, target_map;

void WriteLines(GOOD_DIR_LINE *L,short MaxN, const char *name);
void WritePears(GOOD_DIR_LINE *L,short MaxN, const char *name,short
PMax);

int __cdecl compare_array_elem ( const void *elem1,const void *elem2 );
int Introduction(int arg, char *a);
//=================================================================
=====
ofstream LineC;
//=============================================
int main(int argc,char* argv[])
{short i,j;
char *p,mess[128],clean[]="                                    ";
    if(Introduction(argc,argv[argc-1])) return-1;

// PROTOCOL OUTPUT
// ================   GRAPHICS START
        if(GRAPHICS_START(&vc,GRAPHMODE)) GRAPH_OUT(-1);
//==================
//========= TARGET PICTURE name and vertexes
    SCR_PNT target_pos(0,0);      // CONSTRACTOR default 0,0
    pict_target=sign_storage_rgb(argv[1],vc );
    sign_present_RGB(pict_target,target_pos);
//=========

SCR_PNT StartPnt(0,0),EndPnt(pict_target.s_cols-1,0);
short Slope,Start,Stop;
GOOD_DIR_LINE LocalMax[51];
//DEBUG

// GRAPH_OUT(0);

//           LOOP over SLOPE
       for(Slope=MinSlope;Slope<=MaxSlope;Slope+=SlopeStep)
           {
_settextposition( vc.numtextrows-3,0);
printf("Slope %d",Slope);
       Start=__max(0,-Slope);
       Stop=__min(pict_target.s_rows,pict_target.s_rows-Slope);
//         LINE Calculation
       for (EndPnt.r=(StartPnt.r=Start)+Slope;
           StartPnt.r<Stop;StartPnt.r++,EndPnt.r++)
              {
              Lines[StartPnt.r]=

GOOD_DIR_LINE::GOOD_DIR_LINE(StartPnt,EndPnt);
```

/51/

```
                AverageForLines[StartPnt.r]=LineMoments(pict_target,Lines[StartPnt.r],MAP)
            ;
                        }
//           Line Estimation short StartRow,Q0,QUp,QDown;
        for (StartRow=Start;StartRow<Stop-
DetectorWidthPlus;StartRow++)
                Lines[StartRow].Qual=Quality(AverageForLines+StartRow);
//DEBUG
#ifdef DBG0
            _clearscreen( _GCLEARSCREEN );
            sign_present_RGB(pict_target,target_pos);
        for (StartRow=Start;StartRow<Stop-DetectorWidthPlus;StartRow++)
            { _moveto(0, StartRow );
              _lineto(10,StartRow+Slope+1);
              _moveto(255, StartRow+Slope+1 );

_lineto(255+(short)(Lines[StartRow].Qual*0.5),StartRow+Slope+1);
            _settextposition( vc.numtextrows-2,0);
            _outtext( clean );
            _settextposition( vc.numtextrows-2,0);
            sprintf(mess,"Quality= %6g ",Lines[StartRow].Qual );
            _outtext( mess);*/
            }
        getch();
#endif
//       Line Selection
        for (QUp=0,StartRow=__max(0,-Slope);
                    StartRow<Stop;StartRow++)
                {
                QO=Lines[StartRow].Qual;
                QDown=(StartRow!=Stop-1)?Lines[StartRow].Qual:0;
                if((Q0>=QDown)&&(Q0>=QUp))
                    {LocalMax[50]=Lines[StartRow];
//including in consideration
                    qsort((void*)LocalMax,51,sizeof(GOOD_DIR_LINE
),
                        compare_GOOD_DIR_LINE);
                    }
                QUp=Q0;
                }
        }//   End Slope LOOP
CString ProName(argv[1]);
    ProName+=".pln";
WriteLines(LocalMax,51 , (const char *)ProName);
```

```
//  line grouping
PT st_main,end_main,st_scnd,end_scnd;
        for(i=0;i<51;i++)
          if(LocalMax[i].Qual>0)
           {st_main=LocalMax[i].Start_p();
            end_main=LocalMax[i].End_p();
            for(j=i+1;j<51;j++)
              if(LocalMax[j].Qual>0)
               {st_scnd=LocalMax[j].Start_p();
                end_scnd=LocalMax[j].End_p();
                if((fabs(st_main.v-st_scnd.v)<DistanceThresh)||
                   (fabs(end_main.v-end_scnd.v)<DistanceThresh))
                     LocalMax[j].Qual=0.0;
               }
           }
        qsort((void*)LocalMax,51,sizeof(GOOD_DIR_LINE),
                         compare_GOOD_DIR_LINE);
    ProName=argv[1];
        ProName+=".stp";
WriteLines(LocalMax,51 , (const char *)ProName);
 ProName=argv[1];
        ProName+=".pn2";

WritePears(LocalMax,51 , (const char *)ProName, MaxStripNumber);

GRAPH_OUT();
pict_target.free_PCT();
return(0);
}

// ================================================================
========
int get_number_plines() // INITIALISATION GRAPHICMODE, GET SCALE
{
    GRAPH_OUT();
        cout << " MinSlope -20, MaxSlope 20, SlopeStep2 DistanceThresh 10
MAP \n";
        cout <<
           " NTSC 0 ColorPlanl 1 New_plan 2 RGB 3 LUMIN_THR 4 IHS 5
\n";

cin >>MinSlope>> MaxSlope>>SlopeStep>>DistanceThresh>>MAP;

// =============== GRAPHICS START
        if(GRAPHICS_START(&vc,GRAPHMODE)) GRAPH_OUT(-1);
//================
return 1;
}
```

```c
//*************************
int get_number_plines_f(FILE *f) // INITIALISATION GRAPHICMODE, GET SCALE
{
    fscanf(f," %*[^\n]s ");
    fscanf(f," %d %d %d %d",&MinSlope,&MaxSlope,&SlopeStep,&DistanceThresh,
                                               &MAP);
// Threshold for histogramme    Number Of Points
// for CorrThresh
return 1;
}
//==================INTRODUCTION
int Introduction(int arg, char *a)
{
int FLG_F=0;
FILE *datainf;
short n=0;
  if((arg != 2) && (arg !=3))
      {
        printf(" target-file \n");
        FLG_F=0;
      return(1);
    }
   else
     if(arg ==3)
         {FLG_F=1;
         if(!(datainf=fopen(a,"r"))) return 0;
         }
if(FLG_F)
    {get_number_plines_f(datainf); //    GET SCALE AND PARAMETERS
     fclose (datainf);
    }
else
   get_number_plines();
return 0;
}
//============================================================
==================
void WriteLines(GOOD_DIR_LINE *L,short MaxN, const char *name)
{
 LineC.open(name,ios::out || ios::trunc);
if(LineC.fail())
       {LineC.clear(0);
         cout << "CAN NOT OPEN StripCollection";
        GRAPH_OUT(-1);
       }
   LineC<<" # \t st_X \t st_Y \t end_X \t end_y \t Value\n";
// OUTPUT all 51 line
```

154

```
short i;
PT st,end;
    for(i=0;i<MaxN;i++)
        if((L+i)->Qual>0)
            {st=(L+i)->Start_p();end=(L+i)->End_p();
              LineC<< i<<" \t"<< (short)st.u<<" \t"<<(short)st.v+2<<
                    " \t"<< end.u<<" \t"<< end.v+2<<
              " \t"<<(L+i)->Qual<<"\n";
                }
LineC.close();
}
//================================================================
void WritePears(GOOD_DIR_LINE *L,short MaxN, const char *name,short PMax)
{
 LineC.open(name,ios::out||ios::trunc);
 if(LineC.fail())
        {LineC.clear(0);
          cout << "CAN NOT OPEN StripCollection";
          GRAPH_OUT(-1);
        }
LineC<<" Strip_Collection \n";
// OUTPUT 16 pears
short i,n=0,j;
PT st,end,st2,end2;
    for(i=0;i<MaxN-1;i++)
        if((L+i)->Qual>0)
            {st=(L+i)->Start_p();end=(L+i)->End_p();
              for(j=i+1;(n<PMax) && (j<MaxN);j++)
                if((L+j)->Qual>0)
                   {n++;
                     LineC<< (short)st.u<<" \t"<<
                        (short)st.v+2<<" \t"<< end.u<<" \t"<< end.v+2<<'\n';
                     st2=(L+j)->Start_p();end2=(L+j)->End_p();
                     LineC<< (short)st2.u<<" \t"<<
                        (short)st2.v+2<<" \t"<< end2.u<<" \t"<<
end2.v+2<<'\n';
                   }
            }
LineC.close();
}
//================================================================
```

```
ORIGIN = PWB
ORIGIN_VER = 2.0
PROJ = LN_DEC2
PROJFILE = LN_DEC2.mak
BUILDDIR = obj
DEBUG = 1

BRFLAGS  = /o obj\$(PROJ).bsc
BSCMAKE  = bscmake
SBRPACK  = sbrpack
NMAKEBSC1 = set
NMAKEBSC2 = nmake
BROWSE   = 1
CC  = cl
CFLAGS_G  = /W2 /BATCH /FR$*.sbr /Zn
CFLAGS_D  = /f /Zi /Od
CFLAGS_R  = /f- /Ot /Oi /Ol /Oe /Og /Gs
CXX  = cl
CXXFLAGS_G  = /AL /W4 /G2 /D_DOS /BATCH /FR$*.sbr /Zn
CXXFLAGS_D  = /f- /Od /FPi87 /Zi /DMICI /DSINGLE_WIN /D_DEBUG
CXXFLAGS_R  = /f- /Ot /Ol /Og /Oe /Oi /FPi87 /Gs /DMICI /DSINGLE_WIN
MAPFILE_D = NUL
MAPFILE_R = NUL
LFLAGS_G = /NOI /STACK:32000 /BATCH /ONERROR:NOEXE
LFLAGS_D = /CO /FAR /PACKC
LFLAGS_R = /EXE /FAR /PACKC
LINKER      = link
ILINK = ilink
LRF  = echo > NUL
ILFLAGS  = /a /e
LLIBS_R  = LAFXCR
LLIBS_D  = LAFXCRD
LLIBS_G  = graphics
CVFLAGS  = /25 /S
RUNFLAGS  = \ilya\pnewline\tst\t0234e ln_dec.ini FILES  = ..\LIB\VICALLOC.CPP ..\LIB\PROJCTN7.CPP ..\LIB\PIC_M7.CPP\
       ..\LIB\RES_MCH7.CPP ..\LIB\L_TRN7.CPP LN_TPL1.CPP
LN_DEC2.CPP
OBJS  = obj\VICALLOC.obj obj\PROJCTN7.obj obj\PIC_M7.obj
obj\RES_MCH7.obj\
       obj\L_TRN7.obj obj\LN_TPL1.obj obj\LN_DEC2.obj
SBRS  = obj\VICALLOC.sbr obj\PROJCTN7.sbr obj\PIC_M7.sbr
obj\RES_MCH7.sbr\
       obj\L_TRN7.sbr obj\LN_TPL1.sbr obj\LN_DEC2.sbr all: obj\$(PROJ).exe

.SUFFIXES:
```

```
.SUFFIXES:
.SUFFIXES: .obj .sbr .cpp obj\VICALLOC.obj : ..\LIB\VICALLOC.CPP C:\C700\INCLUDE\stdlib.h\
        C:\C700\INCLUDE\stdio.h C:\C700\INCLUDE\vmemory.h\
        C:\C700\INCLUDE\malloc.h
!IF $(DEBUG)
        @$(CXX) @<<obj\$(PROJ).rsp
/c $(CXXFLAGS_G)
$(CXXFLAGS_D) /Foobj\VICALLOC.obj ..\LIB\VICALLOC.CPP
<<
!ELSE
        @$(CXX) @<<obj\$(PROJ).rsp
/c $(CXXFLAGS_G)
$(CXXFLAGS_R) /Foobj\VICALLOC.obj ..\LIB\VICALLOC.CPP
<<
!ENDIF obj\VICALLOC.sbr : ..\LIB\VICALLOC.CPP C:\C700\INCLUDE\stdlib.h\
        C:\C700\INCLUDE\stdio.h C:\C700\INCLUDE\vmemory.h\
        C:\C700\INCLUDE\malloc.h
!IF $(DEBUG)
        @$(CXX) @<<obj\$(PROJ).rsp
/Zs $(CXXFLAGS_G)
$(CXXFLAGS_D) /FRobj\VICALLOC.sbr ..\LIB\VICALLOC.CPP
<<
!ELSE
        @$(CXX) @<<obj\$(PROJ).rsp
/Zs $(CXXFLAGS_G)
$(CXXFLAGS_R) /FRobj\VICALLOC.sbr ..\LIB\VICALLOC.CPP
<<
!ENDIF obj\PROJCTN7.obj : ..\LIB\PROJCTN7.CPP C:\C700\INCLUDE\graph.h\
        C:\C700\INCLUDE\stdlib.h C:\C700\INCLUDE\iostream.h
..\LIB\projctn7.h\
        C:\C700\INCLUDE\ios.h C:\C700\INCLUDE\streamb.h\
        C:\C700\INCLUDE\istream.h C:\C700\INCLUDE\ostream.h\
        C:\C700\INCLUDE\math.h
!IF $(DEBUG)
        @$(CXX) @<<obj\$(PROJ).rsp
/c $(CXXFLAGS_G)
$(CXXFLAGS_D) /Foobj\PROJCTN7.obj ..\LIB\PROJCTN7.CPP
<<
!ELSE
        @$(CXX) @<<obj\$(PROJ).rsp
/c $(CXXFLAGS_G)
$(CXXFLAGS_R) /Foobj\PROJCTN7.obj ..\LIB\PROJCTN7.CPP
<<
```

!ENDIF obj\PROJCTN7.sbr : ..\LIB\PROJCTN7.CPP C:\C700\INCLUDE\graph.h\
    C:\C700\INCLUDE\stdlib.h C:\C700\INCLUDE\iostream.h
..\LIB\projctn7.h\
    C:\C700\INCLUDE\ios.h C:\C700\INCLUDE\streamb.h\
    C:\C700\INCLUDE\istream.h C:\C700\INCLUDE\ostream.h\
    C:\C700\INCLUDE\math.h
!IF $(DEBUG)
    @$(CXX) @<<obj\$(PROJ).rsp
/Zs $(CXXFLAGS_G)
$(CXXFLAGS_D) /FRobj\PROJCTN7.sbr ..\LIB\PROJCTN7.CPP
<<
!ELSE
    @$(CXX) @<<obj\$(PROJ).rsp
/Zs $(CXXFLAGS_G)
$(CXXFLAGS_R) /FRobj\PROJCTN7.sbr ..\LIB\PROJCTN7.CPP
<<
!ENDIF obj\PIC_M7.obj : ..\LIB\PIC_M7.CPP C:\C700\INCLUDE\stdlib.h\
    C:\C700\INCLUDE\stdio.h C:\C700\INCLUDE\graph.h
C:\C700\INCLUDE\math.h\
    C:\C700\INCLUDE\io.h C:\C700\INCLUDE\fcntl.h
C:\C700\INCLUDE\string.h\
    C:\C700\INCLUDE\float.h C:\C700\INCLUDE\malloc.h ..\LIB\phdr.h\
    ..\LIB\vicalloc.h ..\LIB\pic_mch7.h C:\C700\INCLUDE\vmemory.h\
    ..\LIB\projctn7.h
!IF $(DEBUG)
    @$(CXX) @<<obj\$(PROJ).rsp
/c $(CXXFLAGS_G)
$(CXXFLAGS_D) /Foobj\PIC_M7.obj ..\LIB\PIC_M7.CPP
<<
!ELSE
    @$(CXX) @<<obj\$(PROJ).rsp
/c $(CXXFLAGS_G)
$(CXXFLAGS_R) /Foobj\PIC_M7.obj ..\LIB\PIC_M7.CPP
<<
!ENDIF obj\PIC_M7.sbr : ..\LIB\PIC_M7.CPP C:\C700\INCLUDE\stdlib.h\
    C:\C700\INCLUDE\stdio.h C:\C700\INCLUDE\graph.h
C:\C700\INCLUDE\math.h\
    C:\C700\INCLUDE\io.h C:\C700\INCLUDE\fcntl.h
C:\C700\INCLUDE\string.h\
    C:\C700\INCLUDE\float.h C:\C700\INCLUDE\malloc.h ..\LIB\phdr.h\
    ..\LIB\vicalloc.h ..\LIB\pic_mch7.h C:\C700\INCLUDE\vmemory.h\
    ..\LIB\projctn7.h
!IF $(DEBUG)

```
        @$(CXX) @<<obj\$(PROJ).rsp
/Zs $(CXXFLAGS_G)
$(CXXFLAGS_D) /FRobj\PIC_M7.sbr ..\LIB\PIC_M7.CPP
<<
!ELSE
        @$(CXX) @<<obj\$(PROJ).rsp
/Zs $(CXXFLAGS_G)
$(CXXFLAGS_R) /FRobj\PIC_M7.sbr ..\LIB\PIC_M7.CPP
<<
!ENDIF obj\RES_MCH7.obj : ..\LIB\RES_MCH7.CPP C:\C700\INCLUDE\stdlib.h\
        C:\C700\INCLUDE\vmemory.h ..\LIB\pic_mch7.h ..\LIB\res_mch7.h\
        C:\C700\INCLUDE\graph.h ..\LIB\projctn7.h C:\C700\INCLUDE\math.h
!IF $(DEBUG)
        @$(CXX) @<<obj\$(PROJ).rsp
/c $(CXXFLAGS_G)
$(CXXFLAGS_D) /Foobj\RES_MCH7.obj ..\LIB\RES_MCH7.CPP
<<
!ELSE
        @$(CXX) @<<obj\$(PROJ).rsp
/c $(CXXFLAGS_G)
$(CXXFLAGS_R) /Foobj\RES_MCH7.obj ..\LIB\RES_MCH7.CPP
<<
!ENDIF obj\RES_MCH7.sbr : ..\LIB\RES_MCH7.CPP C:\C700\INCLUDE\stdlib.h\
        C:\C700\INCLUDE\vmemory.h ..\LIB\pic_mch7.h ..\LIB\res_mch7.h\
        C:\C700\INCLUDE\graph.h ..\LIB\projctn7.h C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\RES_MCH7.sbr ..\LIB\RES_MCH7.CPP
<<
!ELSE
        @$(CXX) @<<obj\$(PROJ).rsp
/Zs $(CXXFLAGS_G)
$(CXXFLAGS_R) /FRobj\RES_MCH7.sbr ..\LIB\RES_MCH7.CPP
<<
!ENDIF obj\L_TRN7.obj : ..\LIB\L_TRN7.CPP C:\C700\INCLUDE\stdlib.h\
        C:\C700\INCLUDE\stdio.h C:\C700\INCLUDE\conio.h\
        C:\C700\INCLUDE\malloc.h ..\LIB\vicalloc.h ..\LIB\lin_trn7.h\
        C:\C700\INCLUDE\vmemory.h ..\LIB\projctn7.h ..\LIB\res_mch7.h\
        ..\LIB\pic_mch7.h C:\C700\INCLUDE\math.h
C:\C700\INCLUDE\graph.h
!IF $(DEBUG)
        @$(CXX) @<<obj\$(PROJ).rsp
```

```
/c $(CXXFLAGS_G)
$(CXXFLAGS_D) /Foobj\L_TRN7.obj ..\LIB\L_TRN7.CPP
<<
!ELSE
        @$(CXX) @<<obj\$(PROJ).rsp
/c $(CXXFLAGS_G)
$(CXXFLAGS_R) /Foobj\L_TRN7.obj ..\LIB\L_TRN7.CPP
<<
!ENDIF obj\L_TRN7.sbr : ..\LIB\L_TRN7.CPP C:\C700\INCLUDE\stdlib.h\
        C:\C700\INCLUDE\stdio.h C:\C700\INCLUDE\conio.h\
        C:\C700\INCLUDE\malloc.h ..\LIB\vicalloc.h ..\LIB\lin_trn7.h\
        C:\C700\INCLUDE\vmemory.h ..\LIB\projctn7.h ..\LIB\res_mch7.h\
        ..\LIB\pic_mch7.h C:\C700\INCLUDE\math.h
C:\C700\INCLUDE\graph.h
!IF $(DEBUG)
        @$(CXX) @<<obj\$(PROJ).rsp
/Zs $(CXXFLAGS_G)
$(CXXFLAGS_D) /FRobj\L_TRN7.sbr ..\LIB\L_TRN7.CPP
<<
!ELSE
        @$(CXX) @<<obj\$(PROJ).rsp
/Zs $(CXXFLAGS_G)
$(CXXFLAGS_R) /FRobj\L_TRN7.sbr ..\LIB\L_TRN7.CPP
<<
!ENDIF obj\LN_TPL1.obj : LN_TPL1.CPP C:\C700\INCLUDE\stdio.h
C:\C700\INCLUDE\stdlib.h\
        C:\C700\INCLUDE\conio.h C:\C700\INCLUDE\malloc.h\
        C:\C700\INCLUDE\float.h C:\C700\INCLUDE\graph.h\
        C:\C700\INCLUDE\string.h C:\C700\INCLUDE\ctype.h match5.h\
        ..\LIB\pic_mch7.h ..\LIB\projctn7.h ..\LIB\res_mch7.h\
        ..\LIB\lin_trn7.h C:\C700\INCLUDE\vmemory.h
C:\C700\INCLUDE\math.h
!IF $(DEBUG)
        @$(CXX) @<<obj\$(PROJ).rsp
/c $(CXXFLAGS_G)
$(CXXFLAGS_D) /Foobj\LN_TPL1.obj LN_TPL1.CPP
<<
!ELSE
        @$(CXX) @<<obj\$(PROJ).rsp
/c $(CXXFLAGS_G)
$(CXXFLAGS_R) /Foobj\LN_TPL1.obj LN_TPL1.CPP
<<
!ENDIF
```

```
obj\LN_TPL1.sbr : LN_TPL1.CPP C:\C700\INCLUDE\stdio.h
C:\C700\INCLUDE\stdlib.h\
        C:\C700\INCLUDE\conio.h C:\C700\INCLUDE\malloc.h\
        C:\C700\INCLUDE\float.h C:\C700\INCLUDE\graph.h\
        C:\C700\INCLUDE\string.h C:\C700\INCLUDE\ctype.h match5.h\
        ..\LIB\pic_mch7.h ..\LIB\projctn7.h ..\LIB\res_mch7.h\
        ..\LIB\lin_trn7.h C:\C700\INCLUDE\vmemory.h
C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\LN_TPL1.sbr LN_TPL1.CPP
<<
!ELSE
        @$(CXX) @<<obj\$(PROJ).rsp
/Zs $(CXXFLAGS_G)
$(CXXFLAGS_R) /FRobj\LN_TPL1.sbr LN_TPL1.CPP
<<
!ENDIF obj\LN_DEC2.obj : LN_DEC2.CPP C:\C700\INCLUDE\stdlib.h
C:\C700\INCLUDE\conio.h\
        C:\C700\INCLUDE\stdio.h C:\C700\INCLUDE\string.h\
        C:\C700\INCLUDE\graph.h C:\C700\INCLUDE\float.h\
        C:\C700\MFC\INCLUDE\afx.h C:\C700\INCLUDE\fstream.h\
        C:\C700\INCLUDE\time.h match5.h ..\LIB\vicalloc.h\
        C:\C700\INCLUDE\ctype.h C:\C700\MFC\INCLUDE\afx.inl\
        C:\C700\INCLUDE\iostream.h ..\LIB\projctn7.h ..\LIB\pic_mch7.h\
        ..\LIB\res_mch7.h ..\LIB\lin_trn7.h C:\C700\INCLUDE\vmemory.h\
        C:\C700\INCLUDE\ios.h C:\C700\INCLUDE\streamb.h\
        C:\C700\INCLUDE\istream.h C:\C700\INCLUDE\ostream.h\
        C:\C700\INCLUDE\math.h
!IF $(DEBUG)
        @$(CXX) @<<obj\$(PROJ).rsp
/c $(CXXFLAGS_G)
$(CXXFLAGS_D) /Foobj\LN_DEC2.obj LN_DEC2.CPP
<<
!ELSE
        @$(CXX) @<<obj\$(PROJ).rsp
/c $(CXXFLAGS_G)
$(CXXFLAGS_R) /Foobj\LN_DEC2.obj LN_DEC2.CPP
<<
!ENDIF obj\LN_DEC2.sbr : LN_DEC2.CPP C:\C700\INCLUDE\stdlib.h
C:\C700\INCLUDE\conio.h\
        C:\C700\INCLUDE\stdio.h C:\C700\INCLUDE\string.h\
        C:\C700\INCLUDE\graph.h C:\C700\INCLUDE\float.h\
        C:\C700\MFC\INCLUDE\afx.h C:\C700\INCLUDE\fstream.h\
```

```
        C:\C700\INCLUDE\time.h match5.h ..\LIB\vicalloc.h\
        C:\C700\INCLUDE\ctype.h C:\C700\MFC\INCLUDE\afx.ini\
        C:\C700\INCLUDE\iostream.h ..\LIB\projctn7.h ..\LIB\pic_mch7.h\
        ..\LIB\res_mch7.h ..\LIB\in_trn7.h C:\C700\INCLUDE\vmemory.h\
        C:\C700\INCLUDE\ios.h C:\C700\INCLUDE\streamb.h\
        C:\C700\INCLUDE\istream.h C:\C700\INCLUDE\ostream.h\
        C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\LN_DEC2.sbr LN_DEC2.CPP
<<
!ELSE
        @$(CXX) @<<obj\$(PROJ).rsp
/Zs $(CXXFLAGS_G)
$(CXXFLAGS_R) /FRobj\LN_DEC2.sbr LN_DEC2.CPP
<<
!ENDIF obj\$(PROJ).bsc : $(SBRS)
        $(BSCMAKE) @<<
$(BRFLAGS) $(SBRS)
<< obj\$(PROJ).exe : $(OBJS)
        -$(NMAKEBSC1) MAKEFLAGS=
        -$(NMAKEBSC2) $(NMFLAGS) -f $(PROJFILE) obj\$(PROJ).bsc
!IF $(DEBUG)
        $(LRF) @<<obj\$(PROJ).lrf
$(RT_OBJS: = +^
) $(OBJS: = +^
)
$@
$(MAPFILE_D)
$(LIBS: = +^
) +
$(LLIBS_G: = +^
) +
$(LLIBS_D: = +^
)
$(DEF_FILE) $(LFLAGS_G) $(LFLAGS_D);
<<
!ELSE
        $(LRF) @<<obj\$(PROJ).lrf
$(RT_OBJS: = +^
) $(OBJS: = +^
)
$@
```

```
$(MAPFILE_R)
$(LIBS: = +^
) +
$(LLIBS_G: = +^
) +
$(LLIBS_R: = +^
)
$(DEF_FILE) $(LFLAGS_G) $(LFLAGS_R);
<<
!ENDIF
      $(LINKER) @obj\$(PROJ).lrf .cpp.obj :
!IF $(DEBUG)
      @$(CXX) @<<obj\$(PROJ).rsp
/c $(CXXFLAGS_G)
$(CXXFLAGS_D) /Fo$@ $<
<<
!ELSE
      @$(CXX) @<<obj\$(PROJ).rsp
/c $(CXXFLAGS_G)
$(CXXFLAGS_R) /Fo$@ $<
<<
!ENDIF .cpp.sbr :
!IF $(DEBUG)
      @$(CXX) @<<obj\$(PROJ).rsp
/Zs $(CXXFLAGS_G)
$(CXXFLAGS_D) /FR$@ $<
<<
!ELSE
      @$(CXX) @<<obj\$(PROJ).rsp
/Zs $(CXXFLAGS_G)
$(CXXFLAGS_R) /FR$@ $<
<<
!ENDIF run: obj\$(PROJ).exe
      obj\$(PROJ).exe $(RUNFLAGS)

debug: obj\$(PROJ).exe
      CV $(CVFLAGS) obj\$(PROJ).exe $(RUNFLAGS)
```

```
#ifndef MATCH
#define MATCH
#include "projctn7.h"
#include "pic_mch7.h"
#include "res_mch7.h"
#include "lim_trn7.h"
//#include "tem_plt7.h"

#define NAME_LENGTH  40
#define      GRAPHMODE        _VRES256COLOR

//COLOR_RGB INTER_pix_color_rgb(PCT p1, PT PT_now);
#endif
```

```
//      STRIP SELECTION
//      Module gets a strips after line detection (module plines
// and selects two lines with a maximumm informational
// contents (frequency approach).
// COMMAND STRING
//
// Ins_corr <TARGET_name> [CommandFile]
//
//      <TARGET_name>  File name of FRAME without extention
//      [CommandFile]  Optional ASCI file with a run time parameters.
//
// INPUT
//=======ATTENTION
// LN_DEC2 used  .pn2 files - output PLNEW modules
// RGB files of frame (field) and corresponding .SGN files created by
// module PLINE.
// RUN TIME parameters:
//
// <four number>  -shift of strips vertexes relative to original>
// <V H_low H_up Hight Width> -Five integer:
//      V              - The highest vertical harmonic;
//      H_low, H_up    - The lowest and highest horisontal harmonics;
//      Hight, Width   - Hight and Width of windowfor analyses.
// <Gap HalfScrWeight PosWeight> - Integer and two float <1:
//      Gap            - range unsensetivites to screen position;
//      HalfScrWeight       - Additional weght if an upper line is
//                           in upper half of screen
//      PosWeight      - Additional weght if miuddle line belower
//                           then middle line of another line.
//SEE ALSO FILE "LN_DEC.Ini"
// OUTPUT
//      TARGET_name.SG2   - Strips selected;
//      LINEDET.002       - result collection for analyses,
//                          includes keyboard information to analyse.
//=======ATTENTION
// LN_DEC2 OUTPUT
//      TARGET_name.SG2   - Strips selected;
//      LINEDET.002       - result collection for analyses,
//                          includes keyboard information to analyse.

#include <stdlib.h>
#include <conio.h>
#include <stdio.h>
#include <string.h>
#include <graph.h>
#include <float.H>
#include <afx.h>
#include <fstream.h>
#include <time.h>
```

```c
#include "match5.h"
#include "vicalloc.h"
include <ctype.h> short PRESENT_HIGHT;
short GAP=8;
double HalfScrWeight=0.1, PosWeight=0.1;

short TAG_hight;
struct _videoconfig vc;
SCR_PNT    vrt_target[4];
FILE *datres;
double sh[4]={0,0,0,0};
double GAMMA=1.0,CORR_THRESH=0,Thresh_mdl=0;
short VOITING=0,MAP=0;
char f_name[40]="_",FILE_name[40]="_", FRAME_Name[40]="_",
     STRING_name[40]="_", SIGN_name[40]="_";
PCT pict_target, target_map;
short win_hight,win_lenth;
short HOR_HARM_l,HOR_HARM_h,VERT_HARM_1 ;

int __cdecl compare_array_elem ( const void *elem1,const void *elem2 );
int PictureInf(const char *name,SCR_PNT *vertexes,short n);

//int picture_inf_num_new(char *name,SCR_PNT *vertexes,short n);
void get_shift_f(FILE *f,double * sh); // INITIALISATION GRAPHICMODE, GET SCALE
void get_shift(double * sh); // INITIALISATION GRAPHICMODE, GET SCALE
int get_number_3();
int get_number_3_f(FILE *f);
double     GlobalWinCalc(PCT target_map,
           SCR_PNT win_size, short winpos);
//=========================================================
=====
ofstream LineC;
//============     OpenStripCollection
void OpenStripCol(const char*name)
{ LineC.open(name,ios::out|ios::app|ios::out|ios::nocreate);
  if(LineC.fail())
     {LineC.clear(0);
       LineC.open(name,ios::out|ios::app|ios::out|ios::noreplace);
       if(LineC.fail())
          {LineC.clear(0);
           cout << "CAN NOT OPEN StripCollection";
          GRAPH_OUT(-1);
          }
       else
          LineC<<"StripAnalysCollection \n";
     }
```

166

```
    LineC<<"Name #1\tVERT_HARM_l \t"<<
         " HOR_HARM_l \t HOR_HARM_h \t WindowLength\n";
}
//=============================================
int main(int argc,char* argv[])
{
char *p,mess[128],clean[]="                           ";
SCR_PNT line_vrt[20][4];
int FLG_F=0;
FILE *datainf;
short n=0;
SCR_PNT t_pos;
   if((argc != 2) && (argc !=3))

{
        printf(" target-file \n");
        FLG_F=0;
      return(1);
     }
    else
     if(argc ==3)
        {FLG_F=1;
         if(!(datainf=fopen(argv[2],"r"))) return 0;
        }
if(FLG_F)
  {get_shift_f(datainf,sh); //      GET SCALE
   get_number_3_f(datainf);
  }
else
  {get_shift(sh); //   GET SCALE
   get_number_3();
  }
// PROTOCOL OUTPUT
CString ProName("linedet.002");
 strcpy(f_name,argv[1]);
 OpenStripCol((const char *)ProName);
   LineC<<f_name<<" \t" <<VERT_HARM_1<<" \t"<< HOR_HARM_l<<" \t"
             <<HOR_HARM_h<<" \t"<<win_lenth<<"\n';
   LineC<<"GAP="<< GAP<< " \tHalfScrWeight="<<HalfScrWeight<<
        " \tPosWeight= "<<PosWeight<< "\n';
LineC<<" Line # \t Hight \t Value \t Comm \n";
// ================   GRAPHICS START
      if(GRAPHICS_START(&vc,GRAPHMODE)) GRAPH_OUT(-1);
//=================
//========= TARGET PICTURE name and vertexes
   SCR_PNT target_pos;   // CONSTRACTOR default 0,0
   pict_target=sign_storage_rgb(argv[1],vc );
//========= PROTOTYPE initialisation
short j,k;
```

```
double res[20];
for(j=0;j<20;res[j++]=0.0);
CString FName(' ',80);
    FName=argv[1];
    FName+=".pn2";
while(PictureInf((const char*)FName,vrt_target, n++))
 {
SCR_PNT vrt[4];
  match_vertex( vrt_target);
  for(j=0;j<4;j++)
      {
      vrt[j].c=vrt_target[j].c;
      k=((j%2)?j-1:j+1);
      if (fabs(sh[j])<1)
        {vrt[j].r=(sh[j]?(short)((vrt_target[j].r-vrt_target[k].r)*sh[j])+
        vrt_target[j].r:vrt_target[j].r);
        }
      else
        vrt[j].r=vrt_target[j].r+sh[j];
      }
#define CALC_HIGHT 16
  TAG_hight=(short)(vrt[2].r-vrt[3].r+vrt[1].r-vrt[0].r+2)*0.5;
  if(TAG_hight<10) continue;
  target_map=linear_transform_cont(pict_target, vrt, CALC_HIGHT );
  if(!target_map.s_cols)
      {printf("TOO NARROW LINES");continue;}
  match_vertex( vrt);

PRESENT_HIGHT=16;
  _clearscreen(_GCLEARSCREEN);
  target_pos.c=10;
  target_pos.r=10;
  sign_present_RGB( target_map,target_pos);
//================================
SCR_PNT win_size(128,4);
short winpos;

win_size.r=(win_hight>0)?__min(win_hight,CALC_HIGHT):CALC_HIGHT;
      win_size.c=(win_lenth>0)?__min(win_lenth,target_map.s_cols)
                        :target_map.s_cols;
      winpos=(CALC_HIGHT-win_size.r)/2;

const double scale=(double)PRESENT_HIGHT/CALC_HIGHT;
//     RESULTS AND VERTEXES
          res[n-1]= GlobalWinCalc(target_map,win_size, winpos);
  for (j=0;j<4;j++)
      line_vrt[n-1][j]=vrt[j];
  target_map.free_PCT();
//====================================================
```

```
    LineC<< n-1<<"\t"<< TAG_hight<<"\t"<< res[n-1]<<"\t";
    //LineC<<" Line # \t Hight \t Value \t Comm_1 \t COMM_2 \n";
        sprintf(mess,"File Name ");
        _settextposition( vc.numtextrows-2,0);
        _outtext( clean );
        _settextposition( vc.numtextrows-2,0);
        _outtext( mess );
        p=mess;
        while(!isspace( (int)(*p++=(char)getche()) ));
        *(--p)='\0';
    LineC<<mess<<"\t\n";
//=========================================================
    }
// ——— DECISION MAKING
    short i,nl[5], up_ln[5],top_ln[5];
    short best=0,scnd=0;
    double    *nmb[20],weight[5]={0,0,0,0,0};

for(i=0;i<20;i++) nmb[i]=res+i;
    qsort((void*)nmb,20,sizeof(double*),compare_array_elem );
    for(i=0;i<5;i++)
    {if(!(*nmb[i])) break;
     nl[i]=nmb[i]-res;
     up_ln[i]=line_vrt[nl[i]][3].r+line_vrt[nl[i]][0].r;
     top_ln[i]=line_vrt[nl[i]][2].r+line_vrt[nl[i]][2].r;
     weight[i]=*nmb[i];
    }
    if(weight[0])
     {if((up_ln[1]+top_ln[1])>(up_ln[0]+top_ln[0]-GAP))
                            weight[1]*=(1.0+PosWeight);
      if(up_ln[1]>pict_target.s_rows)
                            weight[1]*=(1.0+HalfScrWeight);
      if(up_ln[0]>pict_target.s_rows)
                            weight[0]*=(1.0+HalfScrWeight);
     scnd=(best=(weight[0]<weight[1])?1:0)?0:1;

//——— DESCISION OUTPUT
    target_pos.c=10;
    target_pos.r=10;
    _clearscreen(_GCLEARSCREEN);
    target_map=linear_transform_cont(pict_target, line_vrt[nl[best]],16 );
    sign_present_RGB( target_map,target_pos);
    target_map.free_PCT();

if(weight[scnd])
        {
        target_pos.r+=20;
        target_map=linear_transform_cont(pict_target, line_vrt[nl[scnd]],16 );
        sign_present_RGB( target_map,target_pos);
```

```
        target_map.free_PCT();
    }
    sprintf(mess,"Result 1_res= %6g w= %6g 2_res=%6f W=%6f \0",
        *nmb[best],weight[best],*nmb[scnd],weight[scnd]);

char Sn1[20];
    _settextposition( vc.numtextrows-2,1);
    _outtext( clean );
    _settextposition( vc.numtextrows-2,0);
    _outtext( mess );
    p=Sn1;
    while(!isspace( (int)(*p++=(char)getche()) ));
    *(--p)='\0';
    strcat(mess,Sn1);
LineC<< mess<<'\n';
LineC.close();
//picture presentation
    _clearscreen(_GCLEARSCREEN);
    target_pos.c=0;
    target_pos.r=0;
    target_map=linear_transform_cont(pict_target, line_vrt[nl[best]],16 );
    sign_present_RGB( pict_target,target_pos);
    _setcolor( color_num(240,240,240));
    _moveto(line_vrt[nl[best]][3].c,line_vrt[nl[best]][3].r);
    _lineto(line_vrt[nl[best]][0].c,line_vrt[nl[best]][0].r);
    _moveto(line_vrt[nl[best]][2].c,line_vrt[nl[best]][2].r);
    _lineto(line_vrt[nl[best]][1].c,line_vrt[nl[best]][1].r);
    getch();
    if(weight[scnd])
    {
    _setcolor( color_num(240,240,0));
    _moveto(line_vrt[nl[scnd]][3].c,line_vrt[nl[scnd]][3].r);
    _lineto(line_vrt[nl[scnd]][0].c,line_vrt[nl[scnd]][0].r);
    _moveto(line_vrt[nl[scnd]][2].c,line_vrt[nl[scnd]][2].r);
    _lineto(line_vrt[nl[scnd]][1].c,line_vrt[nl[scnd]][1].r);
    getch();
    } strcat(strcpy(f_name,argv[1]),".sg2");
LineC.open(f_name,ios::out);
LineC<<"After Str Selection\n";
LineC<<argv[1]<<" ___ "<<Sn1<<" \t" <<Sn1<<'\n';
    for(j=0;j<4;j++)
        LineC<<line_vrt[nl[best]][j].c<<" \t"<<line_vrt[nl[best]][j].r<<'\n';
    if(weight[scnd])
        for(j=0;j<4;j++)
            LineC<<line_vrt[nl[scnd]][j].c<<" \t"<<line_vrt[nl[scnd]][j].r<<'\n';
LineC.close();
// END DECISION
```

```
        }
else
    {
        LineC.open(f_name,ios::out);
LineC<<"After Str Selection\n";
LineC<<argv[1]<<" ___ "<<"___\t____\n";
LineC.close();

cout <<" Lines not proposed";
        }
GRAPH_OUT();
pict_target.free_PCT();
target_map.free_PCT();
fclose(datres);
return(0);
}

//===============================================================
===============
int __cdecl compare_array_elem ( const void *elem1,const void *elem2 )
{int i;
 double a;
 a=(double )elem1-(double )elem2;
 i=(a?((a<0)?1:-1):0);
 return i;
}
//
===============================================================
========
void get_shift_f(FILE *f,double * sh) // INITIALISATION GRAPHICMODE,
GET SCALE
{
        fscanf(f," %lf %lf %lf %lf",sh,sh+1,sh+2,sh+3);
}
//
===============================================================
========
void get_shift(double * sh) // INITIALISATION GRAPHICMODE, GET SCALE
{int i;
        cout<< "vertexes shift over rows ( top_right, bottom_right, bottom_left,
top_left %\n";
        for (i=0;i<4; i++)
                cin>>sh[i];
}
//===============================================================
==========
int get_number_3()
{
GRAPH_OUT();
```

```
cout << " VERT_HARM<16 HOR_HARM_start<16
HOR_HARM_stop,win_hight win_lenth";
cin
>>VERT_HARM_1>>HOR_HARM_l>>HOR_HARM_h>>win_hight>>win_lent
h;
cout<<" GAP HalfScrWeight % PosWeight % ";
cin>>GAP>>HalfScrWeight>>PosWeight;
HalfScrWeight/=100.0;
PosWeight/=100.0;
// ================   GRAPHICS START
if(GRAPHICS_START(&vc,GRAPHMODE)) GRAPH_OUT(-1);
//=================
return 0;
}
//**************************
int get_number_3_f(FILE *f)
{ fscanf(f," %d %d %d %d %d",&VERT_HARM_1,
    &HOR_HARM_l,&HOR_HARM_h,&win_hight,&win_lenth);
fscanf(f," %d %lf %lf",&GAP,&HalfScrWeight,&PosWeight);
HalfScrWeight/=100.0;
PosWeight/=100.0;
return 1;
}
//=================================
int PictureInf(const char *name,SCR_PNT *vertexes,short n)
  {int i,j;
ifstream datfp;
    char new_str[80];
    int r,FLG=0;
    datfp.open(name,ios::in);
  if(datfp.fail())
      {datfp.clear(0);
        cout << "CAN NOT OPEN InfFile "<< name<<"\n";
        GRAPH_OUT(-1);
      }
  datfp.getline(new_str,80);
    for(j=0;j<n+1;j++)
      for(i=0;i<4;i++)
       {datfp>>(vertexes+i)->c>>(vertexes+i)->r;
        if(datfp.eof())
            {datfp.close (); return 0;}
      }
    datfp.close ();
return 1;
}
//=========================================================
```

17a

```c
#include <stdio.h>
#include <stdlib.h>
#include <conio.h>
#include <malloc.h>
#include <float.h>
#include <graph.h>
include <string.h>
include <ctype.h> include "match5.h"
//#include "tem_plt7.h"
#include "pic_mch7.h"
define MAX_LINE 1024 extern short TAG_hight;
extern struct _videoconfig vc;
extern char f_name[40],FILE_name[40], FRAME_Name[40],
       STRING_name[40], SIGN_name[40];
typedef struct
        {double md[3],var[3];} AVERAGE_VEC;
//================================================================
extern short HOR_HARM_l;
extern short HOR_HARM_h;
extern short VERT_HARM_1 ;
//————————————————————————————
double    calcul_power(PCT win,short x_scale, double *vr)
{const short
VERT_HARM=VERT_HARM_1*2,HOR_HARM=HOR_HARM_h*2,
        HOR_HARM_s=HOR_HARM_l?HOR_HARM_l*2-1:HOR_HARM_l;
const short THR=16;
double sum[19][19];
COLOR_RGB col;
double pow=0,mid=0;
short c1;
long l_now;
long n;
short h_t,v_t,x,y,h,v,half_x,half_y,quot_x,quot_y;
   n=win.s_cols*win.s_rows;
   half_y=win.s_rows>>1;
   quot_y=win.s_rows>>2;
//!!!!!!!!!!!!!!!!!!!!!!!!!!!!!!!!!!!!!!!!!!!!!!!!!!!!!!!!!!!!!!!
   half_x=x_scale>>1;
   quot_x=x_scale>>2;
//   half_x=win.s_rows>>1;
//   quot_x=win.s_rows>>2;
//   half_x=win.s_cols>>1;
//   quot_x=win.s_cols>>2;
//!!!!!!!!!!!!!!!!!!!!!!!!!!!!!!!!!!!!!!!!!!!!!!!!!!!!!!!!!!!!!!!
```

```
    for(h=0;h<HOR_HARM+1;h++)
     for(v=0;v<VERT_HARM+1;v++)
        sum[v][h]=0;
  for(y=0;y<win.s_rows;y++)
     for(x=0;x<win.s_cols;x++)
        {col=win.get_pixel(y,x);
         I_now=col.r+col.b+col.g;
         I_now=(I_now>THR)?I_now:0;
         mid+=I_now;
         pow+=I_now*I_now;
         for(v=0;(v<VERT_HARM+1) &&(((v+1)>>1)<=quot_y);v++)
            {
              v_t=y*((v+1)>>1);   // HARMONIC # =(v+1)>>1
              v_t=(v_t+(v & 0x0001 ? quot_y:0))/half_y;
              v_t &= 0x0001;  //1 if y_pos in 2nd half
              c1= v_t?I_now:-I_now;

for(h=HOR_HARM_s;(h<HOR_HARM+1)&&(((h+1)>>1)<=quot_x);h++)
              {
                h_t=x*((h+1)>>1);
                h_t=(h_t+(h & 0x0001 ?quot_x:0))/half_x;
                h_t &= 0x0001;
                sum[v][h]+= h_t?c1:-c1;
              }
            }
         } double s0,dd;
   for(s0=h=0;h<HOR_HARM+1;h++)
      for(v=0;v<VERT_HARM+1;v++)
           if(h||v)
              s0+=(double) sum[v][h]*sum[v][h];
   s0/=n;
   *vr=(dd=(pow-mid*mid/n))?s0/dd:0;
//return add_out;
 return (s0/(n*100.0));
}
//=========================================
double     GlobalWinCalc(PCT target_map,
              SCR_PNT win_size, short winpos)
   {
double centr_pow;
double     pow_now;
long n_fr=0;
double mid_pow=0;
double rev_fr;
PCT win(win_size.c,win_size.r);
SCR_PNT st_t,st_win;
```

```
    st_win.r=winpos;
    for (st_win.c=0;st_win.c<target_map.s_cols-win_size.c+1;st_win.c++)
        {
        win.load_template(target_map,st_win);
        pow_now=calcul_power(win,target_map.s_rows,&centr_pow);
        mid_pow+=pow_now;
        n_fr++;
        }
rev_fr=1.0/n_fr;
mid_pow*=rev_fr;

win.free_PCT();
return mid_pow;
}
//================================================================
===============
```

```
ORIGIN = PWB
ORIGIN_VER = 2.0
PROJ = LNS_CORR
PROJFILE = LNS_CORR.MAK
BUILDDIR = obj
DEBUG = 0

BRFLAGS  = /o obj\$(PROJ).bsc
BSCMAKE  = bscmake
SBRPACK  = sbrpack
NMAKEBSC1 = set
NMAKEBSC2 = nmake
BROWSE    = 1
CC = cl
CFLAGS_G = /W2 /BATCH /FR$*.sbr /Zn
CFLAGS_D = /f /Zi /Od
CFLAGS_R = /f- /Ot /Oi /Ol /Oe /Og /Gs
CXX = cl
CXXFLAGS_G = /AL /W4 /G2 /D_DOS /BATCH /FR$*.sbr /Zn
CXXFLAGS_D = /f- /Od /FPi87 /Zi /DMICI /DSINGLE_WIN
CXXFLAGS_R = /f- /Ot /Ol /Og /Oe /Oi /FPi87 /Gs /DMICI /DSINGLE_WIN
MAPFILE_D = NUL
MAPFILE_R = NUL
LFLAGS_G = /NOI /STACK:32000 /BATCH /ONERROR:NOEXE
LFLAGS_D = /CO /FAR /PACKC
LFLAGS_R = /EXE /FAR /PACKC
LINKER   = link
ILINK = ilink
LRF  = echo > NUL
ILFLAGS = /a /e
LLIBS_G = graphics lafxcr
CVFLAGS = /25 /S
RUNFLAGS = ..\win4\S160_0 ..\win4\S160_ auto1

FILES = LNS_CORR.CPP ..\LIB\VICALLOC.CPP ..\LIB\PROJCTN7.CPP\
     ..\LIB\PIC_M7.CPP ..\LIB\RES_MCH7.CPP COR_FNC.CPP
COR_WIN.CPP
OBJS = obj\LNS_CORR.obj obj\VICALLOC.obj obj\PROJCTN7.obj
obj\PIC_M7.obj\
     obj\RES_MCH7.obj obj\COR_FNC.obj obj\COR_WIN.obj
SBRS = obj\LNS_CORR.sbr obj\VICALLOC.sbr obj\PROJCTN7.sbr
obj\PIC_M7.sbr\
     obj\RES_MCH7.sbr obj\COR_FNC.sbr obj\COR_WIN.sbr all: obj\$(PROJ).exe .SUFFIXES:
.SUFFIXES:
.SUFFIXES: .obj .sbr .cpp
```

```
obj\LNS_CORR.obj : LNS_CORR.CPP C:\C700\INCLUDE\stdlib.h\
    C:\C700\INCLUDE\conio.h C:\C700\INCLUDE\stdio.h\
    C:\C700\INCLUDE\string.h C:\C700\INCLUDE\graph.h\
    C:\C700\INCLUDE\float.H C:\C700\INCLUDE\io.h
C:\C700\INCLUDE\time.h\
    C:\C700\INCLUDE\ctype.h C:\C700\INCLUDE\iostream.h\
    C:\C700\MFC\INCLUDE\afx.h LNS_CORR.h cor_win.h
c:\ilya\lib\vicalloc.h\
  c  C:\C700\INCLUDE\ios.h C:\C700\INCLUDE\streamb.h\
    C:\C700\INCLUDE\istream.h C:\C700\INCLUDE\ostream.h\
    C:\C700\MFC\INCLUDE\afx.inl ..\LIB\projctn7.h ..\LIB\pic_mch7.h\
    ..\LIB\res_mch7.h c:\ilya\lib\lin_tm7.h C:\C700\INCLUDE\vmemory.h\
    C:\C700\INCLUDE\math.h
!IF $(DEBUG)
    @$(CXX) @<<obj\$(PROJ).rsp
/c $(CXXFLAGS_G)
$(CXXFLAGS_D) /Foobj\LNS_CORR.obj LNS_CORR.CPP
<<
!ELSE
    @$(CXX) @<<obj\$(PROJ).rsp
/c $(CXXFLAGS_G)
$(CXXFLAGS_R) /Foobj\LNS_CORR.obj LNS_CORR.CPP
<<
!ENDIF obj\LNS_CORR.sbr : LNS_CORR.CPP C:\C700\INCLUDE\stdlib.h\
    C:\C700\INCLUDE\conio.h C:\C700\INCLUDE\stdio.h\
    C:\C700\INCLUDE\string.h C:\C700\INCLUDE\graph.h\
    C:\C700\INCLUDE\float.H C:\C700\INCLUDE\io.h
C:\C700\INCLUDE\time.h\
    C:\C700\INCLUDE\ctype.h C:\C700\INCLUDE\iostream.h\
    C:\C700\MFC\INCLUDE\afx.h LNS_CORR.h cor_win.h
c:\ilya\lib\vicalloc.h\
    C:\C700\INCLUDE\ios.h C:\C700\INCLUDE\streamb.h\
    C:\C700\INCLUDE\istream.h C:\C700\INCLUDE\ostream.h\
    C:\C700\MFC\INCLUDE\afx.inl ..\LIB\projctn7.h ..\LIB\pic_mch7.h\
    ..\LIB\res_mch7.h c:\ilya\lib\lin_tm7.h C:\C700\INCLUDE\vmemory.h\
    C:\C700\INCLUDE\math.h
!IF $(DEBUG)
    @$(CXX) @<<obj\$(PROJ).rsp
/Zs $(CXXFLAGS_G)
$(CXXFLAGS_D) /FRobj\LNS_CORR.sbr LNS_CORR.CPP
<<
!ELSE
    @$(CXX) @<<obj\$(PROJ).rsp
/Zs $(CXXFLAGS_G)
$(CXXFLAGS_R) /FRobj\LNS_CORR.sbr LNS_CORR.CPP
<<
```

!ENDIF obj\VICALLOC.obj : ..\LIB\VICALLOC.CPP C:\C700\INCLUDE\stdlib.h\
    C:\C700\INCLUDE\stdio.h C:\C700\INCLUDE\vmemory.h\
    C:\C700\INCLUDE\malloc.h
!IF $(DEBUG)
    @$(CXX) @<<obj\$(PROJ).rsp
/c $(CXXFLAGS_G)
$(CXXFLAGS_D) /Foobj\VICALLOC.obj ..\LIB\VICALLOC.CPP
<<
!ELSE
    @$(CXX) @<<obj\$(PROJ).rsp
/c $(CXXFLAGS_G)
$(CXXFLAGS_R) /Foobj\VICALLOC.obj ..\LIB\VICALLOC.CPP
<<
!ENDIF obj\VICALLOC.sbr : ..\LIB\VICALLOC.CPP C:\C700\INCLUDE\stdlib.h\
    C:\C700\INCLUDE\stdio.h C:\C700\INCLUDE\vmemory.h\
    C:\C700\INCLUDE\malloc.h
!IF $(DEBUG)
    @$(CXX) @<<obj\$(PROJ).rsp
/Zs $(CXXFLAGS_G)
$(CXXFLAGS_D) /FRobj\VICALLOC.sbr ..\LIB\VICALLOC.CPP
<<
!ELSE
    @$(CXX) @<<obj\$(PROJ).rsp
/Zs $(CXXFLAGS_G)
$(CXXFLAGS_R) /FRobj\VICALLOC.sbr ..\LIB\VICALLOC.CPP
<<
!ENDIF obj\PROJCTN7.obj : ..\LIB\PROJCTN7.CPP C:\C700\INCLUDE\graph.h\
    C:\C700\INCLUDE\stdlib.h C:\C700\INCLUDE\iostream.h
..\LIB\projctn7.h\
    C:\C700\INCLUDE\ios.h C:\C700\INCLUDE\streamb.h\
    C:\C700\INCLUDE\istream.h C:\C700\INCLUDE\ostream.h\
    C:\C700\INCLUDE\math.h
!IF $(DEBUG)
    @$(CXX) @<<obj\$(PROJ).rsp
/c $(CXXFLAGS_G)
$(CXXFLAGS_D) /Foobj\PROJCTN7.obj ..\LIB\PROJCTN7.CPP
<<
!ELSE
    @$(CXX) @<<obj\$(PROJ).rsp
/c $(CXXFLAGS_G)
$(CXXFLAGS_R) /Foobj\PROJCTN7.obj ..\LIB\PROJCTN7.CPP
<<
!ENDIF

```
obj\PROJCTN7.sbr : ..\LIB\PROJCTN7.CPP C:\C700\INCLUDE\graph.h\
      C:\C700\INCLUDE\stdlib.h C:\C700\INCLUDE\iostream.h
..\LIB\projctn7.h\
      C:\C700\INCLUDE\ios.h C:\C700\INCLUDE\streamb.h\
      C:\C700\INCLUDE\istream.h C:\C700\INCLUDE\ostream.h\
      C:\C700\INCLUDE\math.h
!IF $(DEBUG)
      @$(CXX) @<<obj\$(PROJ).rsp
/Zs $(CXXFLAGS_G)
$(CXXFLAGS_D) /FRobj\PROJCTN7.sbr ..\LIB\PROJCTN7.CPP
<<
!ELSE
      @$(CXX) @<<obj\$(PROJ).rsp
/Zs $(CXXFLAGS_G)
$(CXXFLAGS_R) /FRobj\PROJCTN7.sbr ..\LIB\PROJCTN7.CPP
<<
!ENDIF obj\PIC_M7.obj : ..\LIB\PIC_M7.CPP C:\C700\INCLUDE\stdlib.h\
      C:\C700\INCLUDE\stdio.h C:\C700\INCLUDE\graph.h
C:\C700\INCLUDE\math.h\
      C:\C700\INCLUDE\io.h C:\C700\INCLUDE\fcntl.h
C:\C700\INCLUDE\string.h\
      C:\C700\INCLUDE\float.H C:\C700\INCLUDE\malloc.h ..\LIB\phdr.h\
      c:\ilya\lib\vicalloc.h ..\LIB\pic_mch7.h C:\C700\INCLUDE\vmemory.h\
      ..\LIB\projctn7.h
!IF $(DEBUG)
      @$(CXX) @<<obj\$(PROJ).rsp
/c $(CXXFLAGS_G)
$(CXXFLAGS_D) /Foobj\PIC_M7.obj ..\LIB\PIC_M7.CPP
<<
!ELSE
      @$(CXX) @<<obj\$(PROJ).rsp
/c $(CXXFLAGS_G)
$(CXXFLAGS_R) /Foobj\PIC_M7.obj ..\LIB\PIC_M7.CPP
<<
!ENDIF obj\PIC_M7.sbr : ..\LIB\PIC_M7.CPP C:\C700\INCLUDE\stdlib.h\
      C:\C700\INCLUDE\stdio.h C:\C700\INCLUDE\graph.h
C:\C700\INCLUDE\math.h\
      C:\C700\INCLUDE\io.h C:\C700\INCLUDE\fcntl.h
C:\C700\INCLUDE\string.h\
      C:\C700\INCLUDE\float.H C:\C700\INCLUDE\malloc.h ..\LIB\phdr.h\
      c:\ilya\lib\vicalloc.h ..\LIB\pic_mch7.h C:\C700\INCLUDE\vmemory.h\
      ..\LIB\projctn7.h
!IF $(DEBUG)
      @$(CXX) @<<obj\$(PROJ).rsp
```

```
/Zs $(CXXFLAGS_G)
$(CXXFLAGS_D) /FRobj\PIC_M7.sbr ..\LIB\PIC_M7.CPP
<<
!ELSE
       @$(CXX) @<<obj\$(PROJ).rsp
/Zs $(CXXFLAGS_G)
$(CXXFLAGS_R) /FRobj\PIC_M7.sbr ..\LIB\PIC_M7.CPP
<<
!ENDIF obj\RES_MCH7.obj : ..\LIB\RES_MCH7.CPP C:\C700\INCLUDE\stdlib.h\
       C:\C700\INCLUDE\vmemory.h ..\LIB\pic_mch7.h ..\LIB\res_mch7.h\
       C:\C700\INCLUDE\graph.h ..\LIB\projctn7.h C:\C700\INCLUDE\math.h
!IF $(DEBUG)
       @$(CXX) @<<obj\$(PROJ).rsp
/c $(CXXFLAGS_G)
$(CXXFLAGS_D) /Foobj\RES_MCH7.obj ..\LIB\RES_MCH7.CPP
<<
!ELSE
       @$(CXX) @<<obj\$(PROJ).rsp
/c $(CXXFLAGS_G)
$(CXXFLAGS_R) /Foobj\RES_MCH7.obj ..\LIB\RES_MCH7.CPP
<<
!ENDIF obj\RES_MCH7.sbr : ..\LIB\RES_MCH7.CPP C:\C700\INCLUDE\stdlib.h\
       C:\C700\INCLUDE\vmemory.h ..\LIB\pic_mch7.h ..\LIB\res_mch7.h\
       C:\C700\INCLUDE\graph.h ..\LIB\projctn7.h C:\C700\INCLUDE\math.h
!IF $(DEBUG)
       @$(CXX) @<<obj\$(PROJ).rsp
/Zs $(CXXFLAGS_G)
$(CXXFLAGS_D) /FRobj\RES_MCH7.sbr ..\LIB\RES_MCH7.CPP
<<
!ELSE
       @$(CXX) @<<obj\$(PROJ).rsp
/Zs $(CXXFLAGS_G)
$(CXXFLAGS_R) /FRobj\RES_MCH7.sbr ..\LIB\RES_MCH7.CPP
<<
!ENDIF obj\COR_FNC.obj : COR_FNC.CPP C:\C700\INCLUDE\stdio.h
C:\C700\INCLUDE\stdlib.h\
       C:\C700\INCLUDE\conio.h C:\C700\INCLUDE\float.H\
       C:\C700\INCLUDE\graph.h cor_fnc.h ..\LIB\pic_mch7.h
..\LIB\res_mch7.h\
       C:\C700\INCLUDE\vmemory.h ..\LIB\projctn7.h
C:\C700\INCLUDE\math.h
!IF $(DEBUG)
       @$(CXX) @<<obj\$(PROJ).rsp
```

```
/c $(CXXFLAGS_G)
$(CXXFLAGS_D) /Foobj\COR_FNC.obj COR_FNC.CPP
<<
!ELSE
        @$(CXX) @<<obj\$(PROJ).rsp
/c $(CXXFLAGS_G)
$(CXXFLAGS_R) /Foobj\COR_FNC.obj COR_FNC.CPP
<<
!ENDIF obj\COR_FNC.sbr : COR_FNC.CPP C:\C700\INCLUDE\stdio.h
C:\C700\INCLUDE\stdlib.h\
        C:\C700\INCLUDE\conio.h C:\C700\INCLUDE\float.H\
        C:\C700\INCLUDE\graph.h cor_fnc.h ..\LIB\pic_mch7.h
..\LIB\res_mch7.h\
        C:\C700\INCLUDE\vmemory.h ..\LIB\projctn7.h
C:\C700\INCLUDE\math.h
!IF $(DEBUG)
        @$(CXX) @<<obj\$(PROJ).rsp
/Zs $(CXXFLAGS_G)
$(CXXFLAGS_D) /FRobj\COR_FNC.sbr COR_FNC.CPP
<<
!ELSE
        @$(CXX) @<<obj\$(PROJ).rsp
/Zs $(CXXFLAGS_G)
$(CXXFLAGS_R) /FRobj\COR_FNC.sbr COR_FNC.CPP
<<
!ENDIF obj\COR_WIN.obj : COR_WIN.CPP C:\C700\INCLUDE\vmemory.h\
        C:\C700\INCLUDE\stdio.h C:\C700\INCLUDE\stdlib.h\
        C:\C700\INCLUDE\conio.h C:\C700\INCLUDE\malloc.h\
        C:\C700\INCLUDE\float.H C:\C700\INCLUDE\graph.h\
        C:\C700\INCLUDE\string.h LNS_CORR.h cor_fnc.h ..\LIB\projctn7.h\
        ..\LIB\pic_mch7.h ..\LIB\res_mch7.h c:\ilya\lib\lin_tm7.h\
        C:\C700\INCLUDE\math.h
!IF $(DEBUG)
        @$(CXX) @<<obj\$(PROJ).rsp
/c $(CXXFLAGS_G)
$(CXXFLAGS_D) /Foobj\COR_WIN.obj COR_WIN.CPP
<<
!ELSE
        @$(CXX) @<<obj\$(PROJ).rsp
/c $(CXXFLAGS_G)
$(CXXFLAGS_R) /Foobj\COR_WIN.obj COR_WIN.CPP
<<
!ENDIF obj\COR_WIN.sbr : COR_WIN.CPP C:\C700\INCLUDE\vmemory.h\
```

```
    C:\C700\INCLUDE\stdio.h C:\C700\INCLUDE\stdlib.h\
    C:\C700\INCLUDE\conio.h C:\C700\INCLUDE\malloc.h\
    C:\C700\INCLUDE\float.H C:\C700\INCLUDE\graph.h\
    C:\C700\INCLUDE\string.h LNS_CORR.h cor_fnc.h ..\LIB\projctn7.h\
    ..\LIB\pic_mch7.h ..\LIB\res_mch7.h c:\ilya\lib\lin_trn7.h\
    C:\C700\INCLUDE\math.h
!IF $(DEBUG)
    @$(CXX) @<<obj\$(PROJ).rsp
/Zs $(CXXFLAGS_G)
$(CXXFLAGS_D) /FRobj\COR_WIN.sbr COR_WIN.CPP
<<
!ELSE
    @$(CXX) @<<obj\$(PROJ).rsp
/Zs $(CXXFLAGS_G)
$(CXXFLAGS_R) /FRobj\COR_WIN.sbr COR_WIN.CPP
<<
!ENDIF obj\$(PROJ).bsc : $(SBRS)
    $(BSCMAKE) @<<
$(BRFLAGS) $(SBRS)
<< obj\$(PROJ).exe : $(OBJS)
    -$(NMAKEBSC1) MAKEFLAGS=
    -$(NMAKEBSC2) $(NMFLAGS) -f $(PROJFILE) obj\$(PROJ).bsc
!IF $(DEBUG)
    $(LRF) @<<obj\$(PROJ).lrf
$(RT_OBJS: = +^
) $(OBJS: = +^
)
$@
$(MAPFILE_D)
$(LIBS: = +^
) +
$(LLIBS_G: = +^
) +
$(LLIBS_D: = +^
)
$(DEF_FILE) $(LFLAGS_G) $(LFLAGS_D);
<<
!ELSE
    $(LRF) @<<obj\$(PROJ).lrf
$(RT_OBJS: = +^
) $(OBJS: = +^
)
$@
$(MAPFILE_R)
```

18a

```
$(LIBS: = +^
) +
$(LLIBS_G: = +^
) +
$(LLIBS_R: = +^
)
$(DEF_FILE) $(LFLAGS_G) $(LFLAGS_R);
<<
!ENDIF
        $(LINKER) @obj\$(PROJ).lrf .cpp.obj :
!IF $(DEBUG)
        @$(CXX) @<<obj\$(PROJ).rsp
/c $(CXXFLAGS_G)
$(CXXFLAGS_D) /Fo$@ $<
<<
!ELSE
        @$(CXX) @<<obj\$(PROJ).rsp
/c $(CXXFLAGS_G)
$(CXXFLAGS_R) /Fo$@ $<
<<
!ENDIF .cpp.sbr :
!IF $(DEBUG)
        @$(CXX) @<<obj\$(PROJ).rsp
/Zs $(CXXFLAGS_G)
$(CXXFLAGS_D) /FR$@ $<
<<
!ELSE
        @$(CXX) @<<obj\$(PROJ).rsp
/Zs $(CXXFLAGS_G)
$(CXXFLAGS_R) /FR$@ $<
<<
!ENDIF run: obj\$(PROJ).exe
        obj\$(PROJ).exe $(RUNFLAGS)

debug: obj\$(PROJ).exe
        CV $(CVFLAGS) obj\$(PROJ).exe $(RUNFLAGS)
```

```
//      Module calculates correlation functions of PROTO_1 and set of
// prototypes. Set of prototypes' names is defined by a MASK correspondes
// to names generated by MAKEPRB and has next structure:
//         [path]&RRW_P.rgb
// Where
//         [path]  - optional name of directory;
//         &       - first letter of file name
//         RR      - two digits corresponding to prototype's hight
//                   (RR= 16| 32 | 48 | 64)
//         W       - number corresponding to window number (see
MAKEPRB
//                   description.
//         P       prototype Number
//      MASK includes ONLY [path]&RRW_     and programme will
// calculate correlation functions for prototypes with P from 0 to
// first not existing number.

// COMMAND STRING
//
// lns_corr <PROTO_1_Name> <MASK> [CommandFile]
//
//      <PROTO_1_Name>      File name of PROTOTYPE without
extention
//      <MASK>              Mask for prototypes FileNames without extention
and
//                          Prototype's number.
//      [CommandFile]       Optional ASCI file with a run time parameters.
//
// INPUT
//      RGB files of prototypes and corresponding .SGN files created by
// module MAKEPRB.
// RUN TIME parameters:
//
//      0 0 0 0     -shift for all cases have to be 0
//      <CalorSpace>
//                  We have used 1 - as worked only with a luminance
//      <Window width>
//                  We have used 8
//SEE ALSO FILE "LNS_CORR.INI"
// OUTPUT
//      Correlation functions in  PROTO_1.DBC file.

#include <stdlib.h>
#include <conio.h>
#include <stdio.h>
#include <string.h>
#include <graph.h>
#include <float.H>
```

```
#include <io.h>
#include <time.h>
#include <ctype.h>
#include <iostream.h>
#include <afx.h>
#include "LNS_CORR.h"
#include "cor_win2.h"
#include "vicalloc.h"

char f_name[40]="_",FILE_name[40]="_", FRAME_Name[40]="_",
ARGV_1[30]="_",
        STRING_name[40]="_", SIGN_name[40]="_",TAG_name[9]="_",
drive[3]="_",dir[30]="_",
        ext[5]="_",*tag_frame;
double GAMMA=1.0,CORR_THRESH=0.0,Thresh_mdl=0.0;
short MAP;
short VOITING=3,TAG_hight;
struct _videoconfig vc;
FILE *datres;
int FLG_WRIGHT=0;
double sh[4]={0,0,0,0};

PCT pict_target, pict_proto;
FILE *out_rslt;

int picture_inf(char *name,SCR_PNT *vertexes);
int picture_inf_num(char *name,SCR_PNT *vertexes,short n);
int get_number(); // INITIALISATION GRAPHICMODE, GET SCALE
int get_number_3(); // INITIALISATION GRAPHICMODE, GET SCALE
void get_shift_f(FILE *f,double * sh); // INITIALISATION GRAPHICMODE, GET SCALE
void get_shift(double * sh); // INITIALISATION GRAPHICMODE, GET SCALE
int get_number_3_f(FILE *f); // INITIALISATION GRAPHICMODE, GET SCALE
int picture_inf_num_2(char *name,SCR_PNT *vertexes,short n,char *ext);
int picture_inf_num_new(char *name,SCR_PNT *vertexes,short n);
//$$$$$$$$$$$$$$$$$$$$$$$$$$$$$$$$$$$$$$$$$$$$$$$$$$$$$$$$$$$$$$$$
$$$$$$$$$$$$$$$$$$$

short PRESENT_HIGHT=32, CALC_HIGHT =32;

FILE * INP_PROTOCOL;
FILE *PROTOCOL;

CString PROTOCOL_NAME;
CString PROTOCOL_START;
CString PROTO1_HEADER=CString::CString(
```

```
"PROTO_File\tFRAME_Name\tSTRING_name\tS_name\tSLength\tWinLengt
h\tSPACE\n");

CString PROTO_TAG_HEADER=CString::CString(
   "TAG_File\tFRAME_Name\tSTRING_name\tS_Name\tLegnth\tCOMM\n");

//=============================================================
=============
void init_protocol(char *name)
{short FLG;
 FLG=_access(PROTOCOL_NAME,0); //0 if exist
 PROTOCOL=fopen(PROTOCOL_NAME,"a");
 if(FLG)
    fprintf(PROTOCOL,"AUTO and CROSS correlation functions \n %s",
         PROTO1_HEADER);
 PROTOCOL_START=name;
 PROTOCOL_START+="\t";
}
//=============================================================
===========
int open_inp_prot(char *name)
{if(!(INP_PROTOCOL=fopen(name,"r"))) return 1;
 //split first str
 fscanf(INP_PROTOCOL,"%*[^\n]s");
 return 0;
}
//$$$$$$$$$$$$$$$$$$$$$$$$$$$$$$$$$$$$$$$$$$$$$$$$$$$$$$$$$$$$$
$$$$$$$$$$$$$$$$$$$$$
//return  file name without extwntion in "name" and TRUE 1 if file exist;
int next_pict(char *name,char *mask,char *ext,int num)
                         //if num=-2 initalisation;
                         //    -1 next
                         //    >0  adding this # to mask
                         // NULL if notexist file with ".rgb"
{static int now;
 char full_name[80];
 strcpy(name,mask);
 if (num==-2)now=0;
 else if (num==-1)
        now++;
 else if (num<0) return 1;
 else now=num;
 _itoa( now, name+strlen(name), 10);
 strcat(strcpy(full_name,name),ext);
  //1 if file exist
 return(!_access( full_name, 0 ));
}
//=============================================================
======
```

186

```
#include <fstream.h>
int ReadStrInf(char *name,short *StD)
{ifstream InpF;
 char a[80];
 strcat(strcpy(a,name),".str");
 short i;
 InpF.open(a,ios::in|ios::nocreate);
   if(InpF.fail())
      {InpF.clear(0);
       return 1;
       }
   InpF.getline(a,80,'\n');
   InpF.getline(a,80,'\n');
   InpF.getline(a,80,'\n');
   InpF.getline(a,80,'\n');
   InpF.getline(a,80,'\n');
   InpF.getline(a,80,'\n');
   i=0;
   do
    {
     InpF>>StD[i++];
     if (InpF.eof()|| i>17)
        { StD[-i]=-1;
          break;
        }
     InpF>>StD[i++];
    }
   while(1);
  InpF.close();
   return 0;
}

//========================================================
==========
SCR_PNT winsize;
//========================================================
======
int main(int argc,char* argv[])
{int FLG_F=0, FLG_WRIGHT=0;
 FILE *datainf;
 short winstep, map_stnd;
 short n=0;
 SCR_PNT t_pos;
   if((argc != 3) && (argc !=4))
       {
        printf(" target-file proto_file_mask \n");
        FLG_F=0;
       return(1);
      }
```

```
    else
      if(argc==4)
          {FLG_F=1;
           if(!(datainf=fopen(argv[3],"r"))) return 0;
          }
if(FLG_F)
  {get_shift_f(datainf,sh); //    GET SCALE
   get_number_3_f(datainf); //    GET SCALE
  }
else
  {get_shift(sh); //  GET SCALE    0
   get_number_3();
  } strcpy(ARGV_1,argv[1]);
PROTOCOL_NAME=argv[1];
PROTOCOL_NAME+=".dbc";
init_protocol(argv[1]);

// ================ GRAPHICS START
        if(GRAPHICS_START(&vc,GRAPHMODE)) exit(-1);
//========= TARGET PICTURE name and vertexes
SCR_PNT target_pos;    // CONSTRACTOR default 0,0
short StrDescr[17];
   _splitpath( argv[1], drive,dir,TAG_name,ext );
   pict_target=sign_storage_rgb(argv[1],vc );
   if(ReadStrInf(argv[1],StrDescr))
             {printf("STR  PROTO not exist"); GRAPH_OUT(-1);return -1;
             };

winsize.r=pict_target.s_rows;
   winstep=winsize.c;
//"PROTO_File\tFRAME_Name\tSTRING_name\tS_name\SLength\tWinLengt
h\tSPACE\n");
fprintf(PROTOCOL,"%s %8s\t%6s\t%12s\t%4d\t%4d\t%12s\n%s",
        (const char
*)PROTOCOL_START,FRAME_Name,STRING_name,SIGN_name,
              pict_target.s_cols,winsize.c,SP[MAP],
        (const char *)   PROTO_TAG_HEADER);

//========= PROTOTYPE      LOOP OVER names
char   proto_name[NAME_LENGTH],buff[4];
SCR_PNT proto_pos.z;
//loop over masks
//return  file name without extention in "name" and TRUE 1 if file exist;
short proto_number=0; //# 0;
while( next_pict( proto_name,argv[2],".rgb", proto_number))
  { proto_number=-1; //next;
SCR_PNT pr_v[4];
```

188

```
// PROTO_INFORMATION IN PROTOCOL
    pict_proto=sign_storage_rgb(proto_name,vc );
    picture_inf_num_2(proto_name,pr_v,0,".str"); //only for SIGN_name
//   "TAG_File\tFRAME_Name\tSTRING_name\tS_Name\tLegnth\n")
    fprintf(PROTOCOL," %12s\t %8s\t %6s\t %12s\t%4d\n", proto_name,FRAME_Name,STRING_name,SIGN_name,pict_proto.s_cols);

TAG_hight=pict_proto.s_rows;
// TARGET PRESENTATION
        _clearscreen(_GCLEARSCREEN);
        proto_pos.c=target_pos.c=10;
        proto_pos.r=(target_pos.r=10)+pict_target.s_rows+5;
        sign_present_RGB( pict_target,target_pos);
        sign_present_RGB(pict_proto,proto_pos);
//=================================
        corr_win_proto(pict_target, pict_proto,
                winsize, winstep,CORR_THRESH,StrDescr);

pict_proto.free_PCT();
    }
_displaycursor( _GCURSORON );
_setvideomode( _DEFAULTMODE );
pict_target.free_PCT();
fclose(PROTOCOL);
return(0);
}

//
================================================================
========
void get_shift_f(FILE *f,double * sh) // INITIALISATION GRAPHICMODE,
GET SCALE
{int i;
    for(i=0;i<4; i++)
        {
        fscanf(f,"%lf %lf\n",sh+i++,sh+i);
        }
}
//
================================================================
========
void get_shift(double * sh) // INITIALISATION GRAPHICMODE, GET SCALE
{int i;
        cout<< "vertexes shift over rows ( top_right, bottom_right, bottom_left,
top_left %\n";
        for (i=0;i<4; i++)
            cin>>sh[i];
}
```

```
//===========================================================
==========
int get_number_3() // INITIALISATION GRAPHICMODE, GET SCALE
{int R;
    _displaycursor( _GCURSORON );
    _setvideomode( _DEFAULTMODE );
    cout << " [<0 EXIT], color_map (0-NTSC, 1-HSI,2-NEW,3-RGB,4-
LUMIN_THR 5-HSI\n";
    cout<<"WIN_SIZE\n ";
    cin >>MAP>>winsize.c;
      _displaycursor( _GCURSOROFF );
      _setvideomode( GRAPHMODE );
    make_palette();
return R;
}
//***************************
int get_number_3_f(FILE *f) // INITIALISATION GRAPHICMODE, GET
SCALE
{int R;
    fscanf(f," %d  %d ",&MAP, &(winsize.c));
return 1;
}
//===========================================================
int picture_inf(char *name,SCR_PNT *vertexes)
   {int i;
    char new_name[25];
    FILE *datfp;
    strcat(strcpy(new_name,name),".sgn");
    if(!(datfp=fopen(new_name,"r"))) return 0;
    fscanf(datfp,"%s\n",new_name);
    for(i=0;i<4;i++)
      fscanf(datfp,"%d %d\n",&(vertexes[i].c),&(vertexes[i].r));
   fclose(datfp);
return 1;
}
//================================
//===========================================================
int picture_inf_num_2(char *name,SCR_PNT *vertexes,short n,char
*ext=".sgn")
   {int i,j;
    char new_name[45];
    FILE *datfp;
    strcat(strcpy(new_name,name),ext);

if(!(datfp=fopen(new_name,"r"))) return 0;
fscanf(datfp,"%*s %*s %*s %*s %*s \n");
fscanf(datfp,"%s %s %s %s %s",&f_name,&FILE_name, &FRAME_Name,
                         &STRING_name, &SIGN_name);
    for(j=0;j<n+1;j++)
```

```c
    for(i=0;i<4;i++)
        if(fscanf(datfp,"%d %d\n",&(vertexes[i].c),&(vertexes[i].r))==EOF)
            {fclose (datfp); return 0;}
    fclose(datfp);
return 1;
}
//============================================================
/*void write_sign_inf(char *pr,PCT pict_now)
{ char fl_fp[50],f_name[9];

int FLG;
  FILE *dathere,*database;
  _splitpath( pr, drive,dir,f_name,ext );
  strcat(strcpy(fl_fp,pr),".sgn");
  dathere=fopen(fl_fp,"w");
  FLG=_access("PROTODB.1", 0 );// -1 if not exist if(!(database=fopen("PROTODB.1","a")))
    {strcpy(fl_fp,"CAN NOT CREATE D_BASE FILE");
        exit(-1);}
fprintf(dathere, " WIN_name FILE_name FRAME_Name  STRING_name
SIGN_name\n ");
fprintf(dathere,"%8s %9s %10s %11s %9s \n",f_name, FILE_name, FRAME_Name,STRING_name,SIGN_name);
if(FLG)
    fprintf(database,  " WIN_name FILE_name FRAME_Name  STRING_name
SIGN_name\n ");
    fprintf(database,"%8s %9s %10s %11s %9s \n",f_name, FILE_name, FRAME_Name,STRING_name,SIGN_name);
  fprintf(dathere,"%d 0\n",pict_now.s_cols-1);
  fprintf(dathere,"%d %d \n",pict_now.s_cols-1,pict_now.s_rows-1);
  fprintf(dathere," 0 %d\n",pict_now.s_rows-1);
  fprintf(dathere," 0  0\n");

fclose(dathere);
fclose(database);
} */
//=========================================================

//============================================================
int picture_inf_num(char *name,SCR_PNT *vertexes,short n)
    {int i,j;
    char new_name[25];
    FILE *datfp;
    strcat(strcpy(new_name,name),".sgn");
    if(!(datfp=fopen(new_name,"r"))) return 0;
    fscanf(datfp,"%s\n",new_name);
```

```
    for(j=0;j<n+1;j++)
      for(i=0;i<4;i++)
        if(fscanf(datfp,"%d %d\n",&(vertexes[i].c),&(vertexes[i].r))==EOF)
           {fclose (datfp); return 0;}
    fclose(datfp);
  return 1;
  }
//===========================================================
int picture_inf_num_new(char *name,SCR_PNT *vertexes,short n)
  {int i,j;
   char new_str[80];
   FILE *datfp;
   int r,FLG=0;
   strcat(strcpy(new_str,name),".sgn");
   if(!(datfp=fopen(new_str,"r"))) return 0;
   r=fscanf(datfp,"%[^\n]s ",new_str);
   r=fscanf(datfp," %[^\n]s ",new_str);
   if(__iscsymf( (int)new_str[0]))//FILE INFORMATION )
                              //(letter or underscore)
       {sscanf(new_str," %s %s %s %s ",&FILE_name, &FRAME_Name,
                             &STRING_name, &SIGN_name);
         r=fscanf(datfp," %[^\n]s ",new_str);
       }
    for(j=0;j<n+1;j++)
      for(i=0;i<4;i++)
        {if(FLG)
           if(fscanf(datfp," %[^\n]s",new_str)==EOF)
              {fclose (datfp); return 0;}
         FLG=1;
         sscanf(new_str," %d %d",&(vertexes[i].c),&(vertexes[i].r));
        }
    fclose(datfp);
  return 1;
  }
//===========================================================
```

```c
#include <vmemory.h>
#include <stdio.h>
#include <stdlib.h>
#include <conio.h>
#include <malloc.h>
#include <float.h>
#include <graph.h>
include <string.h> include "Ins_corr.h"
//#include "tem_plt7.h"
#include "cor_fnc.h"
//#include "deb_out.h"

define MAX_LINE 1024 extern FILE *PROTOCOL;

extern double GAMMA,Thresh_mdl;
extern short MAP;
extern short VOITING;
extern struct _videoconfig vc;
extern char f_name[40],FILE_name[40], FRAME_Name[40],
       STRING_name[40], SIGN_name[40];
//=============================================================
===
void  draw_int(short st,short w,COLOR_VEC intr);
//=============================================================
===
void  draw_color_corr_1(COLOR_VEC corr,short F,
short CH_HIGHT,
short CH_BASE,double THRESH,
short pos_now,short size);
//=============================
void  draw_chart(double *dist_line,short n,double max_value=0,
short CH_HIGHT= 100,
short CH_BASE= 480,double THRESH=0,
short t_pos=60);
//=============================================================
================
#define HOR_HARM 2
#define VERT_HARM 4
//————————————————————————
inline COLOR_VEC sign_for_col(short d, COLOR_VEC col)
  { COLOR_VEC out;
    int i;
    for (i=0;i<3;i++)
              out.c[i]= d?col.c[i]:-col.c[i];
    return out;
```

```
}
//_____
/*COLOR_VEC int_value_1(PCT w,double Thr,
    COLOR_VEC (*p_funct)(COLOR_RGB p1,double
Thresh_mdl),AVERAGE_VEC w_av)
{COLOR_VEC col,sum[9][9],out,c1;
 const COLOR_VEC z={0,0,0};

short h_t,v_t,i,x,y,h,v,
   half_x=w.s_cols>>1,half_y=w.s_rows>>1,
   quot_x=w.s_cols>>2,quot_y=w.s_rows>>2;
  long n;

for(h=0;h<HOR_HARM+1;h++)
    for(v=0;v<VERT_HARM+1;v++)
        sum[v][h].c[0]=sum[v][h].c[1]=sum[v][h].c[2]=0.0;
   n=w.s_cols*w.s_rows;
   n*=n;
  for(y=0;y<w.s_rows;y++)
    for(v=0;v<VERT_HARM+1;v++)
      {
        v_t=y*((v+1)>>1);
        v_t=(v_t+(v & 0x0001 ? quot_y:0))/half_y;
        v_t &= 0x0001;
        for(x=0;x<w.s_cols;x++)
         {col=p_funct(w.get_pixel(y,x),Thr);
          c1= sign_for_col(v_t,col);
          for(h=0;h<HOR_HARM+1;h++)
            {
              h_t=x*((h+1)>>1);
              h_t=(h_t+(h & 0x0001 ?quot_x:0))/half_x;
              h_t &= 0x0001;
              c1= sign_for_col(h_t,c1);
              for(i=0;i<3;i++)
                sum[v][h].c[i]+=c1.c[i];
            }
         }
       }
double s0,dd,max_v=0,th;
  for(dd=i=0;i<3;i++)
    {for(s0=h=0;h<HOR_HARM+1;h++)
        for(v=0;v<VERT_HARM+1;v++)
            if(h||v)
              s0+=sum[v][h].c[i]*sum[v][h].c[i];
    s0/=n;
    dd=w_av.var[i]+w_av.md[i]*w_av.md[i];
    out.c[i]=(dd?s0/dd:1);
    max_v=(max_v<out.c[i])?out.c[i]:max_v;
  }
```

194

```
  for(i=0;i<3;i++)
    {th=out.c[i]/max_v;
//              THRESHOLDING
    if(th<0.2)
      out.c[i]=0;
    }
return out;
} */
//================================================================
COLOR_VEC (*PointColFunct())(COLOR_RGB p1,double Thresh_mdl)

{ switch ( MAP)
       {case NTSC:return(color_space_NTSC);
        case New_plan:return(color_space_NEW);
        case HSI:return(color_space_RGB);
        case RGB:return(color_space_RGB_simple);
        case LUMIN_THR:return(color_space_LUMIN_THR);
        case IHS:return(color_space_IHS);
        };
return NULL;
}
//================================================================
const short CH_HIGHT_D=100, CH_BASE_D=470,
        CH_HIGHT=100, CH_BASE=450, t_pos=40;
//================================================================
double scale_fact=1;
//================================================================
void corr_win_proto(PCT win_source,PCT Proto, SCR_PNT win_size
            ,short win_step,double CORR_THRESH,short *StripEnds)
   {
    short i;
    char mess[40];
    short F=0;
    COLOR_VEC (*p_funct)(COLOR_RGB p1,double Thresh_mdl);
    p_funct=PointColFunct();

PCT win(win_size.c,win_size.r);
    PCT tag(win_size.c,win_size.r);
    SCR_PNT st_t,st_win;
    AVERAGE_VEC middle_win[64],middle_tag;
    const AVERAGE_VEC z={{0,0,0},{0,0,0}};

COLOR_VEC *corr_now,cr;
    const COLOR_VEC z_col={0.0,0.0,0.0};
    int line_size=win_source.s_cols+Proto.s_cols;
//memory allocation
```

```c
if((corr_now= (COLOR_VEC*) malloc(
sizeof(COLOR_VEC)*(size_t)line_size*3))==NULL)
        {printf("WIN NOT MEMORY"); return;};

st_t.r=0;
double dd;-
    st_win.r=0;
 short k,FLG_COL=1;
  short StripStart,StripStop;
  short PartNum;
 k=PartNum=0;
 while(StripEnds[PartNum]>=0)
    {StripStart=StripEnds[PartNum++];
     StripStop=StripEnds[PartNum++];
     for (st_win.c=StripStart;
st_win.c+win_size.c<=StripStop;st_win.c+=win_step,k++)
        {
        FLG_COL=1;
        for(i=0;i<line_size;corr_now[i++]=z_col);

win.load_template(win_source,st_win);
        middle_win[k]=average(win,Thresh_mdl,p_funct);

#ifdef MICI
endif const COLOR_VEC z_UNIT={1.0,1.0,1.0};

for (st_t.c=0;st_t.c<=Proto.s_cols-win_size.c;st_t.c++)
            {
//==============================================
        tag.load_template(Proto,st_t);
        middle_tag=average(tag,Thresh_mdl,p_funct);
// DIFF ABS VALUES
#ifdef SINGL_VAL
        cr=template_conv_1( tag,win,Thresh_mdl,z_UNIT,p_funct);
        strcpy(mess," VECTOR Approach to CORRELATION ");
        corr_now[st_t.c]=Correlation_single_1(cr,middle_tag,middle_win[k],z_
UNIT);
#ifdef ABS_VALUE
        strcpy(mess," DIFF ABS VALUES/ max ABS VALUES");
        cr=
            template_abs_diff_1 (tag,win,Thresh_mdl,z_UNIT,p_funct,
                middle_tag,middle_win[k]);
#else
        cr=template_conv_1( tag,win,Thresh_mdl,z_UNIT,p_funct);
        strcpy(mess," PEARSON CORR. ");
        corr_now[st_t.c]=Correlation(cr,middle_tag,middle_win[k],z_UNIT);
#endif
```

```
#endif

// ONLY LUMINANCE
//      strcat(mess," ALL 3 COMP");
        strcat(mess," Only 0 COMP");
        corr_now[st_t.c].c[1]=corr_now[st_t.c].c[2]=
            corr_now[st_t.c].c[0];
#ifdef MICI
draw_color_corr_1(
corr_now[st_t.c],FLG_COL,CH_HIGHT_D,CH_BASE_D,CORR_THRESH,
                st_t.c,Proto.s_cols);
FLG_COL=0;
#endif
        }
//======FILL PROTOCOL
//$ WILL BE USED AS SEPARATOR FOR READING
    fprintf(PROTOCOL,"$\t%s\t$\t%4d\t $\n",mess, st_win.c);
    for(i=0;i<Proto.s_cols;i++) //ONLY 0 COMP
        fprintf(PROTOCOL,"%6g\t",corr_now[i].c[0]);
        fprintf(PROTOCOL," \n");
    }
} win.free_PCT();
tag.free_PCT();
free((void *)corr_now);
return ;
}
//===========================================================
===============

//===========================================================
======================
void draw_chart(double *dist_line,short n,double max_value,
short CH_HIGHT,
short CH_BASE,double THRESH,
short t_pos)

{short i,j;
 double p,
  crit=max_value;
  if(!max_value)
    for (i=0;i<n;i++)
        crit=(dist_line[i]>crit)? dist_line[i]:crit;
    else crit=max_value;
  if(!crit)
      crit=1;
  p= CH_HIGHT*(1-THRESH/crit);
  _moveto( 0,CH_BASE-CH_HIGHT    );
```

```
    _lineto(n,CH_BASE-CH_HIGHT);
    _moveto(0,CH_BASE-(short)p);
    _lineto(n,CH_BASE-(short)p);
    _moveto( (short) 0,(short) CH_BASE  );
    for (i=0;i<__min(n,vc.numxpixels);i++)
     {j=CH_BASE-CH_HIGHT+(short)(dist_line[i]*CH_HIGHT/crit);
      if(j<0)
//      getch()
         ;
      else
         if(!_lineto( i,j))
//           getch()
            ;
    }
    if(t_pos)
         _settextposition( t_pos,30);
 char buffer[30];
    sprintf(buffer, "MAX = %f10 ", crit );
    _outtext( buffer );

}
//===========================================================
=
void  draw_int(short st,short w,COLOR_VEC intr)
{short CH_HIGHT=100,
 CH_BASE=200;
 double p;
           _setcolor( color_num(240,240,240));
          _setcolor( color_num(240,0,0));
            p=CH_BASE-CH_HIGHT*intr.c[0];
            _moveto( st,(short)p);
            _lineto(st+w,(short)p);
              _setcolor( color_num(0,240,0));
            p=CH_BASE-CH_HIGHT*intr.c[1];
            _moveto( st,(short)p);
            _lineto(st+w,(short)p);
              _setcolor( color_num(0,0,240));
            p=CH_BASE-CH_HIGHT*intr.c[2];
            _moveto( st,(short)p);
            _lineto(st+w,(short)p);
}
//===========================================================
====================
void   draw_color_corr(COLOR_VEC corr,COLOR_RGB *corr_old,short F,
short CH_HIGHT,
short CH_BASE,double THRESH,
short pos_now)
{double p;
 short j;
```

```
if(F)
 {
   _setcolor( color_num(240,240,240));
   p= CH_HIGHT*(1-THRESH);
   _moveto( 0,CH_BASE-CH_HIGHT   );
   _lineto(512,CH_BASE-CH_HIGHT);
   _moveto(0,CH_BASE-(short)p);
   _lineto(512,CH_BASE-(short)p);
 }
   _setcolor( color_num(240,240,240));
   _moveto( pos_now,corr_old->r);
   j=CH_BASE-CH_HIGHT+(short)(corr.c[0]*CH_HIGHT);
   _lineto(pos_now+1 ,j);
   corr_old->r=j;
   _moveto( pos_now,corr_old->g);
   _setcolor( color_num(240,0,0));
   j=CH_BASE-CH_HIGHT+(short)(corr.c[1]*CH_HIGHT);
   _lineto(pos_now+1 ,j);
   corr_old->g=j;
   _moveto( pos_now,corr_old->b);
   _setcolor( color_num(0,240,0));
   j=CH_BASE-CH_HIGHT+(short)(corr.c[2]*CH_HIGHT);
   _lineto(pos_now+1 ,j);
   corr_old->b=j;
}
//=========================================================
=====
void   draw_color_corr_1(COLOR_VEC corr,short F,
short CH_HIGHT,
short CH_BASE,double THRESH,
short pos_now,short size)
{
 short j,k,l,i,st;
 static short real_size,pos_old;
 short POS;
static COLOR_RGB corr_old;
real_size=size*scale_fact;
POS=10+pos_now*scale_fact;
_setcolor( color_num(240,240,240));
if(F)
 {
   _setcolor( color_num(0,0,0));
   _rectangle( _GFILLINTERIOR,0,CH_BASE-3*CH_HIGHT-
(CH_HIGHT_D>>1),
                  real_size ,CH_BASE);
   _setcolor( color_num(240,240,240));
   corr_old.r=k=CH_BASE-2*CH_HIGHT-40;
   st=CH_HIGHT/10;
   for(i=0;i<3;i++)
```

```
        {
         _moveto( 10,k-CH_HIGHT);
         _lineto(10,k);
         _lineto(10+real_size,k);
         _moveto(10,k-CH_HIGHT*THRESH);
         _lineto(10+real_size,k-CH_HIGHT*THRESH);
         for(l=0,j=1;j<11;j++)
            {l+=st;
             _moveto(
                  (j==5)?5:((j==10)?0:7)
                  ,k-l);
             _lineto(10,k-l);
            }
         k+=(CH_HIGHT+20);
        }
        corr_old.g=corr_old.r+CH_HIGHT+20;
        corr_old.b=corr_old.g+CH_HIGHT+20;
        pos_old=10;
       }
       _setcolor( color_num(240,240,240));
       k=CH_BASE;
       _moveto( pos_old,corr_old.b);
       j=k-(short)(corr.c[2]*CH_HIGHT);
       _lineto((short)(POS) ,j);
       corr_old.b=j;

k-=(CH_HIGHT+20);
       _moveto( pos_old,corr_old.g);
       j=k-(short)(corr.c[1]*CH_HIGHT);
       _lineto((short)(POS),j);
       corr_old.g=j;

k-=(CH_HIGHT+20);
       _moveto( pos_old,corr_old.r);
       j=k-(short)(corr.c[0]*CH_HIGHT);
       _lineto((short)(POS) ,j);
       corr_old.r=j;
       pos_old=POS;

}
```

SUBSTITUTE SHEET (RULE 26)

```
void corr_win_proto(PCT win_source,PCT Proto, SCR_PNT win_size
          ,short win_step,double CORR_THRESH,
          short *StripEnds) ;
```

201

```
ORIGIN = PWB
ORIGIN_VER = 2.0
PROJ = PRT_ANL2
PROJFILE = PRT_ANL2.MAK
BUILDDIR = obj
DEBUG = 1

BRFLAGS = /o obj\$(PROJ).bsc
BSCMAKE = bscmake
SBRPACK = sbrpack
NMAKEBSC1 = set
NMAKEBSC2 = nmake
BROWSE   = 1
CC = cl
CFLAGS_G = /W2 /BATCH /FR$*.sbr
CFLAGS_D = /f /Zi /Od
CFLAGS_R = /f- /Ot /Oi /Ol /Oe /Og /Gs
CXX = cl
CXXFLAGS_G = /AL /W4 /G2 /D_DOS /BATCH /FR$*.sbr
CXXFLAGS_D = /f- /Od /FPi87 /Zi /DMICI /DSINGLE_WIN
CXXFLAGS_R = /f- /Ot /Ol /Og /Oe /Oi /FPi87 /Gs /DMICI /DSINGLE_WIN
MAPFILE_D = NUL
MAPFILE_R = NUL
LFLAGS_G = /NOI /STACK:32000 /BATCH /ONERROR:NOEXE
LFLAGS_D = /CO /FAR /PACKC
LFLAGS_R = /EXE /FAR /PACKC
LINKER   = link
ILINK = ilink
LRF = echo > NUL
ILFLAGS = /a /e
LLIBS_G = graphics lafxcr
CVFLAGS = /25 /S
RUNFLAGS = ..\win4\s160_0 corrthr.06
PACK_SBRS = 1

FILES = PRT_ANL2.CPP ..\LIB\VICALLOC.CPP ..\LIB\PROJCTN7.CPP\
    ..\LIB\PIC_M7.CPP ..\LIB\RES_MCH7.CPP PRT_2MD.CPP
OBJS = obj\PRT_ANL2.obj obj\VICALLOC.obj obj\PROJCTN7.obj
obj\PIC_M7.obj\
    obj\RES_MCH7.obj obj\PRT_2MD.obj
SBRS = obj\PRT_ANL2.sbr obj\VICALLOC.sbr obj\PROJCTN7.sbr
obj\PIC_M7.sbr\
    obj\RES_MCH7.sbr obj\PRT_2MD.sbr all: obj\$(PROJ).exe .SUFFIXES:
.SUFFIXES:
.SUFFIXES: .obj .sbr .cpp
```

```
obj\PRT_ANL2.obj : PRT_ANL2.CPP C:\C700\INCLUDE\stdlib.h\
       C:\C700\INCLUDE\conio.h C:\C700\INCLUDE\stdio.h\
       C:\C700\INCLUDE\string.h C:\C700\INCLUDE\graph.h\
       C:\C700\INCLUDE\float.H C:\C700\INCLUDE\time.h
C:\C700\INCLUDE\ctype.h\
       C:\C700\INCLUDE\fstream.h C:\C700\MFC\INCLUDE\afx.h prt_anls.h\
       PIC_PRO.h C:\C700\INCLUDE\iostream.h
C:\C700\MFC\INCLUDE\afx.inl\
       ..\LIB\projctn7.h ..\LIB\pic_mch7.h ..\LIB\res_mch7.h\
       c:\ilya\lib\lin_tm7.h C:\C700\INCLUDE\direct.h
C:\C700\INCLUDE\ios.h\
       C:\C700\INCLUDE\streamb.h C:\C700\INCLUDE\istream.h\
       C:\C700\INCLUDE\ostream.h C:\C700\INCLUDE\math.h\
       C:\C700\INCLUDE\vmemory.h
!IF $(DEBUG)
       @$(CXX) @<<obj\$(PROJ).rsp
/c $(CXXFLAGS_G)
$(CXXFLAGS_D) /Foobj\PRT_ANL2.obj PRT_ANL2.CPP
<<
!ELSE
       @$(CXX) @<<obj\$(PROJ).rsp
/c $(CXXFLAGS_G)
$(CXXFLAGS_R) /Foobj\PRT_ANL2.obj PRT_ANL2.CPP
<<
!ENDIF obj\PRT_ANL2.sbr : PRT_ANL2.CPP C:\C700\INCLUDE\stdlib.h\
       C:\C700\INCLUDE\conio.h C:\C700\INCLUDE\stdio.h\
       C:\C700\INCLUDE\string.h C:\C700\INCLUDE\graph.h\
       C:\C700\INCLUDE\float.H C:\C700\INCLUDE\time.h
C:\C700\INCLUDE\ctype.h\
       C:\C700\INCLUDE\fstream.h C:\C700\MFC\INCLUDE\afx.h prt_anls.h\
       PIC_PRO.h C:\C700\INCLUDE\iostream.h
C:\C700\MFC\INCLUDE\afx.inl\
       ..\LIB\projctn7.h ..\LIB\pic_mch7.h ..\LIB\res_mch7.h\
       c:\ilya\lib\lin_tm7.h C:\C700\INCLUDE\direct.h
C:\C700\INCLUDE\ios.h\
       C:\C700\INCLUDE\streamb.h C:\C700\INCLUDE\istream.h\
       C:\C700\INCLUDE\ostream.h C:\C700\INCLUDE\math.h\
       C:\C700\INCLUDE\vmemory.h
!IF $(DEBUG)
       @$(CXX) @<<obj\$(PROJ).rsp
/Zs $(CXXFLAGS_G)
$(CXXFLAGS_D) /FRobj\PRT_ANL2.sbr PRT_ANL2.CPP
<<
!ELSE
       @$(CXX) @<<obj\$(PROJ).rsp
/Zs $(CXXFLAGS_G)
```

```
$(CXXFLAGS_R) /FRobj\PRT_ANL2.sbr PRT_ANL2.CPP
<<
!ENDIF obj\VICALLOC.obj : ..\LIB\VICALLOC.CPP C:\C700\INCLUDE\stdlib.h\
        C:\C700\INCLUDE\stdio.h C:\C700\INCLUDE\vmemory.h\
        C:\C700\INCLUDE\malloc.h
!IF $(DEBUG)
        @$(CXX) @<<obj\$(PROJ).rsp
/c $(CXXFLAGS_G)
$(CXXFLAGS_D) /Foobj\VICALLOC.obj ..\LIB\VICALLOC.CPP
<<
!ELSE
        @$(CXX) @<<obj\$(PROJ).rsp
/c $(CXXFLAGS_G)
$(CXXFLAGS_R) /Foobj\VICALLOC.obj ..\LIB\VICALLOC.CPP
<<
!ENDIF obj\VICALLOC.sbr : ..\LIB\VICALLOC.CPP C:\C700\INCLUDE\stdlib.h\
        C:\C700\INCLUDE\stdio.h C:\C700\INCLUDE\vmemory.h\
        C:\C700\INCLUDE\malloc.h
!IF $(DEBUG)
        @$(CXX) @<<obj\$(PROJ).rsp
/Zs $(CXXFLAGS_G)
$(CXXFLAGS_D) /FRobj\VICALLOC.sbr ..\LIB\VICALLOC.CPP
<<
!ELSE
        @$(CXX) @<<obj\$(PROJ).rsp
/Zs $(CXXFLAGS_G)
$(CXXFLAGS_R) /FRobj\VICALLOC.sbr ..\LIB\VICALLOC.CPP
<<
!ENDIF obj\PROJCTN7.obj : ..\LIB\PROJCTN7.CPP C:\C700\INCLUDE\graph.h\
        C:\C700\INCLUDE\stdlib.h C:\C700\INCLUDE\iostream.h
..\LIB\projctn7.h\
        C:\C700\INCLUDE\ios.h C:\C700\INCLUDE\streamb.h\
        C:\C700\INCLUDE\istream.h C:\C700\INCLUDE\ostream.h\
        C:\C700\INCLUDE\math.h
!IF $(DEBUG)
        @$(CXX) @<<obj\$(PROJ).rsp
/c $(CXXFLAGS_G)
$(CXXFLAGS_D) /Foobj\PROJCTN7.obj ..\LIB\PROJCTN7.CPP
<<
!ELSE
        @$(CXX) @<<obj\$(PROJ).rsp
/c $(CXXFLAGS_G)
$(CXXFLAGS_R) /Foobj\PROJCTN7.obj ..\LIB\PROJCTN7.CPP
```

```
<<
!ENDIF obj\PROJCTN7.sbr : ..\LIB\PROJCTN7.CPP C:\C700\INCLUDE\graph.h\
      C:\C700\INCLUDE\stdlib.h C:\C700\INCLUDE\iostream.h
..\LIB\projctn7.h\
      C:\C700\INCLUDE\ios.h C:\C700\INCLUDE\streamb.h\
      C:\C700\INCLUDE\istream.h C:\C700\INCLUDE\ostream.h\
      C:\C700\INCLUDE\math.h
!IF $(DEBUG)
      @$(CXX) @<<obj\$(PROJ).rsp
/Zs $(CXXFLAGS_G)
$(CXXFLAGS_D) /FRobj\PROJCTN7.sbr ..\LIB\PROJCTN7.CPP
<<
!ELSE
      @$(CXX) @<<obj\$(PROJ).rsp
/Zs $(CXXFLAGS_G)
$(CXXFLAGS_R) /FRobj\PROJCTN7.sbr ..\LIB\PROJCTN7.CPP
<<
!ENDIF obj\PIC_M7.obj : ..\LIB\PIC_M7.CPP C:\C700\INCLUDE\stdlib.h\
      C:\C700\INCLUDE\stdio.h C:\C700\INCLUDE\graph.h
C:\C700\INCLUDE\math.h\
      C:\C700\INCLUDE\io.h C:\C700\INCLUDE\fcntl.h
C:\C700\INCLUDE\string.h\
      C:\C700\INCLUDE\float.H C:\C700\INCLUDE\malloc.h ..\LIB\phdr.h\
      ..\LIB\vicalloc.h ..\LIB\pic_mch7.h C:\C700\INCLUDE\vmemory.h\
      ..\LIB\projctn7.h
!IF $(DEBUG)
      @$(CXX) @<<obj\$(PROJ).rsp
/c $(CXXFLAGS_G)
$(CXXFLAGS_D) /Foobj\PIC_M7.obj ..\LIB\PIC_M7.CPP
<<
!ELSE
      @$(CXX) @<<obj\$(PROJ).rsp
/c $(CXXFLAGS_G)
$(CXXFLAGS_R) /Foobj\PIC_M7.obj ..\LIB\PIC_M7.CPP
<<
!ENDIF obj\PIC_M7.sbr : ..\LIB\PIC_M7.CPP C:\C700\INCLUDE\stdlib.h\
      C:\C700\INCLUDE\stdio.h C:\C700\INCLUDE\graph.h
C:\C700\INCLUDE\math.h\
      C:\C700\INCLUDE\io.h C:\C700\INCLUDE\fcntl.h
C:\C700\INCLUDE\string.h\
      C:\C700\INCLUDE\float.H C:\C700\INCLUDE\malloc.h ..\LIB\phdr.h\
      ..\LIB\vicalloc.h ..\LIB\pic_mch7.h C:\C700\INCLUDE\vmemory.h\
      ..\LIB\projctn7.h
```

```
!IF $(DEBUG)
    @$(CXX) @<<obj\$(PROJ).rsp
/Zs $(CXXFLAGS_G)
$(CXXFLAGS_D) /FRobj\PIC_M7.sbr ..\LIB\PIC_M7.CPP
<<
!ELSE
    @$(CXX) @<<obj\$(PROJ).rsp
/Zs $(CXXFLAGS_G)
$(CXXFLAGS_R) /FRobj\PIC_M7.sbr ..\LIB\PIC_M7.CPP
<<
!ENDIF obj\RES_MCH7.obj : ..\LIB\RES_MCH7.CPP C:\C700\INCLUDE\stdlib.h\
    C:\C700\INCLUDE\vmemory.h ..\LIB\pic_mch7.h ..\LIB\res_mch7.h\
    C:\C700\INCLUDE\graph.h ..\LIB\projctn7.h C:\C700\INCLUDE\math.h
!IF $(DEBUG)
    @$(CXX) @<<obj\$(PROJ).rsp
/c $(CXXFLAGS_G)
$(CXXFLAGS_D) /Foobj\RES_MCH7.obj ..\LIB\RES_MCH7.CPP
<<
!ELSE
    @$(CXX) @<<obj\$(PROJ).rsp
/c $(CXXFLAGS_G)
$(CXXFLAGS_R) /Foobj\RES_MCH7.obj ..\LIB\RES_MCH7.CPP
<<
!ENDIF obj\RES_MCH7.sbr : ..\LIB\RES_MCH7.CPP C:\C700\INCLUDE\stdlib.h\
    C:\C700\INCLUDE\vmemory.h ..\LIB\pic_mch7.h ..\LIB\res_mch7.h\
    C:\C700\INCLUDE\graph.h ..\LIB\projctn7.h C:\C700\INCLUDE\math.h
!IF $(DEBUG)
    @$(CXX) @<<obj\$(PROJ).rsp
/Zs $(CXXFLAGS_G)
$(CXXFLAGS_D) /FRobj\RES_MCH7.sbr ..\LIB\RES_MCH7.CPP
<<
!ELSE
    @$(CXX) @<<obj\$(PROJ).rsp
/Zs $(CXXFLAGS_G)
$(CXXFLAGS_R) /FRobj\RES_MCH7.sbr ..\LIB\RES_MCH7.CPP
<<
!ENDIF obj\PRT_2MD.obj : PRT_2MD.CPP C:\C700\INCLUDE\io.h
C:\C700\INCLUDE\iostream.h\
    C:\C700\INCLUDE\fstream.h prt_anls.h PIC_PRO.h
C:\C700\INCLUDE\ios.h\
    C:\C700\INCLUDE\streamb.h C:\C700\INCLUDE\istream.h\
    C:\C700\INCLUDE\ostream.h ..\LIB\projctn7.h ..\LIB\pic_mch7.h\
    ..\LIB\res_mch7.h c:\ilya\lib\lin_tm7.h C:\C700\INCLUDE\stdlib.h\
```

```
        C:\C700\INCLUDE\direct.h C:\C700\MFC\INCLUDE\afx.h\
        C:\C700\INCLUDE\math.h C:\C700\INCLUDE\vmemory.h\
        C:\C700\INCLUDE\graph.h C:\C700\INCLUDE\string.h\
        C:\C700\INCLUDE\stdio.h C:\C700\INCLUDE\time.h\
        C:\C700\MFC\INCLUDE\afx.inl
!IF $(DEBUG)
        @$(CXX) @<<obj\$(PROJ).rsp
/c $(CXXFLAGS_G)
$(CXXFLAGS_D) /Foobj\PRT_2MD.obj PRT_2MD.CPP
<<
!ELSE
        @$(CXX) @<<obj\$(PROJ).rsp
/c $(CXXFLAGS_G)
$(CXXFLAGS_R) /Foobj\PRT_2MD.obj PRT_2MD.CPP
<<
!ENDIF obj\PRT_2MD.sbr : PRT_2MD.CPP C:\C700\INCLUDE\io.h
C:\C700\INCLUDE\iostream.h\
        C:\C700\INCLUDE\fstream.h prt_anls.h PIC_PRO.h
C:\C700\INCLUDE\ios.h\
        C:\C700\INCLUDE\streamb.h C:\C700\INCLUDE\istream.h\
        C:\C700\INCLUDE\ostream.h ..\LIB\projctn7.h ..\LIB\pic_mch7.h\
        ..\LIB\res_mch7.h c:\ilya\lib\lin_tm7.h C:\C700\INCLUDE\stdlib.h\
        C:\C700\INCLUDE\direct.h C:\C700\MFC\INCLUDE\afx.h\
        C:\C700\INCLUDE\math.h C:\C700\INCLUDE\vmemory.h\
        C:\C700\INCLUDE\graph.h C:\C700\INCLUDE\string.h\
        C:\C700\INCLUDE\stdio.h C:\C700\INCLUDE\time.h\
        C:\C700\MFC\INCLUDE\afx.inl
!IF $(DEBUG)
        @$(CXX) @<<obj\$(PROJ).rsp
/Zs $(CXXFLAGS_G)
$(CXXFLAGS_D) /FRobj\PRT_2MD.sbr PRT_2MD.CPP
<<
!ELSE
        @$(CXX) @<<obj\$(PROJ).rsp
/Zs $(CXXFLAGS_G)
$(CXXFLAGS_R) /FRobj\PRT_2MD.sbr PRT_2MD.CPP
<<
!ENDIF obj\$(PROJ).bsc : $(SBRS)
        $(BSCMAKE) @<<
$(BRFLAGS) $(SBRS)
<< obj\$(PROJ).exe : $(OBJS)
        -$(NMAKEBSC1) MAKEFLAGS=
```

```
        -$(NMAKEBSC2) $(NMFLAGS) -f $(PROJFILE) obj\$(PROJ).bsc
!IF $(DEBUG)
        $(LRF) @<<obj\$(PROJ).lrf
$(RT_OBJS: = +^
) $(OBJS: = +^
)
$@
$(MAPFILE_D)
$(LIBS: = +^
) +
$(LLIBS_G: = +^
) +
$(LLIBS_D: = +^
)
$(DEF_FILE) $(LFLAGS_G) $(LFLAGS_D);
<<
!ELSE
        $(LRF) @<<obj\$(PROJ).lrf
$(RT_OBJS: = +^
) $(OBJS: = +^
)
$@
$(MAPFILE_R)
$(LIBS: = +^
) +
$(LLIBS_G: = +^
) +
$(LLIBS_R: = +^
)
$(DEF_FILE) $(LFLAGS_G) $(LFLAGS_R);
<<
!ENDIF
        $(LINKER) @obj\$(PROJ).lrf .cpp.obj :
!IF $(DEBUG)
        @$(CXX) @<<obj\$(PROJ).rsp
/c $(CXXFLAGS_G)
$(CXXFLAGS_D) /Fo$@ $<
<<
!ELSE
        @$(CXX) @<<obj\$(PROJ).rsp
/c $(CXXFLAGS_G)
$(CXXFLAGS_R) /Fo$@ $<
<<
!ENDIF .cpp.sbr :
```

```
!IF $(DEBUG)
        @$(CXX) @<<obj\$(PROJ).rsp
/Zs $(CXXFLAGS_G)
$(CXXFLAGS_D) /FR$@ $<
<<
!ELSE
        @$(CXX) @<<obj\$(PROJ).rsp
/Zs $(CXXFLAGS_G)
$(CXXFLAGS_R) /FR$@ $<
<<
!ENDIF run: obj\$(PROJ).exe
        obj\$(PROJ).exe $(RUNFLAGS)

debug: obj\$(PROJ).exe
        CV $(CVFLAGS) obj\$(PROJ).exe $(RUNFLAGS)
```

```
#ifndef PIC_PRO
#define PIC_PRO
#include  <stdlib.h>
#include  <direct.h>
#include <afx.h>
#include <pic_mch7.h>
//==================================================
CString MakeName(char *p );
CString MakeName(CString N);

//==========================================================
=======
const SCR_PNT z_0(0,0);
class  PRT:public PCT
        {public:
//information
     CString PathName;
     CString FRAME_Number;
     CString STRING_name;
     CString  SIGN_name;
        short  Pos;    // Position in the string
        long NumberOfChk,MaxNum;
        double *Charact;
//models
        PRT::~PRT()
            {this->free_PCT();
              Pos=0;
                    if(MaxNum)
                       delete Charact;
                    Charact=NULL;
                    MaxNum=NumberOfChk=0;
            }
//————————————————————————
        PRT::PRT()
            {NumberOfChk=MaxNum=s_cols=s_rows=0;
             Charact=NULL;pict=NULL;
             }
//————————————————————————
    PRT::PRT (short n_cols, short n_rows)
       {*(PCT *)this=PCT::PCT(n_cols,n_rows);
        NumberOfChk=MaxNum=0;
        Charact=NULL;
       }
//==========================================================
int read_proto_SGN()
  {
    CString new_name(' ',80);

PathName=MakeName(PathName);
```

```
        new_name=PathName+".sgn";
        char now[80];
        FILE *datfp;
            if(!(datfp=fopen((const char*)new_name,"r"))) return 1;
                if(fscanf(datfp,"%*[^\n]s ")==EOF)goto ERR;
                if(fscanf(datfp,"%s ",now)==EOF)goto ERR;
                if(fscanf(datfp,"%s ",now)==EOF)goto ERR;
                if(fscanf(datfp,"%s ",now)==EOF)goto
    ERR;FRAME_Number=now;
                if(fscanf(datfp,"%s ",now)==EOF)goto
    ERR;STRING_name=now;
                if(fscanf(datfp,"%s ",now)==EOF)goto ERR; SIGN_name=now;
                FRAME_Number.MakeUpper();
                STRING_name.MakeUpper();
                SIGN_name.MakeUpper();
                fclose(datfp);
                return 0;
            ERR:fclose (datfp); return 1;
}
//==========================================================
    int proto_storage_rgb(char *name,struct _videoconfig vc)
            {*(PCT *)this=sign_storage_rgb(name,vc);
            if (!s_cols) return 1;
            PathName=MakeName(name);
            if (read_proto_SGN())
                {free_PCT();
                return 1;
                }
            return 0;
            }
//————————————————————
int read_proto_DBC(FILE *datfp)
    {
    char now[80];
            if(fscanf(datfp,"%s ",now)==EOF)goto
ERR;PathName=MakeName(now);
            if(fscanf(datfp,"%s ",now)==EOF)goto
ERR;FRAME_Number=now;
            if(fscanf(datfp,"%s ",now)==EOF)goto
ERR;STRING_name=now;
            if(fscanf(datfp,"%s ",now)==EOF)goto ERR; SIGN_name=now;
            if(fscanf(datfp,"%d ",&(this->s_cols))==EOF)goto ERR;
            FRAME_Number.MakeUpper();
            STRING_name.MakeUpper();
            SIGN_name.MakeUpper();
            return 1;
        ERR: return 0;
    }
```

```
//=================================================================
int alloc_Charact_dbl(long Num)
{
 if(!(Charact=new double[Num])) return 1;
 MaxNum=Num; NumberOfChk=0;
  return 0;
 }
//————————————————————
void free_Charact()
{delete Charact;
  Charact=NULL;
}
//————————————————————
int read_Charact_dbl(FILE *inp,long Num)
  {short i;
   double d;
   if(MaxNum<(NumberOfChk+Num)) return 1;
   for (i=0;i<Num;i++)
    {if(fscanf(inp,"%lf ",&d) ==EOF) return 1;
     if(fabs(d)<1.0e-4) d=0;
        Charact[NumberOfChk]=d;
     NumberOfChk++;
    }
  return 0;
  }
//————————————————————
double CorrValue(short WNum,short Pnum)
 {return (*(Charact+(long)WNum*s_cols+Pnum));
 }
//————————————————————
};
//========================================= define UnKnown -1
//=================================================================
typedef struct
       { short n;  // voiting numbers
         short pos; // position in string
         double value; //value
       } RSLT;

//————————————————————
void HistCollect(short NOfWin,short St,short Fin,PRT &Db);
RSLT LineEstimation (short TagSize, PRT &Db,short NOfWin,
                         short WSize,double Thr);
int LineInf(const PRT &P, PRT T, short rw, short Xpos,struct _videoconfig vc);
double LinInter( PRT &P,short WNum,short WSize ,double Pt);
```

212

```
void HistThresh(short *H,short *BotThr,short *TopThr,short num);
#endif
```

```
#ifndef DECISION
#define DECISION
#include <iostream.h>
#include "PIC_PRO.h"
#define UnKnown -1
//=============================================================
typedef struct
    { short n;    // voiting numbers
      short pos; // position in string
      double value; //value
    } RSLT;

//--------------------------------------------------------------
void HistThresh(short *H,short *BotThr,short *TopThr,short num)

void HistCollect (short **His, short NOfWin, PRT &Db);
RSLT LineEstimation (short TagSize, PRT Db,short NOfWin,
                     short WSize,double Thr);
int WriteLineInf(PRT &P, PRT T, short rw, short Xpos);
```

```
#ifndef LNS_CORR
#define LNS_CORR
#include "projctn7.h"
#include "pic_mch7.h"
#include "res_mch7.h"
#include "lin_trn7.h"
//#include "tem_plt7.h"

#define NAME_LENGTH   40
define      GRAPHMODE       _VRES256COLOR define HistDim 101 endif
```

```
//          PRT_ANLS
//    Module analyses file PROTO_1.dbc (output of LNS_CORR),
//calculates histogramme functions of PROTO_1 in file PROTO_1.hs2.
//Bisides that it asks a possibilites to connect PROTO_1
//with another sign in one strip.
//
// COMMAND STRING
//
// prt_anls <PROTO_1_Name> [CommandFile]
//
//      <PROTO_1_Name>     File name of PROTOTYPE without extention
// [CommandFile]    Optional ASCI file with a run time parameters.
//
// INPUT
//    .DBC, .RGB files of prototypes and corresponding .SGN files created by
// modules LNS_CORR and MAKEPRB.
// RUN TIME parameters:
//
//      <CORR_THR>     threshold for sign linking
//              We have used 0.6;
//              If cross correlation axceede the <CORR_THR> the number of
//              string will be asked. Negative number cause not including the
//              connection in list.
//SEE ALSO FILE "PRT_ANLS.INI"
// OUTPUT
//      PROTO_1.HS2 - Histogramme ;
//      LINECOL.PRT - File collects an information about sign linking
//              in accordance with <CORR_THR> and our response.
//              FILE structure:
//(example file string start after char # that not belongs to file
//*****0 pos in str*********************************************
//    #LineCollection
//    #Line #   FName #1        FName #2        Pos ...
//    #1        c:\ilya\winps\s160_0    c:\ilya\winps\s160_6      18
//    #1        c:\ilya\winps\s160_0    c:\ilya\winps\s160_15     37
//EOF
// Here 1 Line number named through the keyboard
//....s160_0 - PROTO_1 name;
//....s160_6 and s160_15 name   of prototypes linked with a PROTO_1
//              in one strip;
// 18 and 37  positions of corresponding prototypes start relative to
// 0 colomn of PROTO_1 (PROTO_1 STARTS in 0 colomn of PROTO_1)

#include <stdlib.h>
#include <conio.h>
#include <stdio.h>
#include <string.h>
```

216

```c
#include <graph.h>
#include <float.H>
#include <time.h>
#include <ctype.h>
#include <fstream.h>
include <afx.h>
#include "prt_anls.h"
#include "PIC_PRO.h"

#define MaxNumOfPicks 20
const short MaxNumOfWin =25;
define MaxProtNum 25 short Hist[MaxNumOfWin][HistDim];

char LineColName[] ="linecol.prt";
char f_name[40]="_",FILE_name[40]="_", FRAME_Name[40]="_",
     STRING_name[40]="_", SIGN_name[40]="_";
double GAMMA=1.0,CORR_THRESH=0.0,Thresh_mdl=0.0;
short MAP;
short VOITING=3,TAG_hight;
struct _videoconfig vc;
double sh[4]={0,0,0,0};

int get_number_4(); // INITIALISATION GRAPHICMODE, GET SCALE
int get_number_4_f(FILE *f); // INITIALISATION GRAPHICMODE, GET SCALE
//$$$$$$$$$$$$$$$$$$$$$$$$$$$$$$$$$$$$$$$$$$$$$$$$$$$$$$$$$$$$$$$$
$$$$$$$$$$$$$$$$$$$

CString PROTOCOL_NAME;

ofstream LineC;
//============    OpenLineCollection
void OpenLineCol(const char*name)
{ LineC.open(name,ios::out|ios::app|ios::out|ios::nocreate);
  if(LineC.fail())
     {LineC.clear(0);
       LineC.open(name,ios::out|ios::app|ios::out|ios::noreplace);
       if(LineC.fail())
          {LineC.clear(0);
            cout << "CAN NOT OPEN LineCollection";
            GRAPH_OUT(-1);
          }
      }
}
//================================================================
===
SCR_PNT winsize;
```

```
//================================================================
int main(int argc,char* argv[])
{
int FLG_F=0;
FILE *datainf;
short n=0;
SCR_PNT t_pos;
   if((argc != 2) && (argc !=3))
      {
        printf(" proto_file\n");
        FLG_F=0;
      return(1);
     }
    else
     if(argc ==3)
         {FLG_F=1;
         if(!(datainf=fopen(argv[2],"r"))) return 0;
         }
if(FLG_F)
   get_number_4_f(datainf); //    GET SCALE
else
   get_number_4();

PRT prototype;
// =============== GRAPHICS START
       if(GRAPHICS_START(&vc,GRAPHMODE)) GRAPH_OUT(-1);
//================
if(prototype.proto_storage_rgb(argv[1],vc))
     {printf("SGN  TARGET not exist");   GRAPH_OUT(-1);
     }
// READ .DBC FILE AND STORED Correlation Function
//========= PROTOTYPE     LOOP OVER DBASE .dbc
PRT DbProto[MaxProtNum];
CString DbName=argv[1];
DbName+=".dbc";
FILE *Db=fopen((const char *)DbName,"r");
if(!Db)
     {printf("DBase not exist");   GRAPH_OUT(-1);}

// DEBUG Split two rows
short WinSize;
char AA [128],SPACE[14];
fscanf(Db,"%[^\n]s ", AA);
fscanf(Db," %[^\n]s", AA);
fscanf(Db,"%*s %*s %*s %*s %*s %d %s ",&WinSize,SPACE);

const MaxNumberOfWin=30;
short NumberOfWin=0;//=prototype.s_cols/WinSize;
```

218

```
short iDbProto=0;
fscanf(Db,"%[^\n]s ", AA);
short i,j;
while( DbProto[iDbProto].read_proto_DBC(Db) )
   { if(DbProto[iDbProto].alloc_Charact_dbl(MaxNumberOfWin*DbProto[iDbProto]
   .s_cols) )
          {printf(" NOT MEMORY for datat");  GRAPH_OUT(-1);}
     fscanf(Db," %[^\n]s ",AA);     // DEBUG Split one row
     while(!feof(Db))
       {
       NumberOfWin++;
       if(DbProto[iDbProto].read_Charact_dbl(Db,DbProto[iDbProto].s_cols))
              {printf(" END of DB");   GRAPH_OUT(-1);}
       fscanf(Db," %[^\n]s ",AA);   // DEBUG Split one row
       }
     iDbProto++;
   }
fclose(Db);
// END READ .DBC FILE AND STORED Correlation Function
   OpenLineCol(LineColName);
   LineC<< "LineCollection \nLine #\t FName #1\t FName #2\t Pos ... \n";
     //LOOP over targets
int LN,p;
RSLT LineEst;
short St,Fin;
for (i=0;i<MaxNumOfWin;i++)
   for (j=0;j<HistDim;Hist[i][j++]=0);

//Miki's Threshold
short PrNumber=-1;
for(i=0;i<iDbProto;i++)
  if(DbProto[i].PathName==prototype.PathName)
     {PrNumber=i; break;}
//   IF AutoCorr absence PrNumber=-1

// Line linking and noise calculation
for (i=0;i<iDbProto;i++)
    { St=0;
      Fin= DbProto[i].s_cols;
      if(i!=PrNumber)
         {LineEst=LineEstimation(prototype.s_cols, DbProto[i],NumberOfWin,
                                                     WinSize,CORR_THRE
SH);
        if (LineEst.n)
             {
              p=LineEst.pos-DbProto[i].s_cols;   // DbProtoStart
```

```
        LN=LineInf(prototype, DbProto[i], vc.numtextrows, p+10,vc);
        if (LN>=0)
         {if (p>0)
           St=prototype.s_cols-p;
          else
           Fin=-p;
          LineC<<LN<<'\t'<<prototype.PathName<< '\t'<<
             DbProto[i].PathName<<'\t'<<p<<'\n';
         }
        }
      }
       //Histogramm calculation
       HistCollect(NumberOfWin,St,Fin,DbProto[i]);
      }
LineC.close();
// RESULT OUT PROTOCOL_NAME=argv[1];
PROTOCOL_NAME+=".hs2" ;
OpenLineCol((const char*)PROTOCOL_NAME);
   LineC<<"Histogrammes\n";
   LineC<<argv[1]<<'\t'<<prototype.SIGN_name<<'\n';
   LineC<<"NumberOfWindows\t"<<NumberOfWin<<'\n';
   LineC<<"NumberOfBins\t"<<HistDim<<'\n';
   LineC<<"Win_pos\n";

for(j=0;j<NumberOfWin;j++)
     {LineC<<j"WinSize<<" \t";
        for(i=0;i<HistDim;i++)
          LineC<<Hist[j][i]<<" \t";
        LineC<<'\n';
     }
LineC.close;
//CORRELATION PROCESSING
GRAPH_OUT();
return(0);
}

//
================================================================
========
/*void get_shift_f(FILE *f,double * sh) // INITIALISATION GRAPHICMODE,
GET SCALE
{int i;
      for(i=0;i<4; i++)
         {
         fscanf(f,"%lf %lf\n",sh+i++,sh+i);
         }
}
```

```
//
================================================================
void get_shift(double * sh) // INITIALISATION GRAPHICMODE, GET SCALE
{int i;
        cout<< "vertexes shift over rows ( top_right, bottom_right, bottom_left,
top_left %\n";
        for (i=0;i<4; i++)
                cin>>sh[i];
} */
//================================================================
int get_number_4() // INITIALISATION GRAPHICMODE, GET SCALE
{int R;
    GRAPH_OUT();
        cout << "CORR_THRESH \n";
        cin >>CORR_THRESH;
// =============== GRAPHICS START
        if(GRAPHICS_START(&vc,GRAPHMODE)) GRAPH_OUT(-1);
//================
return R;
}
//***********************
int get_number_4_f(FILE *f) // INITIALISATION GRAPHICMODE, GET
SCALE
{
        fscanf(f," %lf ",&CORR_THRESH);
return 1;
}
//================================================================
/*int picture_inf_num_new(char *name,SCR_PNT *vertexes,short n)
  {int i,j;
   char new_str[80];
   FILE *datfp;
   int r,FLG=0;
   strcat(strcpy(new_str,name),".sgn");
   if(!(datfp=fopen(new_str,"r"))) return 0;
   r=fscanf(datfp,"%[^\n]s ",new_str);
   r=fscanf(datfp," %[^\n]s ",new_str);
   if(__iscsymf( (int)new_str[0]))//FILE INFORMATION )
                            //(letter or underscore)
       {sscanf(new_str," %s %s %s %s ",&FILE_name, &FRAME_Name,
                            &STRING_name, &SIGN_name);
       r=fscanf(datfp," %[^\n]s ",new_str);
       }
  for(j=0;j<n+1;j++)
   for(i=0;i<4;i++)
      {if(FLG)
        if(fscanf(datfp," %[^\n]s",new_str)==EOF)
```

221

```
            {fclose (datfp); return 0;}
        FLG=1;
        sscanf(new_str," %d %d",&(vertexes[i].c),&(vertexes[i].r));
        }
    fclose(datfp);
return 1;
} */
//===============================================================
```

```c
#include <io.h>
#include <iostream.h>
#include <fstream.h>
#include "prt_anls.h"
#include "PIC_PRO.h"

extern const short MaxHistSize;
extern const short MaxNumOfWin;

extern short Hist[][HistDim];
#define Histogramm(i,x)  (Hist[(i)][(short)( 0.5*((x)+1)*(HistDim-1)+0.5)]++)
//================================================================
===
void HistCollect( short NOfWin,short St,short Fin,PRT &Db)
{short i,j;
 double val;
for (i=0;i<NOfWin;i++)
   for(j=St;j<Fin;j++)
     {
       val=Db.CorrValue(i,j);
       Histogramm(i,val);
     }
}
//================================================================
=
 RSLT LineEstimation(short TagSize, PRT &Db,short NOfWin,short
WSize,double Thr)
{RSLT out={0,-1,0.0};
 short i,j,EndPosDb=0,k;
 double *DMF=new double[k=Db.s_cols+TagSize];
 for (i=0;i<k;DMF[i++]=0.0);
 double val;
 for (i=0;i<NOfWin;i++)
      for(j=0;j<Db.s_cols;j++)
        {
         val=Db.CorrValue(i,j);
         if (val>Thr)
              {EndPosDb=i*WSize-j+Db.s_cols;
         DMF[EndPosDb]+=val;
         out.n++;
        }
     }
if(out.n)
for(i=0;i<k;i++)
     if(out.value<DMF[i])
           {out.value=DMF[i];
            out.pos=i;
           }
delete DMF;
```

223

```cpp
return out;
}
//=============================================================
int LineInf(const PRT &P, PRT T,short rw,short Xpos,struct _videoconfig vc)
{SCR_PNT PR(10,10),TG(0,18);
char mess[80]="LineNum [<0] UnKnown";
int out=UnKnown ;
    TG.c=Xpos;
        _settextposition(rw,1 );
        *((PCT *)&T)=
    sign_storage_rgb((const char *)(T.PathName),vc);
    if (T.s_cols)
            {_setcolor( color_num(0,0,0));
                _rectangle( _GFILLINTERIOR,0,0, 680,60 );
                sign_present_RGB(P,PR);
                sign_present_RGB(T,TG);
                T.free_PCT();
                _setcolor( color_num(240,240,240));
            _outtext (mess);
            cin>>out;
            }
        else
            {
            sprintf(mess,"%s from %s RGB UNACCESIBLE ",
                (const char *)(P.SIGN_name),
                (const char *)(T.STRING_name));
            _outtext (mess);
            }
return out;
}
//=============================================================
double CorVal( PRT &P,short WNum,short y)
  {double v1;
   if(y<0) v1=P.CorrValue(WNum,0);
    else {if(y>=P.s_cols) v1=P.CorrValue(WNum,P.s_cols-1);
        else v1=P.CorrValue(WNum,(short)y);
        }
    return v1;
    }
//=============================================================
#define VALUE(X)   ((X)<(P.s_cols-WSize))?CorVal(P, WNum,
(X)):CorVal(P, WNum, (X-1))
//=============================================================
double LinInter( PRT &P,short WNum,short WSize ,double Pt)
 {double y1,y0,x=WNum*WSize+Pt;
```

```
    short x1,x0;
    x0=(short)x;
    x1=(x0>x)?x0-1:x0+1;
    y1=CorVal(P, WNum, x1);
    y0=CorVal( P, WNum, x0);
    return( y0+(x-x0)*(y1-y0)/(x1-x0));
  }
//===================================================================
void HistThresh(short *H,short *BotThr,short *TopThr,short num)
{short S=0;
*BotThr=0;
*TopThr=HistDim-1;
while((S+=H[(*TopThr)--])<num);
S=0;
while((S+=H[(*BotThr)++])<num);
}
//================================================
CString MakeName(CString N)
{
short k=(N.SpanIncluding(" \t")).GetLength();
char *p,fp[80];
p=((char*)(const char *)N)+k;
CString M=p;
if(M.Find(':')<0)
  {if(M.GetAt(0)=='\\')
    { M=':'+M;
       M= (char)(_getdrive( )-1+'A')+M;
    }
    else
      M=_fullpath(fp,(const char *)M,80);
   }
M.MakeLower();
return M;
}
//===================================================================
CString MakeName(char *p )
{CString M(p);
return (MakeName(M));
}
//===================================================================
```

225

```
ORIGIN = PWB
ORIGIN_VER = 2.1.49
PROJ = TRACK
PROJFILE = TRACK.MAK
DEBUG = 1

NMAKEBSC1 = set
NMAKEBSC2 = nmake
CC = cl
CFLAGS_G = /AL /W2 /G2 /GA /DMSC /DMFG_ /DWIN /DPAS /DDLL /GEf
/Zp /BATCH\
        /FR$*.sbr
CFLAGS_D = /f- /Od /FPi87 /Zi /Gs
CFLAGS_R = /f- /Os /Og /Oe /FPi87 /Gs
CXX = cl
CXXFLAGS_G = /G2 /W2 /GA /GEf /Zp /BATCH /FR$*.sbr
CXXFLAGS_D = /f /Zi /Od /Gs
CXXFLAGS_R = /f- /Oe /Og /Os /Gs
MAPFILE_D = NUL
MAPFILE_R = NUL
LFLAGS_G = /STACK:16000 /BATCH /ONERROR:NOEXE
LFLAGS_D = /CO /NOF
LFLAGS_R = /NOF
LLIBS_G = c:\c700\windev\lib\LIBW.LIB c:\c700\windev\lib\commdlg.lib\
        c:\visnplus\lib\win_ai.lib c:\visnplus\lib\mfgmm.lib\
        c:\visnplus\lib\iffdll.lib
LINKER    = link
ILINK = ilink
LRF = echo > NUL
ILFLAGS = /a /e
RC = rc -K
LLIBS_R = /NOD:LLIBC7 LLIBC7W
LLIBS_D = LLIBCEW /NOD:LLIBC7
BRFLAGS = /o $(PROJ).bsc
BSCMAKE = bscmake
SBRPACK = sbrpack
BROWSE  = 1
PACK_SBRS = 1
```

```
FILES = BITMAP.C MIN_MAG.C PERSP.C TRACK.C TRACK.DEF
TRACK.RC LIB.C LINES.C\
       QRSOLV.C
DEF_FILE = TRACK.DEF
OBJS = BITMAP.obj MIN_MAG.obj PERSP.obj TRACK.obj LIB.obj
LINES.obj\
       QRSOLV.obj
RESS = TRACK.res
SBRS = BITMAP.sbr MIN_MAG.sbr PERSP.sbr TRACK.sbr LIB.sbr
LINES.sbr\
       QRSOLV.sbr all: $(PROJ).exe .SUFFIXES:
.SUFFIXES:
.SUFFIXES: .obj .sbr .res .c .rc BITMAP.obj : BITMAP.C const.h bitmap.h lines.h track.h min_mag.h lib.h
!IF $(DEBUG)
       @$(CC) @<<$(PROJ).rsp
/c $(CFLAGS_G)
$(CFLAGS_D) /FoBITMAP.obj BITMAP.C
<<
!ELSE
       @$(CC) @<<$(PROJ).rsp
/c $(CFLAGS_G)
$(CFLAGS_R) /FoBITMAP.obj BITMAP.C
<<
!ENDIF BITMAP.sbr : BITMAP.C const.h bitmap.h lines.h track.h min_mag.h lib.h
!IF $(DEBUG)
       @$(CC) @<<$(PROJ).rsp
/Zs $(CFLAGS_G)
$(CFLAGS_D) /FRBITMAP.sbr BITMAP.C
<<
```

```
!ELSE
    @$(CC) @<<$(PROJ).rsp
/Zs $(CFLAGS_G)
$(CFLAGS_R) /FRBITMAP.sbr BITMAP.C
<<
!ENDIF MIN_MAG.obj : MIN_MAG.C const.h bitmap.h lines.h track.h persp.h
min_mag.h\
    lib.h
!IF $(DEBUG)
    @$(CC) @<<$(PROJ).rsp
/c $(CFLAGS_G)
$(CFLAGS_D) /FoMIN_MAG.obj MIN_MAG.C
<<
!ELSE
    @$(CC) @<<$(PROJ).rsp
/c $(CFLAGS_G)
$(CFLAGS_R) /FoMIN_MAG.obj MIN_MAG.C
<<
!ENDIF MIN_MAG.sbr : MIN_MAG.C const.h bitmap.h lines.h track.h persp.h
min_mag.h\
    lib.h
!IF $(DEBUG)
    @$(CC) @<<$(PROJ).rsp
/Zs $(CFLAGS_G)
$(CFLAGS_D) /FRMIN_MAG.sbr MIN_MAG.C
<<
!ELSE
    @$(CC) @<<$(PROJ).rsp
/Zs $(CFLAGS_G)
$(CFLAGS_R) /FRMIN_MAG.sbr MIN_MAG.C
<<
!ENDIF
```

228

```
PERSP.obj : PERSP.C const.h bitmap.h lines.h track.h persp.h min_mag.h
lib.h
!IF $(DEBUG)
        @$(CC) @<<$(PROJ).rsp
/c $(CFLAGS_G)
$(CFLAGS_D) /FoPERSP.obj PERSP.C
<<
!ELSE
        @$(CC) @<<$(PROJ).rsp
/c $(CFLAGS_G)
$(CFLAGS_R) /FoPERSP.obj PERSP.C
<<
!ENDIF PERSP.sbr : PERSP.C const.h bitmap.h lines.h track.h persp.h min_mag.h
lib.h
!IF $(DEBUG)
        @$(CC) @<<$(PROJ).rsp
/Zs $(CFLAGS_G)
$(CFLAGS_D) /FRPERSP.sbr PERSP.C
<<
!ELSE
        @$(CC) @<<$(PROJ).rsp
/Zs $(CFLAGS_G)
$(CFLAGS_R) /FRPERSP.sbr PERSP.C
<<
!ENDIF TRACK.obj : TRACK.C const.h bitmap.h persp.h lines.h track.h min_mag.h
lib.h
!IF $(DEBUG)
        @$(CC) @<<$(PROJ).rsp
/c $(CFLAGS_G)
$(CFLAGS_D) /FoTRACK.obj TRACK.C
<<
!ELSE
        @$(CC) @<<$(PROJ).rsp
/c $(CFLAGS_G)
```

```
$(CFLAGS_R) /FoTRACK.obj TRACK.C
<<
!ENDIF

TRACK.sbr : TRACK.C const.h bitmap.h persp.h lines.h track.h min_mag.h
lib.h
!IF $(DEBUG)
       @$(CC) @<<$(PROJ).rsp
/Zs $(CFLAGS_G)
$(CFLAGS_D) /FRTRACK.sbr TRACK.C
<<
!ELSE
       @$(CC) @<<$(PROJ).rsp
/Zs $(CFLAGS_G)
$(CFLAGS_R) /FRTRACK.sbr TRACK.C
<<
!ENDIF TRACK.res : TRACK.RC track.h frames.dlg
       $(RC) $(RCFLAGS1) /r /fo TRACK.res TRACK.RC LIB.obj : LIB.C const.h bitmap.h persp.h lines.h track.h min_mag.h lib.h
!IF $(DEBUG)
       @$(CC) @<<$(PROJ).rsp
/c $(CFLAGS_G)
$(CFLAGS_D) /FoLIB.obj LIB.C
<<
!ELSE
       @$(CC) @<<$(PROJ).rsp
/c $(CFLAGS_G)
$(CFLAGS_R) /FoLIB.obj LIB.C
<<
!ENDIF LIB.sbr : LIB.C const.h bitmap.h persp.h lines.h track.h min_mag.h lib.h
!IF $(DEBUG)
       @$(CC) @<<$(PROJ).rsp
/Zs $(CFLAGS_G)
```

```
$(CFLAGS_D) /FRLIB.sbr LIB.C
<<
!ELSE
        @$(CC) @<<$(PROJ).rsp
/Zs $(CFLAGS_G)
$(CFLAGS_R) /FRLIB.sbr LIB.C
<<
!ENDIF LINES.obj : LINES.C const.h bitmap.h persp.h lines.h track.h min_mag.h lib.h
!IF $(DEBUG)
        @$(CC) @<<$(PROJ).rsp
/c $(CFLAGS_G)
$(CFLAGS_D) /FoLINES.obj LINES.C
<<
!ELSE
        @$(CC) @<<$(PROJ).rsp
/c $(CFLAGS_G)
$(CFLAGS_R) /FoLINES.obj LINES.C
<<
!ENDIF LINES.sbr : LINES.C const.h bitmap.h persp.h lines.h track.h min_mag.h lib.h
!IF $(DEBUG)
        @$(CC) @<<$(PROJ).rsp
/Zs $(CFLAGS_G)
$(CFLAGS_D) /FRLINES.sbr LINES.C
<<
!ELSE
        @$(CC) @<<$(PROJ).rsp
/Zs $(CFLAGS_G)
$(CFLAGS_R) /FRLINES.sbr LINES.C
<<
!ENDIF QRSOLV.obj : QRSOLV.C qrsolv.h
!IF $(DEBUG)
        @$(CC) @<<$(PROJ).rsp
```

```
/c $(CFLAGS_G)
$(CFLAGS_D) /FoQRSOLV.obj QRSOLV.C
<<
!ELSE
        @$(CC) @<<$(PROJ).rsp
/c $(CFLAGS_G)
$(CFLAGS_R) /FoQRSOLV.obj QRSOLV.C
<<
!ENDIF QRSOLV.sbr : QRSOLV.C qrsolv.h
!IF $(DEBUG)
        @$(CC) @<<$(PROJ).rsp
/Zs $(CFLAGS_G)
$(CFLAGS_D) /FRQRSOLV.sbr QRSOLV.C
<<
!ELSE
        @$(CC) @<<$(PROJ).rsp
/Zs $(CFLAGS_G)
$(CFLAGS_R) /FRQRSOLV.sbr QRSOLV.C
<<
!ENDIF $(PROJ).bsc : $(SBRS)
        $(BSCMAKE) @<<
$(BRFLAGS) $(SBRS)
<<

$(PROJ).exe : $(DEF_FILE) $(OBJS) $(RESS)
        -$(NMAKEBSC1) MAKEFLAGS=
        -$(NMAKEBSC2) $(NMFLAGS) -f $(PROJFILE) $(PROJ).bsc
!IF $(DEBUG)
        $(LRF) @<<$(PROJ).lrf
$(RT_OBJS: = +^
) $(OBJS: = +^
)
$@
```

232

```
$(MAPFILE_D)
$(LIBS: = +^
) +
$(LLIBS_G: = +^
) +
$(LLIBS_D: = +^
)
$(DEF_FILE) $(LFLAGS_G) $(LFLAGS_D);
<<
!ELSE
        $(LRF) @<<$(PROJ).lrf
$(RT_OBJS: = +^
) $(OBJS: = +^
)
$@
$(MAPFILE_R)
$(LIBS: = +^
) +
$(LLIBS_G: = +^
) +
$(LLIBS_R: = +^
)
$(DEF_FILE) $(LFLAGS_G) $(LFLAGS_R);
<<
!ENDIF
        $(LINKER) @$(PROJ).lrf
        $(RC) $(RCFLAGS2) $(RESS) $@

.c.obj :
!IF $(DEBUG)
        @$(CC) @<<$(PROJ).rsp
/c $(CFLAGS_G)
$(CFLAGS_D) /Fo$@ $<
<<
!ELSE
        @$(CC) @<<$(PROJ).rsp
/c $(CFLAGS_G)
```

```
$(CFLAGS_R) /Fo$@ $<
<<
!ENDIF

.c.sbr :
!IF $(DEBUG)
     @$(CC) @<<$(PROJ).rsp
/Zs $(CFLAGS_G)
$(CFLAGS_D) /FR$@ $<
<<
!ELSE
     @$(CC) @<<$(PROJ).rsp
/Zs $(CFLAGS_G)
$(CFLAGS_R) /FR$@ $<
<<
!ENDIF .rc.res :
     $(RC) $(RCFLAGS1) /r /fo $@ $< run: $(PROJ).exe
     WX $(WXFLAGS) $(PROJ).exe $(RUNFLAGS)

debug: $(PROJ).exe
     WX /p $(WXFLAGS) CVW $(CVFLAGS) $(PROJ).exe $(RUNFLAGS)
```

NAME    TRANSFORM

DESCRIPTION   'Changing signs'
EXETYPE     WINDOWS
STUB        'WINSTUB.EXE'
CODE        PRELOAD MOVEABLE DISCARDABLE
DATA        PRELOAD MOVEABLE MULTIPLE
HEAPSIZE    1024
STACKSIZE   8192

```
#include <windows.h>
#include "track.h"
#include "frames.dlg"

trans MENU
{
POPUP "File"
  {
  MENUITEM "Open...",       IDM_OPEN
  MENUITEM "Write...",      IDM_WRITE
  }

POPUP "&Pick sign"
  {
  MENUITEM "&Original",     IDM_PICK_ORIG
  MENUITEM "&Substitue",    IDM_PICK_SUBST
  MENUITEM "&Load Orig",    IDM_LOAD_ORIG
  MENUITEM "&Pick Corners", IDM_PICK_CORNERS
  }
MENUITEM "&change sign",    IDM_CHANGE POPUP "&Method"
  {
  MENUITEM "&Bilinear",     IDM_BILINEAR
  MENUITEM "&Trilinear",    IDM_TRILINEAR
  MENUITEM "&SplitMode",    IDM_SPLIT
  }
  MENUITEM "&Info",         IDM_INFO POPUP "&MFG"
  {
  MENUITEM "&Init"      DISP_INIT
  MENUITEM "&Grab"      DISP_GRAB
  MENUITEM "&Snap"      DISP_SNAP
  MENUITEM "&Load Pict"    DISP_LOAD
  MENUITEM "&Load Field"   DISP_LOAD_FIELD
  MENUITEM "&Draw"      DISP_DRAW
```

23b

```
    MENUITEM "&Clean"   DISP_CLEAN
    MENUITEM "&Wipe"    DISP_WIPE
  }
MENUITEM "&Start track",   IDM_START_TRACK
MENUITEM "&Tracking",         IDM_AUTO_TRACK POPUP "&V-Disk"
  {
  MENUITEM "&Init", SONY_INIT
  MENUITEM "&Go to",   SONY_FRAME
  MENUITEM "&Replace", SONY_RECORD
  MENUITEM "&Close", SONY_END
  }
}
```

```
frames DIALOG 19, 22, 126, 57
STYLE DS_MODALFRAME | WS_POPUP | WS_VISIBLE | WS_CAPTION |
WS_SYSMENU
CAPTION "Edit Frames"
FONT 8, "MS Sans Serif"
BEGIN
    LTEXT       "From Frame", 101, 10, 4, 48, 8
    LTEXT       "To Frame", 102, 10, 22, 56, 8
    EDITTEXT    103, 67, 4, 45, 13, ES_AUTOHSCROLL
    EDITTEXT    104, 67, 21, 45, 14, ES_AUTOHSCROLL
    PUSHBUTTON  "OK", 105, 7, 39, 40, 14
    PUSHBUTTON  "Cancel", 106, 72, 38, 40, 14
END
```

```c
long FAR PASCAL _export WndProc (HWND, UINT, UINT, LONG) ;
DWORD GetDibInfoHeaderSize (BYTE huge * ) ;
int PASCAL GetDibWidth (BYTE huge * ) ;
int PASCAL GetDibHeight (BYTE huge * ) ;
BYTE huge * GetDibBitsAddr (BYTE huge * ) ;
DWORD GetDrawTableSize(BYTE huge *) ;
BYTE huge * ReadDib (HWND ,char * ,int*,int*) ;
int PASCAL display_information(HWND ) ;
int PASCAL teach_grey_pallete(HWND , int ) ;
BYTE huge * ReadRGB(HWND ,char * ,int*,int*) ;
int PASCAL draw_rgb_picture(HWND   ,HDC) ;
int PASCAL teach_rgb_pallete(HWND) ;
int PASCAL get_file_type_by_name(char * ) ;
int PASCAL create_poly_src_dst() ;
int PASCAL keep_subst(HWND,MYBITMAP*) ;
BYTE PASCAL get_palette_index(BYTE , BYTE , BYTE ) ;
int PASCAL WriteGreyRgb (HWND hwnd,char *szFileName,MYBITMAP
*Bmap) ;
int PASCAL get_in_series_flag() ;
int PASCAL smooth_values(double , double *,double *,int,double *) ;
int PASCAL enlarge_area_of_noise(MYBITMAP *,MYBITMAP *) ;

#define GREY_MODEL   1
#define COLOR_MODEL  2
define RGBA_MODEL   3 define IN_BILINEAR  2
define IN_TRILINEAR 3 define FILE_IS_BMP      1
define FILE_IS_RGB      2
define FILE_IS_UNKNOWN  3 define AF_ZOOM     102
define AF_ANGLE    104
#define AF_OK       105
#define AF_CANCEL   106
```

```
#define PER_WIDTH        103
#define PER_HEIGHT       104
#define PER_FROM_TOP     107
#define PER_FROM_BOTTOM  108
#define PER_OK           109
define PER_CANCEL       110 define IDM_OPEN 100
define IDM_PICK 101
#define IDM_CHANGE       104
#define IDM_PERSPECTIVE 102
#define IDM_INFO  103
#define IDM_WRITE        105
#define IDM_PICK_ORIG 106
#define IDM_PICK_SUBST       107
#define IDM_LOAD_ORIG 108
define IDM_PICK_CORNERS   109 define IDM_NEAREST 110
define IDM_BILINEAR 111
#define IDM_TRILINEAR 112
define IDM_SPLIT  114 define  IDM_START_TRACK 150
define  IDM_AUTO_TRACK  151 define DISP_SNAP  200
define DISP_GRAB  201
#define DISP_LOAD  202
#define DISP_DRAW  203
#define DISP_CLEAN 204
#define DISP_WIPE  205
#define DISP_INIT  206
define DISP_LOAD_FIELD 207 define IDM_DEBUG 300
```

```
#define SONY_HEADER 400
#define SONY_FRAME 401
#define SONY_RECORD 402
#define SONY_INIT   403
define SONY_END    404 define SONY_FROM_FR 103
define SONY_TO_FR   104
#define SONY_OK     105
define SONY_CANCEL 106 typedef struct phdr {
    int cols, rows ;
    int bp ;
} PHDR ;

typedef BYTE TRIPLE[3] ;

typedef struct edge {
    double xs, ys;
    double xe, ye;
    int vertical;
    LINE l;
} EDGE;

typedef struct shift {
    double dx, dy;
    double sim; /* minimal value of sum of abs. diff.  (MAD)
            maximal value of correlation     (COR) */
} SHIFT;

typedef struct sign {
    MYBITMAP *Bmap ;
    MYBITMAP *BmapGrey ;
    TRACK_POINTS TrPoints ;
} SIGN ;
``` a41

SUBSTITUTE SHEET (RULE 26)

```c
#include<math.h>
include<stdio.h> typedef unsigned char byte;

typedef struct {
  unsigned long
      r : 8,
      g : 8,
      b : 8,
      a : 8;
} RGBA;

typedef struct {
  double x ;
  double y ;
} RPOINT ;

typedef struct {
  byte r, g, b;
} MYRGB;

typedef enum {
  Grey, Rgb, Rgba
} BMTYPE;

typedef struct {
  int cols, rows;
  BMTYPE typ;
  BYTE huge *gpic ;
} MYBITMAP;

typedef double LUMARR[7][7] ;

#define BITMAP_PLACE(bm,i,j)  \
  *((BYTE huge*)((bm->gpic)+(DWORD)(i)*(DWORD)(bm->cols)+(DWORD)(j)))
#define BITMAP_PLACE_PTR(bm,i,j)  \
```

242

```
   (BYTE huge*)((bm->gpic)+(DWORD)(i)*(DWORD)(bm->cols)+(DWORD)(j))

#define BITMAP_RGB_PLACE(bm,i,j)   \
   *((BYTE huge*)((bm->gpic)+((DWORD)(i)*(DWORD)(bm-
>cols)+(DWORD)(j))*(DWORD)3))
#define BITMAP_RGB_PLACE_PTR(bm,i,j)   \
   (BYTE huge*)((bm->gpic)+ ((DWORD)(i)*(DWORD)(bm-
>cols)+(DWORD)(j))*(DWORD)3)

#define MIN(a, b) ((a) < (b) ? (a) : (b))
#define MAX(a, b) ((a) > (b) ? (a) : (b))

#define DLVLS 3
define ILVLS 1 define MAX_NO_OF_TR_WIN   30 typedef struct {
double x, y;
} PNT;

typedef struct {
   double     Af[3][3];
   double     Ab[3][3];
}          Affine_Transform;

typedef struct {
   double     Pf[3][3];
   double     Pb[3][3];
}          Perspective_Transform;

typedef struct track_points {
   POINT  TrackP[NUM_OF_TRACK_POINTS];
   int    NumOfPoints;
} TRACK_POINTS;

typedef struct shift_points {
   RPOINT TrackP[NUM_OF_TRACK_POINTS];
```

343

```
    int   NumOfPoints ;
} SHIFT_POINTS ;

typedef struct tr_win {
   RPOINT Center ;
   double Xdir ;
   double Ydir ;
} TR_WIN ;

MYBITMAP FAR*   bm_alloc(int , int , BMTYPE ) ;
double PASCAL bilinear(double , double , MYBITMAP FAR *) ;
double PASCAL bilinear_red(double , double , MYBITMAP FAR *) ;
double PASCAL bilinear_green(double , double , MYBITMAP FAR *) ;
double PASCAL bilinear_blue(double , double , MYBITMAP FAR *) ;
int PASCAL multmat(HWND,int , int , int , double *, double *, double *);
double PASCAL resample_trilinear(MYBITMAP FAR*
,double,double,double,int) ;
double PASCAL resample_trilinear_red(MYBITMAP FAR*
,double,double,double,int) ;
double PASCAL resample_trilinear_blue(MYBITMAP FAR*
,double,double,double,int) ;
double PASCAL resample_trilinear_green(MYBITMAP FAR*
,double,double,double,int) ;
int PASCAL build_pyramid(HWND,MYBITMAP FAR * ) ;
int PASCAL bm_free(MYBITMAP FAR* ) ;
int PASCAL create_lum_bmap(MYBITMAP *, MYBITMAP **) ;
int PASCAL duplicate_bmap(MYBITMAP *, MYBITMAP **,int ) ;
int PASCAL create_grey_bounded_bitmap(RECT, MYBITMAP *,MYBITMAP
**) ;
int PASCAL substract_bitmaps(RECT,MYBITMAP *,MYBITMAP *,MYBITMAP
**) ;
int PASCAL insert_grey_bounded_bitmap(RECT ,MYBITMAP *, MYBITMAP
*) ;
int PASCAL get_mask_bitmap(HWND,MYBITMAP *,int ,MYBITMAP **) ;
int PASCAL find_horiz_line(MYBITMAP*,POINT , POINT , RPOINT *) ;
int PASCAL find_vertic_line(MYBITMAP *,POINT , POINT , RPOINT *) ;
double PASCAL bilinear_rgb(double, double , MYBITMAP FAR* ,double *) ;
```

```
int PASCAL copy_grey_rect_from_frame(MYBITMAP *, MYBITMAP *,RECT )
;
int PASCAL build_alpha_map(MYBITMAP **, MYBITMAP*,RPOINT *) ;
int PASCAL split_bitmap(MYBITMAP *,int,int ) ;
int PASCAL split_bitmap_frame(MYBITMAP *,MYBITMAP **, MYBITMAP **) ;
int PASCAL sum_grey_bitmap_value(MYBITMAP *,DWORD *) ;
int PASCAL filter_noises_by_rects(MYBITMAP *,RECT ,int , int ,MYBITMAP *) ;
```

```c
#define VALUE_IN(array,i,j,cols) *(array +(DWORD)(i)*(DWORD)(cols) +(j))
#define X_DIM 1
define Y_DIM 2 int PASCAL l_cp_int_arr_to_RPOINT(RPOINT *, int *, int *,int );
int PASCAL l_quad_in_new_origin(RPOINT *,RPOINT *,int ,int ,int ) ;
int PASCAL find_extremes_in_1dim(RPOINT *, int , int ,double *, double *);
int PASCAL find_best_cluster(HWND, int,RPOINT *,RPOINT *,int
*,int,int*,int*,
                                                    RPOINT*,int*);
int PASCAL l_copy_RPOINT_array(RPOINT *,RPOINT *,int ) ;
int PASCAL l_copy_int_array(int *,int *,int ) ;
int PASCAL l_find_bound_rect(RPOINT *, RECT *) ;
int PASCAL print_transform(HFILE ,char *,Perspective_Transform *) ;
int PASCAL insert_new_vertexes(RPOINT *CurrVert, RPOINT *Vert1,
RPOINT *Vert2,
      RPOINT *Vert3, RPOINT *Vert4,double *Wheight,int num,RPOINT
*NewVert) ;
int PASCAL transform_rpoint_arr(RPOINT *,RPOINT
*,int,Perspective_Transform) ;
```

```
#define FAC 16
#define LOBES 2
#define FSIZE (LOBES * FAC)
#define CORR_WINDOWX 8
#define CORR_WINDOWY 6

MYBITMAP FAR *  minify(HWND, MYBITMAP FAR *, int) ;
int PASCAL sinc_filter(int) ;
MYBITMAP FAR *hminify(HWND, MYBITMAP FAR *, int);
MYBITMAP FAR *vminify(HWND, MYBITMAP FAR *, int ) ;
int PASCAL lpf1D(BYTE huge* , int, int, BYTE huge *) ;
int PASCAL lpf1D_rgb(BYTE huge* , int, int, BYTE huge *) ;
int PASCAL edge_refine(MYBITMAP *,EDGE *,int) ;
int PASCAL h_refine(MYBITMAP *, double *, double *,int) ;
int PASCAL v_refine(MYBITMAP *,double *, double *,int) ;
int PASCAL sub_pixel_interp(double, double, double, double *, double *em) ;
int PASCAL xysolve(HWND,MYBITMAP *,MYBITMAP *,SHIFT *,TR_WIN *,
int,
        TRACK_POINTS*,
        TRACK_POINTS*,Perspective_Transform*,HFILE,
        TRACK_POINTS*,RPOINT*) ;
int PASCAL xysrch(HWND,MYBITMAP *,MYBITMAP *, SHIFT
*,POINT,POINT,
int,int,int,int);

int PASCAL sub_pixel_refine(int , int , int,int,SHIFT *) ;
int PASCAL find_average_shift(HWND,int ,SHIFT
*,SHIFT_POINTS,SHIFT_POINTS,
                                Perspective_Transform*) ;

int PASCAL Quad2Quad(HWND ,RPOINT srcpnts[4],RPOINT dstpnts[4],
                                Perspective_Transform *) ;

int PASCAL copy_transform(Perspective_Transform *,Perspective_Transform
*) ;
int PASCAL Thin_Perspective(HWND , SHIFT_POINTS , SHIFT_POINTS
,int,
```

```
                              Perspective_Transform *) ;
int PASCAL trans_grey_frame_to_fields(HWND ,RPOINT *,RPOINT *,
    MYBITMAP *,RPOINT *, MYBITMAP **,MYBITMAP **) ;
```

```c
#define det2(a11, a12, a21, a22)   (a11 * a22 - a12 * a21)

int PASCAL perspective(HWND,MYBITMAP FAR *,MYBITMAP
FAR*,RPOINT*,RPOINT*,int,
                              Perspective_Transform* );
int PASCAL Rectan2Quad(HWND,RPOINT *, RPOINT
*,Perspective_Transform*);
int PASCAL Perspective_map(MYBITMAP FAR*,Perspective_Transform*,
                   MYBITMAP FAR*, RPOINT *,int);
RPOINT bPerspective(RPOINT, Perspective_Transform *);
RPOINT PASCAL dPerspective(RPOINT , Perspective_Transform *);
int PASCAL check_if_rect(RPOINT*);
RPOINT PASCAL fPerspective(RPOINT ,Perspective_Transform *);

int PASCAL median_filter_5(HWND,MYBITMAP *);
int PASCAL get_tresh_for_occ(MYBITMAP *,int *);
int PASCAL perspective_mask(HWND ,MYBITMAP *,MYBITMAP *,
MYBITMAP *,
        RPOINT *, RPOINT *, int ,int ,MYBITMAP *);
int PASCAL Perspective_map_mask(MYBITMAP FAR
*,Perspective_Transform*,
        MYBITMAP FAR *, MYBITMAP *,RPOINT *,int ,int ,MYBITMAP *);
int PASCAL Quad2Rectan(HWND , RPOINT *, RPOINT
*,Perspective_Transform *);
int PASCAL perspective_al(HWND ,MYBITMAP FAR *,MYBITMAP FAR
*,MYBITMAP *,
        RPOINT* ,RPOINT * ,int ,Perspective_Transform *);
int PASCAL Perspective_map_al(MYBITMAP *,Perspective_Transform *,
MYBITMAP *, MYBITMAP *,RPOINT *,int );
int PASCAL Perspective_near_map(MYBITMAP      *,Perspective_Transform*,
        MYBITMAP *, RPOINT *,int );
int PASCAL perspective_near(HWND ,MYBITMAP *, MYBITMAP *,
        RPOINT* ,RPOINT * ,int ,Perspective_Transform *);
```

```
#include <windows.h>
#include <windowsx.h>
#include <commdlg.h>
#include <stdlib.h>
#include <bios.h>
#include "const.h"
#include "bitmap.h"
#include "persp.h"
#include "lines.h"
#include "track.h"
#include "min_mag.h"
#include "lib.h"
#undef RGB
include <mfghost.h> define UNTIL_FRAME 420
define UNTIL_PICT 4 int PASCAL bitmap_for_display(HWND,HDC,MYBITMAP FAR *,RECT) ;
int PASCAL draw_to_screen(MYBITMAP *,int,int) ;
int PASCAL create_disp_bmap(MYBITMAP *, MYBITMAP **,RECT) ;
int PASCAL pick_sign(HWND , UINT , UINT , LONG ) ;
int PASCAL change_sign(HWND , UINT , UINT , LONG ) ;
int PASCAL add_tracking_point(HWND , UINT , UINT , LONG ) ;
int PASCAL change_sign_by_tracking(HWND,int) ;
int PASCAL WriteRgb (HWND ,char *,MYBITMAP *) ;
int PASCAL create_norm_bmap(HWND ,MYBITMAP *,MYBITMAP**,RECT) ;
int PASCAL keep_orig(HWND ,MYBITMAP *) ;
int PASCAL pick_original(HWND, UINT, UINT, LONG) ;
int PASCAL create_mask_bmap(HWND ,MYBITMAP *,RPOINT *,RPOINT
*,RECT,MYBITMAP**) ;
int PASCAL WriteGreyRgb (HWND hwnd,char *szFileName,MYBITMAP
*Bmap) ;
int PASCAL add_clean_points(HWND, UINT , UINT , LONG ) ;
BOOL FAR PASCAL _export FramesDlg(HWND ,UINT ,UINT ,LONG ) ;
UINT FAR PASCAL _export TimerProc(HWND, UINT,UINT,LONG) ;
int PASCAL SonySearch(HWND,int , int ) ;
int PASCAL SonyRecord(HWND, int) ;
int PASCAL load_field_from_card(HWND,int) ;
int PASCAL load_picture_from_card(HWND) ;
int PASCAL load_picture_from_file(HWND ,char *) ;
int PASCAL draw_field_to_screen(HWND ,MYBITMAP *,int ) ;
int PASCAL WriteSign (HWND ,char *,SIGN *) ;
int PASCAL ReadSign(HWND ,char *,SIGN *) ;
int PASCAL pick_corners(HWND , UINT , UINT , LONG ) ;
int PASCAL get_fittness_of_vertexes(HWND,RECT ,MYBITMAP *,RPOINT
*,DWORD *) ;
int PASCAL replace_sign(HWND, RPOINT *) ;
```

```
int PASCAL create_subs_sign(HWND hwnd) ;
int PASCAL fill_mask_rect(MYBITMAP *) ;
int PASCAL ValidateOccRects(MYBITMAP *) ;
int PASCAL copy_into_valid_rects() ;

char szAppName [] = "Trans" ;
static BYTE huge * lpRgb ;
static BYTE huge * lpGreyRgb ;
static BYTE huge * lpPtr ;
static BYTE huge * lpRepaint ;
static BYTE huge * lpDisplay ;
static BYTE huge * lpBits ;
PALETTEENTRY FAR *ppalentr ;
PALETTEENTRY FAR ppalsys[256] ;
BYTE FAR ColorTable[32][32][32] ;
HPALETTE  glhpal, hpalprev ;
LOGPALETTE lgcpal ;
RECT GlBound ;
WORD  glModelColor = COLOR_MODEL ;
char  stBufferZoom[50] ;
char  stBufferAngle[50] ;
char  stBufferWidth[50] ;
int   OrgX[8],OrgY[8] ;
int   SignX[4],SignY[4] ;
char  stBufferHeight[50] ;
char  stBufferFrTop[50] ;
char  stBufferFrBot[50] ;
RPOINT    SrcPoly[4], DstPoly[4], KeepPoly[4] ;
RPOINT    BstDst[4] ;
int    InterpMode = IN_BILINEAR ;
MYBITMAP FAR *SrcBmap=NULL ;
MYBITMAP FAR *SrcLumap=NULL ;
MYBITMAP FAR *SubstBmap=NULL ;
MYBITMAP FAR *Subs=NULL ;
MYBITMAP FAR *Dispmap=NULL ;
MYBITMAP FAR *Normap=NULL ;
MYBITMAP FAR *MskBmap=NULL ;
SIGN  OriginSign ;
RECT ClientRect ;
int    IsRgb ;
int    FileType ;
int    SubstCols,SubstRows ;
int    OrigCols,OrigRows ;
int    CurrP, UnderPicking,UnderChanging,UnderTracking,
       UnderOrig,UnderCorners ;
int    InClean ;
BYTE huge* lpSubst ;
BYTE rpixarr[768] ;
TRACK_POINTS TrackBase, TrackCurr ;
```

251

```
Perspective_Transform BasicTransf;
Perspective_Transform ShiftTransf;
int CleanX[2];
int CleanY[2];
int CleanCount;
static FARPROC    lpfnTimeProc;
static LONG RecFrame = 20908;
static int  SearchFrame = 15662;
int TimeElapsed;
static int       PortNumber;
int              FromFr;
static int   ToFr = UNTIL_PICT;
int          PictCount = 0;
int          IsOddLine = 0;
static DWORD  Ticks;
int WasInit = 0;
int SplitMode = 0;
OFSTRUCT of;
HFILE hFile;
int NumberOfField = 0;
double Vert1[4], Vert2[4], Vert3[4], Vert4[4];
double VertWeight[] = {2.0,2.0,3.0,3.0};
static int InSerieMode = 0;
static int ReplaceFlag = 1;
int DummyFrames = 0;
#define DYMMIES 0
RECT ValidOccRects[5];
int    NumOfValidOccRects;
RECT OcclusionRects[5];
int    NumOfOccRects;

int PASCAL WinMain (HANDLE hInstance, HANDLE hPrevInstance,
          LPSTR lpszCmdLine, int nCmdShow)
{
HWND       hwnd;
MSG    msg;
WNDCLASS   wndclass;

if (!hPrevInstance)
       {
       wndclass.style       = CS_HREDRAW | CS_VREDRAW;
       wndclass.lpfnWndProc = WndProc;
       wndclass.cbClsExtra  = 0;
       wndclass.cbWndExtra  = 0;
       wndclass.hInstance   = hInstance;
       wndclass.hIcon       = NULL;
       wndclass.hCursor     = LoadCursor (NULL, IDC_ARROW);
       wndclass.hbrBackground = GetStockObject (WHITE_BRUSH);
       wndclass.lpszMenuName  = szAppName;
```

```
    wndclass.lpszClassName = szAppName ;

RegisterClass (&wndclass) ;
    } hwnd = CreateWindow (szAppName, "Transformations",
            WS_OVERLAPPEDWINDOW,
            CW_USEDEFAULT, CW_USEDEFAULT,
            CW_USEDEFAULT, CW_USEDEFAULT,
            NULL, NULL, hInstance, NULL) ;

ShowWindow (hwnd, nCmdShow) ;
    UpdateWindow (hwnd) ;

while (GetMessage (&msg, NULL, 0, 0))
        {
        TranslateMessage (&msg) ;
        DispatchMessage (&msg) ;
        }
    return msg.wParam ;
} long FAR PASCAL _export WndProc (HWND hwnd, UINT message, UINT wParam,
                    LONG lParam)
{
static char     szFileName    [_MAX_PATH],
                szTitleName [_MAX_FNAME + _MAX_EXT] ;
static char *   szFilter[] = { "RGB Files (*.RGB)",    "*.rgb",
                    "" } ;
static OPENFILENAME ofn ;
static FARPROC   lpfnFramesProc ;
static HANDLE hinst ;

HDC             hdc ;
PAINTSTRUCT     ps ;
char            DebugString[100] ;
WORD            cxClient, cyClient ;
HPALETTE        hpal ;
DWORD           i,j ;
int             k ;
char            RgbFileName[50] ;
RECT            ToValidate,recp ;
DWORD           Size ;
int             DstRows,DstCols ;
int             ToCopy ;
int             gaoi,raoi,baoi ;
PHDR            header ;
```

```
BYTE          huge * PtrRgb ;
char          DataBuffer[10],InputBuffer[10] ;
DCB           dcb ;
static int kernel[] = {
  1,1,1,
  1,1,1,
  1,1,1 } ;

switch (message)    {
     case WM_CREATE:
        ofn.lStructSize    = sizeof (OPENFILENAME) ;
        ofn.hwndOwner      = hwnd ;
        ofn.lpstrFilter    = szFilter [0] ;
        ofn.lpstrFile      = szFileName ;
        ofn.nMaxFile       = _MAX_PATH ;
          ofn.lpstrFileTitle = szTitleName ;
        ofn.nMaxFileTitle  = _MAX_FNAME + _MAX_EXT ;
        ofn.lpstrDefExt    = "bmp" ;
         hinst = ((LPCREATESTRUCT)lParam)->hInstance ;
         lpfnFramesProc =
MakeProcInstance((FARPROC)FramesDlg,hinst);
         lpfnTimeProc = MakeProcInstance((FARPROC)TimerProc,hinst);
         lgcpal.palNumEntries = 256 ;
         lgcpal.palVersion = 0x300 ;
         lgcpal.palPalEntry[0].peRed = 0;
         lgcpal.palPalEntry[0].peGreen = 0;
         lgcpal.palPalEntry[0].peBlue = 0;
         lgcpal.palPalEntry[0].peFlags = PC_NOCOLLAPSE;
         hFile = OpenFile("map.dif",&of,OF_CREATE | OF_WRITE) ;
         OriginSign.Bmap = NULL ;
         OriginSign.BmapGrey = NULL ;
       return 0 ;
     case WM_SIZE:
        cxClient = LOWORD (lParam) ;
        cyClient = HIWORD (lParam) ;
        return 0 ;
     case WM_COMMAND:

switch (wParam) {
           case IDM_OPEN:
              ofn.lpstrInitialDir    = "c:\\work\\trans";
              if (GetOpenFileName (&ofn)) {
                 FileType = get_file_type_by_name(szFileName) ;
                 if ( FileType == FILE_IS_RGB ){
                    load_picture_from_file(hwnd,szFileName) ;
                    InvalidateRect (hwnd, NULL, TRUE) ;
                 }
              }
              break ;
```

```
                case IDM_WRITE:
                    ofn.lpstrInitialDir    = "c:\\work\\trans";
                    if (GetOpenFileName (&ofn)) {
                        FileType = get_file_type_by_name(szFileName) ;
                        if ( FileType == FILE_IS_RGB ) {
                            WriteRgb (hwnd,szFileName,SrcBmap) ;
                        } else {
                            MessageBox (hwnd, "File must be .rgb",
                                szAppName, MB_ICONEXCLAMATION |
MB_OK) ;
                        }
                    }
                    break ;
                case IDM_PICK_SUBST:
                    if ( SrcBmap == NULL ) {
                        MessageBox (hwnd, "No Source Bitmap",
                            szAppName, MB_ICONEXCLAMATION |
MB_OK) ;
                        break ;
                    }
                    UnderPicking = 1 ;
                    CurrP = 0 ;
                    SetCapture(hwnd) ;
                    SetCursor(LoadCursor(NULL,IDC_CROSS)) ;
                    break ;
                case IDM_PICK_ORIG:
                    if ( SrcBmap == NULL ) {
                        MessageBox (hwnd, "No Source Bitmap",
                            szAppName, MB_ICONEXCLAMATION |
MB_OK) ;
                        break ;
                    }
                    UnderOrig = 1 ;
                    CurrP = 0 ;
                    SetCapture(hwnd) ;
                    SetCursor(LoadCursor(NULL,IDC_CROSS)) ;
                    break ;
                case IDM_PICK_CORNERS:
                    if ( SrcBmap == NULL ) {
                        MessageBox (hwnd, "No Source Bitmap",
                            szAppName, MB_ICONEXCLAMATION |
MB_OK) ;
                        break ;
                    }
                    UnderCorners = 1 ;
                    CurrP = 0 ;
                    SetCapture(hwnd) ;
                    SetCursor(LoadCursor(NULL,IDC_CROSS)) ;
                    break ;
```

```
            case IDM_LOAD_ORIG:
                ReadSign( hwnd,"orig.sgn",&OriginSign) ;
                break ;
            case IDM_CHANGE:
                UnderChanging = 1 ;
                if ( lpSubst == NULL ) {
                    MessageBox (hwnd, "No Model Bitmap",
                        szAppName, MB_ICONEXCLAMATION |
MB_OK);
                    break ;
                }
                SetCapture(hwnd) ;
                SetCursor(LoadCursor(NULL,IDC_CROSS)) ;
                break ;
            case IDM_BILINEAR:
                InterpMode = IN_BILINEAR ;
                break ;
            case IDM_TRILINEAR:
                InterpMode = IN_TRILINEAR ;
                break ;
            case IDM_SPLIT:
                SplitMode = 1 - SplitMode ;
                break ;
            case IDM_INFO:
                display_information(hwnd) ;
                break ;
            case IDM_START_TRACK:
                UnderTracking = 1 ;
                OriginSign.TrPoints.NumOfPoints = 0 ;
                TrackBase.NumOfPoints = 0 ;
                TrackCurr.NumOfPoints = 0 ;
                SetCapture(hwnd) ;
                SetCursor(LoadCursor(NULL,IDC_CROSS)) ;
                break ;
            case IDM_AUTO_TRACK:
                //Ticks = GetTickCount() ;
                change_sign_by_tracking(hwnd,1) ;
                //sprintf(DebugString,"Track+Change %ld",
                //    GetTickCount()-Ticks) ;
                //MessageBox (hwnd, DebugString,
                //    szAppName, MB_ICONEXCLAMATION |
MB_OK);
                break ;
            case DISP_INIT:
                mfg_loadcnf("") ;
                mfg_init() ;
                WasInit = 1 ;
                break ;
            case DISP_SNAP:
```
256

```
                if ( WasInit == 0 ) {
                    MessageBox (hwnd, "Need to Initialize MFG",
                        szAppName, MB_ICONEXCLAMATION |
MB_OK);
                    break ;
                }
                mfg_setvframe(RGB) ;
                mfg_dacmode(TRUE_24);
                mfg_snap(CAMERA,PAGE1) ;
                break ;
            case DISP_GRAB:
                if ( WasInit == 0 ) {
                    MessageBox (hwnd, "Need to Initialize MFG",
                        szAppName, MB_ICONEXCLAMATION |
MB_OK);
                    break ;
                }
                mfg_setvframe(RGB) ;
                mfg_dacmode(TRUE_24);
                mfg_grab(CAMERA,PAGE1) ;
                break ;
            case DISP_DRAW:
                if ( WasInit == 0 ) {
                    MessageBox (hwnd, "Need to Initialize MFG",
                        szAppName, MB_ICONEXCLAMATION |
MB_OK);
                    break ;
                }
                draw_to_screen(SrcBmap,0,SrcBmap->rows) ;
                //draw_to_screen(SrcBmap,120,200) ;
                break ;
            case DISP_CLEAN:
                if ( WasInit == 0 ) {
                    MessageBox (hwnd, "Need to Initialize MFG",
                        szAppName, MB_ICONEXCLAMATION |
MB_OK);
                    break ;
                }
                SetCapture(hwnd) ;
                SetCursor(LoadCursor(NULL,IDC_CROSS)) ;
                InClean = 1 ;
                break ;
            case DISP_WIPE:
                if ( WasInit == 0 ) {
                    MessageBox (hwnd, "Need to Initialize MFG",
                        szAppName, MB_ICONEXCLAMATION |
MB_OK);
                    break ;
                }
```

357

```
                    mfg_wipe(0) ;
                    InSerieMode = 1 ;
                    //create_subs_sign(hwnd) ;
                    SetTimer(hwnd,1,500,lpfnTimeProc) ;   // To Be
REMOVED
                    break ;
                case DISP_LOAD:
                    if ( WasInit == 0 ) {
                        MessageBox (hwnd, "Need to Initialize MFG",
                            szAppName, MB_ICONEXCLAMATION |
MB_OK) ;
                        break ;
                    }
                    //load_picture_from_card(hwnd) ;
                    sprintf(RgbFileName,"pict%d.rgb",PictCount++);
                    WriteRgb (hwnd,RgbFileName,SrcBmap);
                    InvalidateRect (hwnd, NULL, TRUE) ;
                    break ;
                case DISP_LOAD_FIELD:
                    if ( WasInit == 0 ) {
                        MessageBox (hwnd, "Need to Initialize MFG",
                            szAppName, MB_ICONEXCLAMATION |
MB_OK) ;
                        break ;
                    }
                    load_field_from_card(hwnd,0) ;
                    InvalidateRect (hwnd, NULL, TRUE) ;
                    break ;
                case SONY_INIT:
                    PortNumber = OpenComm("COM2",1024,128) ;
                    sprintf(DebugString,"PortNumber %d",PortNumber) ;
                    MessageBox (hwnd, DebugString,
                        szAppName, MB_ICONEXCLAMATION | MB_OK) ;
                    k= BuildCommDCB("COM2:1200,n,8,1",&dcb) ;
                    k = SetCommState(&dcb) ;
                    break ;
                case SONY_FRAME:
                    if ( DialogBox(hinst,"frames",hwnd,lpfnFramesProc) ) {
                        sscanf(stBufferWidth,"%d",&FromFr) ;
                        sscanf(stBufferHeight,"%d",&ToFr) ;
                    }
                    //SonySearch(hwnd,FromFr,PortNumber) ;
                    //TimeElapsed = 0 ;
                    //SetTimer(hwnd,1,500,lpfnTimeProc) ;
                    break ;
                case SONY_RECORD:
                    ReplaceFlag = 1 - ReplaceFlag ;
                    //SonyRecord(hwnd,PortNumber) ;
                    break ;
```

```
           case SONY_END:
                k = CloseComm(PortNumber) ;
                break ;
        }
        break ;
    case WM_LBUTTONDOWN:
        if ( UnderPicking == 1 ) {
            pick_sign(hwnd,message,wParam,lParam) ;
        }
        if ( UnderOrig == 1 ) {
            pick_original(hwnd,message,wParam,lParam) ;
        }
        if ( UnderCorners == 1 ) {
            pick_corners(hwnd,message,wParam,lParam) ;
        }
        if ( UnderChanging == 1 ) {
            change_sign(hwnd,message,wParam,lParam) ;
        }
        if ( UnderTracking == 1 ) {
            add_tracking_point(hwnd,message,wParam,lParam) ;
        }
        if ( InClean == 1 ) {
            add_clean_points(hwnd,message,wParam,lParam) ;
        }
        return 0 ;
    case WM_RBUTTONDOWN:
        if ( UnderTracking == 1 ) {
            SetCursor(LoadCursor(NULL,IDC_ARROW)) ;
            ReleaseCapture() ;
            UnderTracking = 0 ;
            create_lum_bmap(OriginSign.Bmap, &(OriginSign.BmapGrey)) ;
            WriteSign(hwnd,"orig.sgn",&OriginSign) ;
        }
        return 0 ;
    case WM_MOUSEMOVE:
        if ( UnderPicking == 1 || UnderChanging == 1 || UnderOrig == 1)
{
sprintf(DebugString,"%d,%d",LOWORD(lParam),HIWORD(lParam)) ;
            recp.left = recp.top = 400 ;
            recp.bottom = 420 ;
            recp.right = 480 ;
            InvalidateRect(hwnd,&recp,TRUE) ;
        }
        return 0 ;
    case WM_PAINT:
        if ( InSerieMode == 1 ) {
            hdc = BeginPaint (hwnd, &ps) ;
            EndPaint (hwnd, &ps) ;
```

```
            break;
        }
        hdc = BeginPaint (hwnd, &ps);
        ToValidate = ps.rcPaint;
        if ( UnderPicking == 1 || UnderChanging == 1 || UnderOrig == 1) {

TextOut(hdc,ToValidate.left,ToValidate.top,DebugString,lstrlen(DebugString))
;
        } else {
        if ( SrcBmap != NULL ) {
            glhpal = CreatePalette(&lgcpal);
            if ( glhpal == NULL )
                MessageBox (hwnd, "PALLET NOT CREATED",
szAppName, MB_ICONEXCLAMATION | MB_OK);
            SetPaletteEntries(glhpal,0,256,ppalentr);
            hpalprev = SelectPalette(hdc, glhpal, FALSE);
            RealizePalette(hdc);
            if ( bitmap_for_display(hwnd,hdc,SrcBmap,ToValidate) == 0) {
                DeleteObject(glhpal);
                EndPaint (hwnd, &ps);
                return 0;
            }
            SetStretchBltMode(hdc,COLORONCOLOR);
            SetDIBitsToDevice(hdc,0,0,Dispmap->cols,
                Dispmap->rows,0,0,0,Dispmap->rows,
                (LPSTR)(Dispmap->gpic),
                (LPBITMAPINFO)lpDisplay, DIB_RGB_COLORS);
            DeleteObject(glhpal);
        }
        } // End Of Else
        EndPaint (hwnd, &ps);
        return 0;

case WM_DESTROY:
        _lclose(hFile);
        if ( lpDisplay != NULL ) {
            GlobalFreePtr(lpDisplay);
        }
        bm_free(SrcBmap);
        bm_free(SrcLumap);
        bm_free(Dispmap);
        bm_free(Normap);
        bm_free(SubstBmap);
        bm_free(Subs);
        bm_free(MskBmap);
        KillTimer(hwnd,1);
        PostQuitMessage (0);
        return 0;
}
```

```
       return DefWindowProc (hwnd, message, wParam, lParam) ;
} int PASCAL teach_grey_pallete(HWND hwnd, int Entries)
{
int     i ;
UINT    rc ;
char    Debug[100] ;

if ( ppalentr != NULL ) {
    GlobalFreePtr(ppalentr) ;
    ppalentr = NULL ;
  }
  ppalentr = (PALETTEENTRY FAR * ) GlobalAllocPtr (GMEM_MOVEABLE
                              ,Entries*sizeof(RGBQUAD)) ;
  for ( i = 0 ; i < Entries ; i++ ) {
    ppalentr[i].peRed = i ;
    ppalentr[i].peGreen = i ;
    ppalentr[i].peBlue = i ;
    ppalentr[i].peFlags = PC_NOCOLLAPSE ;
  } return 1 ;
} int PASCAL get_in_series_flag()
{
   return InSerieMode ;
} int PASCAL display_information(HWND hwnd)
{
char Debug[100] ;

if ( SrcBmap == NULL ) {
      MessageBox (hwnd, "No Source Bitmap", szAppName,
                              MB_ICONEXCLAMATION | MB_OK) ;
      return 1 ;
  } sprintf(Debug,"Width =%d Height = %d ", SrcBmap->cols,SrcBmap->rows) ;
  MessageBox (hwnd, Debug, szAppName, MB_ICONEXCLAMATION |
MB_OK) ;
  return 1 ;
}
```

261

SUBSTITUTE SHEET (RULE 26)

```
BOOL FAR PASCAL _export FramesDlg(HWND hdlg,UINT message,UINT
wParam,
                                    LONG lParam)
{
 switch ( message ) {
   case WM_INITDIALOG:
       return TRUE ;
   case WM_COMMAND:
      switch ( wParam) {
           case SONY_FROM_FR:

GetDlgItemText(hdlg,PER_WIDTH,(LPSTR)stBufferWidth,50) ;
           return TRUE ;
           break ;
           case SONY_TO_FR:

GetDlgItemText(hdlg,PER_HEIGHT,(LPSTR)stBufferHeight,50) ;
           return TRUE ;
           break ;
           case SONY_OK:
              EndDialog(hdlg,TRUE) ;
              return TRUE ;
              break ;
           case SONY_CANCEL:
              EndDialog(hdlg,FALSE) ;
              return TRUE ;
              break ;
      }
 }
 return FALSE ;

}

BYTE huge * ReadRGB(HWND hwnd,char * FileName,int *Width,int *Height)
{
HFILE hFile ;
PHDR phdr;
DWORD Size ;
HDC hdc ;
DWORD offset ;
DWORD i, j ;
BYTE Red,Green,Blue ;
HPALETTE  hpal ;
int    ColorFactor ;
BYTE huge * PtrRgb ;
BYTE huge * lpRead ;
int SizeToRead ;
```

```
   int  Incr ;

if (-1 == (hFile = _lopen (FileName, OF_READ |
OF_SHARE_DENY_WRITE)))
        return NULL ;
   _lread (hFile, (LPSTR) &phdr, sizeof (PHDR)) ;
   if ( glModelColor == GREY_MODEL )      ColorFactor = 1 ;
   if ( glModelColor == COLOR_MODEL )     ColorFactor = 3 ;
   Size = (DWORD)phdr.cols*(DWORD)phdr.rows*(DWORD)ColorFactor ;
   *Width = phdr.cols ;
   *Height = phdr.rows ;
   lpRgb = (BYTE huge * ) GlobalAllocPtr (GMEM_MOVEABLE, Size) ;
   PtrRgb = lpRgb ;
   offset = 0 ;
   SizeToRead = (DWORD)(phdr.cols)*(DWORD)3 ;
   lpRead = (BYTE huge * ) GlobalAllocPtr (GMEM_MOVEABLE,
SizeToRead) ;
      while ( offset < Size ) {
           if (glModelColor == GREY_MODEL) {
              _lread(hFile,(LPSTR)lpRead,SizeToRead) ;
              for ( i = 0 ; i < SizeToRead ; i+= 3 ) {
                 *(PtrRgb+offset) = (*(lpRead+i)+*(lpRead+i+1)+
                                           *(lpRead+i+2))/3 ;
                 offset++ ;
              }
           } else { // COLOR_MODEL
              _lread(hFile,(LPSTR)(PtrRgb+offset),SizeToRead) ;
              offset += SizeToRead ;
           }
      }
   GlobalFreePtr (lpRead) ;
   if (glModelColor == GREY_MODEL) {
        teach_grey_pallete(hwnd, 256) ;
   } else {
      teach_rgb_pallete(hwnd) ;
   }
   _lclose(hFile) ;
   return PtrRgb ;
} int PASCAL teach_rgb_pallete(HWND hwnd)
{
int     pl,i,j,k ;
int     red, blue, green ;
UINT    rc ;
char    Debug[100] ;
int     Scale[6] = {0,64,128,150,192,255} ;
int     Fine[4] = {32,96,171,224} ;
```

263

```
if ( ppalentr != NULL ) {
  GlobalFreePtr(ppalentr) ;
  ppalentr = NULL ;
}
ppalentr = (PALETTEENTRY FAR * ) GlobalAllocPtr (GMEM_MOVEABLE
                                ,256*sizeof(RGBQUAD)) ;
for ( i = 10 ; i < 245 ; i++ ) {
  ppalentr[i].peRed = i ;
  ppalentr[i].peGreen = i ;
  ppalentr[i].peBlue = i ;

ppalentr[i].peFlags = PC_RESERVED ;
} return 1 ;
} int PASCAL get_file_type_by_name(char * FileName)
{
int i,len ;

len = strlen(FileName)-1 ;
for ( i = len ; i > 0 ; i-- ) {
   FileName[i] = toupper(FileName[i]) ;
   if ( FileName[i] == '.' ) {
       i++ ;
       break ;
   }
}
if ( strcmp(FileName+i,"RGB") == 0 )   return FILE_IS_RGB ;
return FILE_IS_UNKNOWN ;

} int PASCAL create_poly_src_dst()
{

SrcPoly[0].x = SrcPoly[0].x = 0.0 ;
  SrcPoly[1].x = SubstBmap->cols ; // SubstCols ;
  SrcPoly[1].y = 0.0 ;
  SrcPoly[2].x = SubstBmap->cols ; //SubstCols ;
  SrcPoly[2].y = SubstBmap->rows ; //SubstRows ;
  SrcPoly[3].x = 0.0 ;
  SrcPoly[3].y = SubstBmap->rows ; //SubstRows ;

l_cp_int_arr_to_RPOINT(DstPoly, OrgX, OrgY,4) ;
  return 1 ;
```

}

```
int PASCAL keep_subst(HWND hwnd,MYBITMAP *Bmap)
{
DWORD i,j ;
HFILE hFile ;
PHDR  phdr ;
DWORD Size ;
DWORD offset ;
DWORD Cols ;
BYTE huge * Ptr ;
DWORD Width,Adjust ;

SubstCols = phdr.cols = abs(OrgX[1] - OrgX[0]) ;
SubstRows = phdr.rows = abs(OrgY[2] - OrgY[1]) ;
phdr.bp = 3 ;
Size = (DWORD)(phdr.cols)*(DWORD)(phdr.rows)*(DWORD)3 ;
lpSubst = (BYTE huge*)GlobalAllocPtr(GMEM_MOVEABLE,Size) ;
offset = 0 ;
Cols = (DWORD)(phdr.cols)*(DWORD)3 ;
Ptr = Bmap->gpic ;

Width = (DWORD)(SrcBmap->cols)*(DWORD)3 ;
Adjust = (DWORD)(OrgX[0])*(DWORD)3 ;

for ( i = 0 ; i < phdr.rows ; i++ ) {
   for ( j = 0 ; j< Cols ; j++ ) {
       *(lpSubst + offset+j) = *(Ptr+
                  ((DWORD)Width*(DWORD)(OrgY[0]+i)) + Adjust + j) ;
   }
   offset += Cols ;
}
SubstBmap = bm_alloc(SubstCols,SubstRows,glModelColor);
SubstBmap->gpic = lpSubst ;
return 1 ;
} int PASCAL keep_orig(HWND hwnd,MYBITMAP *Bmap)
{
DWORD i,j ;
HFILE hFile ;
PHDR  phdr ;
DWORD Size ;
DWORD offset ;
BYTE huge* lpModel ;
DWORD Cols ;
BYTE huge * Ptr ;
DWORD Width,Adjust ;
```

265

```
OrigCols = phdr.cols = abs(OrgX[1] - OrgX[0]) ;
OrigRows = phdr.rows = abs(OrgY[2] - OrgY[1]) ;
phdr.bp = 24 ;
Size = (DWORD)(phdr.cols)*(DWORD)(phdr.rows)*(DWORD)3 ;
lpModel = (BYTE huge*)GlobalAllocPtr(GMEM_MOVEABLE,Size) ;
offset = 0 ;
Cols = (DWORD)(phdr.cols)*(DWORD)3 ;
Ptr = Bmap->gpic ;

Width = (DWORD)(SrcBmap->cols)*(DWORD)3 ;
Adjust = (DWORD)(OrgX[0])*(DWORD)3 ;

for ( i = 0 ; i < phdr.rows ; i++ ) {
   Ptr = Bmap->gpic + ((DWORD)Width*(DWORD)(OrgY[0]+i)) + Adjust ;
   for ( j = 0 ; j< Cols ; j++ ) {
       *(lpModel + offset+j) = *(Ptr++) ;
   }
   offset += Cols ;
}
bm_free(OriginSign.Bmap) ;
bm_free(OriginSign.BmapGrey) ;
OriginSign.Bmap = bm_alloc(OrigCols,OrigRows,glModelColor);
OriginSign.Bmap->gpic = lpModel ;
WriteRgb (hwnd,"orig.rgb",OriginSign.Bmap);
return 1 ;
} int PASCAL bitmap_for_display(HWND hwnd, HDC hdc,MYBITMAP FAR
*Bmap,RECT ToValidate)
{
LONG Size,i,j ;
BYTE huge * TmpB ;
BYTE huge * Tmp ;
BYTE huge * Ptr ;
char Debug[100] ;

GetSystemPaletteEntries(hdc,(UINT)0,(UINT)256,ppalsys) ;
Size = 40 +(DWORD)(sizeof(RGBQUAD))*(DWORD)256 ;

if ( lpDisplay != NULL ) {
   GlobalFreePtr(lpDisplay) ;
}
lpDisplay = (BYTE huge*)GlobalAllocPtr(GMEM_MOVEABLE,Size) ;
lpBits = lpDisplay + 40+(DWORD)(sizeof(RGBQUAD))*(DWORD)256 ;
Ptr = lpDisplay +40 ;
```

```
((BITMAPINFOHEADER huge*)lpDisplay)->biSize = 40 ;
((BITMAPINFOHEADER huge*)lpDisplay)->biWidth = Bmap->cols ;
((BITMAPINFOHEADER huge*)lpDisplay)->biHeight =Bmap->rows ;
((BITMAPINFOHEADER huge*)lpDisplay)->biPlanes = 1 ;
((BITMAPINFOHEADER huge*)lpDisplay)->biBitCount = 8 ;
((BITMAPINFOHEADER huge*)lpDisplay)->biCompression = 0 ;
((BITMAPINFOHEADER huge*)lpDisplay)->biSizeImage = 0 ;
((BITMAPINFOHEADER huge*)lpDisplay)->biXPelsPerMeter = 0 ;
((BITMAPINFOHEADER huge*)lpDisplay)->biYPelsPerMeter = 0 ;
((BITMAPINFOHEADER huge*)lpDisplay)->biClrUsed = 0 ;
((BITMAPINFOHEADER huge*)lpDisplay)->biClrImportant = 0 ;

for ( i = 0 ; i < 256 ; i++ ) {
   (BYTE)*(Ptr + (DWORD)(i*sizeof(RGBQUAD)))   =  ppalsys[i].peBlue;
   (BYTE)*(Ptr + (DWORD)(i*sizeof(RGBQUAD)+1))=  ppalsys[i].peGreen;
   (BYTE)*(Ptr + (DWORD)(i*sizeof(RGBQUAD)+2))=  ppalsys[i].peRed;
   (BYTE)*(Ptr + (DWORD)(i*sizeof(RGBQUAD)+3)) = 0 ;
 }
 return (create_disp_bmap(Bmap, &Dispmap,ToValidate)) ;
} int PASCAL draw_to_screen(MYBITMAP *Bmap,int FromLine,int ToLine)
{
int i,j ;
BYTE huge *Ptr ;
BYTE huge *PtrR ;
BYTE huge *PtrG ;
BYTE huge *PtrB ;
int  Cols ;

Cols = Bmap->cols ;
 Ptr = Bmap->gpic ;
 Ptr += (DWORD)FromLine*(DWORD)Cols*(DWORD)3 ;
 PtrR = Ptr ;
 PtrG = Ptr+1 ;
 PtrB = Ptr+2 ;
 mfg_setgframe(R);
 for ( i = FromLine ; i < ToLine ; i++ ) {
     for ( j = 0 ; j < Cols ; j++ ) {
        rpixarr[j] = *PtrR ;
        PtrR += 3 ;
     }
     mfg_bwhline(PAGE0,0,i,Cols,rpixarr) ;
 }
 mfg_setgframe(G);
 for ( i = FromLine ; i < ToLine ; i++ ) {
     for ( j = 0 ; j < Cols ; j++ ) {
        rpixarr[j] = *PtrG ;
        PtrG += 3 ;
```

```
            }
        mfg_bwhline(PAGE0,0,i,Cols,rpixarr) ;
    }
    mfg_setgframe(B);
    for ( i = FromLine ; i < ToLine ; i++ ) {
        for ( j = 0 ; j < Cols ; j++ ) {
            rpixarr[j] = *PtrB ;
            PtrB += 3 ;
        }
        mfg_bwhline(PAGE0,0,i,Cols,rpixarr) ;
    }
    return 1 ;

} int PASCAL create_disp_bmap(MYBITMAP *Bmap, MYBITMAP
**LumBmap,RECT ToValidate)
{
BYTE huge * Tmp;
BYTE huge * TmpB ;
int ToPad ;
int Cols, Rows ;
DWORD Size ;
int i,j ;
long k ;
int RowLimit ;

if ( Normap == NULL ) return 0 ;
Cols = Bmap->cols ;
Rows = Bmap->rows ;

ToPad = Cols%4 ;
if ( ToPad > 0 ) ToPad = 4 - ToPad ;

Tmp = Bmap->gpic ;

if ( ToValidate.top == 0 ) {
  if ( *LumBmap != NULL ) bm_free(*LumBmap) ;

*LumBmap = bm_alloc(Cols+ToPad,Rows,GREY_MODEL);
  Size = (DWORD)(Cols+ToPad)*(DWORD)Rows ;
  (*LumBmap)->gpic = (BYTE
huge*)GlobalAllocPtr(GMEM_MOVEABLE,Size) ;

}

RowLimit = min(Rows,ToValidate.bottom) ;
for ( i = RowLimit ; i> ToValidate.top ; i-- ) {
    Tmp = Normap->gpic +(DWORD)(i-1)*(DWORD)Cols ;
```

```c
        TmpB = (*LumBmap)->gpic+(Rows-i)*(DWORD)(Cols+ToPad) ;
        for ( j = 0 ; j < Cols ; j++ ) {
            *(TmpB++) = *(Tmp++) ;
        }
        for ( j = 0 ; j < ToPad ; j++ ) {
            *(TmpB++) = 0 ;
        }
    }
    return 1 ;
} int PASCAL pick_sign(HWND hwnd, UINT message, UINT wParam, LONG
lParam)
{

OrgX[CurrP] = LOWORD(lParam);
    OrgY[CurrP] = HIWORD(lParam);
    CurrP++ ;
    if ( CurrP == 2 ) {
        OrgX[2] = OrgX[1] ;
        OrgY[2] = OrgY[1] ;
        OrgY[1] = OrgY[0] ;
        OrgX[3] = OrgX[0] ;
        OrgY[3] = OrgY[2] ;
        UnderPicking = 0 ;
        CurrP = 0 ;
        SetCursor(LoadCursor(NULL,IDC_ARROW)) ;
        ReleaseCapture() ;
        keep_subst(hwnd,SrcBmap) ;
        if ( InterpMode == IN_TRILINEAR )
            build_pyramid(hwnd,SubstBmap) ;
    } return 1 ;
} int PASCAL add_clean_points(HWND hwnd, UINT message, UINT wParam,
LONG lParam)
{
static int kernel[] = {
    1,1,1,
    1,1,1,
    1,1,1 } ;
int gaoi,raoi,baoi ;
int DifX,DifY ;

CleanX[CleanCount] = LOWORD(lParam);
    CleanY[CleanCount] = HIWORD(lParam);
    CleanCount++ ;
```

264

```
    if ( CleanCount == 2 ) {
      InClean = 0 ;
      CleanCount = 0 ;
      SetCursor(LoadCursor(NULL,IDC_WAIT)) ;
      DifX = CleanX[1]-CleanX[0] ;
      DifY = CleanY[1]-CleanY[0] ;
      gaoi = mfg_gaoi_fbcreate(G,CleanX[0],CleanY[0],DifX,DifY) ;
      mfg_median(gaoi,gaoi,3,3,kernel) ;
      raoi = mfg_gaoi_fbcreate(R,CleanX[0],CleanY[0],DifX,DifY) ;
      mfg_median(raoi,raoi,3,3,kernel) ;
      baoi = mfg_gaoi_fbcreate(B,CleanX[0],CleanY[0],DifX,DifY) ;
      mfg_median(baoi,baoi,3,3,kernel) ;
      SetCursor(LoadCursor(NULL,IDC_ARROW)) ;
      ReleaseCapture() ;
      //SetTimer(hwnd,1,40,lpfnTimeProc) ;
    } return 1 ;
} int PASCAL pick_corners(HWND hwnd, UINT message, UINT wParam,
LONG lParam)
{
RPOINT CoefsH1,CoefsH2,CoefsV1,CoefsV2 ;
POINT  Point1,Point2 ;
char   String[100] ;

OrgX[CurrP] = LOWORD(lParam);
  OrgY[CurrP] = HIWORD(lParam);
  CurrP++ ;
  if ( CurrP == 4 ) {
    UnderCorners = 0 ;
    CurrP = 0 ;
    SetCursor(LoadCursor(NULL,IDC_ARROW)) ;
    ReleaseCapture() ;
  } return 1 ;
} int PASCAL pick_original(HWND hwnd, UINT message, UINT wParam,
LONG lParam)
{
RPOINT CoefsH1,CoefsH2,CoefsV1,CoefsV2 ;
POINT  Point1,Point2 ;
char   String[100] ;

OrgX[CurrP] = LOWORD(lParam);
```

270

```
    OrgY[CurrP] = HIWORD(lParam);
    CurrP++ ;
    if ( CurrP == 2 ) {
      OrgX[2] = OrgX[1] ;
      OrgY[2] = OrgY[1] ;
      OrgY[1] = OrgY[0] ;
      OrgX[3] = OrgX[0] ;
      OrgY[3] = OrgY[2] ;
      UnderOrig = 0 ;
      CurrP = 0 ;
      SetCursor(LoadCursor(NULL,IDC_ARROW)) ;
      ReleaseCapture() ;
      keep_orig(hwnd,SrcBmap) ;
    } return 1 ;
} int PASCAL change_sign(HWND hwnd, UINT message, UINT wParam,
   LONG lParam)
{
RECT        Bound ;
RPOINT Pt0,Pt1,Pt2,Pt3;
POINT  Point1,Point2 ;
RPOINT SrcPnts[4] ;
char String[100] ;
DWORD FromTime,ToTime ;
EDGE Edge1,Edge2,Edge3,Edge4 ;
char DebugString[50] ;
MYBITMAP *AlphaMap ;

OrgX[CurrP] = LOWORD(lParam);
  OrgY[CurrP] = HIWORD(lParam);
  CurrP++ ;
  if ( CurrP == 4 ) {
    UnderChanging = 0 ;
    CurrP = 0 ;
    SetCursor(LoadCursor(NULL,IDC_ARROW)) ;
    ReleaseCapture() ;

create_poly_src_dst() ;
    l_find_bound_rect(DstPoly, &Bound) ;

//create_mask_bmap(hwnd,OriginSign.BmapGrey,SrcPoly,DstPoly,Bound,&M
skBmap) ;
    //Ticks = GetTickCount() ;
    build_alpha_map(&AlphaMap, SrcBmap,DstPoly) ;

//perspective_al(hwnd,SubstBmap,SrcBmap,AlphaMap,SrcPoly,
``` a71

SUBSTITUTE SHEET (RULE 26)

```
//      DstPoly, glModelColor, &BasicTransf) ;
    bm_free(AlphaMap) ;
    perspective(hwnd,SubstBmap,SrcBmap,SrcPoly,
            DstPoly, glModelColor, &BasicTransf) ;
    //sprintf(DebugString,"Change %ld",GetTickCount()-Ticks) ;
    //MessageBox (hwnd, DebugString,
    //     szAppName, MB_ICONEXCLAMATION | MB_OK) ;
    //perspective_mask(hwnd,SubstBmap,SrcBmap,SrcPoly,
    //      DstPoly, glModelColor, InterpMode,MskBmap) ;
    create_norm_bmap(hwnd,SrcBmap,&Normap,Bound) ;
    InvalidateRect (hwnd, &Bound, TRUE) ;
  }
  return 1 ;
} int PASCAL add_tracking_point(HWND hwnd, UINT message, UINT wParam,
                                                LONG lParam)
{
int Place ;

Place = OriginSign.TrPoints.NumOfPoints ;
if ( Place >= NUM_OF_TRACK_POINTS ) {
    MessageBox (hwnd, "Cannot track more than 30 points",
                        szAppName, MB_ICONEXCLAMATION | MB_OK) ;
    SetCursor(LoadCursor(NULL,IDC_ARROW)) ;
    ReleaseCapture() ;
    UnderTracking = 0 ;
    create_lum_bmap(OriginSign.Bmap, &(OriginSign.BmapGrey)) ;
    WriteSign(hwnd,"orig.sgn",&OriginSign) ;
    return 1 ;
}
OriginSign.TrPoints.TrackP[Place].x = LOWORD(lParam);
OriginSign.TrPoints.TrackP[Place].y = HIWORD(lParam);
TrackBase.TrackP[Place].x = LOWORD(lParam);
TrackBase.TrackP[Place].y = HIWORD(lParam);
TrackCurr.TrackP[Place].x = LOWORD(lParam);
TrackCurr.TrackP[Place].y = HIWORD(lParam);
OriginSign.TrPoints.NumOfPoints++ ;
TrackBase.NumOfPoints++ ;
TrackCurr.NumOfPoints++ ;

return 1 ;
} int PASCAL change_sign_by_tracking(HWND hwnd,int ToDisplay)
{
Perspective_Transform NewTransf ;
Perspective_Transform Tp ;
```

```
Perspective_Transform TpCurr ;
RECT Bound ;
int    i,k ;
double DiffUp,DiffDown ;
double    _ u,v,w ;
char String[100] ;
int dx,dy ;
DWORD Size ;
int Cols,Rows ;
RPOINT SrcPnts[4] ;
RPOINT RPointIn,RPointOut ;
SHIFT Shift ;
SHIFT Shifts[NUM_OF_TRACK_POINTS];
double DstX,DstY ;
RECT Rectan ;
MYBITMAP *DestBmap ;
RPOINT CmPoly[4] ;
TRACK_POINTS ModelPoints ;
TRACK_POINTS DBasePoints ;
RPOINT DiffArr[MAX_NO_OF_TR_WIN] ;
MYBITMAP *AlphaMap ;
TR_WIN    Windows[MAX_NO_OF_TR_WIN] ;

//create_subs_sign(hwnd) ;

sprintf(String,"\n\n\t\tNew Frame\n") ;
_lwrite(hFile,String,strlen(String)) ;
l_cp_int_arr_to_RPOINT(SrcPnts, SignX, SignY,4) ;

Quad2Quad(hwnd,SrcPnts,DstPoly,&TpCurr) ;

l_find_bound_rect(DstPoly, &Rectan) ;
Cols = Rectan.right-Rectan.left+1 ;
Rows = Rectan.bottom-Rectan.top+1 ;
DestBmap = bm_alloc(Cols,Rows,GREY_MODEL) ;
Size = (DWORD)Cols*(DWORD)Rows ;
DestBmap->gpic = (BYTE huge*)GlobalAllocPtr(GMEM_MOVEABLE,Size) ;

l_quad_in_new_origin(CmPoly,DstPoly,Rectan.left,Rectan.top,4) ;
for ( i = 0 ; i < 4 ; i++ ) {
  sprintf(String,"%d: Dst %lf,%lf Cm %lf,%lf  Src %lf,%lf\n",
          i,DstPoly[i].x,DstPoly[i].y,CmPoly[i].x,CmPoly[i].y,
          SrcPnts[i].x,SrcPnts[i].y) ;
  _lwrite(hFile,String,strlen(String)) ;
}
Quad2Quad(hwnd,SrcPnts, CmPoly,&Tp);
```

```
TrackCurr.NumOfPoints = 0 ;
ModelPoints.NumOfPoints = 0;
DBasePoints.NumOfPoints = 0 ;

for ( i = k= 0 ; i < OriginSign.TrPoints.NumOfPoints ; i++ ) {
    RPointIn.x = (double)OriginSign.TrPoints.TrackP[i].x ;
    RPointIn.y = (double)OriginSign.TrPoints.TrackP[i].y ;
    RPointOut = fPerspective(RPointIn, &Tp) ;
    if (RPointOut.x <= CORR_WINDOWX || RPointOut.x >= (Cols-
CORR_WINDOWX-1) ) continue ;
    if (RPointOut.y <= CORR_WINDOWY || RPointOut.y >= (Rows-
CORR_WINDOWY-1) ) continue ;
    ModelPoints.TrackP[k].x = (int)(RPointOut.x+0.5) ;
    ModelPoints.TrackP[k].y = (int)(RPointOut.y+0.5) ;
    if ( ModelPoints.TrackP[k].x >    RPointOut.x ) { // To minus DiffArr
        DiffArr[k].x = (double)ModelPoints.TrackP[k].x - RPointOut.x ;
    } else {
        DiffArr[k].x = RPointOut.x - (double)ModelPoints.TrackP[k].x ;
    }
    if ( ModelPoints.TrackP[k].y >    RPointOut.y ) {
        DiffArr[k].y = (double)ModelPoints.TrackP[k].y - RPointOut.y ;
    } else {
        DiffArr[k].y = RPointOut.y - (double)ModelPoints.TrackP[k].y ;
    }
    DBasePoints.TrackP[k].x = OriginSign.TrPoints.TrackP[i].x;
    DBasePoints.TrackP[k].y = OriginSign.TrPoints.TrackP[i].y;
    RPointOut = fPerspective(RPointIn, &TpCurr) ;
    TrackCurr.TrackP[k].x = (int)(RPointOut.x+0.5) ;
    TrackCurr.TrackP[k].y = (int)(RPointOut.y+0.5) ;
    if ( TrackCurr.TrackP[k].x >    RPointOut.x ) { // To minus DiffArr
        DiffArr[k].x += (double)TrackCurr.TrackP[k].x - RPointOut.x ;
    } else {
        DiffArr[k].x += RPointOut.x - (double)TrackCurr.TrackP[k].x    ;
    }
    if ( TrackCurr.TrackP[k].y >    RPointOut.y ) {
        DiffArr[k].y += (double)TrackCurr.TrackP[k].y - RPointOut.y ;
    } else {
        DiffArr[k].y += RPointOut.y - (double)TrackCurr.TrackP[k].y    ;
    }
    k++ ;
    TrackCurr.NumOfPoints++ ;
    DBasePoints.NumOfPoints++ ;
    ModelPoints.NumOfPoints++ ;
}
perspective(hwnd,OriginSign.BmapGrey,DestBmap,SrcPnts,
            CrnPoly, GREY_MODEL, &BasicTransf) ;

xysolve(hwnd,Normap,DestBmap,Shifts,Windows,9,&ModelPoints,
        &TrackCurr,&NewTransf,hFile,&DBasePoints,DiffArr) ;
```

```
 bm_free(DestBmap);
 for ( i = 0 ; i < 4 ; i++ ) {
  sprintf(String,"Before %d -%lf,%lf\n",i,SrcPnts[i].x, SrcPnts[i].y) ;
  _lwrite(hFile,String,strlen(String)) ;
  //DstX = SrcPnts[i].x * NewTransf.Pf[0][0] +
  //         SrcPnts[i].y * NewTransf.Pf[1][0] + NewTransf.Pf[2][0] ;
  //DstY = SrcPnts[i].x * NewTransf.Pf[0][1] +
  //         SrcPnts[i].y * NewTransf.Pf[1][1] + NewTransf.Pf[2][1] ;
  //w = SrcPnts[i].x * NewTransf.Pf[0][2] +
  //         SrcPnts[i].y * NewTransf.Pf[1][2] + NewTransf.Pf[2][2] ;
  DstX = CrnPoly[i].x * NewTransf.Pf[0][0] +
            CrnPoly[i].y * NewTransf.Pf[1][0] + NewTransf.Pf[2][0] ;
  DstY = CrnPoly[i].x * NewTransf.Pf[0][1] +
            CrnPoly[i].y * NewTransf.Pf[1][1] + NewTransf.Pf[2][1] ;
  w = CrnPoly[i].x * NewTransf.Pf[0][2] +
            CrnPoly[i].y * NewTransf.Pf[1][2] + NewTransf.Pf[2][2] ;
  DstPoly[i].x = DstX/w ;
  DstPoly[i].y = DstY/w ;
  sprintf(String,"Vertex %d -%lf,%lf\n",i,DstPoly[i].x, DstPoly[i].y) ;
  _lwrite(hFile,String,strlen(String)) ;
 } l_find_bound_rect(DstPoly, &GlBound) ;
 /* OCCLUSION create_mask_bmap(hwnd,OriginSign.BmapGrey,SrcPnts,DstPoly,GlBound,&
 MskBmap) ;
 fill_mask_rect(MskBmap) ;
 ValidateOccRects(MskBmap) ;
 copy_into_valid_rects() ;
 */

//Ticks = GetTickCount() ;
 build_alpha_map(&AlphaMap, SrcBmap,DstPoly) ;
 //WriteGreyRgb (hwnd,"alp.rgb",AlphaMap) ;
 perspective_al(hwnd,SubstBmap,SrcBmap,AlphaMap,SrcPoly,
           DstPoly, glModelColor, &BasicTransf) ;
 //Perspective_map_al(Subs, &NewTransf, SrcBmap, AlphaMap,
 //                            DstPoly,glModelColor);
 //perspective_mask(hwnd,SubstBmap,SrcBmap,AlphaMap,SrcPoly,
 //TESTS
 //        DstPoly, glModelColor, InterpMode,MskBmap) ;   //TESTS
 bm_free(AlphaMap) ;
 create_norm_bmap(hwnd,SrcBmap,&Normap,GlBound) ;   //TESTS
 if ( ToDisplay == 1 ) {
    InvalidateRect (hwnd, &GlBound, TRUE) ;
 } return 1 ;
```

}

```
int PASCAL WriteRgb (HWND hwnd,char *szFileName,MYBITMAP *Bmap)
{
PHDR phdr;
DWORD i,Offset ;
long int Size ;
HFILE hFile ;
OFSTRUCT lpOpenBuff ;
UINT ToWrite ;

phdr.cols = Bmap->cols ;
 phdr.rows = Bmap->rows ;
 phdr.bp = 24 ;

Size = (DWORD)phdr.cols*(DWORD)phdr.rows*(DWORD)3 ;
 hFile = OpenFile(szFileName,&lpOpenBuff,OF_CREATE | OF_WRITE) ;
 _lwrite(hFile,&phdr,sizeof(phdr)) ;

Offset = 0 ;
 while ( Size > 0 ) {
   ToWrite = min(32768ul,Size) ;
   _lwrite(hFile,Bmap->gpic+Offset,ToWrite) ;
   Offset += ToWrite ;
   Size -= ToWrite ;
 }
 _lclose(hFile) ;

return 1 ;
} int PASCAL WriteGreyRgb (HWND hwnd,char *szFileName,MYBITMAP
*Bmap)
{
PHDR phdr;
DWORD i,Offset ;
long int Size ;
HFILE hFile ;
OFSTRUCT lpOpenBuff ;
UINT ToWrite ;
BYTE huge *RgbArr ;
BYTE huge *GreyTmp ;
BYTE huge *Tmp ;
DWORD GreySize ;

phdr.cols = Bmap->cols ;
 phdr.rows = Bmap->rows ;
```

```
phdr.bp = 24 ;

Size = (DWORD)phdr.cols*(DWORD)phdr.rows*(DWORD)3 ;
RgbArr = (BYTE huge*)GlobalAllocPtr(GMEM_MOVEABLE,Size) ;
hFile = OpenFile(szFileName,&lpOpenBuff,OF_CREATE | OF_WRITE) ;
_lwrite(hFile,&phdr,sizeof(phdr)) ;

Tmp = RgbArr ;
GreyTmp = Bmap->gpic ;
GreySize = (DWORD)phdr.cols*(DWORD)phdr.rows ;
for ( i = 0 ; i < GreySize ; i++ ) {
  *(Tmp++) = *(GreyTmp) ;
  *(Tmp++) = *(GreyTmp) ;
  *(Tmp++) = *(GreyTmp++) ;
}

Offset = 0 ;
while ( Size > 0 ) {
  ToWrite = min(32768ul,Size) ;
  _lwrite(hFile,RgbArr+Offset,ToWrite) ;
  Offset += ToWrite ;
  Size -= ToWrite ;
}
_lclose(hFile) ;
GlobalFreePtr(RgbArr) ;

return 1 ;
} int PASCAL WriteSign (HWND hwnd,char *szFileName,SIGN *Sign)
{
DWORD i,Number ;
HFILE hFile ;
OFSTRUCT lpOpenBuff ;
char   String[100] ;

Number = Sign->TrPoints.NumOfPoints ;
sprintf(String,"%05d\n",10*Number+9+11) ;
hFile = OpenFile(szFileName,&lpOpenBuff,OF_CREATE | OF_WRITE) ;
_lwrite(hFile,String,strlen(String)) ;
_lwrite(hFile,"orig.rgb\n",9) ;

sprintf(String,"%05d %05d %05d %05d %05d %05d %05d %05d\n",
  OrgX[0],OrgY[0],OrgX[1],OrgY[1],OrgX[2],OrgY[2],OrgX[3],OrgY[3]) ;
_lwrite(hFile,String,strlen(String)) ;

sprintf(String,"%05d\n",Number) ;
```

```
_lwrite(hFile,String,strlen(String)) ;
for ( i = 0 ; i < Number ; i++ ) {
  sprintf(String,"%4d %4d\n",Sign->TrPoints.TrackP[i].x,
                             Sign->TrPoints.TrackP[i].y) ;
  _lwrite(hFile,String,strlen(String)) ;
}
_lclose(hFile) ;

return 1 ;
} int PASCAL ReadSign(HWND hwnd,char *szFileName,SIGN *Sign)
{
DWORD i,Number ;
HFILE hFile ;
OFSTRUCT lpOpenBuff ;
char    String[100] ;
int     NumOfBytes ;
int     NumOfPoints ;
int     Xval,Yval ;
int     Width,Height ;
BYTE huge *Ptr ;

hFile = OpenFile(szFileName,&lpOpenBuff, OF_READ) ;
 _lread(hFile,String,6) ; // Size of bytes in File.
 String[5] = '\0' ;
 sscanf(String,"%d",&NumOfBytes) ;
 _lread(hFile,String,9) ; // RGB File Name.
 String[8] = '\0' ;
 Ptr = ReadRGB(hwnd,String,&Width,&Height);
 bm_free(Sign->Bmap) ;
 Sign->Bmap = bm_alloc(Width,Height,glModelColor);
 Sign->Bmap->gpic = Ptr ;
 create_lum_bmap(Sign->Bmap, &(Sign->BmapGrey)) ;
 //WriteGreyRgb (hwnd,"greyorg.rgb",Sign->BmapGrey) ;

_lread(hFile,String,48) ;
 sscanf(String,"%d %d %d %d %d %d %d %d",&(SignX[0]),&(SignY[0]),
            &(SignX[1]),&(SignY[1]),&(SignX[2]),&(SignY[2]),
            &(SignX[3]),&(SignY[3])) ;

_lread(hFile,String,6) ; // Number of Points.
 String[5] = '\0' ;
 sscanf(String,"%d",&NumOfPoints) ;

for ( i = 0 ; i < NumOfPoints ; i++ ) {
   _lread(hFile,String,10) ;
   String[9] = '\0' ;
```

```
  sscanf(String,"%d %d",&Xval,&Yval) ;
  Sign->TrPoints.TrackP[i].x = Xval ;
  Sign->TrPoints.TrackP[i].y = Yval ;
 }
 Sign->TrPoints.NumOfPoints = NumOfPoints ;
 _lclose(hFile) ;

return 1 ;
} int PASCAL create_norm_bmap(HWND hwnd,MYBITMAP *Bmap,MYBITMAP
**NormBmap,
                            RECT ToValidate)
{
BYTE huge * TmpNorm ;
BYTE huge * Tmp ;
int Cols,Rows ;
DWORD Size ;
long i,j,k ;
int RowLimit ;

Cols = Bmap->cols ;
Rows = Bmap->rows ;

if ( ToValidate.top == 0 ) {
  if ( *NormBmap != NULL ) bm_free(*NormBmap) ;

*NormBmap = bm_alloc(Cols,Rows,GREY_MODEL);
  Size = (DWORD)Cols*(DWORD)Rows ;
  (*NormBmap)->gpic = (BYTE
huge*)GlobalAllocPtr(GMEM_MOVEABLE,Size) ;
}

RowLimit = min(Rows,ToValidate.bottom) ;
i = ToValidate.top ;
Tmp = Bmap->gpic +(DWORD)i*(DWORD)Cols*(DWORD)3 ;
TmpNorm = (*NormBmap)->gpic+ (DWORD)i*(DWORD)Cols ;
while ( i < RowLimit ) {
   for ( j = 0 ; j < Cols ; j++ ) {
       *(TmpNorm++) = (BYTE)((double)(*(Tmp++))* 0.299 +
           (double)*(Tmp++)* 0.587 + (double)*(Tmp++)* 0.114);
   }
   i++ ;
}
return 1 ;
}
```

```
int PASCAL create_mask_bmap(HWND hwnd,MYBITMAP
*GreyMdlBmap,RPOINT *SrcPoly,
                 RPOINT *DstPoly,RECT Bound,MYBITMAP
**MaskBmap)
{
MYBITMAP *BoundedBmap =NULL ;
MYBITMAP *DiffBmap =NULL;
int     Tresh ;
char    String[100] ;
DWORD   FromTime,ToTime ;
DWORD   Sum ;

//WriteGreyRgb (hwnd,"model.rgb",GreyMdlBmap) ;

create_grey_bounded_bitmap(Bound,Normap,&BoundedBmap) ;//Copy the area to
                                  // be changed into a
                                  //separate bitmap.

//WriteGreyRgb (hwnd,"bound0.rgb",BoundedBmap) ;

perspective(hwnd,GreyMdlBmap,Normap,SrcPoly,
            DstPoly, GREY_MODEL, &BasicTransf) ;
//perspective_near(hwnd,GreyMdlBmap,Normap,SrcPoly,
//          DstPoly, GREY_MODEL, &BasicTransf) ;
                                  // Perform perspective
                                  // grey of the current sign
                                  // with itself into NormBmap.
  substract_bitmaps(Bound,Normap,BoundedBmap,&DiffBmap) ; // Subtract BoundedBmap
                                  // from the transformed
                                  // sign area in NormBmap.

sum_grey_bitmap_value(DiffBmap,&Sum) ;
//sprintf(String,"Sum is %ld",Sum) ;
//MessageBox (hwnd, String, szAppName, MB_ICONEXCLAMATION | MB_OK) ;
//WriteGreyRgb (hwnd,"diff.rgb",DiffBmap) ;
  insert_grey_bounded_bitmap(Bound,BoundedBmap,Normap) ; // retrieve original
                                  //picture into Normap.

median_filter_5(hwnd,DiffBmap) ;       // Creates a median
                                  // filter on Diffbmap.
  WriteGreyRgb (hwnd,"diff1.rgb",DiffBmap) ;
```

```
  get_tresh_for_occ(DiffBmap,&Tresh) ;
                                         // Gets the treshold
                                         // for occlusion.
//sprintf(String,"Tresh Value = %d",Tresh) ;
//MessageBox (hwnd, String, szAppName, MB_ICONEXCLAMATION |
MB_OK) ;

get_mask_bitmap(hwnd,DiffBmap,Tresh,MaskBmap) ;
  WriteGreyRgb (hwnd,"diff2.rgb",*MaskBmap) ;

bm_free(BoundedBmap) ;
  bm_free(DiffBmap) ;

return 1 ;
}
int PASCAL SonySearch(HWND hwnd, int frame, int port)
{
char str[6];
int i, input;
const int N_TRY = 5;
char DataBuffer[128] ;
char InputBuffer[128] ;
int len ;
int ErrCode ;
char String[50] ;
COMSTAT lpStat ;

sprintf(str,"%05d",frame);

DataBuffer[0] = 0x43 ; // Search
  WriteComm(port,DataBuffer, 1);
  InputBuffer[0] = 0x00 ;
  while ( InputBuffer[0] != 0x0A ) {
     ReadComm(port,InputBuffer,1) ;
     ErrCode = GetCommError(port,&lpStat) ;
     //sprintf(String,"Error Code = %d",ErrCode) ;
     //MessageBox (hwnd, String, szAppName, MB_ICONEXCLAMATION |
MB_OK) ;
  }

DataBuffer[0] = 0x55 ; // Frame mode
  WriteComm(port,DataBuffer, 1);
  InputBuffer[0] = 0x00 ;
  while ( InputBuffer[0] != 0x0A ) {
     ReadComm(port,InputBuffer,1) ;
  } for(i = 0; i < 5; i++) {
```

```
    DataBuffer[0] = str[i] ; // Integer
    WriteComm(port,DataBuffer, 1);
    InputBuffer[0] = 0x00 ;
    while ( InputBuffer[0] != 0x0A ) {
        ReadComm(port,InputBuffer,1) ;
    }
}

DataBuffer[0] = 0x40 ; // Enter
WriteComm(port,DataBuffer, 1);
InputBuffer[0] = 0x00 ;
while ( InputBuffer[0] != 0x0A ) {
    ReadComm(port,InputBuffer,1) ;
}

InputBuffer[0] = 0x00 ;
while ( InputBuffer[0] != 0x01 ) {
    ReadComm(port,InputBuffer,1) ;
} return((int)(InputBuffer[0]));
} int PASCAL SonyRecord(HWND hwnd, int port)
{
char str[6];
int  i, input;
const int N_TRY = 5;
BYTE DataBuffer[128] ;
char InputBuffer[128] ;
int len ;
char String[50] ;
int ErrCode ;
COMSTAT lpStat ;

//sprintf(String,"Before Frame Mode") ;
//MessageBox (hwnd, String, szAppName, MB_ICONEXCLAMATION |
MB_OK) ;
 DataBuffer[0] = 0x55 ; // FRAME # MODE
 WriteComm(port,DataBuffer, 1);
 InputBuffer[0] = 0x00 ;
 while ( InputBuffer[0] != 0x0A ) {
   ReadComm(port,InputBuffer,1) ;
    //ErrCode = GetCommError(port,&lpStat) ;
    //sprintf(String,"Error Code = %d",ErrCode) ;
    //MessageBox (hwnd, String, szAppName, MB_ICONEXCLAMATION |
MB_OK) ;
 }
```

282

```
//sprintf(String,"After Frame Mode") ;
//MessageBox (hwnd, String, szAppName, MB_ICONEXCLAMATION |
MB_OK) ;
 DataBuffer[0] = 0xEF ; // BLANK SEARCH DISABLE
 WriteComm(port,DataBuffer, 1);
 InputBuffer[0] = 0x00 ;
 while ( InputBuffer[0] != 0x0A ) {
   ReadComm(port,InputBuffer,1) ;
 }
//sprintf(String,"After Blank enable Mode") ;
//MessageBox (hwnd, String, szAppName, MB_ICONEXCLAMATION |
MB_OK) ;

sprintf(str,"%05ld",RecFrame);
 sprintf(String,"STR = ""%s""",str) ;

DataBuffer[0] = 0xE0 ; // REC StndBy
 WriteComm(port,DataBuffer, 1);
 InputBuffer[0] = 0x00 ;
 while ( InputBuffer[0] != 0x0A ) {
   ReadComm(port,InputBuffer,1) ;
 }
 while ( InputBuffer[0] != 0x01 ) {
   ReadComm(port,InputBuffer,1) ;
 }
//sprintf(String,"After Rec StandBy") ;
//MessageBox (hwnd, String, szAppName, MB_ICONEXCLAMATION |
MB_OK) ;

for(i = 0; i < 5; i++) {
   DataBuffer[0] = str[i] ; // Integer
   WriteComm(port,DataBuffer, 1);
   InputBuffer[0] = 0x00 ;
   while ( InputBuffer[0] != 0x0A ) {
     ReadComm(port,InputBuffer,1) ;
   }
 }

DataBuffer[0] = 0x40 ; // Enter
 WriteComm(port,DataBuffer, 1);
 InputBuffer[0] = 0x00 ;
 while ( InputBuffer[0] != 0x0A ) {
   ReadComm(port,InputBuffer,1) ;
 }

RecFrame++ ;
 sprintf(str,"%05ld",RecFrame);
 for(i = 0; i < 5; i++) {
```

```
      DataBuffer[0] = str[i] ; // Integer
      WriteComm(port,DataBuffer, 1);
      InputBuffer[0] = 0x00 ;
      while ( InputBuffer[0] != 0x0A ) {
        ReadComm(port,InputBuffer,1) ;
      }
    }
    DataBuffer[0] = 0x40 ; // Enter
    WriteComm(port,DataBuffer, 1);
    InputBuffer[0] = 0x00 ;
    while ( InputBuffer[0] != 0x0A ) {
      ReadComm(port,InputBuffer,1) ;
    }
    DataBuffer[0] = 0x40 ; // Enter
    WriteComm(port,DataBuffer, 1);
    InputBuffer[0] = 0x00 ;
    while ( InputBuffer[0] != 0x0A ) {
      ReadComm(port,InputBuffer,1) ;
    }
    InputBuffer[0] = 0x00 ;
    while ( InputBuffer[0] != 0x01 ) {
      ReadComm(port,InputBuffer,1) ;
    }
    DataBuffer[0] = 0xE6 ; // Frame Rec Mode
    WriteComm(port,DataBuffer, 1);
    InputBuffer[0] = 0x00 ;
    while ( InputBuffer[0] != 0x0A ) {
      ReadComm(port,InputBuffer,1) ;
    }
    DataBuffer[0] = 0xE9 ; // Record
    WriteComm(port,DataBuffer, 1);
    InputBuffer[0] = 0x00 ;
    while ( InputBuffer[0] != 0x0A ) {
      ReadComm(port,InputBuffer,1) ;
    }
    InputBuffer[0] = 0x00 ;
    while ( InputBuffer[0] != 0x01 ) {
      ReadComm(port,InputBuffer,1) ;
    } return((int)(InputBuffer[0]));
} static char RgbFileName[50] ;

UINT FAR PASCAL _export TimerProc(HWND hwnd, UINT message,UINT
wParam,
                                  LONG lParam)
```

```
{
DWORD Sum ;
int i ;

switch ( TimeElapsed ) {
  case 0:
      KillTimer(hwnd,1) ;
      if ( PictCount >= ToFr ) {
        InSerieMode = 0 ;
        break ;
      }
      sprintf(RgbFileName,"pict%d.rgb",PictCount++) ;
      load_picture_from_file(hwnd,RgbFileName) ;
      TimeElapsed++ ;
      SetTimer(hwnd,1,40,lpfnTimeProc) ;
      break ;
  case 1:
      KillTimer(hwnd,1) ;
      //SendMessage(hwnd,WM_COMMAND,IDM_AUTO_TRACK,0) ;
      if ( DummyFrames < DYMMIES ) {
        DummyFrames++ ;
        TimeElapsed++ ;
        SetTimer(hwnd,1,40,lpfnTimeProc) ;
        break ;
      }
      if ( ReplaceFlag == 1 ) {
          change_sign_by_tracking(hwnd,0) ;
      }
      TimeElapsed++ ;
      SetTimer(hwnd,1,40,lpfnTimeProc) ;
      break ;
  case 2:
      KillTimer(hwnd,1) ;
      draw_field_to_screen(hwnd,SrcBmap,IsOddLine) ;
      //draw_to_screen(SrcBmap,0,SrcBmap->cols) ;
      TimeElapsed++ ;
      SetTimer(hwnd,1,40,lpfnTimeProc) ;
      break ;
  case 3:
      KillTimer(hwnd,1) ;
      if ( IsOddLine == 1 ) {        //TTTTTTT
        SonyRecord(hwnd,PortNumber) ; //TTTTTTT
        //IsOddLine = 1 - IsOddLine ;
        //TimeElapsed = 0 ;
        //break ;
      }                              // TTTTTTT
      IsOddLine = 1 - IsOddLine ;
      TimeElapsed++ ;
      SetTimer(hwnd,1,1000,lpfnTimeProc) ;
```

```
        break ;
    case 4:
        TimeElapsed++ ;
        break ;
    default:
        TimeElapsed = 0 ;
        break ;
} return 1 ;
}

/*

UINT FAR PASCAL _export TimerProc(HWND hwnd, UINT message,UINT wParam,
                                    LONG IParam)
{
DWORD Sum ;
int i ;

switch ( TimeElapsed ) {
  case 0:
        KillTimer(hwnd,1) ;
        //MessageBox (hwnd, "Before Search", szAppName,
MB_ICONEXCLAMATION | MB_OK) ;
        SonySearch(hwnd, SearchFrame,PortNumber) ;
        SearchFrame++ ;
        //MessageBox (hwnd, "After Search", szAppName,
MB_ICONEXCLAMATION | MB_OK) ;
        mfg_setvframe(RGB) ;
        mfg_dacmode(TRUE_24);
        TimeElapsed++ ;
        mfg_snap(CAMERA,PAGE1) ;
        SetTimer(hwnd,1,40,lpfnTimeProc) ;
        break ;
  case 1:
        KillTimer(hwnd,1) ;
        if ( PictCount >= ToFr ) {
          InSerieMode = 0 ;
          break ;
        }
        sprintf(RgbFileName,"pict%d.rgb",PictCount++) ;
        load_field_from_card(hwnd,0) ;
        WriteRgb (hwnd,RgbFileName,SrcBmap) ;
        sprintf(RgbFileName,"pict%d.rgb",PictCount++) ;
        load_field_from_card(hwnd,1) ;
        WriteRgb (hwnd,RgbFileName,SrcBmap) ;
        SetTimer(hwnd,1,40,lpfnTimeProc) ;
```

```
        TimeElapsed++ ;
        break ;
    default:
        TimeElapsed = 0 ;
        break ;
} return 1 ;
}
*/ int PASCAL load_field_from_card(HWND hwnd,int NumOfField)
{
DWORD Size ;
BYTE huge *RedBytes ;
BYTE huge *GreenBytes ;
BYTE huge *BlueBytes ;
int j,k ;
DWORD Ticks ;
char String[50] ;

Ticks = GetTickCount() ;
    //Size = (DWORD)572*(DWORD)768*(DWORD)3 ;
    Size = (DWORD)286*(DWORD)768*(DWORD)3 ;
    if ( SrcBmap != NULL ) bm_free(SrcBmap) ;
    SrcBmap = bm_alloc(768,286,glModelColor);
    SrcBmap->gpic = (BYTE huge *)GlobalAllocPtr(GMEM_MOVEABLE,Size);
    RedBytes = SrcBmap->gpic     ;
    GreenBytes = SrcBmap->gpic+1 ;
    BlueBytes = SrcBmap->gpic+2 ;
    mfg_setgframe(R);
    for ( k = NumOfField ; k < 572 ;k++ ) {
      mfg_brhline(PAGE0,0,k++,768,rpixarr) ;
      for ( j = 0 ; j < 768 ; j++ ) {
         *RedBytes = rpixarr[j] ;
         RedBytes += 3 ;
      }
    }
    mfg_setgframe(G);
    for ( k = NumOfField ; k < 572 ;k++ ) {
      mfg_brhline(PAGE0,0,k++,768,rpixarr) ;
      for ( j = 0 ; j < 768 ; j++ ) {
         *GreenBytes = rpixarr[j] ;
         GreenBytes += 3 ;
      }
    }
    mfg_setgframe(B);
    for ( k = NumOfField ; k < 572 ;k++ ) {
```

```
    mfg_brhline(PAGE0,0,k++,768,rpixarr) ;
    for ( j = 0 ; j < 768 ; j++ ) {
       *BlueBytes = rpixarr[j] ;
       BlueBytes += 3 ;
    }
  } sprintf(String,"Time = %ld",GetTickCount() - Ticks) ;
  MessageBox (hwnd, szAppName,String,MB_ICONEXCLAMATION |
MB_OK) ;

teach_rgb_pallete(hwnd) ;
  FileType = FILE_IS_RGB ;
  GetClientRect(hwnd,&ClientRect) ;
  create_norm_bmap(hwnd,SrcBmap,&Normap,ClientRect) ;
  return 1 ;
} int PASCAL load_picture_from_card(HWND hwnd)
{
DWORD Size ;
BYTE huge *RedBytes ;
BYTE huge *GreenBytes ;
BYTE huge *BlueBytes ;
int j,k ;

Size = (DWORD)572*(DWORD)768*(DWORD)3 ;
  if ( SrcBmap != NULL ) bm_free(SrcBmap) ;
  SrcBmap = bm_alloc(768,572,glModelColor);
  SrcBmap->gpic = (BYTE huge *)GlobalAllocPtr(GMEM_MOVEABLE,Size);
  RedBytes = SrcBmap->gpic     ;
  GreenBytes = SrcBmap->gpic+1 ;
  BlueBytes = SrcBmap->gpic+2 ;
  mfg_setgframe(R);
  for ( k = 0 ; k < 572 ;k++ ) {
    mfg_brhline(PAGE0,0,k,768,rpixarr) ;
    for ( j = 0 ; j < 768 ; j++ ) {
       *RedBytes = rpixarr[j] ;
       RedBytes += 3 ;
    }
  }
  mfg_setgframe(G);
  for ( k = 0 ; k < 572 ;k++ ) {
    mfg_brhline(PAGE0,0,k,768,rpixarr) ;
    for ( j = 0 ; j < 768 ; j++ ) {
       *GreenBytes = rpixarr[j] ;
       GreenBytes += 3 ;
    }
  }
```

```
    mfg_setgframe(B);
    for ( k = 0 ; k < 572 ;k++ ) {
      mfg_brhline(PAGE0,0,k,768,rpixarr) ;
      for ( j = 0 ; j < 768 ; j++ ) {
         *BlueBytes = rpixarr[j] ;
          BlueBytes += 3 ;
      }
    }
    //if ( InterpMode == IN_TRILINEAR )
    //    build_pyramid(hwnd,SrcBmap) ;

teach_rgb_pallete(hwnd) ;
    FileType = FILE_IS_RGB ;
    GetClientRect(hwnd,&ClientRect) ;
    create_norm_bmap(hwnd,SrcBmap,&Normap,ClientRect) ;
    return 1 ;
} int PASCAL load_picture_from_file(HWND hwnd,char *FileName)
{
int  ColorFactor ;
int  Width,Height ;
DWORD SrcSize ;
DWORD i ;

if ( glModelColor == GREY_MODEL )       {
      ColorFactor = 1 ;
      lpGreyRgb = ReadRGB (hwnd,FileName,&Width,&Height) ;
      lpPtr = lpGreyRgb ;
    }
    if ( glModelColor == COLOR_MODEL ) {
      ColorFactor = 3  ;
      lpPtr = ReadRGB (hwnd,FileName,&Width,&Height) ;
    }
    IsRgb = 1 ;
    bm_free(SrcBmap) ;
    SrcBmap = bm_alloc(Width,Height, glModelColor);
    if (SrcBmap == NULL) {
          MessageBox (hwnd, szAppName,"bm_alloc
Failed!",MB_ICONEXCLAMATION | MB_OK) ;
          return 0 ;
    }
    SrcSize = (DWORD)Width*(DWORD)(Height)*(DWORD)(ColorFactor);
    SrcBmap->gpic = lpPtr ;
    if ( SplitMode == 1 && SrcBmap != NULL) {
          split_bitmap(SrcBmap,SrcBmap->typ,30) ; // NEW CALL
    }
    GetClientRect(hwnd,&ClientRect) ;
```

```c
    create_norm_bmap(hwnd,SrcBmap,&Normap,ClientRect) ;
    return 1 ;
} int PASCAL draw_field_to_screen(HWND hwnd,MYBITMAP *Bmap,int
IsOdd)
{
int i,j ;
BYTE huge *Ptr ;
BYTE huge *PtrR ;
BYTE huge *PtrG ;
BYTE huge *PtrB ;
int Cols,Rows ;

IsOdd = 1- IsOdd ; // PATCH
    Cols = Bmap->cols ;
    Rows = (DWORD)(Bmap->rows)*(DWORD)2 ;
    Ptr = Bmap->gpic ;
    //Ptr += (DWORD)IsOdd*(DWORD)Cols*(DWORD)3 ;
    PtrR = Ptr ;
    PtrG = Ptr+1 ;
    PtrB = Ptr+2 ;
    mfg_setgframe(R);
    for ( i = IsOdd ; i < Rows ; i +=2 ) {
        for ( j = 0 ; j < Cols ; j++ ) {
            rpixarr[j] = *PtrR ;
            PtrR += 3 ;
        }
        //PtrR += (DWORD)Cols+(DWORD)3 ;
        mfg_bwhline(PAGE0,0,i,Cols,rpixarr) ;
    }
    mfg_setgframe(G);
    for ( i = IsOdd ; i < Rows ; i +=2 ) {
        for ( j = 0 ; j < Cols ; j++ ) {
            rpixarr[j] = *PtrG ;
            PtrG += 3 ;
        }
        //PtrG += (DWORD)Cols+(DWORD)3 ;
        mfg_bwhline(PAGE0,0,i,Cols,rpixarr) ;
    }
    mfg_setgframe(B);
    for ( i = IsOdd ; i < Rows ; i +=2 ) {
        for ( j = 0 ; j < Cols ; j++ ) {
            rpixarr[j] = *PtrB ;
            PtrB += 3 ;
        }
        //PtrB += (DWORD)Cols+(DWORD)3 ;
        mfg_bwhline(PAGE0,0,i,Cols,rpixarr) ;
    }
```

```
  return 1 ;
} int PASCAL get_fittness_of_vertexes(HWND hwnd,RECT Bound,MYBITMAP
*Bmap,
                    RPOINT *DstPnts,DWORD *Sum)

{
MYBITMAP *BoundedBmap=NULL ;
MYBITMAP *DiffBmap =NULL ;
RPOINT    SrcPnts[4] ;

l_cp_int_arr_to_RPOINT(SrcPnts, SignX, SignY,4) ;

create_grey_bounded_bitmap(Bound,Normap,&BoundedBmap) ;//Copy the
area to
                    // be changed into a
                    //separate bitmap.

perspective(hwnd,Bmap,Normap,SrcPnts,
        DstPnts, GREY_MODEL, &BasicTransf) ;
                    // Perform perspective
                    // grey of the current sign
                    // with itself into NormBmap.
substract_bitmaps(Bound,Normap,BoundedBmap,&DiffBmap) ; // Subtract
BoundedBmap
                    // from the transformed
                    // sign area in NormBmap.
sum_grey_bitmap_value(DiffBmap,Sum) ;

bm_free(BoundedBmap) ;
bm_free(DiffBmap) ;

return 1 ;
} int PASCAL replace_sign(HWND hwnd,RPOINT *Dest)
{
MYBITMAP *AlphaMap ;

build_alpha_map(&AlphaMap, SrcBmap,Dest) ;
perspective_al(hwnd,SubstBmap,SrcBmap,AlphaMap,SrcPoly,
         Dest, glModelColor, &BasicTransf) ;

bm_free(AlphaMap) ;
create_norm_bmap(hwnd,SrcBmap,&Normap,GlBound) ;
return 1 ;
}
```

```
int PASCAL smooth_values(double NewVal, double *OutVal,double *ValArr,
                int Num, double *Wheight)
{
int i ;
double SumW = 0.0 ;
double Calc ;

for ( i = 0 ; i < Num-1 ; i++ ) {
   ValArr[i] = ValArr[i+1] ;
}
ValArr[Num-1] = NewVal ;
Calc = 0 ;
for ( i = 0 ; i < Num ; i++ ) {
    Calc += ValArr[i]*Wheight[i] ;
    SumW += Wheight[i] ;
}

*OutVal = Calc/SumW ;
return 1 ;
} int PASCAL create_subs_sign(HWND hwnd)
{
//Perspective_Transform TpCurr ;
Perspective_Transform BasicTransf ;
RECT Rectan ;
int     Cols,Rows ;
DWORD    Size ;
RPOINT SrcPnts[4] ;
RPOINT CmPoly[4] ;

//Quad2Quad(hwnd,SrcPoly,DstPoly,&TpCurr) ;

l_find_bound_rect(DstPoly, &Rectan) ;
Cols = Rectan.right-Rectan.left+1 ;
Rows = Rectan.bottom-Rectan.top+1 ;
l_quad_in_new_origin(CmPoly.DstPoly,Rectan.left,Rectan.top,4) ;

bm_free(Subs) ;
Subs = bm_alloc(Cols,Rows,COLOR_MODEL) ;
Size = (DWORD)Cols*(DWORD)Rows*(DWORD)3 ;
Subs->gpic = (BYTE huge*)GlobalAllocPtr(GMEM_MOVEABLE,Size) ;

perspective(hwnd,SubstBmap,Subs,SrcPoly,
             CmPoly, COLOR_MODEL, &BasicTransf) ;
```

SUBSTITUTE SHEET (RULE 26)

```
  return 1 ;
} int PASCAL fill_mask_rect(MYBITMAP *Bmap)
{
int i,j,k,l ;
int Cols,Rows ;
int Count ;
int Index = 0 ;

Cols = Bmap->cols ;
  Rows = Bmap->rows ;
  Count = 0 ;
  for ( i= 0 ; i < Cols ; i++ ) {
      if ( BITMAP_PLACE(Bmap,0,i) == 0) Count++ ;
      else {
         if ( Count > 0 ) {
             OcclusionRects[Index].top = 0 ;
             OcclusionRects[Index].left = i - Count+1 ;
             OcclusionRects[Index].bottom = Rows   ;
             OcclusionRects[Index].right = i /*+Count/3 */ ;   // IF BUG i.
             Index++ ;
             Count = 0 ;
         }
      }
  }
  if ( Index == 0 && NumOfValidOccRects > 0 ) {
    OcclusionRects[0] = ValidOccRects[0] ;
    OcclusionRects[0].right = min(OcclusionRects[0].right+2,Cols-1) ;
    OcclusionRects[0].bottom = Rows ;
    for ( k = OcclusionRects[0].top ; k < OcclusionRects[0].bottom ; k++ ) {
        for ( l = OcclusionRects[0].left ; l< OcclusionRects[0].right ; l++ ) {
             BITMAP_PLACE(Bmap,k,l) = 0 ;
        }
    }
    Index = 1;
  }
NumOfOccRects = Index ;

return 1 ;
} int PASCAL ValidateOccRects(MYBITMAP *Bmap)
{
int i, j,k,l ;
RECT Intersection ;
int Index = 0 ;
```

```
for ( j = 0 ; j < NumOfValidOccRects ; j++ ) {
   for ( i = 0 ; i < NumOfOccRects ; i++ ) {
      IntersectRect(&Intersection,&(OcclusionRects[i]),&(ValidOccRects[j])) ;
      if ( Intersection.bottom == 0 ) {
         for ( k = OcclusionRects[i].top ; k < OcclusionRects[i].bottom ; k++ )
      {
            for ( l = OcclusionRects[i].left ; l< OcclusionRects[i].right ; l++ ) {
               BITMAP_PLACE(Bmap,k,l) = 1 ;
            }
         }
      }
   }
}
return 1 ;
} int PASCAL copy_into_valid_rects()
{
int i ;

for ( i = 0 ; i < NumOfOccRects ; i++ ) {
    ValidOccRects[i] = OcclusionRects[i] ;
 }
 NumOfValidOccRects = NumOfOccRects ;
 return 1 ;
} int PASCAL enlarge_area_of_noise(MYBITMAP *From,MYBITMAP *Bmap)
{
int i, j ;
int Cols,Rows ;
RECT Rectan ;

Cols = Bmap->cols ;
 Rows = Bmap->rows ;
 for ( j = 4 ; j < Cols-4 ; j+=3 ) {
  for ( i = 4 ; i < Rows -4 ; i++ ) {
      Rectan.top = i-3 ;
      Rectan.left = j-3 ;
      Rectan.right = j+3 ;
      Rectan.bottom = i+3 ;
      filter_noises_by_rects(From,Rectan,8,25,Bmap) ;
  }
 }
 return 1 ;
}
```

394

```
#include <windows.h>
#include <windowsx.h>
#include <commdlg.h>
#include <stdlib.h>
#include <math.h>
#include "const.h"
#include "bitmap.h"
#include "lines.h"
#include "track.h"
#include "min_mag.h"
#include "lib.h"

RECT Screen ;
MYBITMAP   FAR *dMaps[1 + DLVLS];
MYBITMAP   FAR *iMaps[1 + ILVLS];

int PASCAL refine_alpha_edges(MYBITMAP* ) ;
int PASCAL get_longest_occlusion(MYBITMAP *,int ,int ) ;

MYBITMAP    FAR * bm_alloc(int xdim, int ydim, BMTYPE typ)
{
MYBITMAP   FAR* bm;

bm = (MYBITMAP FAR *) GlobalAllocPtr(GMEM_MOVEABLE,sizeof(MYBITMAP));
  if (bm == NULL  )
      return NULL ;

bm->typ = typ;
  bm->cols = xdim;
  bm->rows = ydim;
  bm->gpic = NULL ;

return (bm);
}
```

295

```c
double PASCAL bilinear(double xs, double ys, MYBITMAP FAR* bmap)
{
int          yi = (int) ys;
double       dy = ys - (double) yi;
int          xi = (int) xs;
double       dx = xs - (double) xi;
double       g00, g01, g10, g11, g1, g2;

if (xi < 0 || xi >= bmap->cols)
     return (-1.0);
   if (yi < 0 || yi >= bmap->rows)
     return (-1.0);
   g00 = BITMAP_PLACE(bmap,yi,xi) ;
   g01 = (xi == bmap->cols - 1 ? g00 : BITMAP_PLACE(bmap,yi,xi+1));
   g10 = (yi == bmap->rows - 1 ? g00 : BITMAP_PLACE(bmap,yi+1,xi));
   g11 = (xi == bmap->cols - 1 || yi == bmap->rows - 1 ?
          g00 : BITMAP_PLACE(bmap,yi+1,xi+1));
   g1 = g00 + (g01-g00)*dx ;
   g2 = g10 + (g11-g10)*dx ;

return(g1 + (g2-g1)*dy) ;
} double PASCAL bilinear_red(double xs, double ys, MYBITMAP FAR* bmap)
{
int          yi = (int) ys;
double       dy = ys - (double) yi;
int          xi = (int) xs;
double       dx = xs - (double) xi;
double       g00, g01, g10, g11, g1, g2;

if (xi < 0 || xi >= bmap->cols)
       return (-1.0);
   if (yi < 0 || yi >= bmap->rows)
       return (-1.0);
   g00 = BITMAP_RGB_PLACE(bmap,yi,xi) ;
```

```
    g01 = (xi == bmap->cols - 1 ? g00 :
*(BITMAP_RGB_PLACE_PTR(bmap,yi,xi+1)));
    g10 = (yi == bmap->rows - 1 ? g00
:*(BITMAP_RGB_PLACE_PTR(bmap,yi+1,xi)));
    g11 = (xi == bmap->cols - 1 || yi == bmap->rows - 1 ?
        g00 : *(BITMAP_RGB_PLACE_PTR(bmap,yi+1,xi+1)));
    g1 = g00 * (1.0 - dx) + g01 * dx;
    g2 = g10 * (1.0 - dx) + g11 * dx;
    return (g1 * (1.0 - dy) + g2 * dy);
} double PASCAL bilinear_green(double xs, double ys, MYBITMAP FAR*
bmap)
{
int         yi = (int) ys;
double          dy = ys - (double) yi;
int         xi = (int) xs;
double          dx = xs - (double) xi;
double          g00, g01, g10, g11, g1, g2;

if (xi < 0 || xi >= bmap->cols)
        return (-1.0);
    if (yi < 0 || yi >= bmap->rows)
        return (-1.0);
    g00 = *(BITMAP_RGB_PLACE_PTR(bmap,yi,xi)+1) ;
    g01 = (xi == bmap->cols - 1 ? g00 :
                    *(BITMAP_RGB_PLACE_PTR(bmap,yi,xi+1)+1));
    g10 = (yi == bmap->rows - 1 ? g00 :
                    *(BITMAP_RGB_PLACE_PTR(bmap,yi+1,xi)+1));
    g11 = (xi == bmap->cols - 1 || yi == bmap->rows - 1 ?
        g00 : *(BITMAP_RGB_PLACE_PTR(bmap,yi+1,xi+1)+1));
    g1 = g00 * (1.0 - dx) + g01 * dx;
    g2 = g10 * (1.0 - dx) + g11 * dx;

return (g1 * (1.0 - dy) + g2 * dy);
}
```

```c
double PASCAL bilinear_blue(double xs, double ys, MYBITMAP FAR* bmap)
{
int          yi = (int) ys;
double       dy = ys - (double) yi;
int          xi = (int) xs;
double       dx = xs - (double) xi;
double       g00, g01, g10, g11, g1, g2;

if (xi < 0 || xi >= bmap->cols)
       return (-1.0);
   if (yi < 0 || yi >= bmap->rows)
       return (-1.0);
   g00 = *(BITMAP_RGB_PLACE_PTR(bmap,yi,xi)+2) ;
   g01 = (xi == bmap->cols - 1 ? g00
:*(BITMAP_RGB_PLACE_PTR(bmap,yi,xi+1)+2));
   g10 = (yi == bmap->rows - 1 ? g00
:*(BITMAP_RGB_PLACE_PTR(bmap,yi+1,xi)+2));
   g11 = (xi == bmap->cols - 1 || yi == bmap->rows - 1 ?
         g00 : *(BITMAP_RGB_PLACE_PTR(bmap,yi+1,xi+1)+2));
   g1 = g00 * (1.0 - dx) + g01 * dx;
   g2 = g10 * (1.0 - dx) + g11 * dx;

return (g1 * (1.0 - dy) + g2 * dy);
} int PASCAL multmat(HWND hwnd,int Ma, int Na, int Nb, double *A, double
*B, double *C)
{
int          i, j, k;

for (i = 0; i < Ma; i++) {
      for (j = 0; j < Nb; j++) {
         C[(DWORD)i * (DWORD)Nb + (DWORD)j] = 0.0;
         for (k = 0; k < Na; k++) {
            C[(DWORD)i * (DWORD)Nb + (DWORD)j] +=
               A[(DWORD)i * (DWORD)Na + (DWORD)k] *
                     B[(DWORD)k * (DWORD)Nb + (DWORD)j];
         }
      }
```

```
      } _
   }
   return 1 ;
} double PASCAL resample_trilinear(MYBITMAP FAR* bmap, double xs,
double ys,
                              double D,int ColorModel)
{
int id,i,mag ;
double         fMag,hMag ;
double         g1,g2,alpha,g ;

if (D <= 1.0)    // magnified pyramid level not used
      return (bilinear(xs, ys, bmap));
   id = (int) ceil(D);
   for (i = 1; i <= DLVLS; i++) {
      mag = (1 << i);
      if (mag >= id)
         break;
   } if (i > DLVLS) // interplation is bi-linear
         return (bilinear(xs, ys, dMaps[ILVLS]));

fMag = mag;
   hMag = mag / 2;

g1 = bilinear(xs / hMag, ys / hMag, dMaps[i - 1]);
   g2 = bilinear(xs / fMag, ys / fMag, dMaps[i]);
   alpha = (D - hMag) / hMag;
   g = g1 * (1.0 - alpha) + g2 * alpha;

return (g);
} double PASCAL resample_trilinear_red(MYBITMAP FAR* bmap, double xs,
double ys,
``` double D,int ColorModel)
```
{
int id,i,mag ;
double      fMag,hMag ;
double      g1,g2,alpha,g ;

if (D <= 1.0)   // magnified pyramid level not used
     return (bilinear_red(xs, ys, bmap));
  id = (int) ceil(D);
  for (i = 1; i <= DLVLS; i++) {
     mag = (1 << i);
     if (mag >= id)
        break;
  } if (i > DLVLS) // interpiation is bi-linear
        return (bilinear_red(xs, ys, dMaps[ILVLS]));

fMag = mag;
  hMag = mag / 2;

g1 = bilinear_red(xs / hMag, ys / hMag, dMaps[i - 1]);
  g2 = bilinear_red(xs / fMag, ys / fMag, dMaps[i]);
  alpha = (D - hMag) / hMag;
  g = g1 * (1.0 - alpha) + g2 * alpha;

return (g);
} double PASCAL resample_trilinear_green(MYBITMAP FAR* bmap, double xs, double ys,
                        double D,int ColorModel)
{
int id,i,mag ;
double      fMag,hMag ;
double      g1,g2,alpha,g ;

if (D <= 1.0)   // magnified pyramid level not used
```

300

```
      return (bilinear_green(xs, ys, bmap));
   id = (int) ceil(D);
   for (i = 1; i <= DLVLS; i++) {
      mag = (1 << i);
      if (mag >= id)
         break;
   } if (i > DLVLS) // interplation is bi-linear
         return (bilinear_green(xs, ys, dMaps[ILVLS]));

fMag = mag;
   hMag = mag / 2;

g1 = bilinear_green(xs / hMag, ys / hMag, dMaps[i - 1]);
   g2 = bilinear_green(xs / fMag, ys / fMag, dMaps[i]);
   alpha = (D - hMag) / hMag;
   g = g1 * (1.0 - alpha) + g2 * alpha;

return (g);
}
double PASCAL resample_trilinear_blue(MYBITMAP FAR* bmap, double xs,
double ys,
                              double D,int ColorModel)
{
int id,i,mag ;
double          fMag,hMag ;
double          g1,g2,alpha,g ;

if (D <= 1.0)   // magnified pyramid level not used
      return (bilinear_blue(xs, ys, bmap));
   id = (int) ceil(D);
   for (i = 1; i <= DLVLS; i++) {
      mag = (1 << i);
      if (mag >= id)
         break;
   }
```

301

```
    if (i > DLVLS) // interplation is bi-linear
         return (bilinear_blue(xs, ys, dMaps[ILVLS]));

fMag = mag;
    hMag = mag / 2;

g1 = bilinear_blue(xs / hMag, ys / hMag, dMaps[i - 1]);
    g2 = bilinear_blue(xs / fMag, ys / fMag, dMaps[i]);
    alpha = (D - hMag) / hMag;
    g = g1 * (1.0 - alpha) + g2 * alpha;

return (g);
} int PASCAL build_pyramid(HWND hwnd, MYBITMAP FAR * SrcBmap)
{
int i ;

dMaps[0] = iMaps[0] = SrcBmap;
    for (i = 1; i <= DLVLS; i++) {
         dMaps[i] = minify(hwnd, dMaps[i - 1], 2);
    }
    return 1 ;
} int PASCAL bm_free(MYBITMAP FAR* BtMap)
{
  if ( BtMap != NULL ) {
     GlobalFreePtr(BtMap->gpic) ;
     GlobalFreePtr(BtMap) ;
  }
  return 1 ;
} int PASCAL find_horiz_line(MYBITMAP *Bmap,POINT Point1, POINT Point2,
RPOINT *Line)
{
```

```
int i,j,Ri,Rj ;
double Luma1[7][7] ;
double Luma2[7][7] ;
double r,g,b ;
double Tresh = 70 ;
RPOINT Found1,Found2 ;
int Found ;

for ( i = Point1.y-3, Ri = 0 ; Ri < 7 ; i++,Ri++) {
  for ( j = Point1.x-3, Rj = 0 ; Rj < 7 ; j++,Rj++ ) {
      r = *(BITMAP_RGB_PLACE_PTR(Bmap,i,j)) ;
      g = *(BITMAP_RGB_PLACE_PTR(Bmap,i,j)+1) ;
      b = *(BITMAP_RGB_PLACE_PTR(Bmap,i,j)+2) ;
      Luma1[Ri][Rj] = r * 0.299 + g * 0.587 + b * 0.114;
  }
}
for ( i = Point2.y-3, Ri = 0 ; Ri < 7 ; i++,Ri++) {
  for ( j = Point2.x-3, Rj = 0 ; Rj < 7 ; j++,Rj++ ) {
      r = *(BITMAP_RGB_PLACE_PTR(Bmap,i,j)) ;
      g = *(BITMAP_RGB_PLACE_PTR(Bmap,i,j)+1) ;
      b = *(BITMAP_RGB_PLACE_PTR(Bmap,i,j)+2) ;
      Luma2[Ri][Rj] = r * 0.299 + g * 0.587 + b * 0.114;
  }
}
Found = 0 ;
Found1.x = Point1.x ;
Found1.y = Point1.y ;
for ( i = 1 ; i < 6 && Found == 0; i++ ) {
  for ( j = 0 ; j < 6   ; j++ ) {
      if ( fabs(Luma1[i-1][j]-Luma1[i][j]) >= Tresh ) {
          if ( fabs(Luma1[i-1][j+1] - Luma1[i][j+1]) >= Tresh ||
              fabs(Luma1[i+1][j+1] - Luma1[i][j+1]) >= Tresh ) {
              Found1.x = Point1.x -3+j ;
              Found1.y = Point1.y -3+i ;
              Found = 1 ;
              break ;
          }
      }
  }
```

```
       }
    }
Found = 0 ;
Found2.x = Point2.x ;
Found2.y = Point2.y ;
for ( i = 1 ; i < 6 && Found == 0 ; i++ ) {
    for ( j = 0 ; j < 6    ; j++ ) {
        if ( fabs(Luma2[i-1][j]-Luma2[i][j]) >= Tresh ) {
            if ( fabs(Luma2[i-1][j+1] - Luma2[i][j+1]) >= Tresh ||
                 fabs(Luma2[i+1][j+1] - Luma2[i][j+1]) >= Tresh ) {
                Found2.x = Point2.x -3+j ;
                Found2.y = Point2.y -3+i ;
                Found = 1;
                break ;
            }
        }
    }
}

Line->y = (Found2.x*Found1.y-Found2.y*Found1.x)/(Found2.x-Found1.x) ;
Line->x = (Found1.y-Line->y)/Found1.x ;

return 1 ;
} int PASCAL find_vertic_line(MYBITMAP *Bmap,POINT Point1, POINT
Point2, RPOINT *Line)
{
int i,j,Ri,Rj ;
double Luma1[7][7] ;
double Luma2[7][7] ;
double r,g,b ;
double Tresh = 70 ;
RPOINT Found1,Found2 ;
int Found ;

for ( i = Point1.y-3, Ri = 0 ; Ri < 7 ; i++,Ri++ ) {
    for ( j = Point1.x-3, Rj = 0 ; Rj < 7 ; j++,Rj++ ) {
```

304

```
                r = *(BITMAP_RGB_PLACE_PTR(Bmap,i,j)) ;
                g = *(BITMAP_RGB_PLACE_PTR(Bmap,i,j)+1) ;
                b = *(BITMAP_RGB_PLACE_PTR(Bmap,i,j)+2) ;
                Luma1[Ri][Rj] = r * 0.299 + g * 0.587 + b * 0.114;
        }
}
for ( i = Point2.y-3, Ri = 0 ; Ri < 7 ; i++,Ri++) {
    for ( j = Point2.x-3, Rj = 0 ; Rj < 7 ; j++,Rj++ ) {
                r = *(BITMAP_RGB_PLACE_PTR(Bmap,i,j)) ;
                g = *(BITMAP_RGB_PLACE_PTR(Bmap,i,j)+1) ;
                b = *(BITMAP_RGB_PLACE_PTR(Bmap,i,j)+2) ;
                Luma2[Ri][Rj] = r * 0.299 + g * 0.587 + b * 0.114;
        }
}
Found = 0 ;
Found1.x = Point1.x ;
Found1.y = Point1.y ;
for ( i = 0 ; i < 6 && Found == 0; i++ ) {
    for ( j = 0 ; j < 6   ; j++ ) {
        if ( fabs(Luma1[i][j]-Luma1[i][j+1]) >= Tresh ) {
            if ( fabs(Luma1[i+1][j] - Luma1[i+1][j+1]) >= Tresh ) {
                    Found1.x = Point1.x -3+j ;
                    Found1.y = Point1.y -3+i ;
                    Found = 1 ;
                    break ;
            }
        }
    }
}
Found = 0 ;
Found2.x = Point2.x ;
Found2.y = Point2.y ;
for ( i = 0 ; i < 6 && Found == 0 ; i++ ) {
    for ( j = 0 ; j < 6   ; j++ ) {
        if ( fabs(Luma2[i][j]-Luma2[i][j+1]) >= Tresh ) {
            if ( fabs(Luma2[i+1][j] - Luma2[i+1][j+1]) >= Tresh ) {
                    Found2.x = Point2.x -3+j ;
                    Found2.y = Point2.y -3+i ;
```

```
                Found = 1;
                break ;
            }
        }
    }
} if ( Found2.x == Found1.x ) {
    Line->y = 0.0 ;
    Line->x = Found1.x ;
} else {
    Line->y = (Found2.x*Found1.y-Found2.y*Found1.x)/(Found2.x-Found1.x) ;
    Line->x = (Found1.y-Line->y)/Found1.x ;
} return 1 ;
} define HSx 5 /* Half search area (x) */
define HSy 5/* Half search area (y) */
#define HWx 4 /* Half correlation window (x) */
define HWy 4 /* Half correlation window (y) */ int PASCAL create_lum_bmap(MYBITMAP *Bmap, MYBITMAP **LumBmap)
{
BYTE huge * Tmp;
BYTE huge * TmpB ;
int Cols, Rows ;
DWORD Size ;
DWORD i ;

Cols = Bmap->cols ;
Rows = Bmap->rows ;

Tmp = Bmap->gpic ;
```

```
bm_free(*LumBmap) ;

*LumBmap = bm_alloc(Cols,Rows,GREY_MODEL);
Size = (DWORD)Cols*(DWORD)Rows ;
(*LumBmap)->gpic = (BYTE huge*)GlobalAllocPtr(GMEM_MOVEABLE,Size)
;

TmpB = (*LumBmap)->gpic ;
Tmp = Bmap->gpic ;

for ( i = 0 ; i < Size ; i++ ) {
   *(TmpB++) = (BYTE)((double)(*(Tmp++))* 0.299 +
          (double)*(Tmp++)* 0.587 + (double)*(Tmp++)* 0.114);
}
return 1 ;
} int PASCAL duplicate_bmap(MYBITMAP *FrBmap, MYBITMAP **ToBmap,int
Type)
{
BYTE huge * Tmp;
BYTE huge * TmpB ;
int Cols, Rows ;
DWORD Size ;
DWORD i ;
int ColorFactor=1 ;

Cols = FrBmap->cols ;
Rows = FrBmap->rows ;
if ( Type == COLOR_MODEL ) ColorFactor = 3 ;

Tmp = FrBmap->gpic ;

if ( *ToBmap != NULL ) bm_free(*ToBmap) ;

*ToBmap = bm_alloc(Cols,Rows,Type);
Size = (DWORD)Cols*(DWORD)Rows*(DWORD)ColorFactor ;
```

```
(*ToBmap)->gpic = (BYTE huge*)GlobalAllocPtr(GMEM_MOVEABLE,Size) ;

TmpB = (*ToBmap)->gpic ;
Tmp = FrBmap->gpic ;

for ( i = 0 ; i < Size ;i++ ) {
    *(TmpB++) = *(Tmp++) ;
} return 1 ;
} int PASCAL create_grey_bounded_bitmap(RECT area, MYBITMAP
*Bmap,MYBITMAP **BoundBmap)
{
int i, j ;
int Cols,Rows ;
DWORD    Size ;
BYTE huge* Tmp ;

Cols = area.right - area.left ;
Rows = area.bottom - area.top ;
bm_free(*BoundBmap) ;
*BoundBmap = bm_alloc(Cols,Rows,GREY_MODEL) ;
Size = (DWORD)Cols*(DWORD)Rows ;
(*BoundBmap)->gpic = (BYTE
huge*)GlobalAllocPtr(GMEM_MOVEABLE,Size) ;
Tmp = (*BoundBmap)->gpic ;
for ( i = area.top ; i < area.bottom ; i++ ) {
  for ( j = area.left ; j < area.right ; j++ ) {
      *(Tmp++) = BITMAP_PLACE(Bmap,i,j) ;
  }
} return 1 ;
}
```

```
int PASCAL substract_bitmaps(RECT area,MYBITMAP *From,MYBITMAP
*Subs,
                              MYBITMAP **Diff)
{
DWORD Size ;
int Cols, Rows ;
int i, j ;
BYTE huge* Tmp ;

Cols = Subs->cols ;
Rows = Subs->rows ;
bm_free(*Diff) ;
*Diff = bm_alloc(Cols,Rows,GREY_MODEL) ;
Size = (DWORD)Cols*(DWORD)Rows ;
(*Diff)->gpic = (BYTE huge*)GlobalAllocPtr(GMEM_MOVEABLE,Size) ;
Tmp = (*Diff)->gpic ;
for ( i = area.top ; i < area.bottom ; i++ ) {
   for ( j = area.left ; j < area.right ; j++ ) {
        *(Tmp++) = (BYTE)abs((int)(BITMAP_PLACE(From,i,j)-
                 BITMAP_PLACE(Subs,i-area.top,j-area.left))) ;
   }
} return 1 ;
} int PASCAL insert_grey_bounded_bitmap(RECT area,MYBITMAP *ToInsert,
                                       MYBITMAP *Into)
{
int i, j ;

for ( i = area.top ; i< area.bottom ; i++ ) {
   for ( j = area.left ; j< area.right ; j++ ) {
       BITMAP_PLACE(Into,i,j) =
              BITMAP_PLACE(ToInsert,i-area.top,j-area.left) ;
   }
}
```

309

SUBSTITUTE SHEET (RULE 26)

```
return 1;
} int PASCAL copy_grey_rect_from_frame(MYBITMAP *Into, MYBITMAP *From,
                                      RECT area)
{
int i,j ;

for ( i = area.top ; i < area.bottom ; i++ ) {
   for ( j = area.left ; j < area.right ; j++ ) {
       BITMAP_PLACE(Into,i-area.top,j-area.left) = BITMAP_PLACE(From,i,j) ;
   }
} return 1 ;
} int PASCAL build_alpha_map(MYBITMAP **AlphaMap, MYBITMAP *SrcBmap,RPOINT *Vertex)
{
int i,j ;
RECT Rectan ;
int Cols,Rows ;
SEG lines[4] ;
DWORD Size ;
RPOINT Points[4] ;
double Xval,Xmin,Xmax ;
int Curr ;

Cols = SrcBmap->cols ;
 Rows = SrcBmap->rows ;
 l_find_bound_rect(Vertex, &Rectan) ;
 for ( i = 0 ; i < 3 ; i++ ) {
    mksegment(Vertex[i].x, Vertex[i].y, Vertex[i+1].x, Vertex[i+1].y,&(lines[i])) ;
 }
```

3/C

```
  mksegment(Vertex[3].x, Vertex[3].y, Vertex[0].x, Vertex[0].y,&(lines[3])) ;
  *AlphaMap = bm_alloc(Cols,Rows,GREY_MODEL);
  Size = (DWORD)Cols*(DWORD)Rows ;
  (*AlphaMap)->gpic =
       (BYTE huge*)GlobalAllocPtr(GMEM_MOVEABLE |
GMEM_ZEROINIT,Size) ;
  for ( i = Rectan.top ; i < Rectan.bottom ; i++ ) {
    Curr = 0 ;
    for ( j = 0 ; j < 4 ; j++ ) {
      if ( lines[j].a != 0.0 ) {
         Xval = -1.0 *(lines[j].b*(double)i + lines[j].c)/lines[j].a ;
         if ( Xval <= Cols && Xval >= 0 ) {
            if ( i <= (int)(lines[j].ymax) && i >= (int)(lines[j].ymin) )
               Points[Curr++].x = Xval ;
         }
      }
    }
    Xmin = Points[0].x ;
    Xmax = Xmin ;
    for ( j = 1 ; j < Curr ; j++ ) {
        Xmin = min(Points[j].x,Xmin) ;
        Xmax = max(Points[j].x,Xmax) ;
    }
    for ( j = (int)Xmin ; j <= (int)Xmax ; j++ ) {
        BITMAP_PLACE((*AlphaMap),i,j) = 1 ;
    }
  }
    refine_alpha_edges(*AlphaMap) ;
  return 1 ;
} int PASCAL split_bitmap(MYBITMAP *Bmap,int ColorModel,int FromRow)
{
DWORD i,k ;
int Cols,Rows ;
DWORD Place ;
BYTE huge *Dup ;
int ColorFactor ;
```

```
DWORD Offset,Size,Offset2 ;

ColorFactor = 3 ;
Cols = Bmap->cols ;
Rows = Bmap->rows ;
Size = (DWORD)Rows*(DWORD)Cols*(DWORD)ColorFactor ;
Rows = (Bmap->rows-FromRow) /2 ;
if ( ColorModel == GREY_MODEL ) ColorFactor = 1;
Offset = (DWORD)FromRow*(DWORD)Cols*(DWORD)ColorFactor ;
Place = (DWORD)Rows*(DWORD)Cols*(DWORD)ColorFactor ;
Dup = Bmap->gpic + Size - Offset*(DWORD)2 ;
Offset2 = Offset*(DWORD)2 ;
for ( i = 0 ; i < Offset2 ; i++ ) {
   *(Dup++) = *(Bmap->gpic +Place+i) ;
}
Dup = Bmap->gpic+Place ;
k = 0 ;
for ( i = Offset ; i < Place ; i++ ) {
   *(Dup+ k++) = *(Bmap->gpic +i) ;
}
Size = (DWORD)Cols*(DWORD)6*(DWORD)ColorFactor ;  // 6 Rows of
Black.
for ( i = 0 ; i < Size ; i++ ) {
   *(Dup++) = 0 ;
} return 1 ;
} int PASCAL refine_alpha_edges(MYBITMAP* AlphaMap)
{
int i,j;
int Cols,Rows ;
BYTE Far,Close ;
int Count = 0 ;

Cols = AlphaMap->cols ;
Rows = AlphaMap->rows ;
```

```
Far = 170 ;
Close = 85 ;
for ( i = 2 ; i < Rows ; i++ ) {
  for ( j = 2 ; j < Cols-1 ; j++ ) {
      if ( BITMAP_PLACE(AlphaMap,i,j) == 1 ) {
        /*
        if ( BITMAP_PLACE(AlphaMap,i,j-1) == 0 ) {
            BITMAP_PLACE(AlphaMap,i,j-2) = Far  ;
            BITMAP_PLACE(AlphaMap,i,j-1) = Close ;
        }
        if ( BITMAP_PLACE(AlphaMap,i,j+1) == 0 ) {
            BITMAP_PLACE(AlphaMap,i,j+2) = Far ;
            BITMAP_PLACE(AlphaMap,i,j+1) = Close ;
            j++ ;
        }
        */
        if ( BITMAP_PLACE(AlphaMap,i-1,j) == 0 ) {
            BITMAP_PLACE(AlphaMap,i,j) = Far ;
            BITMAP_PLACE(AlphaMap,i+1,j) = Close ;
        }
        if ( BITMAP_PLACE(AlphaMap,i+1,j) == 0 ) {
            BITMAP_PLACE(AlphaMap,i,j) = Far ;
            BITMAP_PLACE(AlphaMap,i-1,j) = Close ;
        }
      }
  }
}
/*
for ( i = 2 ; i < Rows ; i++) {
  for ( j = 2 ; j < Cols ; j++ ) {
      if ( BITMAP_PLACE(AlphaMap,i,j) > 2 &&
BITMAP_PLACE(AlphaMap,i,j-1) ==0 ) {
        Array[Count].x = j-1 ;
        Array[Count++].y = i ;
      }
  }
}
```

313

```c
    for ( i = 0 ; i < Count-1 ; i++ ) {
     Len = Array[i].x-Array[i+1].x ;
     if ( Len == 0 ) continue ;
     Unit = 256/Len ;
     Line = Array[i].y ;
     for ( j = Array[i].x, k = 1 ; Len > 0 ; Len-- ) {
         BITMAP_PLACE(AlphaMap,Line,j) = (DWORD)Unit*(DWORD)k ;
         j-- ;
         k++ ;
     }
    }
*/
 return 1 ;
}

/* int PASCAL get_mask_bitmap(HWND hwnd,MYBITMAP *Bmap,int Tresh,MYBITMAP **MaskBmap)
{
int Cols, Rows ;
BYTE huge *Tmp ;
BYTE huge *BmapPtr ;
DWORD Size ,indx ;
int i,j,k ;
int Limit,Count,Value ;
MYBITMAP *ToBmap ;

Cols = Bmap->cols ;
Rows = Bmap->rows ;
bm_free(*MaskBmap) ;
*MaskBmap = bm_alloc(Cols,Rows,GREY_MODEL) ;
Size = (DWORD)Cols*(DWORD)Rows ;
(*MaskBmap)->gpic = (BYTE huge*)GlobalAllocPtr(GMEM_MOVEABLE,Size) ;
Tmp = (*MaskBmap)->gpic ;
BmapPtr = Bmap->gpic ;
for ( indx = 0 ; indx < Size ; indx++ ) {
```

```
    if ( *(BmapPtr++) <= Tresh ) {
        *(Tmp++) = 1 ;
    } else {
        *(Tmp++) = 0 ;
    }
} duplicate_bmap(*MaskBmap, &ToBmap,GREY_MODEL) ;
enlarge_area_of_noise(ToBmap,*MaskBmap) ;
WriteGreyRgb (hwnd,"mask0.rgb",*MaskBmap) ;
bm_free(ToBmap) ;

Limit = Rows/3 ;
for ( j = 0 ; j < Cols ; j++ ) {    // 0 Means Occlusion. 1 Means OK.
    Count = get_longest_occlusion(*MaskBmap,j,Rows) ;
    if ( Count < Limit ) {
        Value = 1 ;     //
     //for ( i = 0 ; i < Rows ; i++ ) {
     //    BITMAP_PLACE((*MaskBmap),i,j) = 1 ;
     //}
    } else Value = 0 ;     //
    for ( i = 0 ; i < Rows ; i++ ) {          //
        BITMAP_PLACE((*MaskBmap),i,j) = Value ;  //
    }                                          //
}

Count = 0 ;
for ( j = 0 ; j < Cols ; j++ ) {
    if ( BITMAP_PLACE((*MaskBmap),0,j) == 0 ) Count++ ;
    else {
        if ( Count == 0 ) continue ;
        if ( Count < 6 ) {
            for ( k = j-Count ; Count > 0 ; Count--, k++ ) {
                for ( i = 0 ; i < Rows ; i++ ) {
                    BITMAP_PLACE((*MaskBmap),i,k) = 1 ;
                }
            }
        } else { // Count >= 6
```

315

```
for ( i = 0 ; i < Rows ; i++ ) { if ( j > (Count+12) ) Limit = j-(Count+12) ;
    else Limit = 0 ;
    BITMAP_PLACE((*MaskBmap),i,Limit) = 0 ;
    if ( j > (Count+11) ) Limit = j-(Count+11) ;
    else Limit = 0 ;
    BITMAP_PLACE((*MaskBmap),i,Limit) = 0 ;
    if ( j > (Count+10) ) Limit = j-(Count+10) ;
    else Limit = 0 ;
    BITMAP_PLACE((*MaskBmap),i,Limit) = 0 ;
    if ( j > (Count+9) ) Limit = j-(Count+9) ;
    else Limit = 0 ;
    BITMAP_PLACE((*MaskBmap),i,Limit) = 0 ;
    if ( j > (Count+8) ) Limit = j-(Count+8) ;
    else Limit = 0 ;
    BITMAP_PLACE((*MaskBmap),i,Limit) = 0 ;
    if ( j > (Count+7) ) Limit = j-(Count+7) ;
    else Limit = 0 ;
    BITMAP_PLACE((*MaskBmap),i,Limit) = 0 ;
    if ( j > (Count+6) ) Limit = j-(Count+6) ;
    else Limit = 0 ;
    BITMAP_PLACE((*MaskBmap),i,Limit) = 0 ;
    if ( j > (Count+5) ) Limit = j-(Count+5) ;
    else Limit = 0 ;
    BITMAP_PLACE((*MaskBmap),i,Limit) = 0 ;
    if ( j > (Count+4) ) Limit = j-(Count+4) ;
    else Limit = 0 ;
    BITMAP_PLACE((*MaskBmap),i,Limit) = 0 ;
    if ( j > (Count+3) ) Limit = j-(Count+3) ;
    else Limit = 0 ;
    BITMAP_PLACE((*MaskBmap),i,Limit) = 0 ;
    if ( j > (Count+2) ) Limit = j-(Count+2) ;
    else Limit = 0 ;
    BITMAP_PLACE((*MaskBmap),i,Limit) = 0 ;
    if ( j > (Count+1) ) Limit = j-(Count+1) ;
    else Limit = 0 ;
    BITMAP_PLACE((*MaskBmap),i,Limit) = 0 ;
```

```
                BITMAP_PLACE((*MaskBmap),i,j-Count) = 0;
                BITMAP_PLACE((*MaskBmap),i,j) = 0 ;
                Limit = min(j+1,Cols-1) ;
                BITMAP_PLACE((*MaskBmap),i,Limit) = 0 ;
                Limit = min(j+2,Cols-1) ;
                BITMAP_PLACE((*MaskBmap),i,Limit) = 0 ;
                Limit = min(j+3,Cols-1) ;
                BITMAP_PLACE((*MaskBmap),i,Limit) = 0;
                Limit = min(j+4,Cols-1) ;
                BITMAP_PLACE((*MaskBmap),i,Limit) = 0 ;
                Limit = min(j+5,Cols-1) ;
                BITMAP_PLACE((*MaskBmap),i,Limit) = 0 ;
                Limit = min(j+6,Cols-1) ;
                BITMAP_PLACE((*MaskBmap),i,Limit) = 0 ;
                Limit = min(j+7,Cols-1) ;
                BITMAP_PLACE((*MaskBmap),i,Limit) = 0 ;
                Limit = min(j+8,Cols-1) ;
                BITMAP_PLACE((*MaskBmap),i,Limit) = 0 ;
                }
            j = min(j+6,Cols-1) ;
            Count = 0 ;
        }
      }
   }
  return 1 ;
}
*/ int PASCAL get_mask_bitmap(HWND hwnd,MYBITMAP *Bmap,int
Tresh,MYBITMAP **MaskBmap)
{
int Cols, Rows ;
BYTE huge *Tmp ;
BYTE huge *BmapPtr ;
DWORD Size ,indx ;
int i,j,k ;
int Limit,Count,Value ;
MYBITMAP *TempBmap ;
```

```
RECT Rectan ;

Cols = Bmap->cols ;
Rows = Bmap->rows ;
TempBmap = bm_alloc(Cols,Rows,GREY_MODEL) ;
Size = (DWORD)Cols*(DWORD)Rows ;
TempBmap->gpic = (BYTE huge*)GlobalAllocPtr(GMEM_MOVEABLE,Size) ;
Tmp = TempBmap->gpic ;
BmapPtr = Bmap->gpic ;
for ( indx = 0 ; indx < Size ; indx++ ) {
   if ( *(BmapPtr++) <= Tresh ) {
       *(Tmp++) = 1 ;
   } else {
       *(Tmp++) = 0 ;
   }
}

Limit = Rows/3 ;
for ( j = 0 ; j < Cols ; j++ ) {    // 0 Means Occlusion. 1 Means OK.
   Count = get_longest_occlusion(TempBmap,j,Rows) ;
   if ( Count >= Limit ) {
        BITMAP_PLACE(TempBmap,0,j) = 0 ;
   } else {
        BITMAP_PLACE(TempBmap,0,j) = 1 ;
   }

}

Count = 0 ;
for ( j = 0 ; j < Cols ; j++ ) {
   if ( BITMAP_PLACE(TempBmap,0,j) == 0 ) Count++ ;
   else {
       if ( Count == 0 ) continue ;
       if ( Count < 6 ) {
          for ( k = j-Count ; Count > 0 ; Count-- , k++ ) {
              for ( i = 0 ; i < Rows ; i++ ) {
                  BITMAP_PLACE(TempBmap,i,k) = 1 ;
              }
```

```
        }
    } else {  // Count >= 6
        for ( k = j-Count ; Count > 0 ; Count--, k++ ) {
            for ( i = 0 ; i < Rows ; i++ ) {
                BITMAP_PLACE(TempBmap,i,k) = 0 ;
            }
        }
        for ( i = 0 ; i < Rows ; i++ ) {
            if ( j > (Count+5) ) Limit = j-(Count+5) ;
            else Limit = 0 ;
            BITMAP_PLACE(TempBmap,i,Limit) = 0 ;
            if ( j > (Count+4) ) Limit = j-(Count+4) ;
            else Limit = 0 ;
            BITMAP_PLACE(TempBmap,i,Limit) = 0 ;
            if ( j > (Count+3) ) Limit = j-(Count+3) ;
            else Limit = 0 ;
            BITMAP_PLACE(TempBmap,i,Limit) = 0 ;
            if ( j > (Count+2) ) Limit = j-(Count+2) ;
            else Limit = 0 ;
            BITMAP_PLACE(TempBmap,i,Limit) = 0 ;
            if ( j > (Count+1) ) Limit = j-(Count+1) ;
            else Limit = 0 ;
            BITMAP_PLACE(TempBmap,i,Limit) = 0 ;
            Limit = min(j+1,Cols-1) ;
            BITMAP_PLACE(TempBmap,i,Limit) = 0 ;
            Limit = min(j+2,Cols-1) ;
            BITMAP_PLACE(TempBmap,i,Limit) = 0 ;
            Limit = min(j+3,Cols-1) ;
            BITMAP_PLACE(TempBmap,i,Limit) = 0;
            Limit = min(j+4,Cols-1) ;
            BITMAP_PLACE(TempBmap,i,Limit) = 0;
            Limit = min(j+5,Cols-1) ;
            BITMAP_PLACE(TempBmap,i,Limit) = 0;
            j = min(j+5,Cols-1) ;
        }
    }
    Count = 0 ;
}
```

```
        }
    duplicate_bmap(TempBmap, MaskBmap,GREY_MODEL);
    //WriteGreyRgb (hwnd,"mask0.rgb",*MaskBmap);
    for ( i = 5 ; i < Rows-5 ; i++ ) {
        for ( j = 5; j < Cols-5 ; j++ ) {
            if ( BITMAP_PLACE(TempBmap,i,j) == 0 ) {
                Rectan.top = i-5 ;
                Rectan.left = j ;
                Rectan.bottom = i+5 ;
                Rectan.right = j+5 ;
                filter_noises_by_rects(TempBmap,Rectan,6,30,*MaskBmap);
                Rectan.left = j-5 ;
                Rectan.right = j ;
                filter_noises_by_rects(TempBmap,Rectan,6,30,*MaskBmap);
                Rectan.right = j+5 ;
                filter_noises_by_rects(TempBmap,Rectan,11,55,*MaskBmap);
            }
        }
    }
    bm_free(TempBmap);
    //WriteGreyRgb (hwnd,"mask1.rgb",*MaskBmap);
    //Limit = Rows/4 ;
    for ( j = 1 ; j < Cols-2 ; j++ ) {      // 0 Means Occlusion. 1 Means OK.
        //Count = get_longest_occlusion(*MaskBmap,j,Rows);
        if ( BITMAP_PLACE((*MaskBmap),0,j-1) == 1 &&
             (BITMAP_PLACE((*MaskBmap),0,j+2)== 1 ||
              BITMAP_PLACE((*MaskBmap),0,j+1) == 1) {
            for ( i = 0 ; i < Rows ; i++ ) {
                BITMAP_PLACE((*MaskBmap),i,j) = 1 ;
            }
        }
    }
    //WriteGreyRgb (hwnd,"mask2.rgb",*MaskBmap);

return 1 ;
} int PASCAL get_longest_occlusion(MYBITMAP *Bmap,int col,int rows)
                    320
```

```c
{
int i ;
int Count = 0 ;
int Longest = 0 ;

for ( i = 0 ; i < rows ; i++ ) {
    if ( BITMAP_PLACE(Bmap,i,col) == 0 ) Count++ ;
    else {
       if ( Count > Longest ) {
          Longest = Count ;
          Count = 0 ;
       }
    }
}
if ( Count > Longest ) {
   Longest = Count ;
}
return Longest ;
} double PASCAL bilinear_rgb(double xs, double ys, MYBITMAP FAR* bmap,
                           double *Ptr)
{
int       yi = (int) ys;
double        dy = ys - (double) yi;
int       xi = (int) xs;
double        dx = xs - (double) xi;
double        g00, g01, g10, g11, g1, g2;
BYTE      huge *PtrX1 ;
BYTE      huge *PtrY1 ;
BYTE      huge *PtrX1Y1 ;
BYTE      huge *PtrXY ;

PtrXY = BITMAP_RGB_PLACE_PTR(bmap,yi,xi) ;
PtrX1 = BITMAP_RGB_PLACE_PTR(bmap,yi,xi+1) ;
PtrY1 = BITMAP_RGB_PLACE_PTR(bmap,yi+1,xi) ;
PtrX1Y1 = BITMAP_RGB_PLACE_PTR(bmap,yi+1,xi+1) ;
```

```
        g00 = PtrXY[0] ;
        g01 = (xi == bmap->cols - 1 ? g00 : PtrX1[0]);
        g10 = (yi == bmap->rows - 1 ? g00 : PtrY1[0]);
        g11 = (xi == bmap->cols - 1 || yi == bmap->rows - 1 ? g00 : PtrX1Y1[0]);
        g1 = g00 * (1.0 - dx) + g01 * dx;
        g2 = g10 * (1.0 - dx) + g11 * dx;
        Ptr[0] = g1 * (1.0 - dy) + g2 * dy ;

g00 = PtrXY[1] ;
        g01 = (xi == bmap->cols - 1 ? g00 : PtrX1[1]);
        g10 = (yi == bmap->rows - 1 ? g00 : PtrY1[1]);
        g11 = (xi == bmap->cols - 1 || yi == bmap->rows - 1 ? g00 : PtrX1Y1[1]);
        g1 = g00 * (1.0 - dx) + g01 * dx;
        g2 = g10 * (1.0 - dx) + g11 * dx;
        Ptr[1] = g1 * (1.0 - dy) + g2 * dy ;

g00 = PtrXY[2] ;
        g01 = (xi == bmap->cols - 1 ? g00 : PtrX1[2]);
        g10 = (yi == bmap->rows - 1 ? g00 : PtrY1[2]);
        g11 = (xi == bmap->cols - 1 || yi == bmap->rows - 1 ? g00 : PtrX1Y1[2]);
        g1 = g00 * (1.0 - dx) + g01 * dx;
        g2 = g10 * (1.0 - dx) + g11 * dx;
        Ptr[2] = g1 * (1.0 - dy) + g2 * dy ;

return (0.0);
} int PASCAL split_bitmap_frame(MYBITMAP *SrcBmap,MYBITMAP **F1,
MYBITMAP **F2)
{
int Rows,Cols,MidRows ;
DWORD Size,Limit,indx ;
int i,ColorFactor ;
BYTE huge * CurrPtr;
BYTE huge * Ptr;

Rows = SrcBmap->rows ;
Cols = SrcBmap->cols ;
```

```
if ( SrcBmap->typ == COLOR_MODEL ) ColorFactor = 3 ;
else ColorFactor = 1 ;
if ( Rows %2 == 0 ) {
  MidRows = Rows/2 ;
} else {
  MidRows = Rows/2 +1 ;
}
Size = (DWORD)MidRows*(DWORD)Cols*(DWORD)ColorFactor ;
*F1 = bm_alloc(Cols,MidRows,SrcBmap->typ) ;
(*F1)->gpic = (BYTE huge*)GlobalAllocPtr(GMEM_MOVEABLE,Size) ;
Limit = (DWORD)Cols*(DWORD)ColorFactor ;
CurrPtr = (*F1)->gpic ;
for ( i = 0 ; i < Rows ; i+=2 ) {
  if ( ColorFactor == 1 ) {
    Ptr = BITMAP_PLACE_PTR(SrcBmap,i,0) ;
  } else {
    Ptr = BITMAP_RGB_PLACE_PTR(SrcBmap,i,0) ;
  }
  for ( indx = 0 ; indx < Limit ; indx++ ) {
      *(CurrPtr++) = *(Ptr++) ;
  }
}

MidRows = Rows - MidRows ;
Size = (DWORD)MidRows*(DWORD)Cols*(DWORD)ColorFactor ;
*F2 = bm_alloc(Cols,MidRows,SrcBmap->typ) ;
(*F2)->gpic = (BYTE huge*)GlobalAllocPtr(GMEM_MOVEABLE,Size) ;
CurrPtr = (*F2)->gpic ;
for ( i = 1 ; i < Rows ; i+=2 ) {
  if ( ColorFactor == 1 ) {
    Ptr = BITMAP_PLACE_PTR(SrcBmap,i,0) ;
  } else {
    Ptr = BITMAP_RGB_PLACE_PTR(SrcBmap,i,0) ;
  }
  for ( indx = 0 ; indx < Limit ; indx++ ) {
      *(CurrPtr++) = *(Ptr++) ;
  }
}
```

```c
  return 1 ;
} int PASCAL sum_grey_bitmap_value(MYBITMAP *Bmap,DWORD *Sum)
{
DWORD i;
int Cols,Rows ;
DWORD Size ;
DWORD CurrSum ;
BYTE huge *Ptr ;

Cols = Bmap->cols ;
 Rows = Bmap->rows ;
 Ptr =  Bmap->gpic ;

Size = (DWORD)Cols*(DWORD)Rows ;
 CurrSum = 0 ;
 for ( i = 0 ; i < Size ; i++ ) {
   CurrSum += *(Ptr++) ;
 }
 *Sum = CurrSum ;

return 1 ;
} int PASCAL filter_noises_by_rects(MYBITMAP *Source,RECT Rectan,int LowLimit,
                        int HighLimit,MYBITMAP *Target)
{
int i,j ;
int Count = 0 ;
int Left,Right,Top,Bottom ;
int    Value ;

Left = Rectan.left ;
Top = Rectan.top ;
Right = Rectan.right ;
```

```
Bottom = Rectan.bottom ;

for ( i = Top ; i < Bottom ; i++ ) {
    for ( j = Left ; j < Right ; j++ ) {
        if ( BITMAP_PLACE(Source,i,j) == 0 ) Count++ ;
    }
}
Value = -1 ;
if ( Count < LowLimit ) Value = 1 ;
if ( Count > HighLimit ) Value = 0 ;
if ( Value == -1 ) return 1 ;

for ( i = Top ; i < Bottom ; i++ ) {
    for ( j = Left ; j < Right ; j++ ) {
        BITMAP_PLACE(Target,i,j) = Value ;
    }
} return 1 ;
}
```

```c
/*
 *   _ int qrsolv(M,size,b)
 *
 *   Solves the linear system : Mx = b using the QR Decomposition.
 *   On output b is overwritten by the solution x.
 *   Algorithm :
 *   1)qrdecomp M into Q & R (coded in M,m1,m2).
 *   2)multiply b by Q(transpose).
 *   3)R_solve Rx=Q(transpose)b.
 *
 * C Implementaion: Dr. I. Wilf.
 */
#define ORDER 8
#include<math.h>
#include "qrsolv.h"

int    qrsolv (m, size, b)
double m[ORDER][ORDER];
int size ;
double b[ORDER];
{
   int   i,
        j;
   double tau,
        m1[ORDER],
        m2[ORDER];

if (qrdecomp (m, size, m1, m2) < 0)   return 0 ;
        //error ("singularity in qrdecomp()\n");
   for (j = 0; j < (size - 1); j++) {
      tau = 0;
      for (i = j; i < size; i++)
         tau += m[i][j] * b[i];
      tau /= m1[j];
      for (i = j; i < size; i++)
         b[i] -= tau * m[i][j];
   }
   b[size - 1] /= m2[size - 1];
```

```
    rsolv (m, size, m2, b);
}
/*
 *      Compute the QR decomposition of a square matrix m using the
 Stewart
 *      algorithm.
 *      Upon termination, thr decomposition is stored in m,m1 and m2 as
 *      follows:
 *      R is contained in the upper triangle of m except that its main
 *      diagonal is contained in m2, and Q(transpos)=Q(n-1)*...*Q(1)
 *      where Q(j)=I-(Uj*Uj(transpos)/Pj) where
 *      Uj[i]=0, i=1->j-1, Uj[i]=m[i][j],i=j->n, Pj=m1[j].
 *
 *      Stewart,G.W., Introduction to matrix Computations, Academic Press,
 *              New York (1973).
 *
 * C Implementaion: Dr. I. Wilf.
 */ int qrdecomp (m, size, m1, m2)
double m[ORDER][ORDER];
double m1[ORDER],
    m2[ORDER];
{
  int   i,
        k,
        j;
  double eta,
        t,
        sigma,
        tau;

for (k = 0; k < (size - 1); k++) {
    eta = 0.0;
    for (i = k; i < size; i++)
      if (fabs (m[i][k]) > eta)
        eta = fabs (m[i][k]);
    if (eta == 0.0)
```

```
            return (-1);
        /* form Qk and premultiply m by it */
        t = 0;
        for (i = k; i < size; i++) {
            m[i][k] /= eta;
            t += m[i][k] * m[i][k];
        }
        if(m[k][k] >= 0.0)
                    sigma = sqrt(t);
        else
                    sigma = -sqrt(t);
        m[k][k] += sigma;
        m1[k] = sigma * m[k][k];
        m2[k] = (-eta * sigma);
        tau = 0;
        for (j = k + 1; j < size; j++) {
            tau = 0;
            for (i = k; i < size; i++)
               tau += m[i][k] * m[i][j];
            tau /= m1[k];
            for (i = k; i < size; i++)
               m[i][j] -= tau * m[i][k];
        }
    }
    m2[size - 1] = m[size - 1][size - 1];
    return (0);
}
/*
 *      rsolv(m,size,m2,b)
 *      solve Rx=b for x, where the upper triangular matrix R is
 *      stored in M , m2.
 *
 * C Implementaion: Dr. I. Wilf.
 */ rsolv (m, size, m2, b)
double m[ORDER][ORDER];
double m2[ORDER];
```

328.

```
        b[ORDER];
{
   int    i,
          j;
   double s;

for (i = size - 2; i >= 0; i--) {
      s = 0;
      for (j = i + 1; j < size; j++)
         s += m[i][j] * b[j];
      b[i] = (b[i] - s) / m2[i];
   }
}
```

```c
#include <windows.h>
#include <windowsx.h>
#include <commdlg.h>
#include <stdlib.h>
#include <bios.h>
#include "const.h"
#include "bitmap.h"
#include "persp.h"
#include "lines.h"
#include "track.h"
#include "min_mag.h"
#include "lib.h"

int PASCAL l_cp_int_arr_to_RPOINT(RPOINT *Rpoint, int *ArrX, int *ArrY,int num)
{
int i ;

for ( i = 0 ; i < num ; i++ ) {
   Rpoint[i].x = ArrX[i] ;
   Rpoint[i].y = ArrY[i] ;
 } return 1 ;
} int PASCAL l_quad_in_new_origin(RPOINT *NewQuad,RPOINT *Quad,
                                int Xorg,int Yorg,int num)
{
int i ;

for ( i = 0 ; i < num ; i++ ) {
   NewQuad[i].x = Quad[i].x-Xorg ;
   NewQuad[i].y = Quad[i].y-Yorg ;
 } return 1 ;
}
```

330

```c
int PASCAL I_copy_RPOINT_array(RPOINT *To,RPOINT *From,int num)
{
int i ;

for ( i = 0 ; i < num ; i++ ) {
   To[i] = From[i] ;
 } return 1;
} int PASCAL I_copy_int_array(int *To,int *From,int num)
{
int i ;

for ( i = 0 ; i < num ; i++ ) {
   To[i] = From[i] ;
 } return 1;
} int PASCAL I_find_bound_rect(RPOINT *Vertexes, RECT *Rectan)
{

Rectan->left
=(int)min(min(min(Vertexes[0].x,Vertexes[1].x),Vertexes[2].x),Vertexes[3].x) ;
 Rectan->top =
(int)min(min(min(Vertexes[0].y,Vertexes[1].y),Vertexes[2].y),Vertexes[3].y) ;
 Rectan->right
=(int)max(max(max(Vertexes[0].x,Vertexes[1].x),Vertexes[2].x),Vertexes[3].x) ;
 Rectan->bottom =
(int)max(max(max(Vertexes[0].y,Vertexes[1].y),Vertexes[2].y),Vertexes[3].y) ;

return 1 ;
}
```

```
int PASCAL find_extremes_in_1dim(RPOINT *Points, int Number, int Dim,
                double *MaxVal, double *MinVal)
{
int i ;
double MaxNum, MinNum ;

if ( Dim == X_DIM ) {
  MaxNum = MinNum = Points[0].x ;
  for ( i = 1 ; i < Number ; i++ ) {
    if ( Points[i].x > MaxNum ) {
        MaxNum = Points[i].x ;
        continue ;
    }
    if ( Points[i].x < MinNum ) {
        MinNum = Points[i].x ;
        continue ;
    }
  }
  *MaxVal = MaxNum ;
  *MinVal = MinNum ;
}
if ( Dim == Y_DIM ) {
  MaxNum = MinNum = Points[0].y ;
  for ( i = 1 ; i < Number ; i++ ) {
    if ( Points[i].y > MaxNum ) {
        MaxNum = Points[i].y ;
        continue ;
    }
    if ( Points[i].y < MinNum ) {
        MinNum = Points[i].y ;
        continue ;
    }
  }
  *MaxVal = MaxNum ;
  *MinVal = MinNum ;
}
```

```
  return 1 ;
} int PASCAL find_best_cluster(HWND hwnd, int Number, RPOINT *Points,
            RPOINT *Cluster,int *NumCluster,int Dim,
      int *Indexes,int *ClustIndex,RPOINT *NotCluster, int *NotIndexes)
{
int i,j,k ;
int Count,NCount ;
int Distance ;
int Range ;
double MaxNum,MinNum ;
int *DistArray ;
double *SumArray ;
double MaxSum ;
double MaxNumbers,Value ;
int MaxIndex ;

if ( Number == 0 ) return 0 ;
find_extremes_in_1dim(Points,Number,Dim,&MaxNum,&MinNum) ;
Range = (int)(fabs(MaxNum - MinNum+0.5)) ;
DistArray = (int *) GlobalAllocPtr (GMEM_MOVEABLE,
            (DWORD)sizeof(int)*(DWORD)Number*(DWORD)Range
) ;
SumArray = (double *) GlobalAllocPtr (GMEM_MOVEABLE,
            (DWORD)sizeof(double)*(DWORD)Number) ;

for ( i = 0 ; i < Number ;i++ ) {
  SumArray[i] = 0.0 ;
  for ( j = 0 ; j < Range ; j++ ) {
     VALUE_IN(DistArray,i,j,Range) = 0 ;
  }
}
for ( i = 0 ; i < Number ; i++ ) {
  for ( j = 0 ; j < Number ; j++ ) {
     if ( i == j ) continue ;
     for ( k = 1 ; k <= Range ; k++ ) {
        if ( Dim == X_DIM ) {
```

333

```
                if ( fabs(Points[j].x - Points[i].x)<= (double)k ) {
                    VALUE_IN(DistArray,i,k-1,Range) += 1 ;
                }
            } else {
                if ( fabs(Points[j].y - Points[i].y)<= (double)k ) {
                    VALUE_IN(DistArray,i,k-1,Range) += 1 ;
                }
            }
        }
    }
}

MaxSum = 0.0 ;
MaxIndex = 0 ;
for ( i = 0 ; i < Number ; i++ ) {
    for ( j = 0 ; j < Range ; j++ ) {
        SumArray[i] += (double)(VALUE_IN(DistArray,i,j,Range))/(double)(j+1);
    }
    if ( SumArray[i] > MaxSum ) {
        MaxIndex = i ;
        MaxSum = SumArray[i] ;
    }
}

MaxNumbers = 0.0 ;

for ( i = 0 ; i < Range ; i++ ) {
    Value = (double)(VALUE_IN(DistArray,MaxIndex,i,Range))/(double)(i+1) ;
    if ( Value > MaxNumbers ) {
        MaxNumbers = Value ;
        Distance = i+1 ;
    }
} if ( Range == 1 && MaxNumbers <= 2 ) {
    GlobalFreePtr(SumArray) ;
    GlobalFreePtr(DistArray) ;
    return 0 ;
```

334

```
    }
    if ( Range > 1 && MaxNumbers < (double)Number/((double)Range+0.01) ) {
      GlobalFreePtr(SumArray) ;
      GlobalFreePtr(DistArray) ;
      return 0 ;
    }
    Count = NCount = 0 ;
    for ( j = 0 ; j < Number ; j++ ) {
      if ( Dim == X_DIM ) {
        if ( fabs(Points[j].x - Points[MaxIndex].x)<= (double)Distance ) {
          Cluster[Count] = Points[j] ;
          ClustIndex[Count++] = Indexes[j] ;
        } else {
          NotCluster[NCount] = Points[j] ;
          NotIndexes[NCount++] = Indexes[j] ;
        }
      } else {
        if ( fabs(Points[j].y - Points[MaxIndex].y)<= (double)Distance ) {
          Cluster[Count] = Points[j] ;
          ClustIndex[Count++] = Indexes[j] ;
        } else {
          NotCluster[NCount] = Points[j] ;
          NotIndexes[NCount++] = Indexes[j] ;
        }
      }
    }

*NumCluster = Count ;
  GlobalFreePtr(SumArray) ;
  GlobalFreePtr(DistArray) ;

return 1 ;
} int PASCAL print_transform(HFILE hFile,char * Head,Perspective_Transform
*Tp)
{
```

```c
int j ;
char String[50] ;

_lwrite(hFile,Head,strlen(Head)) ;
  for ( j = 0 ; j < 3 ; j++ ) {
   sprintf(String,"\n%lf, %lf, %lf\n",Tp->Pf[j][0],
              Tp->Pf[j][1],Tp->Pf[j][2]) ;
   _lwrite(hFile,String,strlen(String)) ;
  }
  return 1 ;
} int PASCAL insert_new_vertexes(RPOINT *CurrVert, RPOINT *Vert1,
RPOINT *Vert2,
      RPOINT *Vert3, RPOINT *Vert4,double *Wheight,int num,RPOINT
*NewVert)
{
int i ;
RPOINT Delta[4] ;
double Sum ;

Sum =    Wheight[0] + Wheight[1] + Wheight[2] ;
 for ( i = 0 ; i < num-1 ; i++ ) {
   Vert1[i] = Vert1[i+1] ;
   Vert2[i] = Vert2[i+1] ;
   Vert3[i] = Vert3[i+1] ;
   Vert4[i] = Vert4[i+1] ;
 }
 Vert1[num-1] = CurrVert[0] ;
 Vert2[num-1] = CurrVert[1] ;
 Vert3[num-1] = CurrVert[2] ;
 Vert4[num-1] = CurrVert[3] ;

for ( i = 0 ; i < num-1 ; i++ ) {
  Delta[i].x = Vert1[i+1].x - Vert1[i].x ;
  Delta[i].y = Vert1[i+1].y - Vert1[i].y ;
 }
```

336

```
Delta[2].x =(Delta[2].x*Wheight[2] + Delta[1].x*Wheight[1] +
                    Delta[0].x*Wheight[0])/Sum ;
Delta[2].y =(Delta[2].y*Wheight[2] + Delta[1].y*Wheight[1] +
                    Delta[0].y*Wheight[0])/Sum ;
NewVert[0].x = Vert1[2].x + Delta[2].x ;
NewVert[0].y = Vert1[2].y + Delta[2].y ;

for ( i = 0 ; i < num-1 ; i++ ) {
  Delta[i].x = Vert2[i+1].x - Vert2[i].x ;
  Delta[i].y = Vert2[i+1].y - Vert2[i].y ;
}
Delta[2].x =(Delta[2].x*Wheight[2] + Delta[1].x*Wheight[1] +
                    Delta[0].x*Wheight[0])/Sum ;
Delta[2].y =(Delta[2].y*Wheight[2] + Delta[1].y*Wheight[1] +
                    Delta[0].y*Wheight[0])/Sum ;
NewVert[1].x = Vert2[2].x + Delta[2].x ;
NewVert[1].y = Vert2[2].y + Delta[2].y ;

for ( i = 0 ; i < num-1 ; i++ ) {
  Delta[i].x = Vert3[i+1].x - Vert3[i].x ;
  Delta[i].y = Vert3[i+1].y - Vert3[i].y ;
}
Delta[2].x =(Delta[2].x*Wheight[2] + Delta[1].x*Wheight[1] +
                    Delta[0].x*Wheight[0])/Sum ;
Delta[2].y =(Delta[2].y*Wheight[2] + Delta[1].y*Wheight[1] +
                    Delta[0].y*Wheight[0])/Sum ;
NewVert[2].x = Vert3[2].x + Delta[2].x ;
NewVert[2].y = Vert3[2].y + Delta[2].y ;

for ( i = 0 ; i < num-1 ; i++ ) {
  Delta[i].x = Vert4[i+1].x - Vert4[i].x ;
  Delta[i].y = Vert4[i+1].y - Vert4[i].y ;
}
Delta[2].x =(Delta[2].x*Wheight[2] + Delta[1].x*Wheight[1] +
                    Delta[0].x*Wheight[0])/Sum ;
Delta[2].y =(Delta[2].y*Wheight[2] + Delta[1].y*Wheight[1] +
                    Delta[0].y*Wheight[0])/Sum ;
NewVert[3].x = Vert4[2].x + Delta[2].x ;
```

```
    NewVert[3].y = Vert4[2].y + Delta[2].y ;

return 1 ;
} int PASCAL transform_rpoint_arr(RPOINT *SrcPnts, RPOINT *DstPnts,
              int num ,Perspective_Transform TpCurr )
{
double DstX,DstY,w ;
int i ;

for ( i = 0 ; i < num ; i++ ) {
      DstX = SrcPnts[i].x * TpCurr.Pf[0][0] +
             SrcPnts[i].y * TpCurr.Pf[1][0] + TpCurr.Pf[2][0] ;
      DstY = SrcPnts[i].x * TpCurr.Pf[0][1] +
             SrcPnts[i].y * TpCurr.Pf[1][1] + TpCurr.Pf[2][1] ;
      w = SrcPnts[i].x * TpCurr.Pf[0][2] +
             SrcPnts[i].y * TpCurr.Pf[1][2] + TpCurr.Pf[2][2] ;
      DstPnts[i].x = DstX/w ;
      DstPnts[i].y = DstY/w ;
   }
 return 1 ;
}
```

```c
#include <windows.h>
#include <windowsx.h>
#include <commdlg.h>
#include <stdlib.h>
#include "const.h"
#include "bitmap.h"
#include "lines.h"
#include "track.h"
#include "persp.h"
#include "min_mag.h"
#include "lib.h"

int PASCAL improve_diff_bmap(MYBITMAP *,MYBITMAP *) ;
int PASCAL copy_rect_bmap(int ,int ,MYBITMAP *,MYBITMAP *);

int PASCAL perspective(HWND hwnd,MYBITMAP FAR *SrcBmap,
MYBITMAP FAR *DstBmap,
      RPOINT* SrcPnts,RPOINT * DstPnts,int ColorModel,
      Perspective_Transform *Tp)
{

//Rectan2Quad(hwnd,SrcPnts, DstPnts,Tp);
  Quad2Quad(hwnd,SrcPnts, DstPnts,Tp);

Perspective_map(SrcBmap, Tp, DstBmap, DstPnts,ColorModel);
  return TRUE ;
} int PASCAL perspective_near(HWND hwnd,MYBITMAP FAR *SrcBmap,
MYBITMAP FAR *DstBmap,
      RPOINT* SrcPnts,RPOINT * DstPnts,int ColorModel,
      Perspective_Transform *Tp)
{

//Rectan2Quad(hwnd,SrcPnts, DstPnts,Tp);
  Quad2Quad(hwnd,SrcPnts, DstPnts,Tp);

Perspective_near_map(SrcBmap, Tp, DstBmap, DstPnts,ColorModel);
```

```
int PASCAL Rectan2Quad(HWND hwnd, RPOINT *src_pts, RPOINT
*dst_pts,
                            Perspective_Transform *Tp)
{
double      x0, y0, x1, y1, x2, y2, x3, y3;
double      dx1, dy1, dx2, dy2, dx3, dy3;
double      denom ;

double      a11, a12, a13, a21, a22, a23, a31, a32, a33;

double      A[3][3], B[3][3];

/* Verify that src_pts do form a rectangle */
    if ( check_if_rect(src_pts) == FALSE ) {
        MessageBox (hwnd, "Source is not a rectangle",
            "Perspective trans.", MB_ICONEXCLAMATION | MB_OK) ;
        return NULL ;
    }
    /* Solve for transformation from [(0,0),(1,1)] -> Quad */
    x0 = dst_pts[0].x;
    y0 = dst_pts[0].y;
    x1 = dst_pts[1].x;
    y1 = dst_pts[1].y;
    x2 = dst_pts[2].x;
    y2 = dst_pts[2].y;
    x3 = dst_pts[3].x;
    y3 = dst_pts[3].y;

dx1 = x1 - x2;
    dy1 = y1 - y2;
    dx2 = x3 - x2;
    dy2 = y3 - y2;
    dx3 = x0 - x1 + x2 - x3;
    dy3 = y0 - y1 + y2 - y3;
```

34c

```
/* if dx3 = dy3 = 0: transformation is affine    */

/* otherwise:     transformation is perspective */

/*
 * Forward transformation:
 *
 * [x_,y_,w_] = [u,v,1] Pf
 *
 * where: |a11 a12 a13| Pf = |a21 a22 a23| |a31 a32 a33|
 *
 * Then: [x, y] = [x_/w_, y_/w_]
 */ denom = det2(dx1, dx2, dy1, dy2);

a13 = det2(dx3, dx2, dy3, dy2) / denom;
a23 = det2(dx1, dx3, dy1, dy3) / denom;
a11 = x1 - x0 + a13 * x1;
a21 = x3 - x0 + a23 * x3;
a31 = x0;
a12 = y1 - y0 + a13 * y1;
a22 = y3 - y0 + a23 * y3;
a32 = y0;
a33 = 1.0;

{
    A[0][0] = a11;
    A[0][1] = a12;
    A[0][2] = a13;
    A[1][0] = a21;
    A[1][1] = a22;
    A[1][2] = a23;
    A[2][0] = a31;
    A[2][1] = a32;
    A[2][2] = a33;
}
```

```
/* pre-multiply by the matrix converting src_pts->[(0,0),(1,1)] */
{
    double    xs = src_pts[0].x;
    double    ys = src_pts[0].y;
    double    xe = src_pts[2].x;
    double    ye = src_pts[2].y;
    double    dx = xe - xs;
    double    dy = ye - ys;
    B[0][0] = 1.0 / dx;
    B[1][0] = 0.0;
    B[2][0] = -xs / dx;
    B[0][1] = 0.0;
    B[1][1] = 1.0 / dy;
    B[2][1] = -ys / dy;
    B[0][2] = 0.0;
    B[1][2] = 0.0;
    B[2][2] = 1.0;

multmat(hwnd,3, 3, 3, (double*)B, (double*)A, (double*)(Tp->Pf));
}

/*
 * Backward transformation:
 *
 * [u_,v_,w_] = [x,y,1] Pb
 *
 * where: |A11 A12 A13| Pb = |A21 A22 A23| |A31 A32 A33|
 *
 * is the inverse of Pf.
 *
 * Then: [u, v] = [u_/w_, v_/w_]
 */

{
    a11 = Tp->Pf[0][0];
    a12 = Tp->Pf[0][1];
    a13 = Tp->Pf[0][2];
```

```
      a21 = Tp->Pf[1][0];
      a22 = Tp->Pf[1][1];
      a23 = Tp->Pf[1][2];
      a31 = Tp->Pf[2][0];
      a32 = Tp->Pf[2][1];
      a33 = Tp->Pf[2][2];
   }

Tp->Pb[0][0] = a22 * a33 - a23 * a32;
   Tp->Pb[0][1] = a13 * a32 - a12 * a33;
   Tp->Pb[0][2] = a12 * a23 - a13 * a22;
   Tp->Pb[1][0] = a23 * a31 - a21 * a33;
   Tp->Pb[1][1] = a11 * a33 - a13 * a31;
   Tp->Pb[1][2] = a13 * a21 - a11 * a23;
   Tp->Pb[2][0] = a21 * a32 - a22 * a31;
   Tp->Pb[2][1] = a12 * a31 - a11 * a32;
   Tp->Pb[2][2] = a11 * a22 - a12 * a21;

return 1 ;
} int PASCAL Quad2Rectan(HWND hwnd, RPOINT *src_pts, RPOINT *dst_pts,
                                      Perspective_Transform *Tp)
{
double Tmp ;

Rectan2Quad(hwnd,dst_pts,src_pts,Tp) ;

Tmp = Tp->Pf[0][0] ;
Tp->Pf[0][0]  = Tp->Pb[0][0] ;
Tp->Pb[0][0] = Tmp ;

Tmp = Tp->Pf[0][1] ;
Tp->Pf[0][1] = Tp->Pb[0][1] ;
Tp->Pb[0][1] = Tmp ;

Tmp = Tp->Pf[0][2] ;
```

```
    Tp->Pf[0][2] = Tp->Pb[0][2] ;
    Tp->Pb[0][2] = Tmp ;

Tmp = Tp->Pf[1][0] ;
    Tp->Pf[1][0] = Tp->Pb[1][0] ;
    Tp->Pb[1][0] = Tmp ;

Tmp = Tp->Pf[1][1] ;
    Tp->Pf[1][1] = Tp->Pb[1][1] ;
    Tp->Pb[1][1] = Tmp ;

Tmp = Tp->Pf[1][2] ;
    Tp->Pf[1][2] = Tp->Pb[1][2] ;
    Tp->Pb[1][2] = Tmp ;

Tmp = Tp->Pf[2][0] ;
    Tp->Pf[2][0] = Tp->Pb[2][0] ;
    Tp->Pb[2][0] = Tmp ;

Tmp = Tp->Pf[2][1] ;
    Tp->Pf[2][1] = Tp->Pb[2][1] ;
    Tp->Pb[2][1] = Tmp ;

Tmp = Tp->Pf[2][2] ;
    Tp->Pf[2][2] = Tp->Pb[2][2] ;
    Tp->Pb[2][2] = Tmp ;

return 1;
} int PASCAL check_if_rect(RPOINT* Points)
{
    if ( Points[0].x != Points[3].x ) return FALSE ;
    if ( Points[1].x != Points[2].x ) return FALSE ;
    if ( Points[0].y != Points[1].y ) return FALSE ;
    if ( Points[2].y != Points[3].y ) return FALSE ;
```

```
    return TRUE ;
} int PASCAL Perspective_near_map(MYBITMAP
*src_bmap,Perspective_Transform* Tp,
    MYBITMAP *dst_bmap, RPOINT *dst_pts,int ColorModel)
{
RECT        r,Screen;
DWORD       i, j;
DWORD       Size ;
BYTE    huge *Ptr ;
double          RcBil ;
int Colsmin1,Rowsmin1 ;
double          y_dst ;
double          x_dst ;
RPOINT          uv, xy;
double          D ;
BYTE    huge *Colors ;
int             uy,ux ;

/* Find bounding rectangle of dst_pts */
I_find_bound_rect(dst_pts, &r) ;

Colsmin1 = src_bmap->cols -1 ;
Rowsmin1 = src_bmap->rows -1 ;
Colors = (BYTE huge*)GlobalAllocPtr(GMEM_MOVEABLE,3) ;

for (i = r.top; i < r.bottom; i++) {
    y_dst = (double) i;
    for (j = r.left; j < r.right; j++) {
        x_dst = (double) j;
        D = 1.0;

xy.x = x_dst;
    xy.y = y_dst;

uv = bPerspective(xy, Tp);
        if (uv.x < 0.0 || uv.x >= (double) (src_bmap->cols-1))
```

345

```
        continue;
    if (uv.y < 0.0 || uv.y >= (double) (src_bmap->rows-1))
    _continue;

uy = (int)(uv.y+0.5) ;
    ux = (int)(uv.x+0.5) ;
    if ( ColorModel == GREY_MODEL ) {
        RcBil = BITMAP_PLACE(src_bmap,uy,ux) ;
        BITMAP_PLACE(dst_bmap,i,j) = (BYTE)RcBil ;
    } else {        // COLOR_MODEL
        Ptr = BITMAP_RGB_PLACE_PTR(dst_bmap,i,j) ;
        Colors = BITMAP_RGB_PLACE_PTR(src_bmap,uy,ux) ;
        Ptr[0] = (BYTE)Colors[0] ;
        Ptr[1] = (BYTE)Colors[1] ;
        Ptr[2] = (BYTE)Colors[2] ;
            }
        }
    }
    GlobalFreePtr(Colors) ;
    return (0);
} int PASCAL Perspective_map(MYBITMAP FAR
*src_bmap,Perspective_Transform* Tp,
        MYBITMAP FAR *dst_bmap, RPOINT *dst_pts,int ColorModel)
{
RECT        r,Screen;
DWORD       i, j;
DWORD       Size ;
BYTE    huge *Ptr ;
double      RcBil ;
int Colsmin1,Rowsmin1 ;
double      y_dst ;
double      x_dst ;
RPOINT      uv, xy;
double      D ;
double      Colors[3] ;
```

346

```
/* Find bounding rectangle of dst_pts */
l_find_bound_rect(dst_pts, &r) ;

Colsmin1 = src_bmap->cols -1 ;
Rowsmin1 = src_bmap->rows -1 ;

for (i = r.top; i < r.bottom; i++) {
    y_dst = (double) i;
    for (j = r.left; j < r.right; j++) {
        x_dst = (double) j;
        D = 1.0;

xy.x = x_dst;
        xy.y = y_dst;

uv = bPerspective(xy, Tp);
        if (uv.x < 0.0 || uv.x >= (double) (src_bmap->cols))
            continue;
        if (uv.y < 0.0 || uv.y >= (double) (src_bmap->rows))
            continue;

if ( ColorModel == GREY_MODEL ) {
            RcBil = (BYTE)bilinear(uv.x,uv.y, src_bmap);
            if ( RcBil == -1.0 ) continue ;
            BITMAP_PLACE(dst_bmap,i,j) = (BYTE)RcBil ;
        } else {       // COLOR_MODEL
            Ptr = BITMAP_RGB_PLACE_PTR(dst_bmap,i,j) ;
            bilinear_rgb(uv.x,uv.y,src_bmap,Colors) ;
            Ptr[0] = (BYTE)Colors[0] ;
            Ptr[1] = (BYTE)Colors[1] ;
            Ptr[2] = (BYTE)Colors[2] ;
        }
    }
}
return (0);
}
```

```
RPOINT bPerspective(RPOINT xy, Perspective_Transform *Tp)
{
    RPOINT      uv;
    double      x = xy.x;
    double      y = xy.y;
    double      u_ = x * Tp->Pb[0][0] + y * Tp->Pb[1][0] + Tp->Pb[2][0];
    double      v_ = x * Tp->Pb[0][1] + y * Tp->Pb[1][1] + Tp->Pb[2][1];
    double      w_ = x * Tp->Pb[0][2] + y * Tp->Pb[1][2] + Tp->Pb[2][2];

uv.x = u_ / w_;
    uv.y = v_ / w_;
    return (uv);
}

RPOINT PASCAL fPerspective(RPOINT xy, Perspective_Transform *Tp)
{
    RPOINT      uv ;
    double      x = xy.x;
    double      y = xy.y;
    double      u_ = x * Tp->Pf[0][0] + y * Tp->Pf[1][0] + Tp->Pf[2][0];
    double      v_ = x * Tp->Pf[0][1] + y * Tp->Pf[1][1] + Tp->Pf[2][1];
    double      w_ = x * Tp->Pf[0][2] + y * Tp->Pf[1][2] + Tp->Pf[2][2];

uv.x = u_ / w_;
    uv.y = v_ / w_;
    return (uv);
}

/*
double PASCAL dPerspective(RPOINT xy, Perspective_Transform *Tp)
{
    double          Du, Dv, D;
    double          Dux, Duy;
    double          Dvx, Dvy;

double          x = xy.x;
    double          y = xy.y;
```

```
    double    u_ = x * Tp->Pb[0][0] + y * Tp->Pb[1][0] + Tp->Pb[2][0];
    double    v_ = x * Tp->Pb[0][1] + y * Tp->Pb[1][1] + Tp->Pb[2][1];
    double    w_ = x * Tp->Pb[0][2] + y * Tp->Pb[1][2] + Tp->Pb[2][2];

double    u_x = Tp->Pb[0][0];
    double    u_y = Tp->Pb[1][0];
    double    v_x = Tp->Pb[0][1];
    double    v_y = Tp->Pb[1][1];
    double    w_x = Tp->Pb[0][2];
    double    w_y = Tp->Pb[1][2];

Dux = (u_x * w_ - u_ * w_x) / (w_ * w_);
    Duy = (u_y * w_ - u_ * w_y) / (w_ * w_);
    Du = sqrt(Dux * Dux + Duy * Duy);

Dvx = (v_x * w_ - v_ * w_x) / (w_ * w_);
    Dvy = (v_y * w_ - v_ * w_y) / (w_ * w_);
    Dv = sqrt(Dvx * Dvx + Dvy * Dvy);

D = max(Du, Dv);

return (D);
}
*/ define MEDIAN_EDGE 5
define MEDIAN_SIDE 2 int PASCAL median_filter_5(HWND hwnd,MYBITMAP *Bmap)
{
int i, j ,k,l,n;
int MedVec[MEDIAN_EDGE*MEDIAN_EDGE] ;
BYTE IndexArr[256] ;
int Median ;
MYBITMAP *TmpBmap ;
BYTE huge *TmpPtr ;
```

```
BYTE huge *BmapPtr;
DWORD Size,Pl;
DWORD FromTime,ToTime;
char String[100];
int Sum;
int RowLimit, ColLimit;

TmpBmap = bm_alloc(Bmap->cols,Bmap->rows,GREY_MODEL);
Size = (DWORD)Bmap->cols*(DWORD)Bmap->rows;
TmpBmap->gpic = (BYTE huge*)GlobalAllocPtr(GMEM_MOVEABLE,Size);
BmapPtr = Bmap->gpic;
TmpPtr = TmpBmap->gpic;
for ( Pl = 0 ; Pl < Size ; Pl++ ) {
   *(TmpPtr++) = *(BmapPtr++);
}
for ( i = 0 ; i < Bmap->rows ; i++ ) {
   for ( j = 0 ; j < Bmap->cols ; j++ ) {
       if ( BITMAP_PLACE(TmpBmap,i,j) <= 24 ) {
          BITMAP_PLACE(TmpBmap,i,j) = 0 ;
       }
   }
}
WriteGreyRgb (hwnd,"no48.rgb",TmpBmap);
//FromTime = GetTickCount();

RowLimit = Bmap->rows -3;
for ( i = 2 ; i < RowLimit ; i++ ) {
  for ( k = 0 ; k < 256 ; k++ ) IndexArr[k] =0;
  for ( j = 0 ; j < 5 ; j++ ) {
   IndexArr[BITMAP_PLACE(TmpBmap,i-2,j)] += 1;
   IndexArr[BITMAP_PLACE(TmpBmap,i-1,j)] += 1 ;
   IndexArr[BITMAP_PLACE(TmpBmap,i,j))] += 1 ;
   IndexArr[BITMAP_PLACE(TmpBmap,i+1,j)] += 1 ;
   IndexArr[BITMAP_PLACE(TmpBmap,i+2,j))] += 1 ;
  }
  for ( Sum = k = 0 ; k < 256 ; k++ ) {
      Sum += IndexArr[k];
      if ( Sum >= 13 ) {
```

```
            BITMAP_PLACE(TmpBmap,i,2) = k ;
            break ;
        }
    }
    ColLimit = Bmap->cols - 3;
    for ( j = 3 ; j < ColLimit ; j++ ) {
        IndexArr[BITMAP_PLACE(TmpBmap,i-2,j-3)] -= 1 ;
        IndexArr[BITMAP_PLACE(TmpBmap,i-1,j-3)] -= 1 ;
        IndexArr[BITMAP_PLACE(TmpBmap,i,j-3)] -= 1 ;
        IndexArr[BITMAP_PLACE(TmpBmap,i+1,j-3)] -= 1 ;
        IndexArr[BITMAP_PLACE(TmpBmap,i+2,j-3)] -= 1 ;

IndexArr[BITMAP_PLACE(TmpBmap,i-2,j+2)] += 1 ;
        IndexArr[BITMAP_PLACE(TmpBmap,i-1,j+2)] += 1 ;
        IndexArr[BITMAP_PLACE(TmpBmap,i,j+2)] += 1 ;
        IndexArr[BITMAP_PLACE(TmpBmap,i+1,j+2)] += 1 ;
        IndexArr[BITMAP_PLACE(TmpBmap,i+2,j+2)] += 1 ;
        for ( Sum = k = 0 ; k < 256 ; k++ ) {
            Sum += IndexArr[k] ;
            if ( Sum >= 13 ) {
                BITMAP_PLACE(TmpBmap,i,j) = k ;
                break ;
            }
        }
    }
}
WriteGreyRgb (hwnd,"med5.rgb",TmpBmap) ;

//ToTime = GetTickCount() ;
//sprintf(String,"Time elapsed = %lu",ToTime-FromTime) ;
//MessageBox (hwnd, String,"Median Calc", MB_ICONEXCLAMATION | MB_OK) ;
improve_diff_bmap(Bmap,TmpBmap) ;
bm_free(TmpBmap) ;
return 1;
} int PASCAL improve_diff_bmap(MYBITMAP *Bmap,MYBITMAP *TmpBmap)
```

```
{
int i,j ;
int ICount,JCount ;
int Frj ;
int Limit ;
int Cols,Rows ;

Frj = 0 ;
JCount = 0 ;
Cols = Bmap->cols ;
Rows = Bmap->rows ;
Limit = Bmap->rows / 8 ;
for ( j = 0 ; j < Cols ; j++ ) {
   ICount = 0 ;
   for ( i = 0 ; i < Rows ; i++) {
       if ( BITMAP_PLACE(TmpBmap,i,j) != 0 ) ICount++ ;
   }
   if ( ICount < Limit ) JCount++ ;
   else {
       if ( JCount > 0 ) {
          copy_rect_bmap(Frj,JCount,TmpBmap,Bmap) ;
          JCount = 0 ;
       }
       Frj = j+1 ;
   }
} return 1;
} int PASCAL copy_rect_bmap(int FromCol,int NumCols,MYBITMAP
*From,MYBITMAP *To)
{
int i, j ;
int Until ;

Until = FromCol + NumCols ;
for ( j = FromCol ; j < Until ; j++ ) {
```

352

```c
  for ( i = 0 ; i < From->rows ; i++ ) {
      BITMAP_PLACE(To,i,j) = BITMAP_PLACE(From,i,j) ;
  }
} return 1 ;
} int PASCAL get_tresh_for_occ(MYBITMAP *Bmap,int *Tresh)
{
DWORD Size,n ;
BYTE huge *TmpPic ;
DWORD IndexArr[256] ;
int i ;
DWORD Sum, MidSize ;

for ( i = 0 ; i < 256 ; i++ ) {
   IndexArr[i] = 0 ;
}
Size = (DWORD)(Bmap->cols)*(DWORD)(Bmap->rows) ;
TmpPic = Bmap->gpic ;
for ( n = 1 ; n < Size ; n++ ) {
   IndexArr[*(TmpPic++)] += 1 ;
}
MidSize = Size/2 ;
Sum = 0 ;
for ( i = 0 ; i < 256 ; i++ ) {
   Sum += IndexArr[i] ;
   if ( Sum >= MidSize ) {
       *Tresh = i ;
       break ;
   }
}
if ( *Tresh < 32 ) *Tresh = 32 ;
return 1;
}
```

```
int PASCAL perspective_mask(HWND hwnd,MYBITMAP
*SrcBmap,MYBITMAP *DstBmap,
        MYBITMAP * Alpha,RPOINT *SrcPnts, RPOINT *DstPnts, int
ColorModel,
        int interpolation,MYBITMAP *MaskBmap)
{
Perspective_Transform Tp ;

//Rectan2Quad(hwnd,SrcPnts, DstPnts,&Tp);
  Quad2Quad(hwnd,SrcPnts, DstPnts,&Tp);

Perspective_map_mask(SrcBmap, &Tp, DstBmap, Alpha,
DstPnts,ColorModel,
        interpolation,MaskBmap);

return 1 ;
} int PASCAL Perspective_map_mask(MYBITMAP FAR
*src_bmap,Perspective_Transform* Tp,
     MYBITMAP FAR *dst_bmap, MYBITMAP * Alpha,RPOINT *dst_pts,int
ColorModel,
        int interpolation,MYBITMAP *MaskBmap)
{
RECT     r,Screen;
DWORD           i, j;
DWORD           Size ;
BYTE   huge *Ptr ;
double          RcBil ;
double          Colors[3] ;
int         AlphaNumber ;

/* Find bounding rectangle of dst_pts */
 I_find_bound_rect(dst_pts, &r) ;

for (i = r.top; i < r.bottom; i++) {
    double      y_dst = (double) i;
```

354

```
for (j = r.left; j < r.right; j++) {
    double      x_dst = (double) j;
    RPOINT              uv, xy;
    double      D = 1.0;

xy.x = x_dst;
    xy.y = y_dst;

uv = bPerspective(xy, Tp);
    if (uv.x < 0.0 || uv.x >= (double) (src_bmap->cols))
        continue;
    if (uv.y < 0.0 || uv.y >= (double) (src_bmap->rows))
        continue;

if ( ColorModel == GREY_MODEL ) {
                RcBil = (BYTE)bilinear(uv.x,uv.y, src_bmap);
                if ( RcBil == -1.0 ||
                    BITMAP_PLACE(MaskBmap,i-r.top,j-r.left) == 0 )
continue ;
                BITMAP_PLACE(dst_bmap,i,j) = (BYTE)RcBil ;
            } else {      // COLOR_MODEL
                Ptr = BITMAP_RGB_PLACE_PTR(dst_bmap,i,j) ;
                RcBil = bilinear_rgb(uv.x,uv.y,src_bmap,Colors) ;
                if ( RcBil == -1.0 ||
                    BITMAP_PLACE(MaskBmap,i-r.top,j-r.left) == 0) continue
;

if (BITMAP_PLACE(MaskBmap,i-r.top,j-r.left) == 2 ) {
                    Ptr[0] =
(BYTE)((double)((DWORD)Colors[0]*(DWORD)128 +
                    (DWORD)Ptr[0]*(DWORD)128)/256.0) ;
                    Ptr[1] =
(BYTE)((double)((DWORD)Colors[1]*(DWORD)128 +
                    (DWORD)Ptr[1]*(DWORD)128)/256.0) ;
                    Ptr[2] =
(BYTE)((double)((DWORD)Colors[2]*(DWORD)128 +
                    (DWORD)Ptr[2]*(DWORD)128)/256.0) ;
```

355

```
                continue ;
            }

AlphaNumber = BITMAP_PLACE(Alpha,i,j) ;
        if ( AlphaNumber > 1) {
          Ptr[0] =
            (BYTE)((double)((DWORD)Colors[0]*(DWORD)(256-AlphaNumber) +
               (DWORD)Ptr[0]*(DWORD)AlphaNumber)/256.0) ;
          Ptr[1] =
            (BYTE)((double)((DWORD)Colors[1]*(DWORD)(256-AlphaNumber) +
               (DWORD)Ptr[1]*(DWORD)AlphaNumber)/256.0) ;
          Ptr[2] =
            (BYTE)((double)((DWORD)Colors[2]*(DWORD)(256-AlphaNumber) +
               (DWORD)Ptr[2]*(DWORD)AlphaNumber)/256.0) ;

} else {
          Ptr[0] = (BYTE)Colors[0] ;
          Ptr[1] = (BYTE)Colors[1] ;
          Ptr[2] = (BYTE)Colors[2] ;
        }

}
    }
  }
  return (0);
} int PASCAL perspective_al(HWND hwnd,MYBITMAP FAR *SrcBmap,
    MYBITMAP FAR *DstBmap,MYBITMAP *Alpha,
    RPOINT* SrcPnts,RPOINT * DstPnts,int ColorModel,
    Perspective_Transform *Tp)
{

//Rectan2Quad(hwnd,SrcPnts, DstPnts,Tp);
```

356

```
    Quad2Quad(hwnd,SrcPnts, DstPnts,Tp);

Perspective_map_al(SrcBmap, Tp, DstBmap, Alpha,DstPnts,ColorModel);
    return TRUE ;
} int PASCAL Perspective_map_al(MYBITMAP
*src_bmap,Perspective_Transform *Tp,
MYBITMAP *dst_bmap, MYBITMAP *Alpha,RPOINT *dst_pts,int ColorModel)
{
RECT        r,Screen;
DWORD       i, j;
DWORD       Size ;
BYTE   huge *Ptr ;
double      RcBil ;
int Colsmin1,Rowsmin1 ;
double      y_dst ;
double      x_dst ;
RPOINT      uv, xy;
double      D ;
double      Colors[3] ;
int         AlphaNumber ;

/* Find bounding rectangle of dst_pts */
I_find_bound_rect(dst_pts, &r) ;

Colsmin1 = src_bmap->cols -1 ;
Rowsmin1 = src_bmap->rows -1 ;

for (i = r.top; i < r.bottom; i++) {
    y_dst = (double) i;
    for (j = r.left; j < r.right; j++) {
      x_dst = (double) j;
      D = 1.0;

xy.x = x_dst;
      xy.y = y_dst;
```

357

```
            uv = bPerspective(xy, Tp);
         if (uv.x < 0.0 || uv.x >= (double) (src_bmap->cols))
            continue;
         if (uv.y < 0.0 || uv.y >= (double) (src_bmap->rows))
            continue;
         if ( BITMAP_PLACE(Alpha,i,j) == 0 ) continue ;

if ( ColorModel == GREY_MODEL ) {
            RcBil = (BYTE)bilinear(uv.x,uv.y, src_bmap);
            if ( RcBil == -1.0 ) continue ;
            BITMAP_PLACE(dst_bmap,i,j) = (BYTE)RcBil ;
         } else {      // COLOR_MODEL
            Ptr = BITMAP_RGB_PLACE_PTR(dst_bmap,i,j) ;
            bilinear_rgb(uv.x,uv.y,src_bmap,Colors) ;
            AlphaNumber = BITMAP_PLACE(Alpha,i,j) ;
            if ( AlphaNumber > 1) {
              Ptr[0] =
                 (BYTE)((double)((DWORD)Colors[0]*(DWORD)(256-
AlphaNumber) +
                 (DWORD)Ptr[0]*(DWORD)AlphaNumber)/256.0) ;
              Ptr[1] =
                 (BYTE)((double)((DWORD)Colors[1]*(DWORD)(256-
AlphaNumber) +
                 (DWORD)Ptr[1]*(DWORD)AlphaNumber)/256.0) ;
              Ptr[2] =
                 (BYTE)((double)((DWORD)Colors[2]*(DWORD)(256-
AlphaNumber) +
                 (DWORD)Ptr[2]*(DWORD)AlphaNumber)/256.0) ;

} else {
              Ptr[0] = (BYTE)Colors[0] ;
              Ptr[1] = (BYTE)Colors[1] ;
              Ptr[2] = (BYTE)Colors[2] ;
           }
         }
      }
   }
   return (0);
```

}

```c
#include <windows.h>
#include <windowsx.h>
#include <commdlg.h>
#include <stdlib.h>
#include <bios.h>
#include "const.h"
#include "bitmap.h"
#include "persp.h"
#include "lines.h"
#include "track.h"
#include "min_mag.h"
#include "lib.h"

int PASCAL get_quad_segment_on_x(LINE ,LINE ,double ,double ,int
,RPOINT *) ;

int PASCAL mkline(double x1, double y1, double x2, double y2,LINE *l)
{ l->a = y2 - y1;
   l->b = x1 - x2;
   l->c = -l->a * x1 -l->b * y1;

return(1);
} int PASCAL mksegment(double x1, double y1, double x2, double y2,SEG *s)
{
   s->a = y2 - y1;
   s->b = x1 - x2;
   s->c = -s->a * x1 -s->b * y1;
   s->xmax = max(x1,x2) ;
   s->xmin = min(x1,x2) ;
   s->ymax = max(y1,y2) ;
   s->ymin = min(y1,y2) ;

return 1 ;
```

```c
} int PASCAL get_point_on_segment(SEG s1, double param, RPOINT *Point)
{ if ( param < 0.0 || param > 1.0 ) return 0 ;
 Point->x = param * (s1.xmax-s1.xmin) + s1.xmin ;
 Point->y = param * (s1.ymax-s1.ymin) + s1.ymin ;

return 1 ;
}

//this function returns in DstPnts the points calculated relative to the
//Xparam and YParam always from the minimum.

int PASCAL get_shrinked_yquad(RPOINT *SrcPnts, double param, RPOINT *DstPnts)
{
SEG seg1,seg2,seg3,seg4 ;
int i ;

for ( i = 0 ; i < 4 ; i++ ) {
   DstPnts[i].x = SrcPnts[i].x ;
   DstPnts[i].y = SrcPnts[i].y ;
 } mksegment(SrcPnts[1].x, SrcPnts[1].y, SrcPnts[2].x, SrcPnts[2].y,&seg2) ;
 mksegment(SrcPnts[3].x, SrcPnts[3].y, SrcPnts[0].x, SrcPnts[0].y,&seg4) ;

if ( get_point_on_segment(seg2, param, &(DstPnts[2])) == 0 ) return 0 ;
 get_point_on_segment(seg4, param, &(DstPnts[3])) ;

return 1 ;
} int PASCAL isect_lines(LINE l1, LINE l2, RPOINT *p)
{
```

```
  double x,y,w,eps ;

x = l1.b * l2.c - l2.b * l1.c;
    y = l1.c * l2.a - l2.c * l1.a;
    w = l1.a * l2.b - l2.a * l1.b;
    eps = 0.0001;

if(fabs(w) <= eps)
       return(0);
    p->x = x / w;
    p->y = y / w;
    return(1);
} int PASCAL center_of_bounded_rect(RPOINT p1,RPOINT p2, RPOINT p3,
RPOINT p4,
                 RPOINT *Center,double *Xwidth,double *Ywidth)
{
RPOINT DownCorner,UpCorner ;
RPOINT LeftCorner,RightCorner ;

if ( p2.y > p1.y ) {
   UpCorner.x = p2.x ;
   UpCorner.y = p2.y ;
 } else {
   UpCorner.x = p1.x ;
   UpCorner.y = p1.y ;
 } if ( p3.y > p4.y ) {
   DownCorner.x = p4.x ;
   DownCorner.y = p4.y ;
 } else {
   DownCorner.x = p3.x ;
   DownCorner.y = p3.y ;
 }
 if ( p1.x > p4.x ) {
   LeftCorner.x = p1.x ;
```

362

```
      LeftCorner.y = p1.y ;
   } else {
      LeftCorner.x = p4.x ;
      LeftCorner.y = p4.y ;
   } if ( p2.x > p3.x ) {
      RightCorner.x = p3.x ;
      RightCorner.y = p3.y ;
   } else {
      RightCorner.x = p2.x ;
      RightCorner.y = p2.y ;
   }

*Xwidth = fabs(RightCorner.x - LeftCorner.x)/2.0 -2 ;
   *Ywidth = fabs(UpCorner.y - DownCorner.y)/2.0 -2 ;

Center->x = min(UpCorner.x,DownCorner.x)+fabs(UpCorner.x-
DownCorner.x)/2.0 ;
   Center->y = min(UpCorner.y,DownCorner.y)+fabs(UpCorner.y-
DownCorner.y)/2.0 ;

return 1 ;
}

// This function gives back the center of each tracking window in the prototype
// and the width and height of each window in the transformed model. All
// the information is in the Windows array.

int PASCAL get_tracking_windows(RPOINT *Prot,RPOINT *Model,
                                int From,int To,TR_WIN *Windows)
{
double Xmax,Xmin ;
double XModmax,XModmin ;
double Xunit,XModunit ;
double CurrX[20] ;
RPOINT Cp1,Cp2,Cp3,Cp4 ;
```

363

```
RPOINT Cp[4] ;
RPOINT Mo[4] ;
int    i ;
LINE   UpLine,DownLine ;
LINE   UpModLine,DownModLine ;
RPOINT p1,p2,p3,p4 ;
RPOINT mo1,mo2,mo3,mo4 ;
RPOINT DumCenterArr[20] ;

p1 = Prot[0] ;
p2 = Prot[1] ;
p3 = Prot[2] ;
p4 = Prot[3] ;
mo1 = Model[0] ;
mo2 = Model[1] ;
mo3 = Model[2] ;
mo4 = Model[3] ;
Xmax = max(p1.x,p4.x) ;
Xmin = min(p2.x,p3.x) ;
Xunit = (Xmin-Xmax)/(double)(To-From) ;
XModmax = max(mo1.x,mo4.x) ;
XModmin = min(mo2.x,mo3.x) ;
XModunit = (XModmin-XModmax)/(double)(To-From) ;
mkline(p1.x,p1.y,p2.x,p2.y,&UpLine) ;
mkline(p3.x,p3.y,p4.x,p4.y,&DownLine) ;
mkline(mo1.x,mo1.y,mo2.x,mo2.y,&UpModLine) ;
mkline(mo3.x,mo3.y,mo4.x,mo4.y,&DownModLine) ;

for ( i = From ; i < To-1 ; i++ ) {
  get_quad_segment_on_x(UpLine, DownLine,Xmax,Xunit,i,Cp) ;
  center_of_bounded_rect(Cp[0],Cp[1],Cp[2],Cp[3],&(Windows[i].Center),
                &(Windows[i].Xdir),&(Windows[i].Ydir)) ;
  get_quad_segment_on_x(UpModLine,
DownModLine,XModmax,XModunit,i,Mo) ;
  center_of_bounded_rect(Mo[0],Mo[1],Mo[2],Mo[3],&(DumCenterArr[i]),
                &(Windows[i].Xdir),&(Windows[i].Ydir)) ;
}
```

364

```
return 1 ;
}

// This function gets two horizontal (approx) lines, a start point on
// X axis a unit and a number of segment, and returns in Vertexes the
// vertexes of a rectangle in the number segment which is bounded inside
// these two lines.

int PASCAL get_quad_segment_on_x(LINE UpLine,LINE DownLine,double XStart,
                double Xunit,int SegNum,RPOINT *Vertexes)
{
double StartPoint,EndPoint ;

StartPoint = XStart + Xunit*SegNum ;
  EndPoint = StartPoint + Xunit ;

Vertexes[0].y = (UpLine.a*StartPoint + UpLine.c)/-UpLine.b ;
  Vertexes[0].x = StartPoint ;
  Vertexes[1].y = (UpLine:a*EndPoint + UpLine.c)/-UpLine.b ;
  Vertexes[1].x = EndPoint ;
  Vertexes[2].x = EndPoint ;
  Vertexes[2].y = (DownLine.a*EndPoint + DownLine.c)/-DownLine.b ;
  Vertexes[3].x = StartPoint ;
  Vertexes[3].y = (DownLine.a*StartPoint + DownLine.c)/-DownLine.b ;

return 1 ;
}
```

```c
#include <windows.h>
#include <windowsx.h>
#include <math.h>
#include <commdlg.h>
#include <stdlib.h>
#include "const.h"
#include "bitmap.h"
#include "lines.h"
#include "track.h"
#include "persp.h"
#include "min_mag.h"
#include "lib.h"

define SIZE 8 define X_AXIS 1
define Y_AXIS 2
#define MAXIMAL 1
define MINIMAL 2 static double Fa[2 * FSIZE + 1], *F;
int PASCAL  LSE_Perspective(HWND ,SHIFT_POINTS , SHIFT_POINTS
,int,
                  Perspective_Transform *) ;
int PASCAL xPerspEqn(double , double , double , double *) ;
int PASCAL yPerspEqn(double , double , double , double *) ;
int PASCAL qrsolv8 (HWND ,double m[SIZE][SIZE], int , double *) ;
int  PASCAL qrdecomp (double m[SIZE][SIZE], int , double *, double *) ;
int PASCAL rsolv (double m[SIZE][SIZE], int , double *, double *) ;
int PASCAL invertPerspective(double Pf[3][3], double Pb[3][3]) ;
int PASCAL xThinEqn(double, double, double, double *) ;
int PASCAL yThinEqn(double, double, double, double *) ;
double PASCAL det3(double y[3][3]) ;
int PASCAL inv3(double y[3][3],double z[3][3]) ;
int PASCAL tmSim(SHIFT_POINTS , SHIFT_POINTS ,
int,Perspective_Transform *,
HFILE ) ;
int  __cdecl dcomp(const void *a, const void *b) ;
```

366

```c
double      norm2(RPOINT a, RPOINT b) ;
int PASCAL delete_exterme_point(SHIFT_POINTS ,SHIFT_POINTS ,
                    int , int ,int *);

MYBITMAP FAR *   minify(HWND hwnd,MYBITMAP FAR* in, int fac)
{
MYBITMAP FAR *aux, *out;

/* Build windowed-sinc filter-table */
  sinc_filter(fac);

/* horizontally sub-sample in -> aux */
  aux = hminify(hwnd, in, fac);

/* vertically sub-sample Mid -> Out */
  out = vminify(hwnd,aux, fac);

bm_free(aux);

return(out);
}

MYBITMAP FAR *hminify(HWND hwnd,MYBITMAP FAR * in, int fac)
{
MYBITMAP FAR *out;
int y;
int OutCols;
int ColorFactor ;

OutCols = in->cols / fac ;
  out = bm_alloc(OutCols , in->rows, in->typ);

if(out == NULL)
      return(NULL);
  if ( in->typ == COLOR_MODEL ) ColorFactor = 3 ;
  else ColorFactor = 1 ;
```

361

```
    out->gpic = (BYTE huge *)
        GlobalAllocPtr(GMEM_MOVEABLE,(DWORD)OutCols*(DWORD)(in-
>rows)*
                                        (DWORD)ColorFactor);

if(in->typ == GREY_MODEL) {
        for(y = 0; y < in->rows; y++) {
            lpf1D(BITMAP_PLACE_PTR(in,y,0), in->cols, fac,
                            BITMAP_PLACE_PTR(out,y,0) ) ;
        }
    }
    else { // COLOR MODEL
        for(y = 0; y < in->rows; y++) {
            lpf1D_rgb(BITMAP_RGB_PLACE_PTR(in,y,0), in->cols, fac,
                            BITMAP_RGB_PLACE_PTR(out,y,0) ) ;
        }
    }
    return(out);
}

MYBITMAP FAR *vminify(HWND hwnd,MYBITMAP FAR *in, int fac)
{
MYBITMAP FAR *out;
int y, x;
BYTE huge *ivec;
BYTE huge *ovec;
int  OutRows ;
int  ColorFactor ;

OutRows = in->rows / fac ;
    out = bm_alloc(in->cols, OutRows , in->typ);

if(out == NULL)
        return(NULL);
    if ( in->typ == COLOR_MODEL ) ColorFactor = 3 ;
    else ColorFactor = 1 ;
    out->gpic = (BYTE huge *)
```

368

```
        GlobalAllocPtr(GMEM_MOVEABLE,(DWORD)OutRows*(DWORD)(in->cols)*
                                            (DWORD)ColorFactor);
    ivec = (BYTE huge*)GlobalAllocPtr(GMEM_MOVEABLE,(DWORD)(in-
>rows)*
                                            (DWORD)ColorFactor);
    ovec = (BYTE huge *)GlobalAllocPtr(GMEM_MOVEABLE,(DWORD)(out-
>rows)*
                                            (DWORD)ColorFactor);

if(in->typ == GREY_MODEL) {
        for(x = 0; x < in->cols; x++) {
            for(y = 0; y < in->rows; y++)
                ivec[y] = BITMAP_PLACE(in,y,x) ;
            lpf1D(ivec, in->rows, fac, ovec);
            for(y = 0; y < out->rows; y++)
                BITMAP_PLACE(out,y,x) = ovec[y];
        }
    }
    else {
        for(x = 0; x < in->cols; x++) {
            for(y = 0; y < in->rows; y++) {
                ivec[(DWORD)3*(DWORD)y] =
*(BITMAP_RGB_PLACE_PTR(in,y,x)) ;
                ivec[(DWORD)3*(DWORD)y+1] =
*((BITMAP_RGB_PLACE_PTR(in,y,x))+1) ;
                ivec[(DWORD)3*(DWORD)y+2] =
*((BITMAP_RGB_PLACE_PTR(in,y,x))+2) ;
            }
            lpf1D_rgb(ivec, in->rows, fac, ovec);
            for(y = 0; y < out->rows; y++) {
                *(BITMAP_RGB_PLACE_PTR(out,y,x)) =
ovec[(DWORD)3*(DWORD)y];
                *((BITMAP_RGB_PLACE_PTR(out,y,x))+1) =
                                ovec[(DWORD)3*(DWORD)y+1];
                *((BITMAP_RGB_PLACE_PTR(out,y,x))+2) =
                                ovec[(DWORD)3*(DWORD)y+2];
            }
```

```
      }
   }
   return(out);
} int PASCAL sinc_filter(int fac)
{
int j;
int fsize = LOBES * fac;
double pie = acos(-1.0);
double sum;

F = Fa + fsize;

for(j = -fsize; j <= fsize; j++) {
      F[j] = 1.0 / (double)(2 * fsize + 1);
   }

/* Compute windowed sinc filter table */
   for(j = -fsize; j <= fsize; j++) {
      double x = (double)j / fac;
      double z, w;

if(j == 0) {
         z = 1.0;
      }
      else {
         z = sin(pie * x) / (pie * x);
      } w = 0.5 + 0.5 * cos(pie * (double)j / (double)fsize);

F[j] = z * w;
   }

/* Normalize to unit integral */
```

370

```
    for(sum = 0, j = -fsize; j <= fsize; j++)
        sum += F[j];
    for(j = -fsize; j <= fsize; j++)
        F[j] /= sum;
    return 1 ;
} int PASCAL lpf1-D(BYTE huge* in, int Dim, int fac, BYTE huge *out)
{
int i, j, k,x;
int dim = Dim / fac;
double acc ;

for(k = i = 0; i < dim; k += fac, i++) { acc = 0.0;

for(j = -2 * fac; j <= 2 * fac; j++) { x = k + j;

/* zero padding */
            if(x >= 0 && x < Dim)
                acc += (double)(*(in+x))* F[j];
        } if(acc < 0.0)
            *(out+i) = 0;
        else if(acc > 255.0)
            *(out+i) = 255;
        else
            *(out+i) = (BYTE)(0.5 + acc);;
    }
    return 1 ;
} int PASCAL lpf1D_rgb(BYTE huge* in, int Dim, int fac, BYTE huge *out)
{
```

```
int i, j, k,x;
int dim = Dim / fac;
double accr,accg,accb ;
DWORD    CurrPI ;

for(k = i = 0; i < dim; k += fac, i++) { accr = accg = accb = 0.0;

for(j = -2 * fac; j <= 2 * fac; j++) { x = k + j;

/* zero padding */
        if(x >= 0 && x < Dim) {
            accr += (double)(*(in+((DWORD)3*(DWORD)x)))* F[j];
            accg += (double)(*(in+((DWORD)3*(DWORD)x+1)))* F[j];
            accb += (double)(*(in+((DWORD)3*(DWORD)x+2)))* F[j];
        }
    }

CurrPI = (DWORD)3*(DWORD)i ;
    if(accr < 0.0)
        *(out+CurrPI) = 0;
    else if(accr > 255.0)
        *(out+CurrPI) = 255;
    else
        *(out+CurrPI) = (BYTE)(0.5 + accr);;

CurrPI = (DWORD)3*(DWORD)i+1 ;
    if(accg < 0.0)
        *(out+CurrPI) = 0;
    else if(accg > 255.0)
        *(out+CurrPI) = 255;
    else
        *(out+CurrPI) = (BYTE)(0.5 + accg);

CurrPI = (DWORD)3*(DWORD)i+2 ;
```

372

```
        if(accb < 0.0)
            *(out+CurrPl) = 0;
        else if(accb > 255.0)
            *(out+CurrPl) = 255;
        else
            *(out+CurrPl) = (BYTE)(0.5 + accb);;
    }
    return 1 ;
} int PASCAL edge_refine(MYBITMAP *Bmap,EDGE *e,int Len)
{
double dx ;
double dy ;
int status;

dx = fabs(e->xe - e->xs);
    dy = fabs(e->ye - e->ys);

if(dx < dy)
        e->vertical = 1;
    else
        e->vertical = 0;

if(e->vertical) {
        /* horizontal search for max. gradient */
        if(status = h_refine(Bmap,&(e->xs), &(e->ys),Len)) return(status);
        if(status = h_refine(Bmap,&(e->xe), &(e->ye),Len)) return(status);
    }
    else {
        /* vertical   search for max. gradient */
        if(status = v_refine(Bmap,&(e->xs), &(e->ys),Len)) return(status);
        if(status = v_refine(Bmap,&(e->xe), &(e->ye),Len)) return(status);
    }
    return(0);
}
```

373

```
int PASCAL sub_pixel_interp(double ep, double ec, double en, double *zm,
                                                  double *em)
{
    /* 1D sup-pixel estimation of the registration error minimum:
     * ep = A (-1)^2 + B (-1) + C = A - B + C
     * ec = A ( 0)^2 + B ( 0) + C =     C
     * en = A (+1)^2 + B (+1) + C = A + B + C
     *
     * yields the following solution:
     */
    double C = ec;
    double A = (ep + en) / 2.0 - C;
    double B = (en - ep) / 2.0;
    double z;

/* sup-pixel poistion estimate is zm */
    z     = *zm = - (B / (2.0 * A));
    //*em = z*(A*z +B) +C ;
    *em = A * z * z + B * z + C;

return(0);
} define EMAX 10000000L define R0 14 /* search range */
define RY 6 /* Search range in Y direction*/
double Exy[2*RY+1][2*R0+1] ;
HFILE hFile ;
OFSTRUCT of ;

int PASCAL xysolve(HWND hwnd,MYBITMAP *CurrBmap,MYBITMAP *DestBmap,
        SHIFT *Shifts,TR_WIN *Windows,int WindowsNum,
        TRACK_POINTS *TrBase,TRACK_POINTS *TrPoints,
```

```
        Perspective_Transform *NewTransf, HFILE hFile,
        TRACK_POINTS* DBasep,RPOINT *DiffArr)
{
int k, num;
SHIFT i;
char String[50] ;
int Wr = 0 ;
int j ;
double HalfX,HalfY ;
SHIFT_POINTS InitPos, NewPos ;
RPOINT ShiftVals[NUM_OF_TRACK_POINTS] ;
int Indexes[NUM_OF_TRACK_POINTS] ;
int Size,Counter ;
int RemIndex ;

for ( k = 0 ; k < NUM_OF_TRACK_POINTS ; k++ ) {
       Shifts[k].dx = Shifts[k].dy = Shifts[k].sim = 0.0 ;
   }
   k = 0 ;
   Counter = 0 ;

for(k = 0 ; k < TrPoints->NumOfPoints; k++) {
   //for(k = 0 ; k < WindowsNum; k++) {
       if ( xysrch(hwnd,CurrBmap,DestBmap,&(Shifts[k]),
           TrBase->TrackP[k],TrPoints->TrackP[k],
               //(int)(Windows[k].Xdir),(int)(Windows[k].Ydir),10,4) != 0 ) {
               CORR_WINDOWX,CORR_WINDOWY,/*R0,RY*/10,5) != 0 )
{
           ShiftVals[Counter].x = Shifts[k].dx ;
           ShiftVals[Counter].y = Shifts[k].dy ;
           Indexes[Counter] = k ;
           Counter++ ;
       }
   }
   for ( k = 0 ; k < Counter ; k++ ) {
       //InitPos.TrackP[k].x = (double)DBasep->TrackP[Indexes[k]].x ;    //
Replacing clustering.
```

```
        //InitPos.TrackP[k].y = (double)DBasep->TrackP[Indexes[k]].y ;      //
Replacing clustering.
        InitPos.TrackP[k].x = (double)TrBase->TrackP[Indexes[k]].x ;        //
Replacing clustering.
        InitPos.TrackP[k].y = (double)TrBase->TrackP[Indexes[k]].y ;        //
Replacing clustering.
        NewPos.TrackP[k].x = TrPoints->TrackP[Indexes[k]].x +
            ShiftVals[k].x - DiffArr[Indexes[k]].x;  // Replacing clustering.
        NewPos.TrackP[k].y = TrPoints->TrackP[Indexes[k]].y +
            ShiftVals[k].y -DiffArr[Indexes[k]].y;         // Replacing clustering.
    }
    Size = Counter ;         // Replacing clustering.

strcpy(String,"InitPos After Cluster\n") ;                    //
    _lwrite(hFile,String,strlen(String)) ;                        //
    for ( k = 0 ; k < Size ; k++ ) {                              //
        sprintf(String,"%lf,%lf\n",InitPos.TrackP[k].x,InitPos.TrackP[k].y);//
        _lwrite(hFile,String,strlen(String)) ;                    //
    }                                                             //
    strcpy(String,"\n\nNewPos After Cluster\n") ;                 //
    _lwrite(hFile,String,strlen(String)) ;                        //
    for ( k = 0 ; k < Size ; k++ ) {                              //
        sprintf(String,"%lf,%lf\n",NewPos.TrackP[k].x,NewPos.TrackP[k].y); //
        _lwrite(hFile,String,strlen(String)) ;                    //
    }                                                             //
    _lwrite(hFile,"\n\n\n",3) ;
    // Removing 20 % Of Bad Points
    /*
    delete_exterme_point(InitPos,NewPos, Size, X_AXIS ,&RemIndex) ;
    for ( j = RemIndex ; j < Size-1 ; j++ ) {
        InitPos.TrackP[j] = InitPos.TrackP[j+1] ;
        NewPos.TrackP[j] = NewPos.TrackP[j+1] ;
    }
    Size-- ;
    delete_exterme_point(InitPos,NewPos, Size, Y_AXIS ,&RemIndex) ;
    for ( j = RemIndex ; j < Size-1 ; j++ ) {
        InitPos.TrackP[j] = InitPos.TrackP[j+1] ;
```

```
            NewPos.TrackP[j] = NewPos.TrackP[j+1] ;
        }
        Size-- ;
    */
    if ( get_in_series_flag() == 1 ) {
        tmSim(InitPos, NewPos, Size,NewTransf,hFile) ;
    } else {
        tmSim(InitPos, NewPos, Size,NewTransf,hFile) ;
      //LSE_Perspective(hwnd,InitPos,NewPos,Size,NewTransf) ;
    } for ( k = 0 ; k < Size ; k++ ) {
        double DstX,DstY,w ;
        DstX = InitPos.TrackP[k].x * NewTransf->Pf[0][0] +
                    InitPos.TrackP[k].y * NewTransf->Pf[1][0] + NewTransf-
>Pf[2][0] ;
        DstY = InitPos.TrackP[k].x * NewTransf->Pf[0][1] +
                    InitPos.TrackP[k].y * NewTransf->Pf[1][1] + NewTransf-
>Pf[2][1] ;
        w = InitPos.TrackP[k].x * NewTransf->Pf[0][2] +
                    InitPos.TrackP[k].y * NewTransf->Pf[1][2] + NewTransf-
>Pf[2][2] ;
        sprintf(String,"%lf->%lf:::%lf->%lf\n",InitPos.TrackP[k].x,DstX/w,
                            InitPos.TrackP[k].y,DstY/w) ;
        _lwrite(hFile,String,strlen(String)) ;
    }
    for ( j = 0 ; j < 3 ; j++ ) {                           //
      sprintf(String,"\n%lf, %lf, %lf\n",NewTransf->Pf[j][0],          //
               NewTransf->Pf[j][1],NewTransf->Pf[j][2]) ;   //
      _lwrite(hFile,String,strlen(String)) ;                //
    }                                                        //
    return(1);
} int PASCAL xysrch(HWND hwnd,MYBITMAP *CurrBmap,MYBITMAP
*OriginSign,
```

```
SHIFT *s,POINT pBase,POINT pLast,int CorWinX,int CorWinY,int XWin, int
YWin)
{
int x_0, y_0;
int dx, dy, k, l;
int x_n,y_n ;
int dj, di;
double t,r ;
int i ;
double em; double e ;
char String[50] ;
int long PixInWin ;
char Buffer[256] ;
long Tresh ;
BYTE huge *CurrPtr ;
BYTE huge *ZeroPtr ;
int FromX,FromY ;
double z, d , area;

x_0 = pBase.x;
   y_0 = pBase.y;

FromX = pLast.x ;
   FromY = pLast.y ;

PixInWin = (DWORD)(CorWinX*2+1)*(DWORD)(CorWinY*2+1) ;
   Tresh = (DWORD)12*(DWORD)PixInWin ;
   //Tresh = (DWORD)4*(DWORD)PixInWin ;

area = (2 * CorWinY + 1) * (2 * CorWinX + 1);
   em = 1.0e20;
   y_n = FromY -YWin -1 ;
   for(dy = -YWin; dy <= YWin; dy++) {
     y_n++ ;
     for(dx = -XWin; dx <= XWin; dx++) {
       x_n = FromX +dx ;
       e = 0.0 ;
```

```
      for(k = -CorWinY; k <= CorWinY; k++) {
         CurrPtr = BITMAP_PLACE_PTR(CurrBmap,y_n+k,x_n) ;
         ZeroPtr = BITMAP_PLACE_PTR(OriginSign,y_0+k,x_0) ;
         for(l = -CorWinX; l <= CorWinX; l++) {
            z = CurrPtr[l] - ZeroPtr[l] ;
            e = e + z * z;
         }
      } e /= area;
      Exy[dy+YWin][dx+XWin] = e;

/* update min. error */
      if(e < em) {
         em = e;
         dj = dx;
         di = dy;
      }
   }
}
   s->dx = dj ;
   s->dy = di ;
   if ( em > Tresh ) return 0 ;
   if ( abs(dj) == XWin || abs(di) == YWin ) return 0 ;
   sub_pixel_refine(dj,di,dj+XWin, di+YWin, s);

return 1 ;
} int PASCAL sub_pixel_refine(int dj, int di, int dxIndex,int dyIndex,SHIFT *s)
{
double deltax, deltay;
double simx, simy;

s->dx = dj;
   s->dy = di;

s->sim = Exy[dyIndex][dxIndex];
```

379

```
  sub_pixel_interp(Exy[dyIndex][dxIndex-1], Exy[dyIndex][dxIndex],
                   Exy[dyIndex][dxIndex+1], &deltax, &simx);
  sub_pixel_interp(Exy[dyIndex-1][dxIndex], Exy[dyIndex][dxIndex],
                   Exy[dyIndex+1][dxIndex], &deltay, &simy);

s->dx += deltax;
  s->dy += deltay;

s->sim = (simx + simy) / 2.0;

return(0);
} static double Mp[8][8], Ap[8];
double G[2 * NUM_OF_TRACK_POINTS][8];
double Gt[8][2 * NUM_OF_TRACK_POINTS];
double Fpr[2 * NUM_OF_TRACK_POINTS];

int PASCAL Quad2Quad(HWND hwnd,RPOINT srcpnts[4],RPOINT dstpnts[4],
                         Perspective_Transform *Tp)
{
int i,j, k, status;
double x,y,u,v ;

for(k = 0; k < 4; k++) {
      x = dstpnts[k].x;
      y = dstpnts[k].y;
      u = srcpnts[k].x;
      v = srcpnts[k].y;

Ap[ k] = x;
```

```
        Ap[4 + k] = y;

xPerspEqn(x, u, v, Mp[   k]);
      yPerspEqn(y, u, v, Mp[4 + k]);
   }
   qrsolv8(hwnd, Mp, 8, Ap);

Tp->Pf[0][0] = Ap[0];
   Tp->Pf[1][0] = Ap[1];
   Tp->Pf[2][0] = Ap[2];
   Tp->Pf[0][1] = Ap[3];
   Tp->Pf[1][1] = Ap[4];
   Tp->Pf[2][1] = Ap[5];
   Tp->Pf[0][2] = Ap[6];
   Tp->Pf[1][2] = Ap[7];
   Tp->Pf[2][2] = 1.0;

status = invertPerspective(Tp->Pf, Tp->Pb);

return(1);

} int PASCAL copy_transform(Perspective_Transform
*To,Perspective_Transform *From)
{
int i,j ;

for ( i = 0 ; i < 3 ; i++ ){
   for ( j = 0 ; j < 3 ; j++ ){
      To->Pf[i][j] = From->Pf[i][j] ;
      To->Pb[i][j] = From->Pb[i][j] ;
   }
} return 1 ;
}
```

```
int PASCAL LSE_Perspective(HWND hwnd,SHIFT_POINTS src_pts,
    SHIFT_POINTS dst_pts, int pnum,Perspective_Transform *Tp)
{
  int i,j, k, status;
  double x,y,u,v ;

if(pnum < 4) {
      MessageBox (hwnd, "Cannot solve perspective with less than 3
points."
      , "Shifts", MB_ICONEXCLAMATION | MB_OK) ;
      return 0 ;
  } if(pnum == 4) { /* Quad2Quad */
      for(k = 0; k < 4; k++) {
          x = dst_pts.TrackP[k].x;
          y = dst_pts.TrackP[k].y;
          u = src_pts.TrackP[k].x;
          v = src_pts.TrackP[k].y;

Ap[   k] = x;
          Ap[4 + k] = y;

xPerspEqn(x, u, v, Mp[   k]);
          yPerspEqn(y, u, v, Mp[4 + k]);
      }
  } else {
      for(k = 0; k < pnum; k++) {
          x = dst_pts.TrackP[k].x;
          y = dst_pts.TrackP[k].y;
          u = src_pts.TrackP[k].x;
          v = src_pts.TrackP[k].y;

Fpr[   k] = x;
          Fpr[pnum + k] = y;
```

```
        xPerspEqn(x, u, v, G[k]);
        yPerspEqn(y, u, v, G[pnum + k]);
    } for(k = 0; k < 2 * pnum; k++) {
        for(j = 0; j < 8; j++) {
            Gt[j][k] = G[k][j];
        }
    } for (i = 0; i < 8; i++) {
        for (j = 0; j < 8; j++) {
            Mp[i][j] = 0.0;
            for (k = 0; k < 2 * pnum; k++) {
                Mp[i][j] += Gt[i][k] * G[k][j];
            }
        }
    } for(j = 0; j < 8; j++) {
        Ap[j] = 0;
        for(k = 0; k < pnum * 2; k++) {
            Ap[j] += Gt[j][k] * Fpr[k];
        }
    }
} qrsolv8(hwnd, Mp, 8, Ap);

Tp->Pf[0][0] = Ap[0];
Tp->Pf[1][0] = Ap[1];
Tp->Pf[2][0] = Ap[2];
Tp->Pf[0][1] = Ap[3];
Tp->Pf[1][1] = Ap[4];
Tp->Pf[2][1] = Ap[5];
Tp->Pf[0][2] = Ap[6];
Tp->Pf[1][2] = Ap[7];
```

```
      Tp->Pf[2][2] = 1.0;

status = invertPerspective(Tp->Pf, Tp->Pb);

return(1);
} int PASCAL xPerspEqn(double x, double u, double v, double *xRow)
{
   xRow[0] = u;
   xRow[1] = v;
   xRow[2] = 1;
   xRow[3] = 0;
   xRow[4] = 0;
   xRow[5] = 0;
   xRow[6] = - u * x;
   xRow[7] = - v * x;
} int PASCAL yPerspEqn(double y, double u, double v, double *yRow)
{
   yRow[0] = 0;
   yRow[1] = 0;
   yRow[2] = 0;
   yRow[3] = u;
   yRow[4] = v;
   yRow[5] = 1;
   yRow[6] = - u * y;
   yRow[7] = - v * y;
} int PASCAL qrsolv8 (HWND hwnd, double m[SIZE][SIZE], int size, double
b[SIZE])
{
int    i,
       j;
```

```
double     tau,
    m1[SIZE],
    m2[SIZE];

if (qrdecomp (m, size, m1, m2) < 0) {
    MessageBox (hwnd, "singularity in qrdecomp()."
    , "Shifts", MB_ICONEXCLAMATION | MB_OK) ;
    return 0 ;
}
for (j = 0; j < (size - 1); j++) {
    tau = 0.0;
    for (i = j; i < size; i++)
        tau += m[i][j] * b[i];
    tau /= m1[j];
    for (i = j; i < size; i++)
        b[i] -= tau * m[i][j];
}
b[size - 1] /= m2[size - 1];
rsolv (m, size, m2, b);
}
/*
 *    Compute the QR decomposition of a square matrix m using the Stewart
 *    algorithm.
 *    Upon termination , thr decomposition is stored in m,m1 and m2 as
 *    follows:
 *    R is contained in the upper triangle of m except that its main
 *    diagonal is contained in m2, and Q(transpos)=Q(n-1)*...*Q(1)
 *    where Q(j)=I-(Uj*Uj(transpos)/Pj) where
 *    Uj[i]=0, i=1-->j-1, Uj[i]=m[i][j],i=j-->n, Pj=m1[j].
 *
 *    Stewart,G.W., Introduction to matrix Computations , Academic Press,
 *         New York (1973).
 *
 * C Implementaion: Dr. I. Wilf.
 */
```

```
int PASCAL qrdecomp (double m[SIZE][SIZE], int size, double m1[SIZE],
double m2[SIZE])
{
int     i,k,j ;
double       eta,t,sigma,tau ;

for (k = 0; k < (size - 1); k++) {
    eta = 0.0;
    for (i = k; i < size; i++)
        if (fabs (m[i][k]) > eta)
            eta = fabs (m[i][k]);
    if (eta == 0.0)
       return (-1);
 /* form Qk and premultiply m by it */
    t = 0;
    for (i = k; i < size; i++) {
      m[i][k] /= eta;
        t += m[i][k] * m[i][k];
    }
    if(m[k][k] >= 0.0)
             sigma = sqrt(t);
    else
             sigma = -sqrt(t);
    m[k][k] += sigma;
    m1[k] = sigma * m[k][k];
    m2[k] = (-eta * sigma);
    tau = 0;
    for (j = k + 1; j < size; j++) {
      tau = 0;
      for (i = k; i < size; i++)
          tau += m[i][k] * m[i][j];
      tau /= m1[k];
      for (i = k; i < size; i++)
          m[i][j] -= tau * m[i][k];
    }
 }
 m2[size - 1] = m[size - 1][size - 1];
 return (0);
```

```
}
/*
 *    rsolv(m,size,m2,b)
 *    solve Rx=b for b, where the upper triangular matrix R is
 *    stored in M , m2.
 *
 * C Implementaion: Dr. I. Wilf.
 */ int PASCAL rsolv (double m[SIZE][SIZE], int size, double *m2, double *b)
{
int    i,j;
double    s;

for (i = size - 2; i >= 0; i--) {
        s = 0;
        for (j = i + 1; j < size; j++)
            s += m[i][j] * b[j];
        b[i] = (b[i] - s) / m2[i];
    }
} int PASCAL invertPerspective(double Pf[3][3], double Pb[3][3])
{ double a11 = Pf[0][0];
    double a12 = Pf[0][1];
    double a13 = Pf[0][2];
    double a21 = Pf[1][0];
    double a22 = Pf[1][1];
    double a23 = Pf[1][2];
    double a31 = Pf[2][0];
    double a32 = Pf[2][1];
    double a33 = Pf[2][2];

Pb[0][0] = a22 * a33 - a23 * a32;
    Pb[0][1] = a13 * a32 - a12 * a33;
    Pb[0][2] = a12 * a23 - a13 * a22;
```

```
    Pb[1][0] = a23 * a31 - a21 * a33;
    Pb[1][1] = a11 * a33 - a13 * a31;
    Pb[1][2] = a13 * a21 - a11 * a23;
    Pb[2][0] = a21 * a32 - a22 * a31;
    Pb[2][1] = a12 * a31 - a11 * a32;
    Pb[2][2] = a11 * a22 - a12 * a21;

inv3(Pf, Pb);

return(0);
} int PASCAL inv3(double y[3][3],double z[3][3])
{
double b[2][2],dety,detb;
int i,j,k,l,k1,l1;

dety=det3(y);
    if(dety==0.0) return(1);

/* compute [] .*/
    for(i=0;i< 3;i++)
    for(j=0;j< 3;j++) {
       for(k = 0; k < 2; k++)
       for(l = 0; l < 2; l++) {
          if(l<i) l1=l;
          else l1=l+1;
          if(k<j) k1=k;
          else  k1=k+1;
          b[k][l]=y[k1][l1];
       }
       detb=b[0][0]*b[1][1]-b[1][0]*b[0][1];
       if(((i+j)%2)==0) z[i][j]=detb/dety;
       else          z[i][j]=(-detb)/dety;
    }
} double PASCAL det3(double y[3][3])
```

```
{
short j,k,l;
double b[2][2],det,detb;

det=0.0;
    for(j=0;j<=2;j++)
    {
     for(k=0;k<=1;k++)
     for(l=0;l<=1;l++)
     {
      if(l<j) b[k][l]=y[k+1][l];
      else    b[k][l]=y[k+1][l+1];
     }
     detb=b[0][0]*b[1][1]-b[0][1]*b[1][0];
     if((j%2)==0) det=det+y[0][j]*detb;
     else         det=det-y[0][j]*detb;
    }
    return(det);
}

/*
int PASCAL invertPerspective(double Pf[3][3], double Pb[3][3])
{
double a11,a12,a13,a21,a22,a23,a31,a32,a33 ;

a11 = Pf[0][0];
    a12 = Pf[0][1];
    a13 = Pf[0][2];
    a21 = Pf[1][0];
    a22 = Pf[1][1];
    a23 = Pf[1][2];
    a31 = Pf[2][0];
    a32 = Pf[2][1];
    a33 = Pf[2][2];

Pb[0][0] = a22 * a33 - a23 * a32;
    Pb[0][1] = a13 * a32 - a12 * a33;
    Pb[0][2] = a12 * a23 - a13 * a22;
```

```
    Pb[1][0] = a23 * a31 - a21 * a33;
    Pb[1][1] = a11 * a33 - a13 * a31;
    Pb[1][2] = a13 * a21 - a11 * a23;
    Pb[2][0] = a21 * a32 - a22 * a31;
    Pb[2][1] = a12 * a31 - a11 * a32;
    Pb[2][2] = a11 * a22 - a12 * a21;

return(0);
}
*/ int PASCAL h_refine(MYBITMAP *Bmap, double *x, double *y,int Len)
{
int i, j, k, km;
int z = Len + 1;
double u, gm;
double gmax;
double a, b, c, d, e, f;
double Rx, Gx, Bx;
int rows,cols ;
DWORD Size ;
int EfectLen ;
double *Gh ;

i = (int)(*y + 0.5);
    j = (int)(*x + 0.5);
    cols = Bmap->cols ;
    rows = Bmap->rows ;

if(j < z || j > (cols - z)) return(1);
    if(i < 1 || i > (rows - 2)) return(1);

EfectLen = (DWORD)Len*(DWORD)2+1 ;
    Size = (DWORD)(sizeof(double))*(DWORD)Len*(DWORD)2+2 ;
    Gh = (double *)GlobalAllocPtr(GMEM_MOVEABLE,Size) ;

for(k = -Len; k <= Len; k++) {
        a = *(BITMAP_RGB_PLACE_PTR(Bmap,i-1,j+k-1)) ;
```

```
            b = *(BITMAP_RGB_PLACE_PTR(Bmap,i,j+k-1)) ;
            c = *(BITMAP_RGB_PLACE_PTR(Bmap,i+1,j+k-1)) ;
            d = *(BITMAP_RGB_PLACE_PTR(Bmap,i-1,j+k)) ;
            e = *(BITMAP_RGB_PLACE_PTR(Bmap,i,j+k)) ;
            f = *(BITMAP_RGB_PLACE_PTR(Bmap,i+1,j+k)) ;

Rx = a + 2.0 * b + c - d - 2.0 * e - f;

a = *(BITMAP_RGB_PLACE_PTR(Bmap,i-1,j+k-1)+1) ;
            b = *(BITMAP_RGB_PLACE_PTR(Bmap,i,j+k-1)+1) ;
            c = *(BITMAP_RGB_PLACE_PTR(Bmap,i+1,j+k-1)+1) ;
            d = *(BITMAP_RGB_PLACE_PTR(Bmap,i-1,j+k)+1) ;
            e = *(BITMAP_RGB_PLACE_PTR(Bmap,i,j+k)+1) ;
            f = *(BITMAP_RGB_PLACE_PTR(Bmap,i+1,j+k)+1) ;
            Gx = a + 2.0 * b + c - d - 2.0 * e - f;

a = *(BITMAP_RGB_PLACE_PTR(Bmap,i-1,j+k-1)+2) ;
            b = *(BITMAP_RGB_PLACE_PTR(Bmap,i,j+k-1)+2) ;
            c = *(BITMAP_RGB_PLACE_PTR(Bmap,i+1,j+k-1)+2) ;
            d = *(BITMAP_RGB_PLACE_PTR(Bmap,i-1,j+k)+2) ;
            e = *(BITMAP_RGB_PLACE_PTR(Bmap,i,j+k)+2) ;
            f = *(BITMAP_RGB_PLACE_PTR(Bmap,i+1,j+k)+2) ;
            Bx = a + 2.0 * b + c - d - 2.0 * e - f;

Gh[k+Len] = sqrt(Rx * Rx + Gx * Gx + Bx * Bx);
    }

/* Find maximal response */
km = 0;
gm = Gh[0];
for(k = 1 ; k < EfectLen; k++) {
    if(Gh[k] > gm) {
        km = k;
        gm = Gh[k];
    }
} if(km == 0 || km == EfectLen) {
```

```c
        GlobalFreePtr(Gh) ;
        return(1);
    }
    sub_pixel_interp(Gh[km-1], Gh[km], Gh[km+1], &u, &gmax);
    /* can threshold gmax to decide if edge detection was successful */
    GlobalFreePtr(Gh) ;
    if ( gmax < 100.0 ) return(1) ;
    *x += u+km;

return(0);
} int PASCAL v_refine(MYBITMAP *Bmap,double *x, double *y,int Len)
{
int i, j, k, km;
int z = Len + 1;
double v, gm;
double gmax;
int cols,rows ;
DWORD Size ;
int EfectLen ;
double a, b, c, d, e, f;
double Ry, Gy, By;
double *Gh ;

i = (int)(*y + 0.5);
    j = (int)(*x + 0.5);
    cols = Bmap->cols ;
    rows = Bmap->rows ;
    if(j < z || j > (cols - z)) return(1);
    if(i < 1 || i > (rows - 2)) return(1);

EfectLen = (DWORD)Len*(DWORD)2+1 ;
    Size = (DWORD)(sizeof(double))*(DWORD)Len*(DWORD)2+2 ;
    Gh = (double *)GlobalAllocPtr(GMEM_MOVEABLE,Size) ;

for(k = -Len; k <= Len; k++) {
        a = *(BITMAP_RGB_PLACE_PTR(Bmap,i+k-1,j-1)) ;
```

```
        b = *(BITMAP_RGB_PLACE_PTR(Bmap,i+k-1,j));
        c = *(BITMAP_RGB_PLACE_PTR(Bmap,i+k-1,j+1));
        d = *(BITMAP_RGB_PLACE_PTR(Bmap,i+k,j-1));
        e = *(BITMAP_RGB_PLACE_PTR(Bmap,i+k,j));
        f = *(BITMAP_RGB_PLACE_PTR(Bmap,i+k,j+1));

Ry = a + 2.0 * b + c - d - 2.0 * e - f;

a = *(BITMAP_RGB_PLACE_PTR(Bmap,i+k-1,j-1)+1);
        b = *(BITMAP_RGB_PLACE_PTR(Bmap,i+k-1,j)+1);
        c = *(BITMAP_RGB_PLACE_PTR(Bmap,i+k-1,j+1)+1);
        d = *(BITMAP_RGB_PLACE_PTR(Bmap,i+k,j-1)+1);
        e = *(BITMAP_RGB_PLACE_PTR(Bmap,i+k,j)+1);
        f = *(BITMAP_RGB_PLACE_PTR(Bmap,i+k,j+1)+1);

Gy = a + 2.0 * b + c - d - 2.0 * e - f;

a = *(BITMAP_RGB_PLACE_PTR(Bmap,i+k-1,j-1)+2);
        b = *(BITMAP_RGB_PLACE_PTR(Bmap,i+k-1,j)+2);
        c = *(BITMAP_RGB_PLACE_PTR(Bmap,i+k-1,j+1)+2);
        d = *(BITMAP_RGB_PLACE_PTR(Bmap,i+k,j-1)+2);
        e = *(BITMAP_RGB_PLACE_PTR(Bmap,i+k,j)+2);
        f = *(BITMAP_RGB_PLACE_PTR(Bmap,i+k,j+1)+2);
        By = a + 2.0 * b + c - d - 2.0 * e - f;

Gh[k+Len] = sqrt(Ry * Ry + Gy * Gy + By * By);
}
/* Find maximal response */
km = 0;
gm = Gh[0];
for(k = 1; k < EfectLen; k++) {
    if(Gh[k] > gm) {
       km = k;
        gm = Gh[k];
   }
}
if(km == 0 || km == EfectLen) {
    GlobalFreePtr(Gh);
```

```
            return(1);
    }
    sub_pixel_interp(Gh[km-1], Gh[km], Gh[km+1], &v, &gmax);
    /* can threshold gmax to decide if edge detection was successful */
    GlobalFreePtr(Gh) ;
    if ( gmax < 100.0 ) return(1) ;
    *y += v+km;
    return(0);
} define ORDER 8
define NDATA 20
static double qrM[ORDER][ORDER], qrA[ORDER];

double qrG[2 * NDATA][ORDER];
double qrGt[ORDER][2 * NDATA];
double qrF[2 * NDATA];

int PASCAL  Thin_Perspective(HWND hwnd, SHIFT_POINTS src_pts,
        SHIFT_POINTS dst_pts, int pnum, Perspective_Transform *Tp)
{
int i, j, k, status;

if(pnum < 3) {
        MessageBox (hwnd, "Cannot solve perspective with less than 3
points."
        , "Shifts", MB_ICONEXCLAMATION | MB_OK) ;
        return 0 ;
    } for(k = 0; k < pnum; k++) {
        double x = dst_pts.TrackP[k].x;
        double y = dst_pts.TrackP[k].y;
        double u = src_pts.TrackP[k].x;
        double v = src_pts.TrackP[k].y;

qrF[    k] = x;
```

394

```
      qrF[pnum + k] = y;

xThinEqn(x, u, v, qrG[   k]);
      yThinEqn(y, u, v, qrG[pnum + k]);
      continue;
   } for(k = 0; k < 2 * pnum; k++) {
      for(j = 0; j < 5; j++) {
         qrGt[j][k] = qrG[k][j];
      }
   } for(i = 0; i < 5; i++)
   for(j = 0; j < 5; j++) {
      qrM[i][j] = 0.0;
      for(k = 0; k < 2 * pnum; k++) {
         qrM[i][j] += qrGt[i][k] * qrG[k][j];
      }
   } for(j = 0; j < 5; j++) {
      qrA[j] = 0;
      for(k = 0; k < pnum * 2; k++) {
         qrA[j] += qrGt[j][k] * qrF[k];
      }
   } qrsolv(qrM, 5, qrA);

Tp->Pf[0][0] = qrA[0];
   Tp->Pf[1][0] = qrA[1];
   Tp->Pf[2][0] = qrA[2];
   Tp->Pf[0][1] = -qrA[1];
   Tp->Pf[1][1] = qrA[0];
   Tp->Pf[2][1] = qrA[3];
   Tp->Pf[0][2] = qrA[4];
   Tp->Pf[1][2] = 0.0;
```

```
    Tp->Pf[2][2] = 1.0;

status = invertPerspective(Tp->Pf, Tp->Pb);

return(1);
} int PASCAL xThinEqn(double x, double u, double v, double *xRow)
{
    xRow[0] = u;
    xRow[1] = v;
    xRow[2] = 1;
    xRow[3] = 0;
    xRow[4] = - u * x;
    return 1 ;
} int PASCAL yThinEqn(double y, double u, double v, double *yRow)
{
    yRow[0] = v;
    yRow[1] = -u;
    yRow[2] = 0;
    yRow[3] = 1;
    yRow[4] = - u * y;
    return 1 ;
} int PASCAL trans_grey_frame_to_fields(HWND hwnd,RPOINT
*SrcPnts,RPOINT *DstPnts,
        MYBITMAP *SrcBmap,RPOINT *FrPnts, MYBITMAP **F1,MYBITMAP
**F2)
{
Perspective_Transform TpCurr,BasicTransf ;
RPOINT      FrDst[4],CmPoly[4] ;
RECT Rectan ;
MYBITMAP *DestBmap ;
DWORD Size ;
int Cols,Rows ;
```

```
   Quad2Quad(hwnd,FrPnts,DstPnts,&TpCurr) ;
   l_find_bound_rect(DstPnts, &Rectan) ;
   l_quad_in_new_origin(CmPoly,DstPnts,Rectan.left,Rectan.top,4) ;
   Cols = Rectan.right-Rectan.left+1 ;
   Rows = Rectan.bottom-Rectan.top+1 ;
   *F1 = bm_alloc(Cols,Rows,GREY_MODEL) ;
   Size = (DWORD)Cols*(DWORD)Rows ;
   (*F1)->gpic = (BYTE huge*)GlobalAllocPtr(GMEM_MOVEABLE,Size) ;
   perspective(hwnd,SrcBmap,*F1,FrPnts,
               CmPoly, GREY_MODEL, &BasicTransf) ;

//split_bitmap_frame(SrcBmap,F1, F2) ;
   //bm_free(DestBmap) ;

return 1 ;
}
#define NZOOM 256
define WNUM  32 double rZooms[NZOOM];
double rTheta[NZOOM];
double rDx[WNUM];
double rDy[WNUM];
double ValArr[] = {0.0, 0.0, 0.0, 0.0} ;
double Wheight[] = {2.0,2.0,3.0,3.0} ;

int PASCAL tmSim(SHIFT_POINTS mpts, SHIFT_POINTS fpts, int pnum,
                 Perspective_Transform *Tp, HFILE hFile)
{
   double zoom, theta;
   double zsin, zcos;
   char String[50] ;
   double dx, dy;
   double Orgtheta ;

int i, j, nZoom = 0;
   double mlen, flen ;
```

347

```
    double mtheta, ftheta ;

if(pnum > WNUM)
    pnum = WNUM;

for(i = 0; i < pnum; i++)
for(j = i + 1; j < pnum; j++) {
    mlen = norm2(mpts.TrackP[i], mpts.TrackP[j]);
    if(mlen < 30.0)
      continue;

flen = norm2(fpts.TrackP[i], fpts.TrackP[j]);

mtheta = atan2(mpts.TrackP[j].x - mpts.TrackP[i].x,
                   mpts.TrackP[j].y - mpts.TrackP[i].y);
    ftheta = atan2(fpts.TrackP[j].x - fpts.TrackP[i].x,
                   fpts.TrackP[j].y - fpts.TrackP[i].y);

zoom  = flen / mlen;
    theta = ftheta - mtheta;

if(nZoom < NZOOM) {
      rZooms[nZoom] = zoom;
      rTheta[nZoom] = theta;
      ++nZoom;
    }
}

{ /* Trimmed-mean estimate of theta */
    double tavg = 0.0;
    int q1 = nZoom / 4;
    int q3 = 3 * q1;

qsort((void*)rTheta, (size_t)nZoom, sizeof(double), dcomp);
    for(i = q1; i < q3; i++)
      tavg += rTheta[i];
    tavg /= (double)(q3 - q1);
```

348

```
        theta = tavg;
}
{ /* Trimmed-mean estimate of zoom */
    double zavg = 0.0;
    int q1 = nZoom / 4;
    int q3 = 3 * q1;

qsort((void*) rZooms, (size_t) nZoom, sizeof(double), dcomp);
        for(i = q1; i < q3; i++)
            zavg += rZooms[i];
        zavg /= (double)(q3 - q1);
        zoom = zavg;
}

//Orgtheta = theta ;
//smooth_values(Orgtheta, &theta,ValArr,4,Wheight) ;
    sprintf(String,"\n%ZOOM %lf, THETA %lf\n",zoom,theta) ;       //
    _lwrite(hFile,String,strlen(String)) ;
zcos = zoom * cos(theta);
zsin = zoom * sin(theta);

for(i = 0; i < pnum; i++) {
    rDx[i] = fpts.TrackP[i].x - zcos * mpts.TrackP[i].x -
                            zsin * mpts.TrackP[i].y;
    rDy[i] = fpts.TrackP[i].y + zsin * mpts.TrackP[i].x -
                            zcos * mpts.TrackP[i].y;
}

{ /* Trimmed-mean estimate of dx */
    double xavg = 0.0;
    int q1 = pnum / 4;
    int q3 = 3 * q1;

qsort((void*)rDx, (size_t)pnum, sizeof(double), dcomp);
        for(i = q1; i < q3; i++)
            xavg += rDx[i];
        xavg /= (double)(q3 - q1);
        dx = xavg;
```

```
    }

{ /* Trimmed-mean estimate of dy */
        double yavg = 0.0;
        int q1 = pnum / 4;
        int q3 = 3 * q1;

qsort((void*)rDy, (size_t)pnum, sizeof(double), dcomp);
            for(i = q1; i < q3; i++)
                yavg += rDy[i];
            yavg /= (double)(q3 - q1);
            dy = yavg;
    }

{ /* Fill fwd. matrix */

Tp->Pf[0][0] = zcos;
            Tp->Pf[1][0] = zsin;
            Tp->Pf[2][0] = dx;

Tp->Pf[0][1] = -zsin;
            Tp->Pf[1][1] = zcos;
            Tp->Pf[2][1] = dy;

Tp->Pf[0][2] = 0;
            Tp->Pf[1][2] = 0;
            Tp->Pf[2][2] = 1;

inv3(Tp->Pf, Tp->Pb);
    }
    return(1);
} double     norm2(RPOINT a, RPOINT b)
{
    double dx = a.x - b.x;
    double dy = a.y - b.y;
```

400

SUBSTITUTE SHEET (RULE 26)

```
    return(sqrt(dx * dx + dy * dy));
} int   __cdecl dcomp(const void *a, const void *b)/*(double *a, double *b)*/
{
   if(*(double*)a == *(double*)b) return(0);
   return(*(double*)a < *(double*)b ? -1 : 1);
} int PASCAL delete_exterme_point(SHIFT_POINTS init,SHIFT_POINTS new,
                      int Size, int Axis,int *Index)
{
int i ;
double Value,Tmp ;

if (Axis = X_AXIS ) {
    Value = -100.0 ;
    for ( i = 0 ; i < Size ; i++ ) {
        if ( (Tmp = fabs(new.TrackP[i].x - init.TrackP[i].x)) > Value ) {
           Value = Tmp ;
           *Index = i ;
        }
    }
  } if (Axis = Y_AXIS ) {
    Value = -100.0 ;
    for ( i = 0 ; i < Size ; i++ ) {
        if ( (Tmp = fabs(new.TrackP[i].y - init.TrackP[i].y)) > Value ) {
           Value = Tmp ;
           *Index = i ;
        }
    }
  } return 1 ;
}
```

401

SUBSTITUTE SHEET (RULE 26)

We claim:

1. A broadcasting method comprising imaging an event using a plurality of TV cameras and broadcasting an image generated by a first one of the plurality of TV cameras, said first one of the TV cameras being an on-air camera, and for each frame of the images compressing the images generated by all but said first one of the plurality of cameras which are off-air cameras, decoding the image provided by at least one of the off-air cameras, processing data relating to an advertisement site imaged by said at least one off-air camera, matching the image of the advertisement site to a stored representation of an advertisement currently being processed, warping the image in the on-air camera and subtracting the image from the stored representation for the at lest one off-air camera in order to obtain an estimate of an occlusion area for said at least one off-air camera and said advertisement.

2. A method as claimed in claim 1, in which the advertisement image of said at least one off-air camera is warped onto the advertisement site imaged by the on-air camera.

3. A method as claimed in claim 2, in which the warped off-air advertisement image is subtracted from the on-air image and the difference image is filtered to compute a boundary of the occluding object at pixel-level accuracy.

4. A method as claimed in claim 3, in which the images provided by all of the off-air cameras are decoded and in which one of the cameras is selected by performing preliminary analysis on the images generated by each off-air camera to select the most helpful off-air camera.

* * * * *